(12) United States Patent
Peng et al.

(10) Patent No.: US 11,595,330 B2
(45) Date of Patent: Feb. 28, 2023

(54) INFORMATION PROCESSING METHOD, APPARATUS, DEVICE, AND STORAGE MEDIUM

(71) Applicant: Tencent Technology (Shenzhen) Company Limited, Shenzhen (CN)

(72) Inventors: Ying Peng, Shenzhen (CN); Jingjing Yang, Shenzhen (CN); Yangzhou Deng, Shenzhen (CN); Chong Wang, Shenzhen (CN); Yumiao Zhang, Shenzhen (CN); Xingxing Dai, Shenzhen (CN); Zhenquan Wu, Shenzhen (CN); Shan Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/382,222

(22) Filed: Jul. 21, 2021

(65) Prior Publication Data

US 2022/0014488 A1  Jan. 13, 2022

Related U.S. Application Data

(63) Continuation of application No. 16/194,154, filed on Nov. 16, 2018, now Pat. No. 11,153,237, which is a
(Continued)

(30) Foreign Application Priority Data

Aug. 4, 2016 (CN) .......................... 201610635639.6
Aug. 26, 2016 (CN) .......................... 201610729463.0
(Continued)

(51) Int. Cl.
  *H04L 51/046* (2022.01)
  *H04L 51/18* (2022.01)
  (Continued)

(52) U.S. Cl.
  CPC ........ *H04L 51/046* (2013.01); *G06F 21/6263* (2013.01); *G06Q 20/065* (2013.01);
  (Continued)

(58) Field of Classification Search
  CPC ....... H04L 51/046; H04L 51/10; H04L 51/18; H04L 51/32; G06F 21/6263;
  (Continued)

(56) References Cited

U.S. PATENT DOCUMENTS 9,858,605 B2   1/2018  Normann et al.
9,959,037 B2   5/2018  Chaudhri et al.
(Continued)

FOREIGN PATENT DOCUMENTS

CN   103973769 A   8/2014
CN   105183895 A   12/2015
(Continued)

OTHER PUBLICATIONS

Tencent Technology, ISRWO, PCT/CN2017/094361, dated Oct. 12, 2017, 11 pgs.
(Continued)

*Primary Examiner* — John A Follansbee
*Assistant Examiner* — Fadi Haj Said
(74) *Attorney, Agent, or Firm* — Morgan, Lewis & Bockius LLP

(57) ABSTRACT

The present application discloses an information processing method. The method includes: acquiring a resource package parameter determined by a sender client; invoking an interface with a second server, and acquiring a current conversion rate that is between the first-type resource and a second-type rate
(Continued)

resource and is issued by the second server; calculating a quantity of second-type resources equal in value to the first quantity of first-type resources according to the conversion rate, and using the quantity as a second quantity; deducting the second quantity of second-type resources from a second-type resource account of the sender client, and generating at least one resource package, a sum of quantities corresponding to the at least one resource package being equal to the first quantity; and distributing the at least one resource package to at least one receiver client by using the link information.

18 Claims, 62 Drawing Sheets

Related U.S. Application Data continuation-in-part of application No. PCT/CN2017/094361, filed on Jul. 25, 2017.

(30) Foreign Application Priority Data

| Oct. 27, 2016 | (CN) | .................. | 201610955516.0 |
| Oct. 31, 2016 | (CN) | .................. | 201610927287.1 |
| Dec. 6, 2016 | (CN) | .................. | 201611108377.4 |
| Dec. 6, 2016 | (CN) | .................. | 201611108806.8 |
| Dec. 30, 2016 | (CN) | .................. | 201611255510.9 |

(51) Int. Cl.

| *G06Q 50/00* | (2012.01) |
| *G06F 21/62* | (2013.01) |
| *G06Q 20/06* | (2012.01) |
| *H04L 51/10* | (2022.01) |
| *G06Q 20/36* | (2012.01) |
| *G06Q 20/32* | (2012.01) |
| *G06Q 20/40* | (2012.01) |
| *H04L 51/52* | (2022.01) |

(52) U.S. Cl.
CPC ..... *G06Q 20/0655* (2013.01); *G06Q 20/3223* (2013.01); *G06Q 20/363* (2013.01); *G06Q 20/405* (2013.01); *G06Q 50/01* (2013.01); *H04L 51/10* (2013.01); *H04L 51/18* (2013.01); *H04L 51/52* (2022.05)

(58) Field of Classification Search
CPC ............ G06Q 20/065; G06Q 20/0655; G06Q 20/3223; G06Q 20/405; G06Q 50/01; G06Q 20/363
See application file for complete search history.

(56) References Cited

U.S. PATENT DOCUMENTS

| 10,296,194 | B2 | 5/2019 | McLean et al. |
| 2008/0010372 | A1* | 1/2008 | Khedouri ......... H04N 21/47202 709/224 |
| 2010/0251137 | A1 | 9/2010 | Qureshi |
| 2011/0099486 | A1 | 4/2011 | Nesladek et al. |
| 2011/0282764 | A1 | 11/2011 | Borst et al. |
| 2011/0307384 | A1* | 12/2011 | Digrigoli ............... G06Q 20/40 705/44 |
| 2012/0109785 | A1 | 5/2012 | Karlsson |
| 2013/0006627 | A1* | 1/2013 | Guthery .................. H04L 51/04 704/235 |
| 2014/0108928 | A1* | 4/2014 | Mumick ............. G06F 3/04883 715/716 |
| 2014/0156512 | A1* | 6/2014 | Rahman ............... G06Q 20/326 705/39 |
| 2014/0279446 | A1* | 9/2014 | Dorsey ................ G06Q 20/023 705/39 |
| 2014/0310780 | A1* | 10/2014 | Siwik .................... H04L 63/108 726/4 |
| 2014/0325667 | A1 | 10/2014 | Sun |
| 2014/0349692 | A1* | 11/2014 | Zhou ................. H04M 1/72439 455/466 |
| 2015/0324858 | A1* | 11/2015 | DeMattei ........... G06Q 30/0267 705/14.64 |
| 2016/0180425 | A1 | 6/2016 | Normann et al. |
| 2016/0234302 | A1 | 8/2016 | Wu et al. |
| 2017/0178094 | A1 | 6/2017 | Yu et al. |
| 2017/0200202 | A1 | 7/2017 | Yu et al. |
| 2017/0336958 | A1* | 11/2017 | Chaudhri ............. G06Q 10/107 |
| 2018/0324121 | A1 | 11/2018 | Zhang et al. |
| 2019/0124021 | A1 | 4/2019 | DeMattei |
| 2019/0306100 | A1 | 10/2019 | Guthery et al. |

FOREIGN PATENT DOCUMENTS

| CN | 105389117 A | 3/2016 |
| CN | 105553681 A | 5/2016 |
| CN | 105610695 A | 5/2016 |
| CN | 105681056 A | 6/2016 |
| CN | 106302111 A | 1/2017 |
| CN | 106355454 A | 1/2017 |
| CN | 106599142 A | 4/2017 |
| CN | 106709705 A | 5/2017 |
| CN | 106789562 A | 5/2017 |

OTHER PUBLICATIONS

Tencent Technology, IPRP, PCT/CN2017/094361, dated Feb. 5, 2019, 8 pgs.

\* cited by examiner

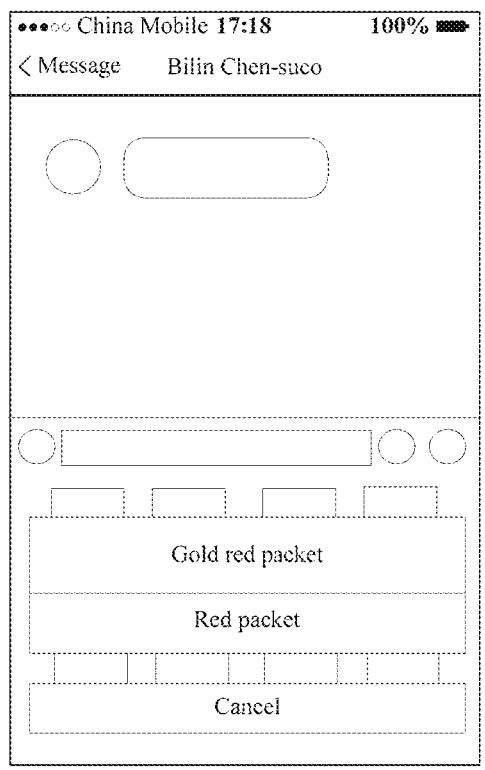 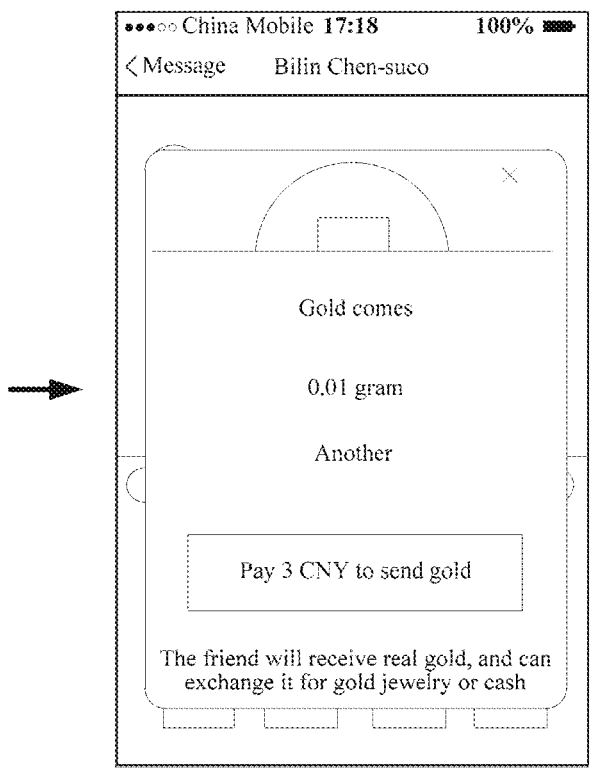
FIG. 6A-1    FIG. 6A-2

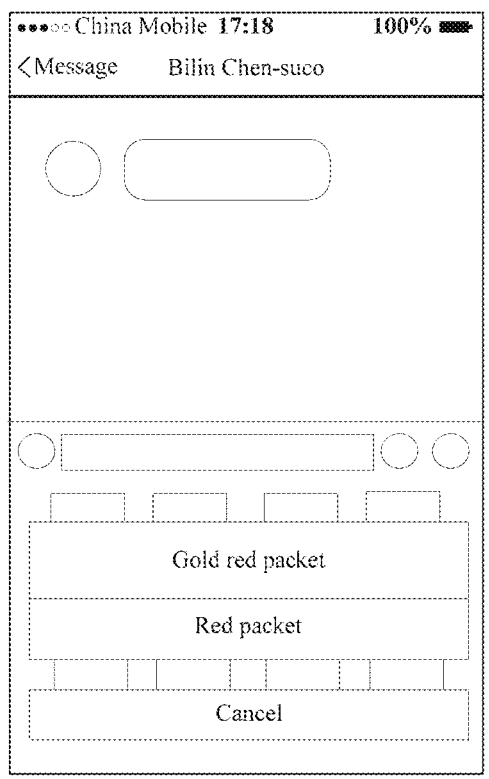 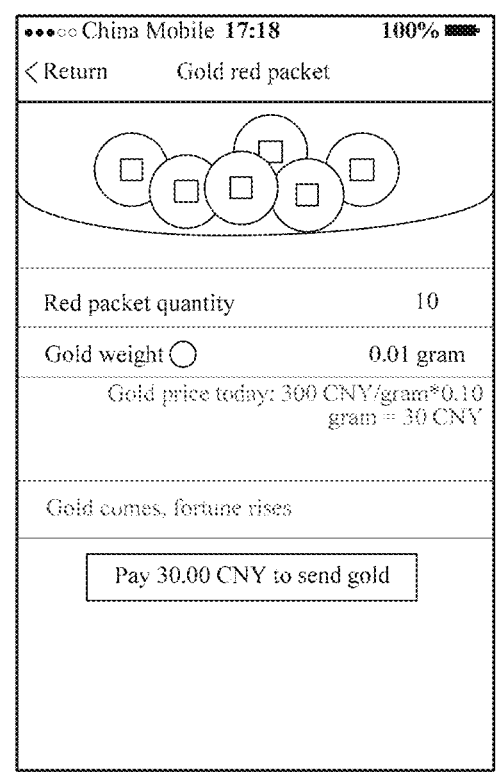
FIG. 6B-1              FIG. 6B-2

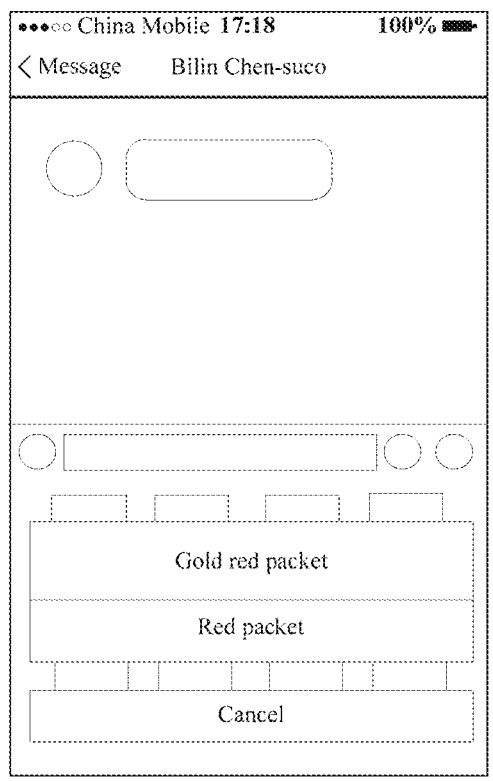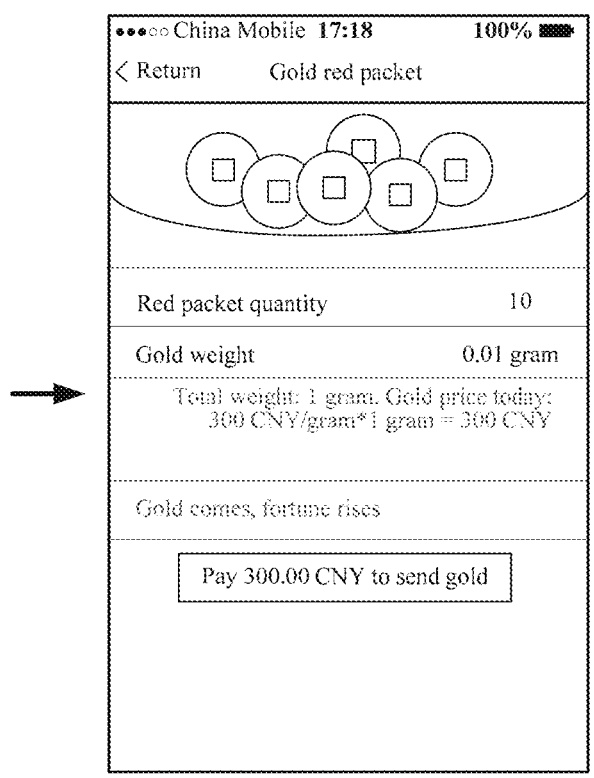
FIG. 6C-1    FIG. 6C-2

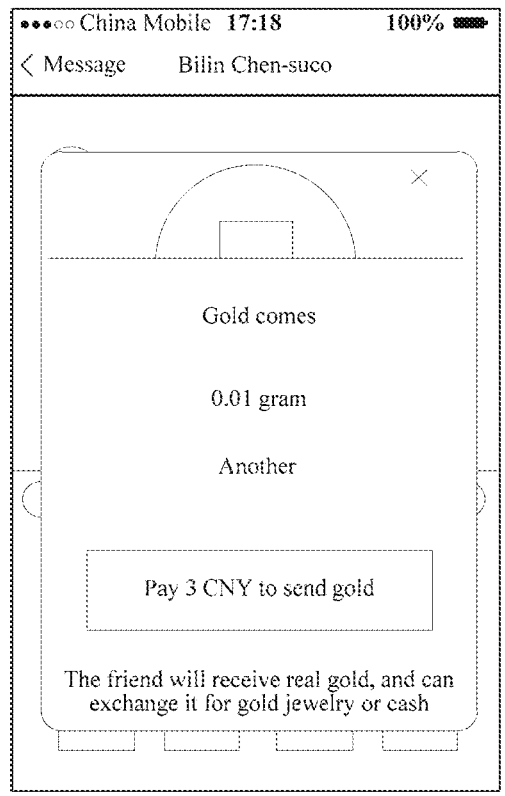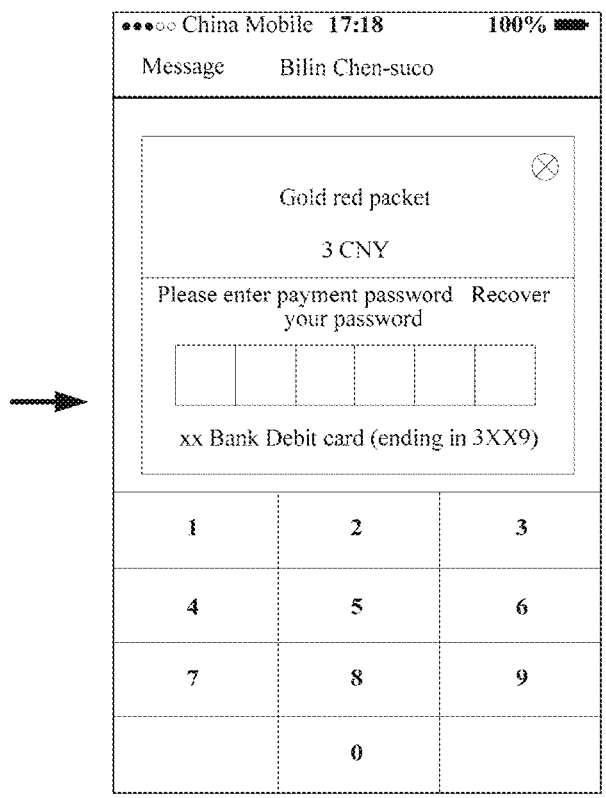
FIG. 6E-1    FIG. 6E-2
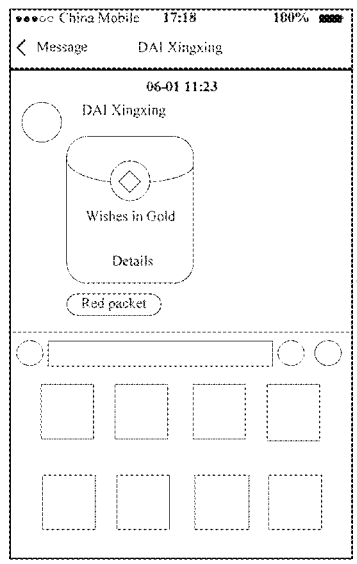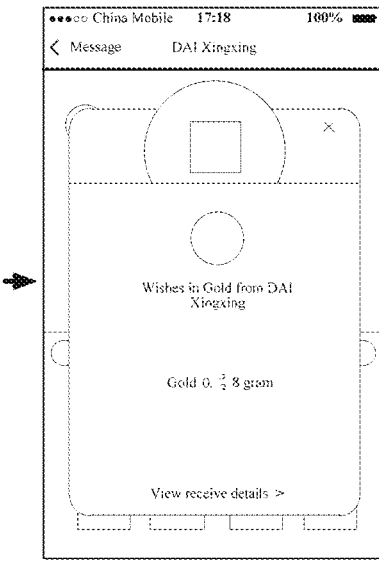
FIG. 6F-1    FIG. 6F-2    FIG. 6F-3

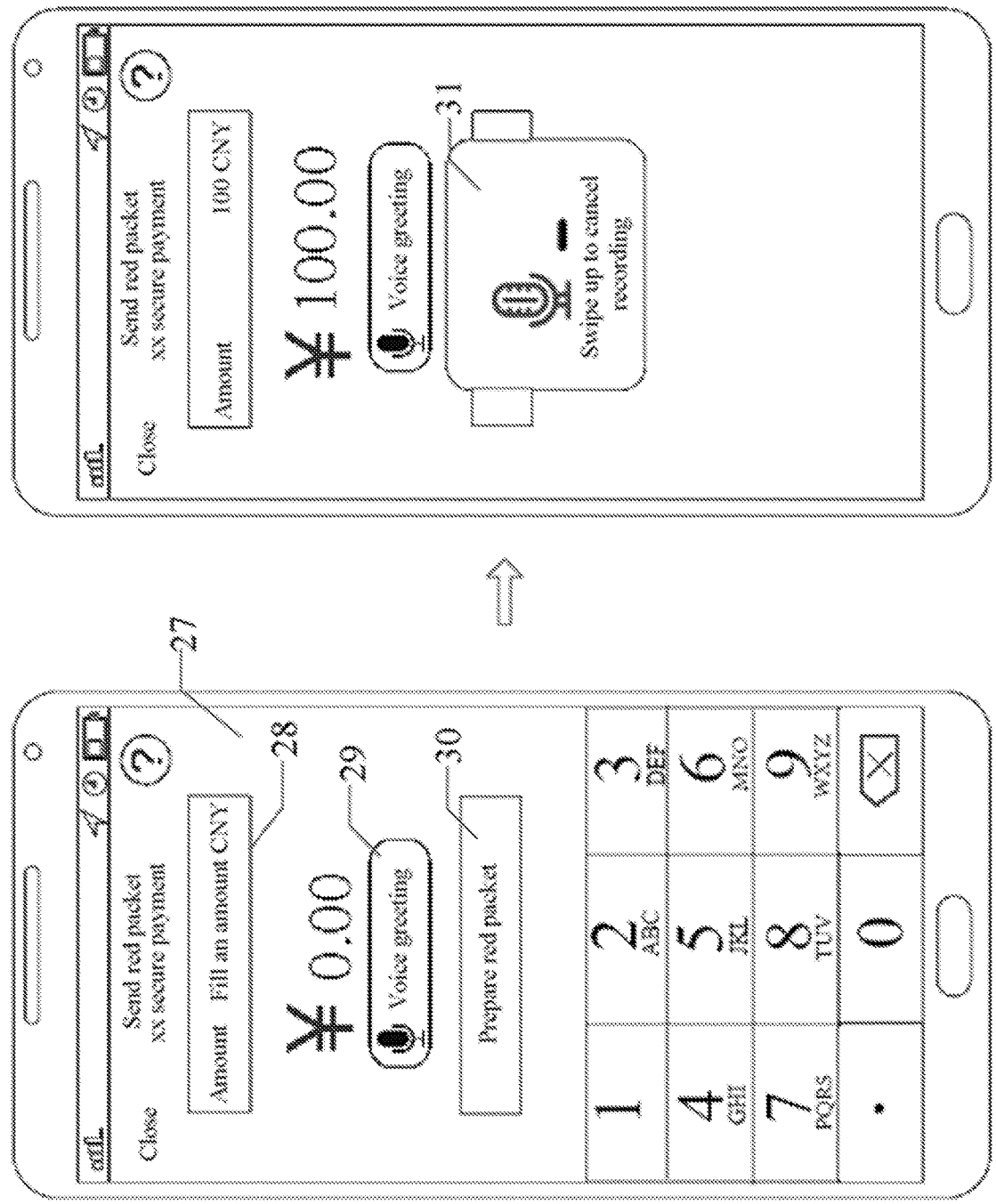

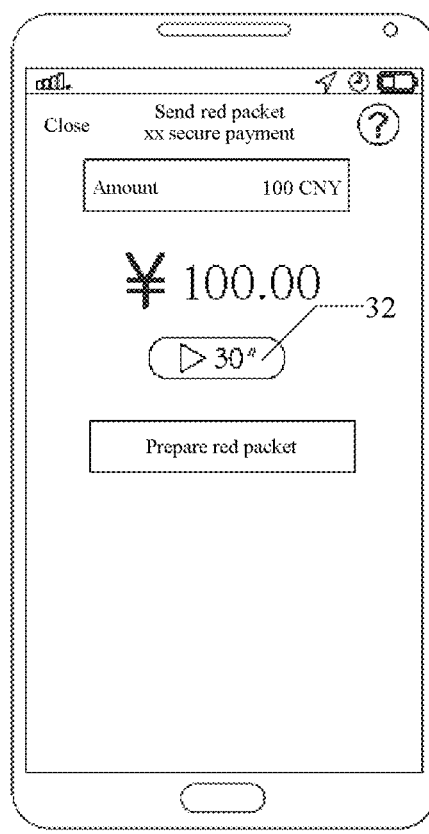 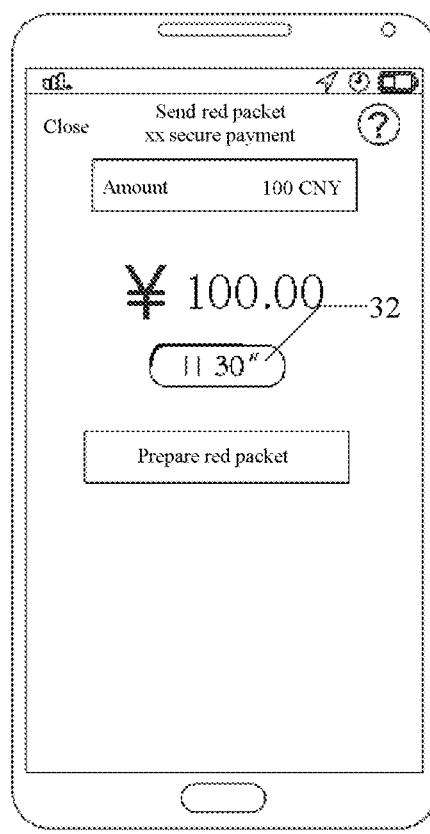
FIG. 15C-1　　　　　　　FIG. 15C-2

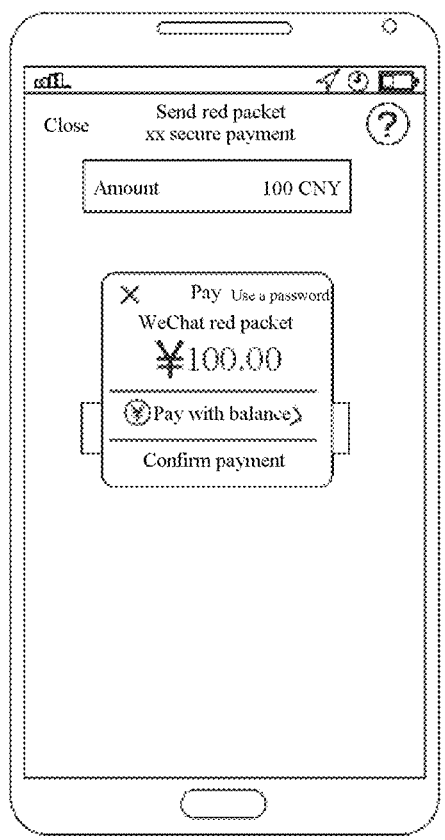
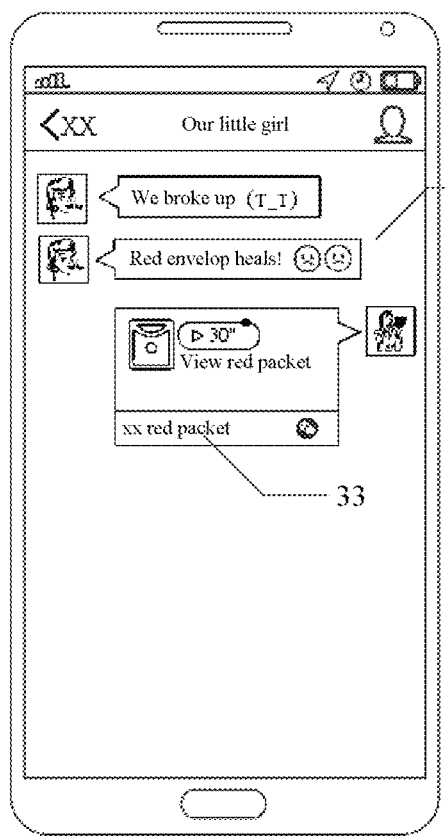
FIG. 15D-1          FIG. 15D-2

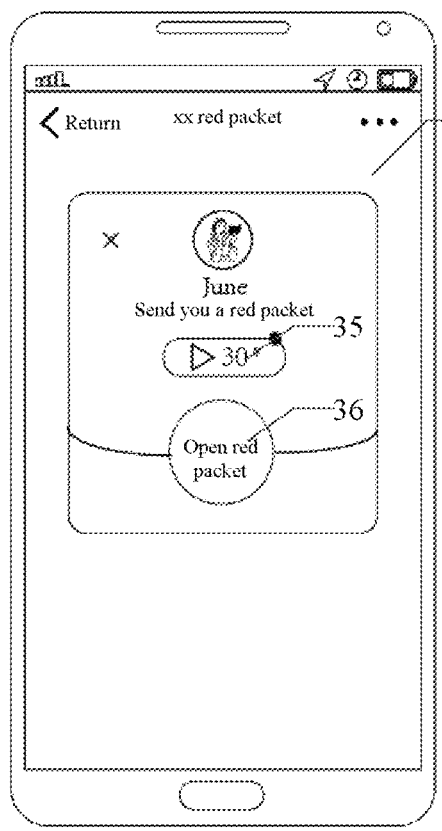
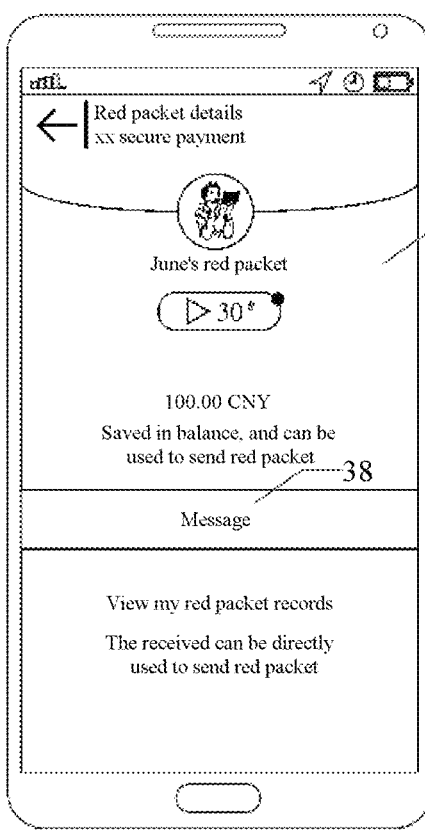
FIG. 15E-1                FIG. 15E-2

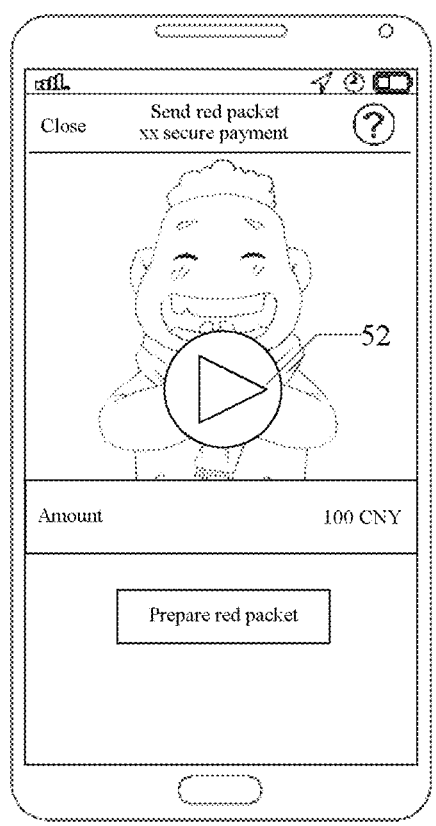
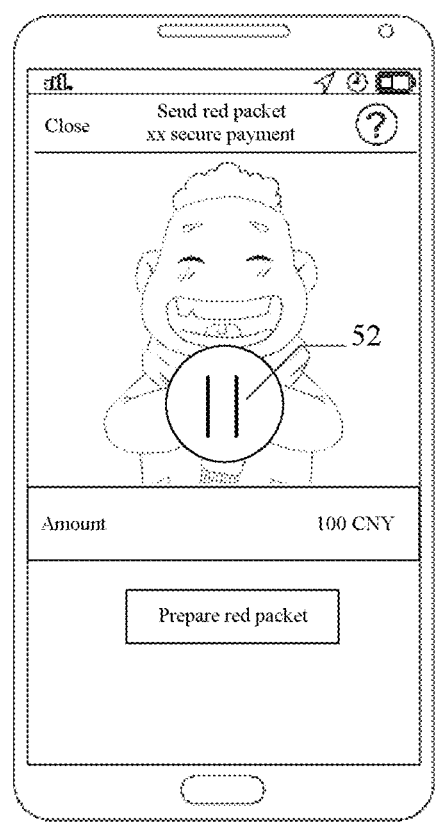
FIG. 17C-1    FIG. 17C-2

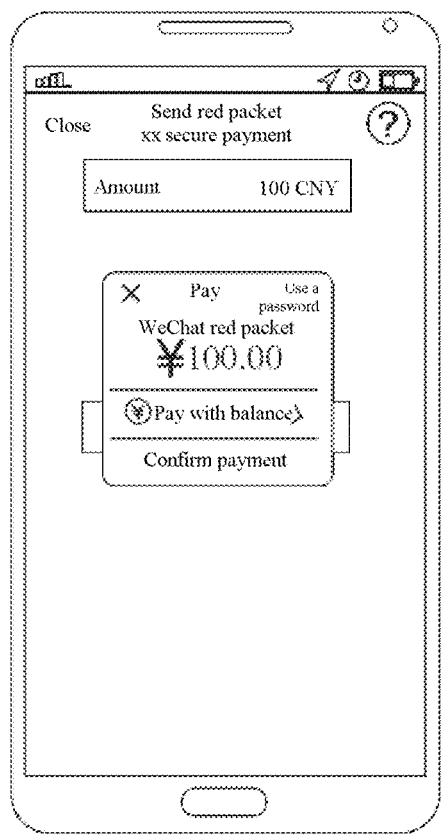
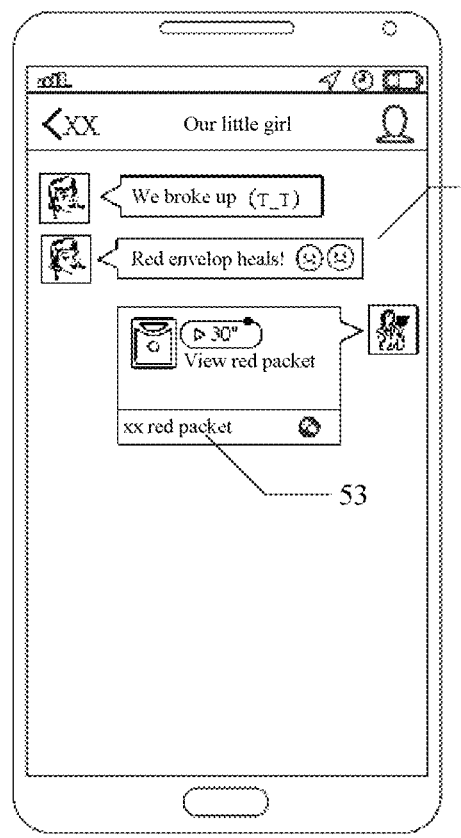
FIG. 17D-1    FIG. 17D-2

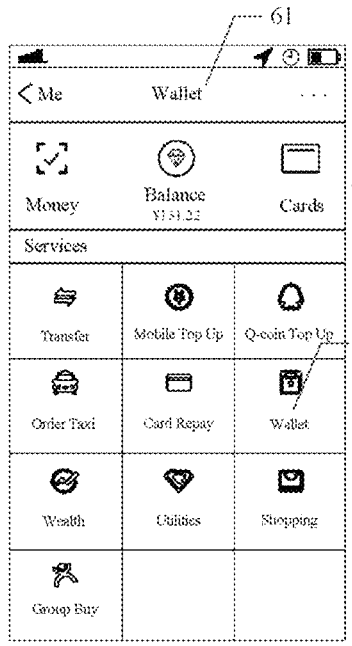
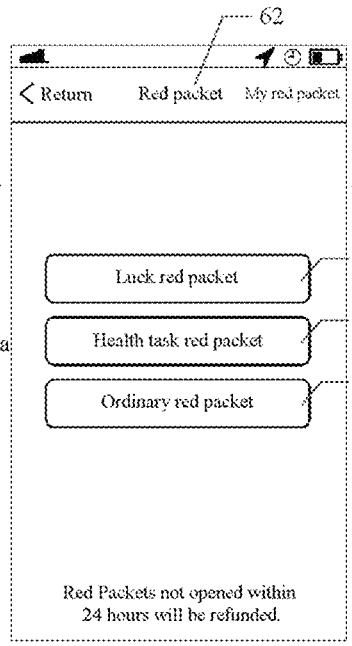
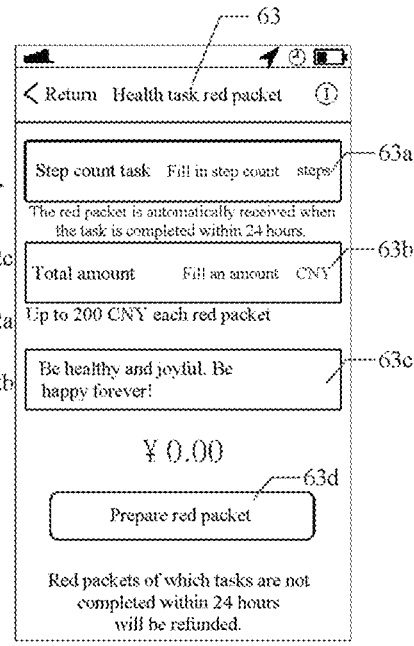
FIG. 24B-1    FIG. 24B-2    FIG. 24B-3
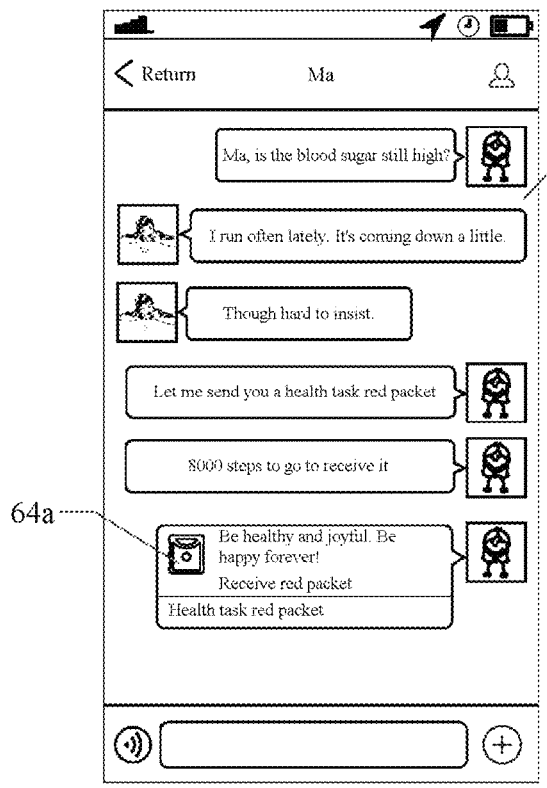
FIG. 24C

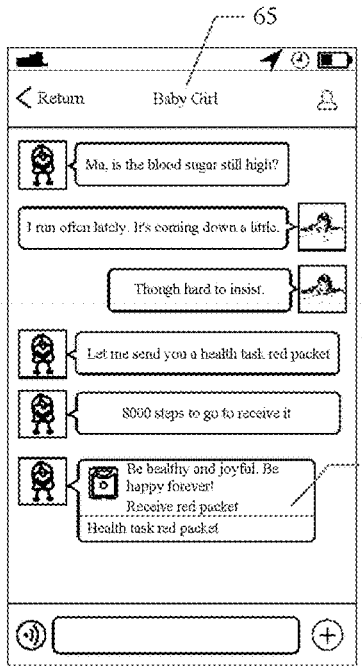 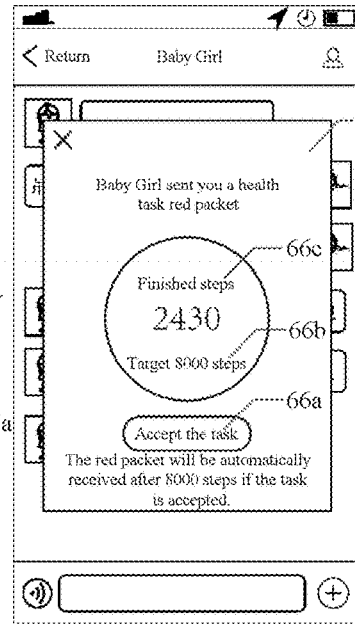 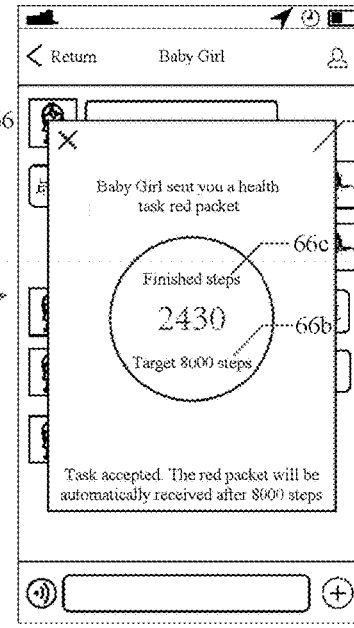
FIG. 24D-1         FIG. 24D-2         FID. 24D-3
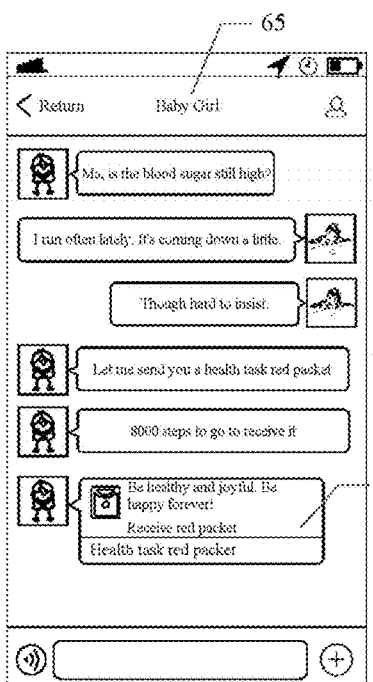 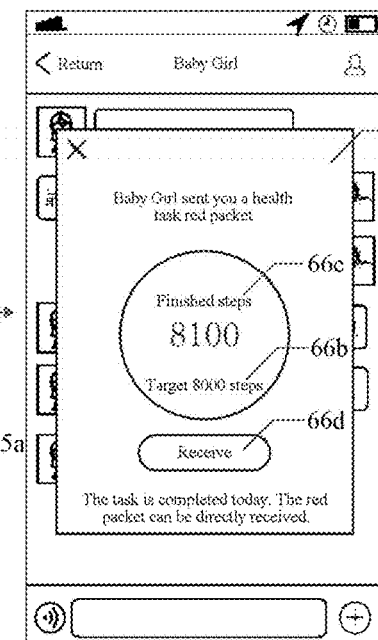 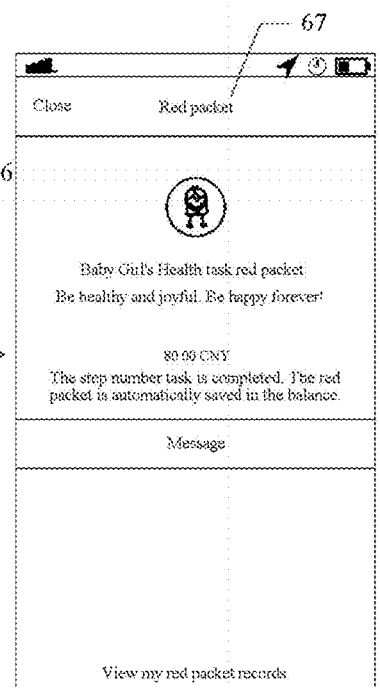
FIG. 24E-1         FIG. 24E-2         FIG. 24E-3

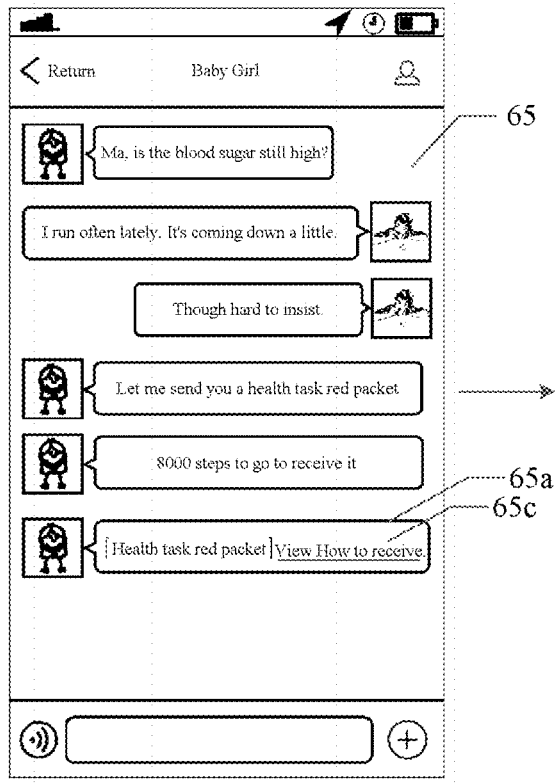
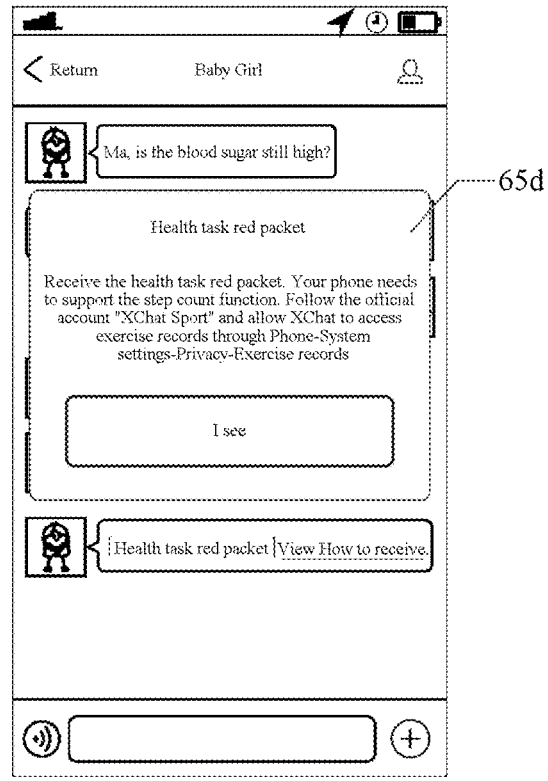
FIG. 24G-1      FIG. 24G-2
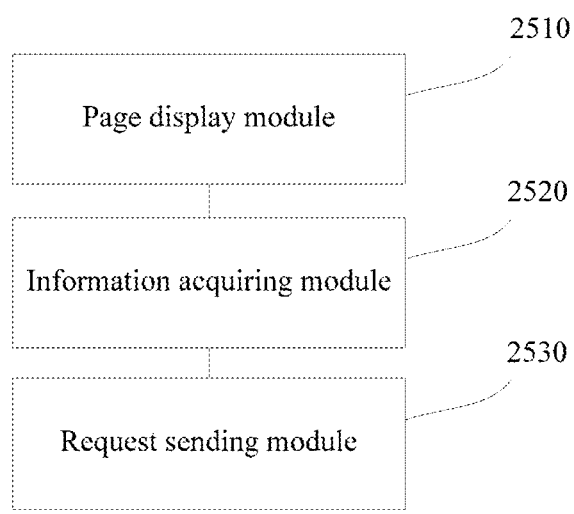
FIG. 25

INFORMATION PROCESSING METHOD, APPARATUS, DEVICE, AND STORAGE MEDIUM

PRIORITY CLAIMS AND RELATED APPLICATIONS

This application is a continuation of U.S. patent application Ser. No. 16/194,154, which is a continuation-in-part application of PCT Application No. PCT/CN2017/094361, entitled "INFORMATION PROCESSING METHOD, APPARATUS, DEVICE, AND STORAGE MEDIUM", filed on Jul. 25, 2017, which claims priority to the following Chinese patent applications, all of which are incorporated herein by reference in their entireties (i) Chinese Patent Application No. 201610635639.6, filed with the Chinese Patent Office on Aug. 4, 2016 and entitled "INFORMATION PROCESSING METHOD, TERMINAL, AND SERVER"; (ii) Chinese Patent Application No. 201610729463.0, filed with the Chinese Patent Office on Aug. 26, 2016 and entitled "METHOD FOR SENDING RESOURCE PACKAGE, METHOD FOR DISTRIBUTING RESOURCE PACKAGE, AND RESOURCE ACQUISITION METHOD AND APPARATUS"; (iii) Chinese Patent Application No. 201610955516.0, filed with the Chinese Patent Office on Oct. 27, 2016 and entitled "METHODS, APPARATUSES, AND SYSTEMS FOR SENDING AND RECEIVING VIRTUAL ITEM PACKAGE"; (iv) Chinese Patent Application No. 201610927287.1, filed with the Chinese Patent Office on Oct. 31, 2016 and entitled "INFORMATION RECOMMENDATION METHOD, SERVER, AND CLIENT"; (v) Chinese Patent Application No. 201611108377.4, filed with the Chinese Patent Office on Dec. 6, 2016 and entitled "METHODS, APPARATUSES, AND SYSTEMS FOR SENDING AND RECEIVING VIRTUAL ITEM"; (vi) Chinese Patent Application No. 201611108806.8, filed with the Chinese Patent Office on Dec. 6, 2016 and entitled "METHOD AND APPARATUS FOR RECEIVING DATA RESOURCE"; and (vii) Chinese Patent Application No. 201611255510.9, filed with the Chinese Patent Office on Dec. 30, 2016 and entitled "METHODS, APPARATUSES, AND SYSTEMS FOR SENDING AND RECEIVING VIRTUAL ITEM PACKAGE".

FIELD OF THE TECHNOLOGY

The present application relates to the field of information processing technology, and in particular, to an information processing method, apparatus, device, and a storage medium.

BACKGROUND OF THE DISCLOSURE

With the gradual increase of socialization needs of users and the popularization of social application clients, it already becomes a common socialization manner to send "red packets" by using social application clients. A "red packet" is used as a medium for virtual resources. A virtual resource can be sent by sending a "red packet".

The virtual resource may be a virtual currency, a virtual gift, or the like. A sender usually establishes a virtual resource account, and stores a virtual resource in the virtual resource account. When needing to send a "red packet", a sender client deducts virtual resources corresponding to the quantity from the virtual resource account according to a quantity of virtual resources to be sent, adds the virtual resources to a "red packet", and then sends the "red packet" to a receiver client. After receiving the "red packet", the receiver client may open the "red packet" to acquire a virtual resource.

SUMMARY

To resolve the related technical problems, embodiments of the present disclosure provide an information processing method, apparatus, device, and a storage medium. The information processing method may include aspects of sending a resource package, aspects of distributing a resource package, aspects of resource acquisition, aspects of sending a virtual item package, aspects of receiving a virtual item package, aspects of receiving a data resource, and so on. The technical solutions are as follows:

A method is performed at a first server having one or more processors, memory, and a display. The method includes: acquiring a resource package parameter determined by a sender client, the resource package parameter being used to determine a quantity of resource packages to be sent and a first quantity, and the first quantity being a quantity of first-type resources to be sent; invoking an interface with a second server, and acquiring a current conversion rate that is between the first-type resource and a second-type resource and is issued by the second server; calculating a quantity of second-type resources equal in value to the first quantity of first-type resources according to the conversion rate, and using the quantity as a second quantity; deducting the second quantity of second-type resources from a second-type resource account of the sender client, and generating at least one resource package, a sum of quantities corresponding to the at least one resource package being equal to the first quantity, so that the sender client sends link information to at least one receiving end having a friendship, the link information being used to receive the at least one resource package; and distributing the at least one resource package to at least one receiver client by using the link information.

According to a second aspect of the present disclosure, a computer acting as a first server includes one or more processors, memory, a display, and a plurality of instructions stored in the memory that, when executed by the one or more processors, cause the first client device to perform the aforementioned method.

According to a third aspect of the present disclosure, a non-transitory computer readable storage medium storing a plurality of instructions configured for execution by a computer acting as a first client device having one or more processors, the plurality of instructions causing the first client device to perform the aforementioned method.

Details of one or more embodiments of the present disclosure are provided in the following accompanying drawings and descriptions. Other features, objectives, and advantages of the present disclosure become clear in the specification, the accompanying drawings, and the claims. The technical solutions provided in the embodiments of the present disclosure have the following beneficial effects:

A solution of sending a resource package after a second-type resource is converted into a first-type resource is provided. A conversion rate issued by a second server is acquired, a second-type resource is deducted according to the conversion rate, and at least one resource package including a first-type resource is generated, so that the second-type resource is converted into a first-type resource package equal in value for sending. A first-type resource package can be sent even if there is no first-type resource, so that the flexibility is improved, and the solution can be used to perform conversion and then send a resource package for any two types of resources, so that requirements of sending different types of resource packages by users are satisfied.

As disclosed herein, when sending a virtual item package, a sender user may record media information as association information of the virtual item package and send the association information to a receiver. The receiver can play the media information after receiving the virtual item package. Therefore, compared with a greeting in a text form, media can transfer more information. For example, a receiver user can intuitively and explicitly know a mental state of the sender user according to features such as the voice, pitch, and tone of the sender user, thereby enriching the amount of information transferred in sending a virtual item package.

As disclosed herein, upon receiving a virtual item package, a receiver client may send a virtual-item receiving request to a backend server to request to acquire a virtual item in the virtual item package. When a large number of users are exchanging virtual item packages, a large quantity of virtual-item receiving requests are generated, causing heavy processing load to the backend server. However, in the embodiments of the present disclosure, task information is additionally set during the sending of a virtual item package, a receiver user needs to complete a task indicated by the task information before the receiver user can request to receive a virtual item in the virtual item package. Because the time of performing tasks is indefinite, even if a relatively large number of users are exchanging virtual item packages, requests are staggered. In this case, the processing load on the backend server at a same time is reduced. In addition, tasks are added during the receiving and sending of virtual item packages, so that the forms of receiving and sending the forms of receiving and sending virtual item packages can be enriched.

As disclosed herein, a new information interaction solution about "Grab red packet" is provided. When a second user triggers second information for the first time, a server starts a timer to start timing. That is, a user that triggers red packet information within a countdown timing time is marked as valid. A user that triggers red packet information before a timing time of the timer is up may obtain a red packet, thereby greatly shortening a time period of acquiring a distributable resource and improving the efficiency of information interaction.

As disclosed herein, personal information of a specific user can be combined to recommend to the user a coupon, a voucher or the like that meets requirements of the user, so that the recommendation precision is relatively high, the conversion efficiency of coupons or vouchers is enhanced, and the exposure of merchant brands is improved.

As disclosed herein, a first terminal receives a plurality of data resources sent by a data server; controls the plurality of data resources to respectively slide in from a first edge of a display interface and slide towards a second edge opposite the first edge to dynamically present the plurality of data resources; detects a click operation on the dynamically presented plurality of data resources, and counts a quantity of clicked data resources of the plurality of data resources; and sends the quantity of clicked data resources to the data server, so that the data server determines a data transfer size according to the quantity of clicked data resources and returns the data transfer size to the first terminal, thereby promoting communication between users by dynamically presenting data resources and improving the frequency of data transfer.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show merely some embodiments of the present disclosure, and a person of ordinary skill in the technology may still derive other drawings from these accompanying drawings without creative efforts.

FIG. 6A-1 and FIG. 6A-2 are schematic diagrams of an information processing process of sending a resource package according to an embodiment of the present disclosure;

FIG. 6B-1 and FIG. 6B-2 are schematic diagrams of an information processing process of sending a resource package according to an embodiment of the present disclosure;

FIG. 6C-1 and FIG. 6C-2 are schematic diagrams of an information processing process of sending a resource package according to an embodiment of the present disclosure;

FIG. 6E-1 and FIG. 6E-2 are schematic diagrams of a resource deduction interface according to an embodiment of the present disclosure;

FIG. 6F-1, FIG. 6F-2 and FIG. 6F-3 are schematic diagrams of a gold reception procedure according to an embodiment of the present disclosure;

FIG. 6H-1, FIG. 6H-2 and FIG. 6H-3 are schematic diagrams of a gold purchase procedure according to an embodiment of the present disclosure;

FIG. 6I-1, FIG. 6I-2 and FIG. 6I-3 are schematic diagrams of a gold exchange procedure according to an embodiment of the present disclosure;

FIG. 6J-1, FIG. 6J-2 and FIG. 6J-3 are schematic diagrams of a gold reception procedure according to an embodiment of the present disclosure;

FIG. 15B-1, FIG. 15B-2, FIG. 15B-3, FIG. 15B-4, FIG. 15C-1, FIG. 15C-2, FIG. 15D-1, FIG. 15D-2, FIG. 15E-1 and FIG. 15E-2 are schematic interface diagrams used in the embodiment shown in FIG. 15A;

FIG. 17B-1, FIG. 17B-2, FIG. 17B-3, FIG. 17B-4, FIG. 17C-1, FIG. 17C-2, FIG. 17D-1, FIG. 17D-2, and FIG. 17E are schematic interface diagrams used in the embodiment shown in FIG. 17A;

FIG. 24B-1, FIG. 24B-2, FIG. 24B-3, FIG. 24C, FIG. 24D-1, FIG. 24D-2, FIG. 24D-3, FIG. 24E-1, FIG. 24E-2, FIG. 24E-3, FIG. 24F, FIG. 24G-1 to FIG. 24G-2 are schematic interface diagrams used in the embodiment shown in FIG. 24A;

FIG. 25 is a block diagram of an information processing apparatus for sending a virtual item package according to an embodiment of the present disclosure;

DESCRIPTION OF EMBODIMENTS

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

Figure 1:
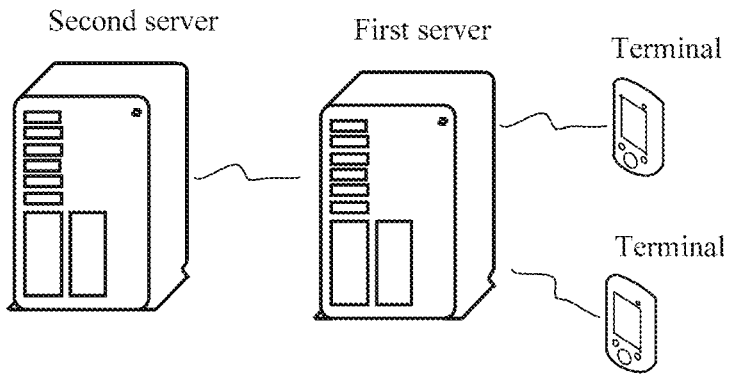
FIG. 1 is a schematic diagram of an implementation environment according to an embodiment of the present disclosure.

FIG. 1 is a schematic diagram of an implementation environment according to an embodiment of the present disclosure. The implementation environment includes: a first server and a plurality of terminals. Each terminal is connected to the first server through a network.

A social application client is run on each terminal. Each terminal may be a mobile phone, a computer, a tablet computer, or the like. This is not limited in this embodiment of the present disclosure.

The first server is configured to provide a service to the social application client, and may be a server or a first server cluster formed of several servers or one cloud computing service center. This is not limited in this embodiment of the present disclosure.

A plurality of social application clients may log in to the first server based on corresponding user identifiers. A friendship relationship may be established between a plurality of user identifiers. A friendship chain of each user identifier may include one or more user identifiers. Any user identifier may transfer a message to another user identifier having a friendship. Moreover, a plurality of user identifiers may join a same social application group and transfer messages to each other in the social application group. A user identifier is a user nickname, a user account, a phone number, or the like. A transferred message may be an instant messaging message, a group message, a message posted on a social information presentation platform, or the like. This is not limited in this embodiment of the present disclosure.

The first server has the function of managing various types of resources. At least one type of resource account may be created for any user identifier, and the first server manages resources stored in the resource account. The foregoing resource means a virtual resource, and the virtual resource may correspond to a physical resource that can be applied in real life. The first server has the function of distributing physical resources, and may distribute a corresponding physical resource to a user according to a virtual resource stored in a resource account of any user identifier.

For example, the resource may include a virtual currency, virtual gold, a virtual stock, a virtual fund, a virtual bond, a virtual gift, a virtual pet, virtual equipment, or the like. The corresponding physical resource may include a currency, gold, a stock, a fund, a bond, a gift, a pet, equipment or the like.

The implementation environment may further include a second server. Unit resources of different types of resources have different values. The second server may further issue a current conversion rate between any two types of resources. The conversion rate is a ratio between values of two types of unit resources. A particular quantity of one type of resources may be exchanged for another quantity of another type of resources equal in value according to the conversion rate. For example, a currency may be exchanged for another currency equal in value according to an exchange rate, or, a currency may be exchanged for gold equal in value according to a gold price.

The second server may provide an interface to the first server. The first server invokes the interface to acquire a current conversion rate that is issued by the second server and is between any two types of resources. For example, the second server may be a bank server, or a gold transaction platform server.

In this embodiment of the present disclosure, a first server is configured to: generate a resource package and distribute the resource package, and is further configured to manage a second-type resource account. A second server is configured to: manage a first-type resource account, issue a conversion rate between a first-type resource and any other type of resource, and distribute a physical resource represented by the first-type resource to a user. The second server may provide an interface to the first server, and interact with the first server by using the interface.

Figure 2:
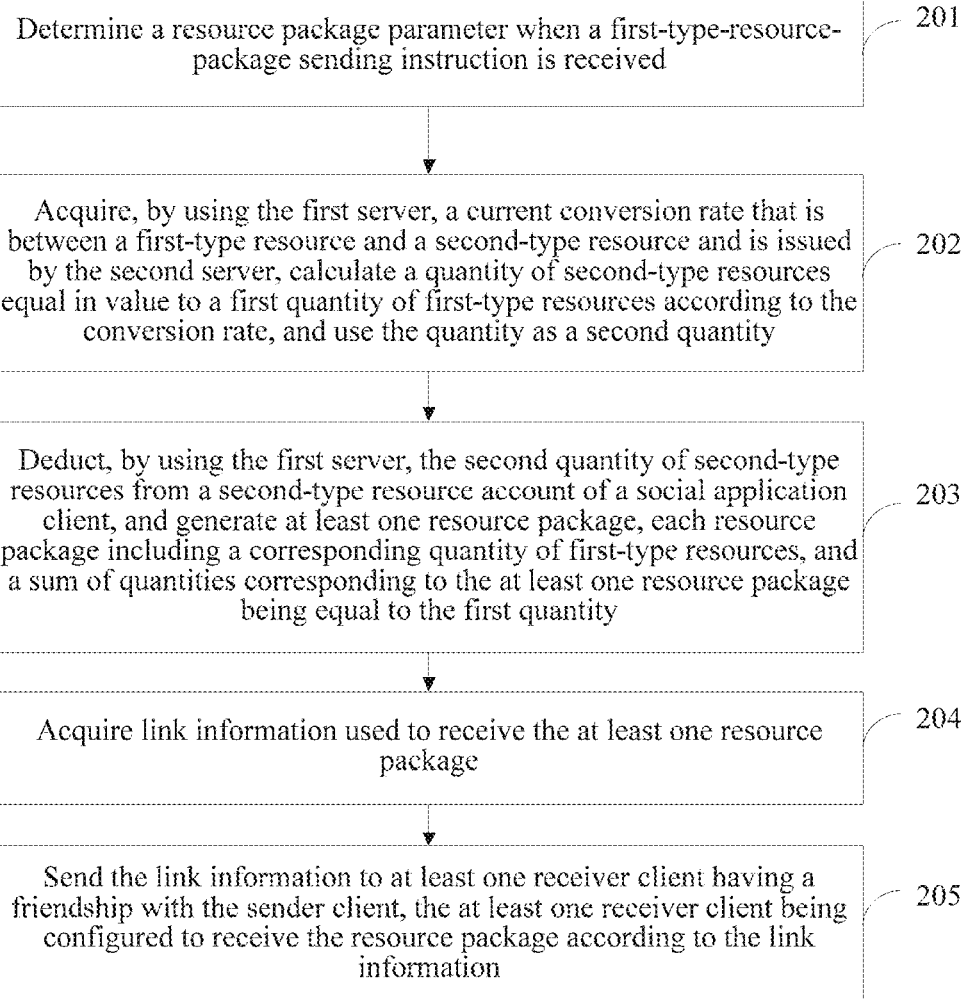
FIG. 2 is a flowchart of a method of information processing for sending a resource package according to an embodiment of the present disclosure.

FIG. 2 is a flowchart of a method for sending a resource package according to an embodiment of the present disclosure. This embodiment of the present disclosure is executed by a sender client in a social application client. Referring to FIG. 2, the method includes:

201: Determine a resource package parameter when a first-type-resource-package sending instruction is received.

202: Acquire, by using a first server, a current conversion rate that is between a first-type resource and a second-type resource and is issued by a second server, calculate a quantity of second-type resources equal in value to a first quantity of first-type resources according to the conversion rate, and use the quantity as a second quantity.

203: Deduct, by using the first server, the second quantity of second-type resources from a second-type resource account of the social application client, and generate at least one resource package, each resource package including a corresponding quantity of first-type resources, and a sum of quantities corresponding to the at least one resource package being equal to the first quantity.

204: Acquire link information used to receive the at least one resource package.

205: Send the link information to at least one receiver client having a friendship with the sender client, the at least one receiver client being configured to receive the resource package according to the link information.

For the method provided in this embodiment of the present disclosure, a solution of sending a resource package after a second-type resource is converted into a first-type resource is provided. A conversion rate issued by a second server is acquired, a second-type resource is deducted according to the conversion rate, and at least one resource package including a first-type resource is generated, so that the second-type resource is converted into a first-type resource package equal in value for sending. A first-type resource package can be sent even if there is no first-type resource, so that the flexibility is improved, and the solution can be used to perform conversion and then send a resource package for any two types of resources, so that requirements of sending different types of resource packages by users are satisfied.

In some embodiments, the resource package parameter includes a quantity of resource packages and a first quantity; or, the resource package parameter includes a quantity of resource packages and a fixed quantity of first-type resources in each resource package, and a product of the quantity of resource packages and the fixed quantity is the first quantity.

In some embodiments, the determining a resource package parameter includes:

determining that a quantity of resource packages is 1 when a first-type-resource-package sending instruction is received in a conversation window of any receiver client having a friendship, and determining a first quantity; or, acquiring an input quantity of resource packages and a fixed quantity when a first-type-resource-package sending instruction is received in a conversation window of a social application group, or, acquiring an input quantity of resource packages and a first quantity.

In some embodiments, the acquiring, by using a first server, a current conversion rate that is between the first-type resource and a second-type resource and is issued by a second server, calculating a quantity of second-type resources equal in value to a first quantity of first-type resources according to the conversion rate, and using the quantity as a second quantity includes:

sending a resource-package sending request to the first server, the resource-package sending request carrying the resource package parameter, so that the first server invokes an interface with the second server, acquires the conversion rate, calculates the quantity of second-type resources equal in value to the first quantity of first-type resources according to the conversion rate, and uses the quantity as the second quantity.

In some embodiments, the method further includes:

deducting the first quantity of first-type resources from a first-type resource account of the sender client by using the first server, and generating the at least one resource package.

In some embodiments, the deducting the first quantity of first-type resources from a first-type resource account of the sender client by using the first server, and generating the at least one resource package includes:

sending a resource-package sending request to the first server, the resource-package sending request carrying the resource package parameter, so that the first server deducts the first quantity of first-type resources from the first-type resource account, and generates the at least one resource package according to the resource package parameter.

In some embodiments, the acquiring link information used to receive the at least one resource includes:

receiving a resource package identifier sent by the first server, the resource package identifier corresponding to the at least one resource package; and generating the link information including the resource package identifier.

In some embodiments, the method further includes:

determining a third quantity and a fourth quantity when a first-type-resource exchange request is received, the third quantity being a quantity of first-type resources to be exchanged, and the fourth quantity being a quantity of second-type resources equal in value to the third quantity of first-type resources; and deducting the fourth quantity of second-type resources from the second-type resource account by using the first server, and adding the third quantity of first-type resources to a first-type resource account.

In some embodiments, the method further includes:

determining a fifth quantity and a sixth quantity when a second-type-resource exchange request is received, the fifth quantity being a quantity of second-type resources to be exchanged, and the sixth quantity being a quantity of first-type resources equal in value to the fifth quantity of second-type resources; and deducting the sixth quantity of first-type resources from a first-type resource account by using the first server, and adding the fifth quantity of second-type resources to the second-type resource account.

In some embodiments, the method further includes:

determining a seventh quantity of first-type resources to be acquired when a first-type-resource acquiring request is received; and deducting resources corresponding to the seventh quantity from a resource account of the sender client by using the first server, and generating an order at least including the seventh quantity and address information, the order being used to distribute a physical resource represented by the seventh quantity of first-type resources to a user of the sender client according to the address information.

In some embodiments, the deducting resources corresponding to the seventh quantity from a resource account of the sender client by using the first server includes:

deducting the seventh quantity of first-type resources from the first-type resource account by using the first server if a remaining quantity of first-type resources in a first-type resource account is not less than the seventh quantity.

In some embodiments, the deducting resources corresponding to the seventh quantity from a resource account of the sender client by using the first server includes:

determining a difference quantity between the seventh quantity and a remaining quantity of first-type resources in a first-type resource account and an eighth quantity matching the difference quantity if the remaining quantity is less than the seventh quantity, the eighth quantity being a quantity of second-type resources equal in value to and the difference quantity of first-type resources, and the eighth quantity being determined according to the current conversion rate between the first-type resource and the second-type resource and the seventh quantity; and deducting the remaining first-type resources from the first-type resource account by using the first server, and deducting the eighth quantity of second-type resources from the second-type resource account.

All the foregoing optional technical solutions may be randomly combined to form optional embodiments of the present disclosure. Details are no longer described here one by one.

Figure 3:
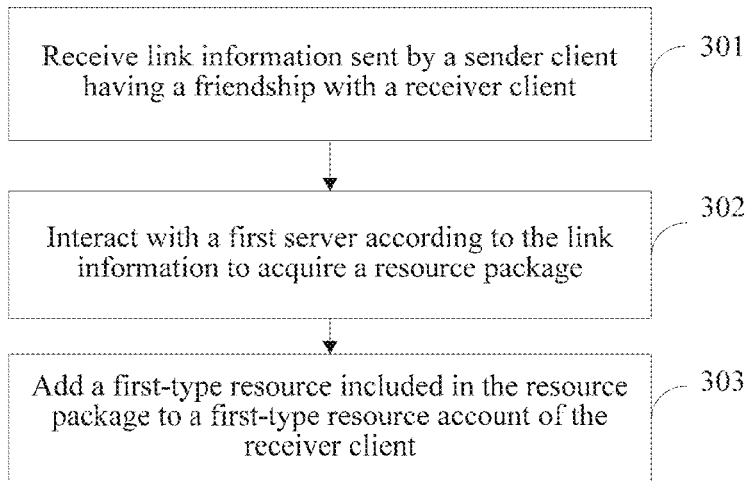
FIG. 3 is a flowchart of a method of information processing for receiving a resource package according to an embodiment of the present disclosure.

FIG. 3 is a flowchart of a method for receiving a resource package according to an embodiment of the present disclosure. This embodiment of the present disclosure is executed by a receiver client in a social application client. Referring to FIG. 3, the method includes:

301: Receive link information sent by a sender client having a friendship with the receiver client.

302: Interact with a first server according to the link information to acquire a resource package.

303: Add a first-type resource included in the resource package to a first-type resource account of the receiver client.

For the method provided in this embodiment of the present disclosure, a solution of sending a resource package after a second-type resource is converted into a first-type resource is provided. A second-type resource of a sender client is deducted according to a current conversion rate, and at least one resource package including a first-type resource is generated, so that the second-type resource is converted into a first-type resource package equal in value for sending. A sender client can send a first-type resource package even if the sender client does not have a first-type resource, so that the flexibility is improved, and the solution can be used to perform conversion and then send a resource package for any two types of resources, so that requirements of sending different types of resource packages by users are satisfied, and correspondingly requirements of receiving different types of resource packages by users are also satisfied.

In some embodiments, the link information includes a resource package identifier, the resource package identifier corresponds to the at least one resource package, and the interacting with a first server according to the link information to acquire a resource package includes:

sending a resource-package receiving request to the first server, the resource-package receiving request carrying the resource package identifier, so that the first server chooses one resource package from remaining resource packages corresponding to the resource package identifier and returns the resource package; and receiving the resource package returned by the first server, and adding the first-type resource included in the resource package to a first-type resource account.

In some embodiments, the method further includes:

determining a third quantity and a fourth quantity when a first-type-resource exchange request is received, the third quantity being a quantity of first-type resources to be exchanged, and the fourth quantity being a quantity of second-type resources equal in value to the third quantity of first-type resources; and deducting the fourth quantity of second-type resources from a second-type resource account of the receiver client by using the first server, and adding the third quantity of first-type resources to the first-type resource account of the receiver client.

In some embodiments, the method further includes:

determining a fifth quantity and a sixth quantity when a second-type-resource exchange request is received, the fifth quantity being a quantity of second-type resources to be exchanged, and the sixth quantity being a quantity of first-type resources equal in value to the fifth quantity of second-type resources; and deducting the sixth quantity of first-type resources from a first-type resource account by using the first server, and adding the fifth quantity of second-type resources to the second-type resource account.

In some embodiments, the method further includes:

determining a seventh quantity of first-type resources to be acquired when a first-type-resource acquiring request is received; and deducting resources corresponding to the seventh quantity from a resource account of the receiver client by using the first server, and generating an order at least including the seventh quantity and address information, the order being used to distribute a physical resource represented by the seventh quantity of first-type resources to a user of the receiver client according to the address information.

In some embodiments, the deducting resources corresponding to the seventh quantity from a resource account of the receiver client by using the first server includes:

deducting the seventh quantity of first-type resources from the first-type resource account by using the first server if a remaining quantity of first-type resources in a first-type resource account is not less than the seventh quantity.

In some embodiments, the deducting resources corresponding to the seventh quantity from a resource account of the receiver client by using the first server includes:

determining a difference quantity between the seventh quantity and a remaining quantity of first-type resources in a first-type resource account and an eighth quantity matching the difference quantity if the remaining quantity is less than the seventh quantity, the eighth quantity being a quantity of second-type resources equal in value to and the difference quantity of first-type resources, and the eighth quantity being determined according to the current conversion rate between the first-type resource and the second-type resource and the seventh quantity; and deducting the remaining first-type resources from the first-type resource account by using the first server, and deducting the eighth quantity of second-type resources from the second-type resource account.

All the foregoing optional technical solutions may be randomly combined to form optional embodiments of the present disclosure. Details are no longer described here one by one.

Figure 4:
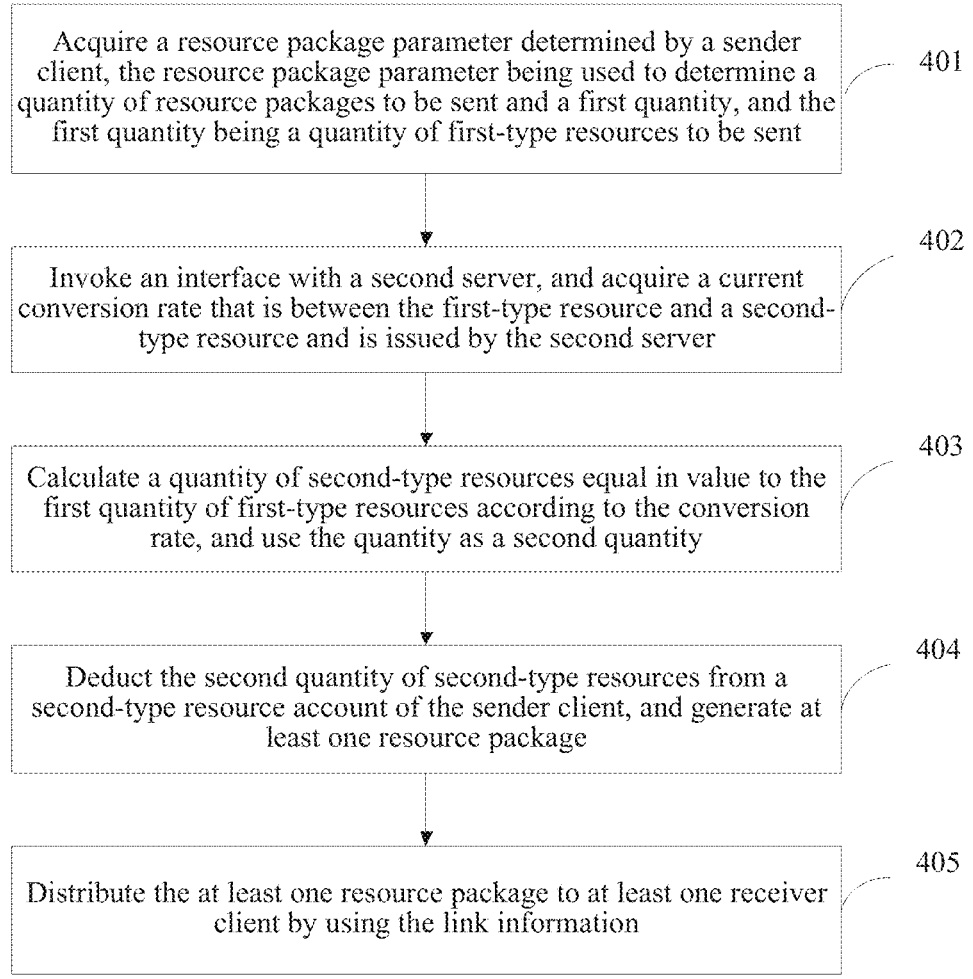
FIG. 4 is a flowchart of a method of information processing for distributing a resource package according to an embodiment of the present disclosure.

FIG. 4 is a flowchart of a method for distributing a resource package according to an embodiment of the present disclosure. This embodiment of the present disclosure is executed by a first server. Referring to FIG. 4, the method includes:

401: Acquire a resource package parameter determined by a sender client, the resource package parameter being used to determine a quantity of resource packages to be sent and a first quantity, and the first quantity being a quantity of first-type resources to be sent.

402: Invoke an interface with a second server, and acquire a current conversion rate that is between the first-type resource and a second-type resource and is issued by the second server.

403: Calculate a quantity of second-type resources equal in value to the first quantity of first-type resources according to the conversion rate, and use the quantity as a second quantity.

404: Deduct the second quantity of second-type resources from a second-type resource account of the sender client, and generate at least one resource package, a sum of quantities corresponding to the at least one resource package being equal to the first quantity, so that the sender client sends link information to at least one receiving end having a friendship, the link information being used to receive the at least one resource package.

405: Distribute the at least one resource package to at least one receiver client by using the link information.

For the method provided in this embodiment of the present disclosure, a solution of sending a resource package after a second-type resource is converted into a first-type resource is provided. A second-type resource of a sender client is deducted, and at least one resource package including a first-type resource is generated, so that the second-type resource is converted into a first-type resource package equal in value for sending. A sender client can send a first-type resource package even if the sender client does not have a first-type resource, so that the flexibility is improved, and the solution can be used to perform conversion and then send a resource package for any two types of resources, so that requirements of sending different types of resource packages by users are satisfied.

In some embodiments, the method further includes:

deducting the first quantity of first-type resources from a first-type resource account of the sender client by interacting with the sender client, and generating at least one resource package.

In some embodiments, after the generating at least one resource package, the method further includes:

generating a resource package identifier for the at least one resource package; and sending the resource package identifier to the sender client, so that the sender client generates the link information including the resource package identifier.

In some embodiments, the distributing the at least one resource package to at least one receiver client by using the link information includes:

receiving a resource-package receiving request sent by any receiver client, the resource-package receiving request carrying the resource package identifier; and choosing one resource package from remaining resource packages corresponding to the resource package identifier and sending the resource package to the receiver client, so that the receiver client adds the first-type resource included in the resource package to a first-type resource account.

In some embodiments, the choosing one resource package from remaining resource packages corresponding to the resource package identifier and sending the resource package to the receiver client includes:

randomly determining a corresponding quantity of resource packages according to a quantity of resource packages to be sent by the sender client and the first quantity if the resource package parameter includes the quantity of resource packages and the first quantity; or, using a fixed quantity of first-type resources in each resource package as a corresponding quantity of resource packages if the resource package parameter includes a quantity of resource packages and the fixed quantity.

In some embodiments, the method further includes:

receiving a resource exchange request sent by any social application client, the resource exchange request including a third quantity and a fourth quantity, the third quantity being a quantity of first-type resources to be exchanged, and the fourth quantity being a quantity of second-type resources equal in value to the third quantity of first-type resources; and deducting the fourth quantity of second-type resources from the second-type resource account of the social application client, and adding the third quantity of first-type resources to a first-type resource account of the social application client.

In some embodiments, the method further includes:

receiving a resource exchange request sent by any social application client, the resource exchange request including a fifth quantity and a sixth quantity, the fifth quantity being a quantity of second-type resources to be exchanged, and the sixth quantity being a quantity of first-type resources equal in value to the fifth quantity of second-type resources; and deducting the sixth quantity of first-type resources from a first-type resource account of the social application client, and adding the fifth quantity of second-type resources to the second-type resource account of the social application client.

In some embodiments, the method further includes:

receiving a resource acquiring request sent by any social application client, the resource acquiring request carrying a seventh quantity of first-type resources to be acquired;

deducting resources corresponding to the seventh quantity from a resource account of the social application client, and generating an order at least including the seventh quantity and address information, the order being used to distribute a physical resource represented by the seventh quantity of first-type resources to a user of the social application client according to the address information.

In some embodiments, the deducting resources corresponding to the seventh quantity from a resource account of the social application client includes:

deducting the seventh quantity of first-type resources from the first-type resource account if a remaining quantity of first-type resources in a first-type resource account is not less than the seventh quantity.

In some embodiments, the deducting resources corresponding to the seventh quantity from a resource account of the social application client by using the first server includes:

determining a difference quantity between the seventh quantity and a remaining quantity of first-type resources in a first-type resource account and an eighth quantity matching the difference quantity if the remaining quantity is less than the seventh quantity, the eighth quantity being a quantity of second-type resources equal in value to and the difference quantity of first-type resources, and the eighth quantity being determined according to the current conversion rate between the first-type resource and the second-type resource and the difference quantity; and deducting the remaining first-type resources from the first-type resource account, and deducting the eighth quantity of second-type resources from the second-type resource account.

All the foregoing optional technical solutions may be randomly combined to form optional embodiments of the present disclosure. Details are no longer described here one by one.

Figure 5:
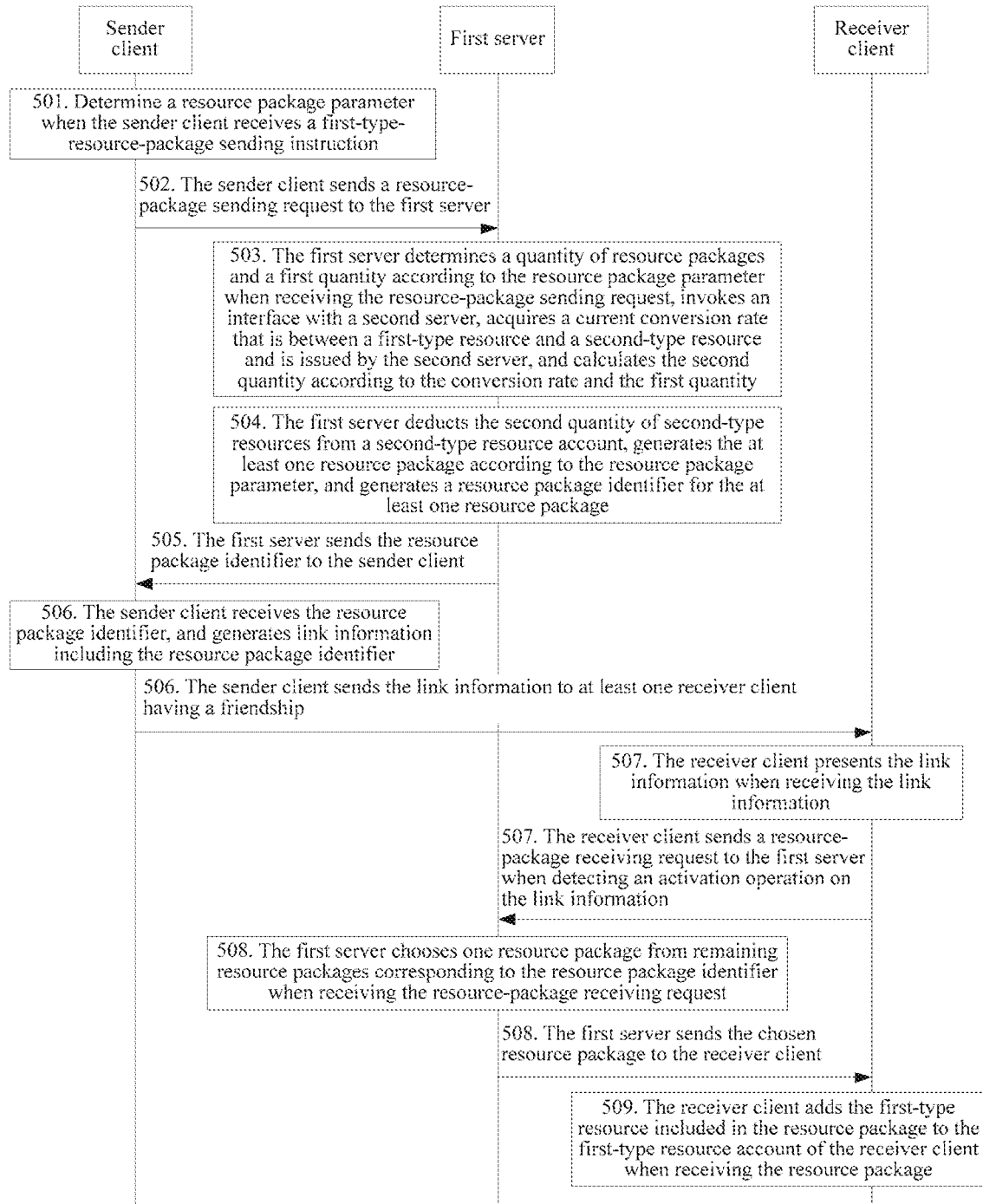
FIG. 5 is a flowchart of a method of information processing for receiving and sending a resource package according to an embodiment of the present disclosure.

FIG. 5 is a flowchart of a method for receiving and sending a resource package according to an embodiment of the present disclosure. This embodiment of the present disclosure is executed by a sender client, a first server, and a receiver client. Referring to FIG. 5, the method includes:

501: Determine a resource package parameter when the sender client receives a first-type-resource-package sending instruction.

A plurality of social application clients may log in to the first server based on corresponding user identifiers. A friendship may be established between a plurality of user identifiers. If user identifiers logged in to on any two social application clients have a friendship, the two social application clients also have a friendship.

Each social application client may further create a resource account and store a resource in the resource account. The resource may be purchased, exchanged by using another type of resource, gifted by a friend, or obtained in another manner. This is not limited in this embodiment of the present disclosure. Moreover, the social application client may create a plurality of different types of resource accounts, and store corresponding types of resources respectively in different resource accounts. The resource may include a virtual currency, virtual gold, a virtual gift, a virtual pet, virtual equipment, or the like. This is not limited in this embodiment of the present disclosure.

Any social application client may be used as the sender client and send a resource package to at least one receiver client having a friendship, the resource package includes a particular quantity of resources, so that resources of the social application client are sent to friends, thereby implementing the transfer of resources. For various types of resources, when receiving a resource package sending instruction of a type, the sender client may send a corresponding type of resource package to at least one receiver client having a friendship.

In this embodiment of the present disclosure, the sending of the first-type resource package is used as an example for description. After receiving the first-type-resource-package sending instruction, the sender client needs to send the first type of resource package to at least one receiver client. The resource package includes a particular quantity of first-type resources.

The first-type resource means any type of resource, and the second-type resource involved subsequently may be a resource different from the first-type resource. In some embodiments, the first-type resource may be a resource having stable value or value that tends to grow. The second-type resource may be a common resource in real life. For example, the first-type resource is gold. The second-type resource is a currency. Alternatively, the second-type resource is a currency used by users in daily life, and the first-type resource is another currency.

The sender client may provide a sending option for a first-type resource package. The first-type-resource-package sending instruction may be triggered by an operation of clicking the sending option, or triggered by a preset operation. The preset operation may be a shake operation, an operation of scanning a specific two-dimensional barcode, and the like. This is not limited in this embodiment of the present disclosure.

Referring to FIG. 6A-1, an example in which the first-type resource is gold and the second-type resource is a currency is used. The sender client presents a selection window in a current conversation window. The selection window includes a "Gold red packet" option and a "Red packet" option. The "Gold red packet" option is used to instruct to send a gold red packet. The "Red packet" option is used to instruct to send a currency red packet. When an operation of clicking the "Gold red packet" option by a user is detected, a first-type-resource sending instruction is received.

The resource package parameter is used to determine a quantity of resource packages to be sent and a first quantity. The quantity of resource packages is a quantity of first-type-resource packages to be sent. Each resource package may include a particular quantity of first-type resources. The first quantity is a total quantity of first-type resources to be sent. The quantity of resource packages is a positive integer. The first quantity is greater than 0.

The resource package parameter may include the quantity of resource packages and the first quantity, or, the resource package parameter may include the quantity of resource packages and a fixed quantity of first-type resources in each resource package, representing that each resource package has the same corresponding quantity. In this case, a product of the quantity of resource packages and the fixed quantity is the first quantity.

Further, the resource package parameter may be selected and determined by a sending user or input on the sender client. In this embodiment of the present disclosure, the manner of determining the resource package parameter is not limited.

In a possible implementation, after receiving the first-type-resource-package sending instruction, the sender client provides a plurality of resource quantity options and a plurality of resource package quantity options. Different quantity options indicate different first quantities. Different resource package quantity options indicate different resource package quantities. In this case, the sending user may choose any quantity from a plurality of quantity options and use the quantity as the first quantity.

Referring to FIG. 6A-2, after receiving the first-type-resource-package sending instruction, the sender client provides a resource quantity option "Pay 3 CNY to send gold", and displays, according to a current conversion rate between gold and a currency, a gold quantity "0.01 gram" equal in value to 3 CNY for selection by the sending user. It represents that a first quantity indicated by a resource quantity of the option "Pay 3 CNY to send gold" is 0.01 gram. If the sending user does not want to send 0.01 gram of gold, the sending user may further click "Another" button. In this case, the sender client provides another quantity option for selection by a user. A plurality of resource quantity options are provided by clicking "Another" button. The sending user may select any resource quantity option according to a requirement, and the sender client may determine the first quantity according to a resource quantity option selected by the user.

In another possible implementation, when receiving the first-type-resource-package sending instruction, the sender client displays a setting page. The setting page includes a resource-package-quantity input bar and a first-quantity input bar. The sending user may input a quantity of resource packages and a first quantity on the setting page. Alternatively, the setting page may include a resource-package-quantity input bar and a fixed-quantity input bar. The sending user may input a quantity of resource packages and a fixed quantity corresponding to each resource package on the setting page.

Referring to FIG. 6B-1 and FIG. 6B-2, when receiving the first-type-resource-package sending instruction, the sender client displays a setting page. The setting page includes a red-packet-quantity input bar and a gold-weight input bar. The sending user inputs, in the red-packet-quantity input bar, a quantity being 10 of red packets to be sent, and inputs, in the gold-weight input bar, a total weight being 0.10 gram of gold to be sent. That is, the quantity of resource packages is 10, and the first quantity is 0.1. Moreover, on the setting page, it may further be calculated according to the total weight being 0.1 gram of gold input by the user and a current conversion rate 300 CNY/gram that the cash equal in value to 0.10 gram of gold is 30 CNY for viewing by the user. The setting page further includes a greeting-information input bar displayed on a gold red packet, and a default input is "Gold comes, fortune rises". The sending user may input a greeting for a friend in the greeting-information input bar.

Alternatively, referring to FIG. 6C-1 and FIG. 6C-2, the sender client displays a setting page. The setting page includes a red-packet-quantity input bar and a gold-weight input bar for each red packet. The sending user inputs, in the red-packet-quantity input bar, a quantity being 10 of red packets to be sent is 10, and inputs, in the gold-weight input bar for each red packet, a gold weight being 0.1 gram included in each red packet. That is, the quantity of resource packages is 10, and the fixed quantity is 0.1 gram. In this case, the first quantity is 1 gram. Moreover, on the setting page, it may further be calculated according to the calculated total weight being 1 gram of gold and a current conversion rate being 300 CNY/gram that the cash equal in value to 1 gram of gold is 300 CNY for viewing by the user.

During actual application, when a first-type-resource sending instruction is received, not only a resource package parameter can be determined, but also at least one receiver client can be determined.

In a first possible implementation, the sender client displays a conversation window of a social application client having a friendship. When a first-type-resource sending instruction is received in the conversation window, it represents that the sending user hopes to send a resource package to a user of the social application client. It may be determined that the social application client is the receiver client. In this case, it may be directly determined that the quantity of resource packages is 1, and the first quantity is determined. Alternatively, the sending user still determines a quantity of resource packages to be sent to the receiver client and the first quantity. This is not limited in this embodiment of the present disclosure.

In a second possible implementation, the sender client displays a conversation window of a social application group. The social application group includes a plurality of social application clients. When a first-type-resource sending instruction is received in the conversation window, it represents that the sending user hopes to send resource packages to users in the social application group. Social application clients in the social application group may be determined as receiver clients. In this case, it may be directly determined that the quantity of resource packages is a quantity of users in the social application group. Alternatively, the sending user still determines a quantity of resource packages to be sent. Further, it may be restricted that the quantity of resource packages that is determined by the user is less than or equal to the quantity of users in the social application group.

In a third possible implementation, when the sender client receives a first-type-resource sending instruction on a social information presentation platform, it represents that the sending user hopes to send resource packages to all friend users. It may be determined that a plurality of social application clients that have a friendship with the sender client are all receiver clients. In this case, the sending user may still determine a quantity of resource packages to be sent. Further, valid duration may be restricted for the sent resource packages. The resource packages can no longer be received after the valid duration ends. The first-type resource in the resource packages will be returned to a first-type resource account of the sender client.

Certainly, the sender client may further use other manners to receive the first-type-resource sending instruction and determine at least one receiver client. This is not limited in this embodiment of the present disclosure.

In some embodiments, when receiving a first-type-resource-package sending instruction in a conversation window of any social application client having a friendship, the sender client determines the social application client as the receiver client, determines that the quantity of resource packages is 1, and determines the first quantity input by the sending user. Alternatively, when receiving a first-type-resource-package sending instruction in a conversation window of a social application group, the sender client determines that the social application client in the social application group is the receiver client, and acquires a quantity of resource packages input by the sending user and a fixed quantity, or acquires a quantity of resource packages input by the sending user and a first quantity.

502: The sender client sends a resource-package sending request to the first server, the resource-package sending request carrying the resource package parameter.

503: The first server determines the quantity of resource packages and the first quantity according to the resource package parameter when receiving the resource-package sending request, invokes an interface with a second server, acquires a current conversion rate that is between the first-type resource and a second-type resource and is issued by the second server, and calculates the second quantity according to the conversion rate and the first quantity.

In this embodiment of the present disclosure, to generate a resource package according to the first quantity of first-type resources, the sender client needs to pay a particular quantity of second-type resources and convert the second-type resources into first-type resources equal in value.

Therefore, the sender client sends a resource-package sending request to the first server, the resource-package sending request carrying the resource package parameter. When receiving the resource-package sending request, the first server determines the quantity of resource packages and the first quantity according to the resource package parameter, invokes an interface provided by the second server, acquires a current conversion rate between the first-type resource and the second-type resource, calculates a quantity of second-type resources equal in value to the first quantity of first-type resources according to the conversion rate, and uses the quantity as the second quantity.

If the resource package parameter includes the quantity of resource packages and the first quantity, the first server directly determines the quantity of resource packages and the first quantity. Moreover, in a subsequent process, the first server randomly generates at least one resource package corresponding to the quantity of resource packages, a sum of quantities corresponding to the resource packages being equal to the first quantity. If the resource package parameter includes the quantity of resource packages and the fixed quantity, the first server calculates a product of the quantity of resource packages and the fixed quantity, and obtains the first quantity. Moreover, in a subsequent process, the first server generates at least one resource package corresponding to the quantity of resource packages, a quantity corresponding to each resource package being equal to the fixed quantity.

The second quantity means a quantity of second-type resources equal in value to the first quantity of first-type resources. That is, the second quantity of second-type resources and the first quantity of first-type resources are equal in value. The conversion rate is issued by the second server. The second server provides an interface to the first server. The first server may invoke the interface to acquire a current conversion rate issued by the second server. The conversion rate varies with various factors in real life. The specific conversion rate may be issued by the second server after comprehensively considering various factors. The conversion rate is not limited in this embodiment of the present disclosure.

504: The first server deducts the second quantity of second-type resources from a second-type resource account, generates the at least one resource package according to the resource package parameter, and generates a resource package identifier for the at least one resource package.

After the second quantity is determined, the first server deducts the second quantity of second-type resources from the second-type resource account of the sender client, and generates at least one resource package, so that each resource package including a corresponding quantity of first-type resources, and a sum of quantities corresponding to the at least one resource package being equal to the first quantity. This is equivalent to that the second quantity of second-type resources are converted into the first quantity of first-type resources, thereby implementing equivalent conversion from the second-type resources into the first-type resources.

Figure 6D:
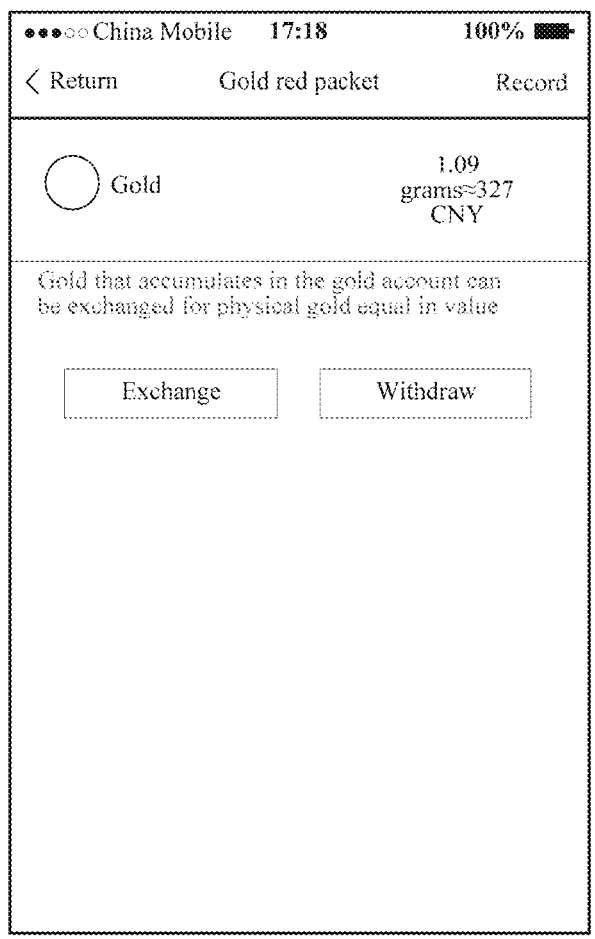
FIG. 6D is a schematic diagram of a gold account according to an embodiment of the present disclosure.

The second-type resource account is used to store the second-type resource, and the first-type resource account is used to store the first-type resource. A user of the sender client may view a remaining quantity of first-type resources in the first-type resource account, or view a remaining quantity of second-type resources in the second-type resource account. Further, when viewing the first-type resource account, the sender client may further display, according to a current conversion rate between the first-type resource and a second-type resource, a quantity of second-type resources equal in value to the remaining first-type resources. Referring to FIG. 6D, the sender client opens a gold account, displaying that the remaining quantity of gold is 1.09 grams, and displaying, according to a current conversion rate being 300, the cash 327 CNY equal in value.

In addition, before deducting the second-type resources from the second-type resource account, the first server may require confirmation by the sending user. That is, the sender client interacts with the first server and presents a conversion confirmation page to the sending user. The conversion confirmation page includes the first quantity and the second quantity, prompts the sending user to convert the second quantity of second-type resources into the first quantity of first-type resources. When a confirmation operation of a user is detected, the first server then deducts the second quantity of second-type resources from the second-type resource account, converts the second quantity of second-type resources into the first quantity of first-type resources, and encloses the first quantity of first-type resources in at least one resource package. To ensure account safety, when the sending user triggers a confirmation operation, the sending user may be required to input a payment password.

Referring to FIG. 6E-1, the sending user clicks the option "Pay 3 CNY to send gold". The sender client displays a conversion confirmation page shown in FIG. 6E-2. The conversion confirmation page includes a cash amount being 3 CNY that needs to be paid and an input bar. The sending user inputs a payment password to perform confirmation.

In fact, the first server also creates the first-type resource account and the second-type resource account. In the process of converting the second quantity of second-type resources of the sender client into the first quantity of first-type resources, in fact, the second quantity of second-type resources are deducted from the second-type resource account of the sender client and transferred to the second-type resource account of the first server, the first quantity of first-type resources are then retrieved from the first-type resource account of the first server, and at least one resource package is generated according to the retrieved first-type resource.

Alternatively, the second server may provide the first-type resource. The second server may also create the first-type resource account and the second-type resource account. In the process of converting the second quantity of second-type resources of the sender client into the first quantity of first-type resources, in fact, the first server deducts the second quantity of second-type resources from the second-type resource account of the sender client, and uses the second quantity of second-type resources to request to acquire the first quantity of first-type resources equal in value from the second server. The second server receives the second quantity of second-type resources, stores the second quantity of second-type resources in an account of the second server, retrieves the first quantity of first-type resources, and sends the first quantity of first-type resources to the first server. The first server may generate at least one resource package according to the acquired first-type resource.

After the at least one resource package is generated, to make it convenient for the receiver client to receive a resource package, the first server may generate a unique corresponding resource package identifier for the at least one resource package, and send the resource package identifier to the sender client. The resource package identifier is used to indicate the at least one resource package, and a resource package can be received according to the resource package identifier.

For example, the first server may establish a mapping between the resource package identifier and the at least one resource package. Subsequently, a resource package may be delivered to the receiver client according to the mapping and the resource package identifier.

In this embodiment of the present disclosure, for various types of resources possessed by the sender client, the sender client may specify a second-type resource as a default resource. A particular quantity of second-type resources are paid to send any type of resources and converted into the type of resources to be send. For example, a resource most commonly used by a user in real life may be used as a default resource. Alternatively, when receiving a first-type-resource sending instruction, the sender client provides options of a plurality of types of resources for the user to select one type of resource for payment and conversion into the first-type resource. This is not limited in this embodiment of the present disclosure.

In an embodiment of the present disclosure, the first server may alternatively not deduct the second-type resource, but instead directly deduct the first-type resource. That is, the first server deducts the first quantity of first-type resources from the first-type resource account of the sender client, and generates at least one resource package according to the first quantity and the quantity of resource packages. The process does not involve conversion between different types of resources.

Further, the first server may also first determine whether a remaining quantity of first-type resources in the first-type resource account is less than the first quantity. If the remaining quantity is less than the first quantity, the default second-type resource is converted into the first-type resource. If the remaining quantity is not less than the first quantity, the first quantity of first-type resources is directly deducted.

It should be noted that in this embodiment of the present disclosure, the sender client sends a request to the first server, and the first server performs the operations of deducting a resource and generating a resource package. During actual applications, the sender client interacts with the first server to generate a resource package. Each operation in the process can be specifically executed by the sender client or the first server. This is not limited in this embodiment of the present disclosure.

505: The first server sends the resource package identifier to the sender client.

506: The sender client receives the resource package identifier, generates link information including the resource package identifier, and sends the link information to at least one receiver client having a friendship.

The sender client acquires the link information used to receive the at least one resource package after generating at least one resource package by interacting with the first server. Any social application client can receive a resource package according to the link information when acquiring the link information. Therefore, the sender client sends the link information to at least one receiver client having a friendship.

Specifically, the sender client sends the link information and a user identifier of the at least one receiver client to the first server, and the first server sends the link information to the at least one receiver client according to the user identifier of the at least one receiver client.

The link information may be a link address, a two-dimensional barcode, or the like. The link information may be sent to the receiver client in various manners. This is not limited in this embodiment of the present disclosure.

In a first possible implementation, the sender client sends the link information by using a conversation window with one receiver client. The first server receives the link information and sends the link information to the receiver client. That is, the link information is sent to the receiver client in a manner of an instant messaging message.

In a second possible implementation, the sender client sends the link information by using a conversation window with a social application group. The first server receives the link information and sends the link information to each receiver client in the social application group. That is, the link information is sent to the receiver clients in a manner of a group message.

In a third possible implementation, the sender client presents the link information on a social information presentation platform by interacting with the first server. Only at least one receiver client having a friendship with the sender client can receive the link information. That is, the link information is posted on the social information presentation platform.

507: The receiver client presents the link information when receiving the link information, and sends a resource-package receiving request to the first server when detecting an activation operation on the link information, the resource-package receiving request carrying the resource package identifier.

For any receiver client of the at least one receiver client, the link information is presented when the receiver client receives the link information.

A manner of presenting the link information is determined according to a manner in which the sender client detects the first-type-resource sending instruction.

In a first possible implementation, when the sender client receives the first-type-resource sending instruction in a conversation window with the receiver client, the receiver client presents the link information in the conversation window of the sender client. That is, the link information is presented in a manner of an instant messaging message.

Referring to FIG. 6F-1, the receiver client displays a conversation window with the sender client, and presents the link information in the conversation window. The link information is presented in the form of a "red packet". In addition, the sender client may also present the link information in the conversation window with the receiver client after sending the link information. The presentation form is similar to that in FIG. 6F-1.

In a second possible implementation, when the sender client receives the first-type-resource sending instruction in a conversation window of a social application group, the receiver client presents the link information in the conversation window of the social application group, that is, presents the link information in a manner of a group message.

In a third possible implementation, when the sender client receives the first-type-resource sending instruction on the social information presentation platform, the receiver client presents the link information on a message summary page. The message summary page includes messages posted on the social information presentation platform by the receiver client and any sender client having a friendship with the receiver client.

During presentation of the link information, if wanting to receive a resource package sent by the sending user, a receiving user may trigger an activation operation on the link information, so as to interact with the first server according to the link information to acquire a resource package.

Specifically, the receiver client detects the activation operation, acquires the resource package identifier included in the link information, and sends a resource-package receiving request to the first server, the resource-package receiving request carrying the resource package identifier. The first server distributes a resource package to the receiver client.

508: The first server chooses one resource package from remaining resource packages corresponding to the resource package identifier when receiving the resource-package receiving request, and sends the resource package to the receiver client.

In a first possible implementation, the first server generates at least one resource package, and a quantity corresponding to each resource package is a fixed quantity. In this case, the first server chooses one resource package from remaining resource packages corresponding to the resource package identifier when receiving the resource-package receiving request, uses the fixed quantity as a corresponding quantity of resource packages, and sends the quantity to the receiver client. In this case, the resource package includes the fixed quantity of first-type resources.

In a second possible implementation, the first server generates at least one resource package, and a quantity corresponding to each resource package is random. It is only restricted that a sum of quantities corresponding to at least one resource package is the first quantity. In this case, the first server chooses one resource package from remaining resource packages corresponding to the resource package identifier, randomly determines a corresponding quantity of resource packages according to the quantity of resource packages and the first quantity, and sends the quantity to the receiver client. The resource package includes a particular quantity of first-type resources.

509: The receiver client adds the first-type resource included in the resource package to the first-type resource account of the receiver client when receiving the resource package.

The acquired resource package includes a corresponding quantity of first-type resources. The receiver client may add the first-type resource included in the resource package to the first-type resource account of the receiver client for storage after acquiring the resource package.

The receiver client first creates the first-type resource account if the receiver client has not created the first-type resource account yet, then adds the first-type resource included in the resource package to the newly created first-type resource account.

Referring to FIG. 6F-1, the first server sends a gold red packet to the receiver client after a user clicks the link information. When receiving a gold red packet, the receiver client may display a gold receiving page as depicted in FIG. 6F-2 and FIG. 6F-3. An animation effect that a gold coin bounces up and down is presented in the upper portion of the gold receiving page, and different numbers are displayed rolling below the gold coin, making it more interesting. After the animation effect has been presented, the received 0.06 gram of gold and the cash amount 18 CNY equal in value are displayed. In this case, a part of the gold coin is blocked. The entire gold coin is displayed when a user clicks a display region in which the gold coin is located.

It should be noted that each receiver client can use the manner in the foregoing 507 to 509 to acquire the first-type resource sent by the sender client. However, when a quantity of the at least one resource package is less than the quantity of receiver clients, the first server distributes resource packages according to an order in which the receiver clients receive the resource packages. For example, the quantity of resource packages is N, and only the first N receiver clients can receive a resource package. Subsequent receiver clients cannot receive a resource package.

Alternatively, when the quantity of receiver clients receiving a resource package is less than the quantity of the at least one resource package, some resource packages remain unreceived. After preset duration, the first server adds first-type resources whose quantity is a sum of quantities corresponding to remaining resource packages to the first-type resource account of the sender client.

For the sender client, in a process in which at least one receiver client receives a resource package, the sender client may present a receiving progress, to show a receiver client that currently has already received a resource package and a quantity of first-type resources received by each receiver client.

Figure 6G:
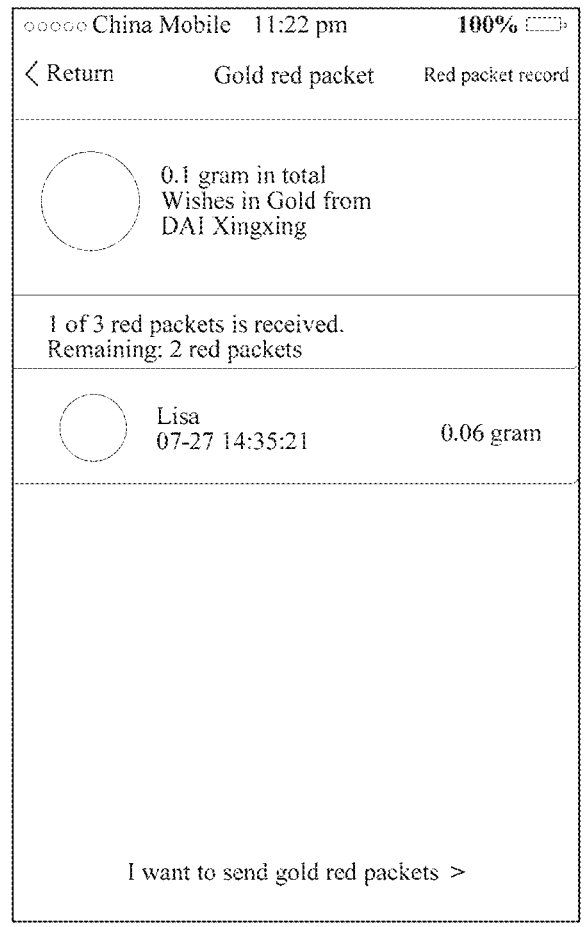
FIG. 6G is a schematic diagram of a receive-progress presentation page according to an embodiment of the present disclosure.

Referring to FIG. 6G, when the sending user clicks the link information, the sender client displays a receive-progress presentation page. The receive-progress presentation page includes a friend Lisa who has already received a gold red packet, the weight being 0.06 gram of gold received by the friend, the receiving time being 14:35:21, a total quantity being 3 of gold red packets, a quantity being 2 of the remaining gold red packets, and the total weight being 0.1 gram of the sent gold. Moreover, a red packet record option is further included in the upper right corner on the receive-progress presentation page. Gold red packets the sender client used to send or receive can be viewed by clicking the red packet record option.

For the method provided in this embodiment of the present disclosure, a solution of sending a resource package after a second-type resource is converted into a first-type resource is provided. A conversion rate issued by a second server is acquired, a second-type resource is deducted according to the conversion rate, and at least one resource package including a first-type resource is generated, so that the second-type resource is converted into a first-type resource package equal in value for sending. When acquiring a resource package, a receiver client adds a first-type resource in the resource package to a first-type resource account. A sender client can send a first-type resource package even if the sender client does not have a first-type resource, so that the flexibility is improved, and the solution can be used to send a resource package for any two types of resources, so that requirements of sending different types of resource packages by users are satisfied.

Based on the foregoing embodiment shown in FIG. 5, for any social application client, the social application client not only can be used as a sender client to send a resource package to a receiver client but also can be used as a receiver client to receive a resource package sent by a sender client. Various processing may be performed on resources possessed by the receiver client.

In a first possible implementation, the social application client may exchange a second-type resource for a first-type resource. Specifically, the exchange process may include the following steps:

1-1: The social application client determines a third quantity and a fourth quantity when receiving a first-type-resource exchange request, the third quantity being a quantity of first-type resources to be exchanged, and the fourth quantity being a quantity of second-type resources equal in value to the third quantity of first-type resources.

For the social application client, a user may determine the third quantity, and the fourth quantity is then calculated according to the third quantity determined by the user and a current conversion rate. Alternatively, a user determines the fourth quantity, and the third quantity is calculated according to the fourth quantity determined by the user and a current conversion rate.

1-2: Deduct the fourth quantity of second-type resources from the second-type resource account by using the first server, and add the third quantity of first-type resources to a first-type resource account.

Specifically, the social application client sends an exchange request to the first server. The exchange request includes the third quantity and the fourth quantity, and is used to instruct to exchange the fourth quantity of second-type resources for the third quantity of first-type resources. The first server generates a conversion page including the third quantity and the fourth quantity after receiving the exchange request, and sends the conversion page to the social application client. The social application client presents the conversion page. When a confirmation operation on the conversion page is detected, a confirmation request is sent to the first server. The first server can then deduct the fourth quantity of second-type resources from the second-type resource account, and add the third quantity of first-type resources to a first-type resource account.

Figures 1, 6H:
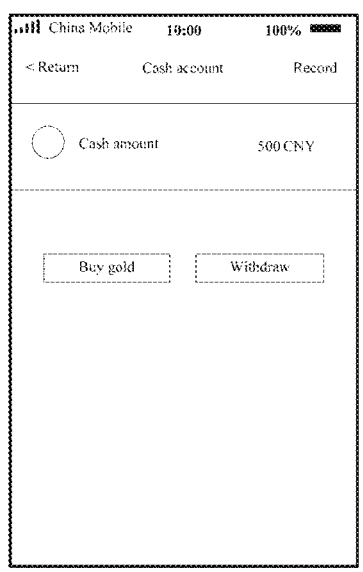
Figures 2, 6H:
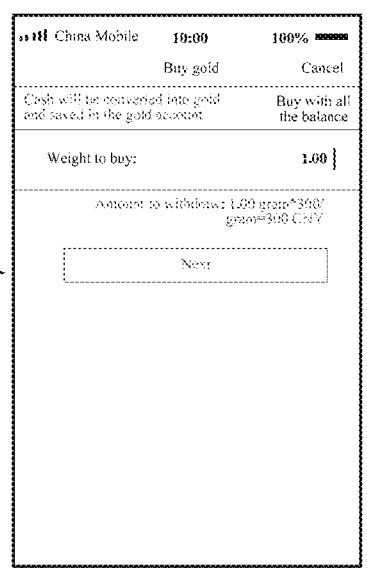
Figures 3, 6H:
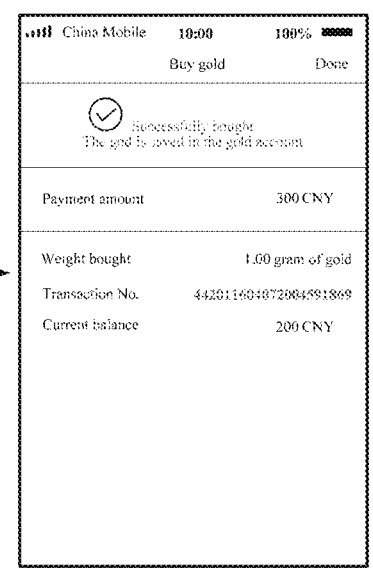

Referring to FIG. 6H-1, a "purchase gold" option is provided in a cash account. A gold exchange request is triggered when a user clicks the option. In this case, the user inputs the weight of gold to exchange cash for as depicted in FIG. 6H-2. The social application client displays a cash amount equal in value to the weight of gold according to the weight of gold and a current conversion rate. After confirmation by the user, the first server deducts corresponding cash from the cash account, and adds gold equal in value to a gold account as depicted in FIG. 6H-3.

In a second possible implementation, the social application client may use the first-type resource to exchange for the second-type resource. Specifically, the exchange process may include the following steps:

2-1: Determine a fifth quantity and a sixth quantity when a second-type-resource exchange request is received, the fifth quantity being a quantity of second-type resources to be exchanged, and the sixth quantity being a quantity of first-type resources equal in value to the fifth quantity of second-type resources.

2-2: Deduct the sixth quantity of first-type resources from a first-type resource account by using the first server, and add the fifth quantity of second-type resources to the second-type resource account.

Figures 1, 6I:
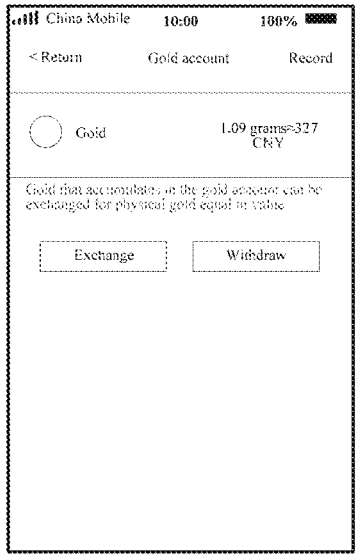
Figures 2, 6I:
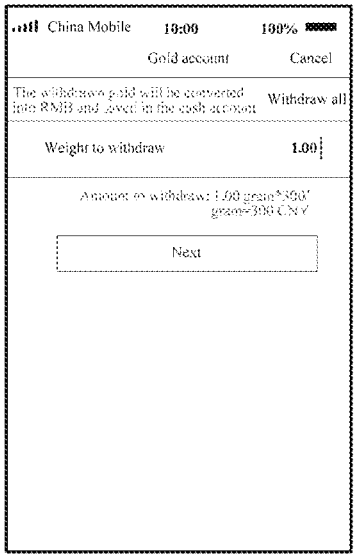
Figures 3, 6I:
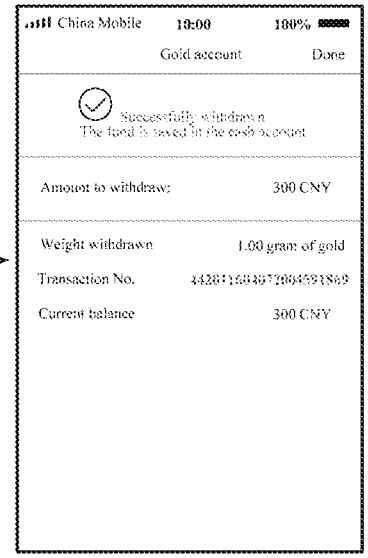

Referring to FIG. 6I-1, a "withdraw" option is provided in a gold account. A cash exchange request is triggered when a user clicks the option. In this case, the user inputs the weight of gold to be exchanged for cash as depicted in FIG. 6I-2. The social application client displays a cash amount equal in value to the gold according to the weight of gold and a current conversion rate. After confirmation by the user, the first server deducts corresponding gold from the gold account, and adds cash equal in value to the cash account as depicted in FIG. 6I-3.

Steps 2-1 and 2-2 are similar to steps 1-1 and 1-2. Details are no longer described here.

In a third possible implementation, the social application client may acquire a physical resource represented by the first-type resource. Specifically, the acquiring process may include the following steps:

3-1: The social application client determines a seventh quantity of first-type resources to be acquired when receiving a first-type-resource acquiring request. The first-type-resource acquiring request is used to instruct to acquire the first-type resource.

The seventh quantity may be determined when a user triggers the first-type-resource acquiring request. Alternatively, the user may determine a quantity of second-type resources first, and the first server calculates the seventh quantity according to the quantity and a current conversion rate.

3-2: Deduct resources corresponding to the seventh quantity from a resource account of the social application client by using the first server, and generate an order at least including the seventh quantity and address information, the order being used to distribute a physical resource represented by the seventh quantity of first-type resources to a user of the social application client according to the address information.

Specifically, when a social application client hopes to acquire a physical resource represented by the first-type resource, the social application client sends a resource acquiring request to the first server. The resource acquiring request carries the seventh quantity of first-type resources to be acquired. The first server deducts resources corresponding to the seventh quantity from the resource account when receiving the resource acquiring request, and generates the order. Subsequently, a manager of the first server may distribute the physical resource to a user of the social application client. Alternatively, the first server sends the order to the second server. A manager of the second server distributes the physical resource to a user of the social application client.

In some embodiments, the deducting resources corresponding to the seventh quantity includes:

deducting the seventh quantity of first-type resources from the first-type resource account by using the first server if a remaining quantity of first-type resources in a first-type resource account is not less than the seventh quantity; and determining a difference quantity between the seventh quantity and a remaining quantity of first-type resources in a first-type resource account and an eighth quantity matching the difference quantity if the remaining quantity is less than the seventh quantity, the eighth quantity being a quantity of second-type resources equal in value to and the difference quantity of first-type resources, and the eighth quantity being determined according to the current conversion rate between the first-type resource and the second-type resource and the seventh quantity; and deducting the remaining first-type resources from the first-type resource account by using the first server, and deducting the eighth quantity of second-type resources from the second-type resource account.

After the order including the seventh quantity and the address information is generated, the manager of the first server acquires a physical resource represented by the seventh quantity of first-type resources according to the order and sends the physical resource to an address of the user, so that the user can receive the physical resource.

Figures 1, 6J:
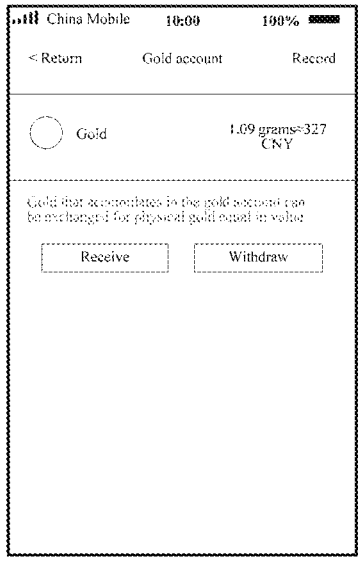
Figures 2, 6J:
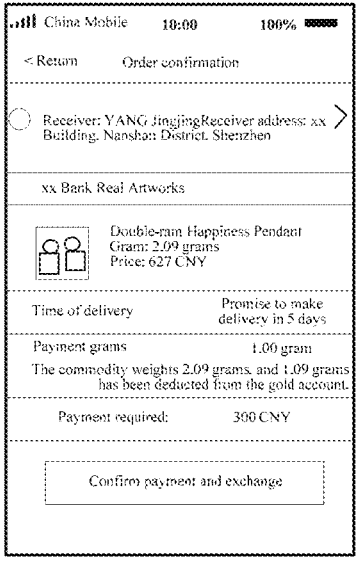
Figures 3, 6J:

Referring to FIG. 6J-1, a "receive" option is provided in a gold account. The social application client presents a confirmation page after a user clicks the option and chooses a gold product that the user wants to receive as depicted in FIG. 6J-2. The confirmation page includes a name, a phone number, and a delivery address of the user, the weight of gold being 1.09 grams to be deducted from the gold account, and a cash amount being 300 CNY that still needs to be paid. The user confirms payment and then inputs a payment password, to generate an order as depicted in FIG. 6J-3. In this case, the user may wait to receive physical gold.

This embodiment of the present disclosure further provides the following exemplary operation procedures:

1. Process of Sending a Gold Red Packet:

A user clicks a "Send gold red packet" option in a conversation window with a friend. A pop-up window used to send a gold red packet is displayed in the conversation window. Each subject of the pop-up window corresponds to one weight of gold. An "Another" button may be clicked to switch to another subject. A cash amount equal in value to the weight of gold is displayed on a confirmation option. The user clicks the confirmation option and then inputs a payment password. In this case, cash indicated by the cash amount is deducted for the user, and a plurality of gold red packets are generated and sent to one or more friends of the user.

Alternatively, a user clicks a "Send gold red packet" option in a conversation window of a group, and inputs a quantity of gold red packets and the total weight of gold, or inputs a quantity of gold red packets and the weight of gold in each gold red packet. A cash amount equal in value to the total weight of gold is displayed on the confirmation option. The user clicks the confirmation option and then inputs a payment password. In this case, cash indicated by the cash amount is deducted for the user, and a plurality of gold red packets are generated and sent to one or more friends of the user.

2. Process of Receiving a Gold Red Packet:

After a gold red packet is sent, link information corresponding to a plurality of gold red packets is presented in a conversation window. Both a user and a friend can view the link information and click the link information to grab a gold red packet. When a user has grabbed a gold red packet, gold in the gold red packet is added to a gold account of the user.

3. Process of Withdrawing Gold:

A user may enter a gold account to view remaining gold. The gold price of gold in the gold account fluctuates with the market price of gold, so that a cash amount equal in value is displayed. If a current gold price is higher than the gold price at which the user obtains the gold, this is equivalent to that the value of the gold increases.

The gold account provides a withdrawal option. A particular amount of gold can be converted into cash equal in value by using the withdrawal option, and the cash is stored in the cash account of the user.

4. Process of exchanging for physical gold: An exchange option is further provided for a gold account. The exchange option is used to generate an order, to exchange a particular amount of gold for physical gold equal in value.

When the remaining gold in the gold account is insufficient but a user wants to exchange more physical gold, in addition to the deduction of the remaining gold in the gold account, cash equal in value can further be paid to exchange for physical gold.

This embodiment of the present disclosure provides a method for sending various types of resource packages. Based on this embodiment of the present disclosure, analysis may further be performed according to types of resource packages sent by a user to determine a user grade and recommend resources matching the user grade to the user, so as to encourage the user to purchase various types of resources.

For example, records of resource packages sent by a user are acquired, to determine types of resource packages that are frequently sent or determine a quantity of sent resources, so as to determine a user grade. The user grade may include a high-risk user, a middle-risk user or a low-risk user. A high-risk resource such as a stock and a bond may be recommended to a high-risk user. A resource such as a fund may be recommended to a middle-risk user. A low-risk resource such as gold and a foreign currency may be recommended to a low-risk user.

Figure 7:
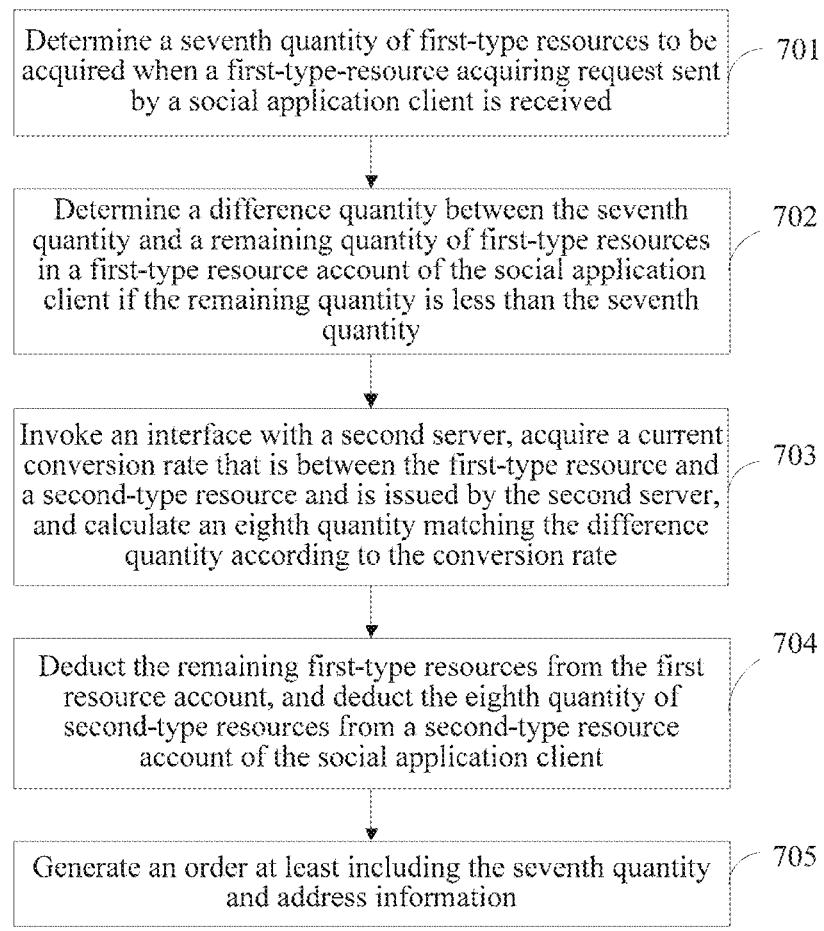
FIG. 7 is a flowchart of a method of information processing for resource acquisition according to an embodiment of the present disclosure.

FIG. 7 is a flowchart of a resource acquisition method according to an embodiment of the present disclosure. This embodiment of the present disclosure is executed by a social application client or a first server. Referring to FIG. 7, the method includes:

701: Determine a seventh quantity of first-type resources to be acquired when a first-type-resource acquiring request sent by a social application client is received.

702: Determine a difference quantity between the seventh quantity and a remaining quantity of first-type resources in a first-type resource account of the social application client if the remaining quantity is less than the seventh quantity.

703: Invoke an interface with a second server, acquire a current conversion rate that is between the first-type resource and a second-type resource and is issued by the second server, and calculate an eighth quantity matching the difference quantity according to the conversion rate, the eighth quantity being a quantity of second-type resources equal in value to and the difference quantity of first-type resources.

704: Deduct the remaining first-type resources from the first resource account, and deduct the eighth quantity of second-type resources from a second-type resource account of the social application client.

705: Generate an order at least including the seventh quantity and address information, the order being used to distribute a physical resource represented by the seventh quantity of first-type resources to a user of the social application client according to the address information.

In the method provided in this embodiment of the present disclosure, a resource can be deducted from a virtual resource account to generate an order used to acquire a physical resource, so that the physical resource can be distributed to a user according to the order, and the operations are very simple.

In some embodiments, the method further includes:

deducting the seventh quantity of first-type resources from the first-type resource account if a remaining quantity of first-type resources in a first-type resource account is not less than the seventh quantity; and generating the order at least including the seventh quantity and the address information.

A specific process in this embodiment of the present disclosure is similar to steps 3-1 and 3-2. Details are no longer described here.

Figure 8:
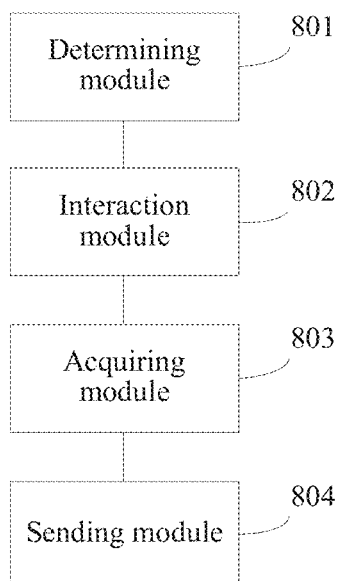
FIG. 8 is a schematic structural diagram of an information processing apparatus for sending a resource package according to an embodiment of the present disclosure.

FIG. 8 is a schematic structural diagram of an apparatus for sending a resource package according to an embodiment of the present disclosure. The apparatus for sending a resource package may be implemented by software, hardware or a combination thereof as a part or all of a sender client of a social application client. Referring to FIG. 8, the apparatus includes:

a determining module 801, configured to determine a resource package parameter when a first-type-resource-package sending instruction is received, the resource package parameter being used to determine a quantity of resource packages to be sent and a first quantity, and the first quantity being a quantity of first-type resources to be sent;

an interaction module 802, configured to: acquire, by using a first server, a current conversion rate that is between the first-type resource and a second-type resource and is issued by a second server, calculate a quantity of second-type resources equal in value to the first quantity of first-type resources according to the conversion rate, and use the quantity as a second quantity, the interaction module 802 being further configured to: deduct, by using the first server, the second quantity of second-type resources from a second-type resource account of the social application client, and generate at least one resource package, each resource package including a corresponding quantity of first-type resources, and a sum of quantities corresponding to the at least one resource package being equal to the first quantity;

an acquiring module 803, configured to acquire link information used to receive the at least one resource package; and a sending module 804, configured to send the link information to at least one receiver client having a friendship with the social application client, the at least one receiver client being configured to receive the resource package according to the link information.

For the apparatus provided in this embodiment of the present disclosure, a solution of sending a resource package after a second-type resource is converted into a first-type resource is provided. A conversion rate issued by a second server is acquired, a second-type resource is deducted according to the conversion rate, and at least one resource package including a first-type resource is generated, so that the second-type resource is converted into a first-type resource package equal in value for sending. A first-type resource package can be sent even if there is no first-type resource, so that the flexibility is improved, and the solution can be used to perform conversion and then send a resource package for any two types of resources, so that requirements of sending different types of resource packages by users are satisfied.

In some embodiments, the resource package parameter includes the quantity of resource packages and the first quantity; or, the resource package parameter includes the quantity of resource packages and a fixed quantity of first-type resources in each resource package, and a product of the quantity of resource packages and the fixed quantity is the first quantity.

In some embodiments, the determining module 801 is configured to determine that the quantity of resource packages is 1 when a first-type-resource-package sending instruction is received in a conversation window of any receiver client having a friendship, and determine the first quantity; or, acquire an input quantity of resource packages and the fixed quantity when a first-type-resource-package sending instruction is received in a conversation window of a social application group, or, acquire an input quantity of resource packages and a first quantity.

In some embodiments, the interaction module 802 is configured to send a resource-package sending request to the first server, the resource-package sending request carrying the resource package parameter, so that the first server acquires a current conversion rate that is between the first-type resource and a second-type resource and is issued by the second server, calculates a quantity of second-type resources equal in value to the first quantity of first-type resources according to the conversion rate, and uses the quantity as a second quantity.

In some embodiments, the interaction module 802 is further configured to: deduct the first quantity of first-type resources from a first-type resource account of the social application client by using the first server, and generate the at least one resource package.

In some embodiments, the interaction module 802 is further configured to send a resource-package sending request to the first server, the resource-package sending request carrying the resource package parameter, so that the first server deducts the first quantity of first-type resources from the first-type resource account, and generates the at least one resource package according to the resource package parameter.

In some embodiments, the acquiring module 803 is further configured to: receive a resource package identifier sent by the first server, the resource package identifier corresponding to the at least one resource package; and generate the link information including the resource package identifier.

In some embodiments, the apparatus further includes:
a first request module, configured to determine a third quantity and a fourth quantity when a first-type-resource exchange request is received, the third quantity being a quantity of first-type resources to be exchanged, and the fourth quantity being a quantity of second-type resources equal in value to the third quantity of first-type resources; and a first exchange module, configured to: deduct the fourth quantity of second-type resources from the second-type resource account by using the first server, and add the third quantity of first-type resources to a first-type resource account.

In some embodiments, the apparatus further includes:
a second request module, configured to determine a fifth quantity and a sixth quantity when a second-type-resource exchange request is received, the fifth quantity being a quantity of second-type resources to be exchanged, and the sixth quantity being a quantity of first-type resources equal in value to the fifth quantity of second-type resources; and a second exchange module, configured to: deduct the sixth quantity of first-type resources from a first-type resource account by using the first server, and add the fifth quantity of second-type resources to the second-type resource account.

In some embodiments, the apparatus further includes:
a third request module, configured to determine a seventh quantity of first-type resources to be acquired when a first-type-resource acquiring request is received; and a resource acquiring module, configured to: deduct resources corresponding to the seventh quantity from a resource account of the social application client by using the first server, and generate an order at least including the seventh quantity and address information, the order being used to distribute a physical resource represented by the seventh quantity of first-type resources to a user of the social application client according to the address information.

In some embodiments, the resource acquiring module is further configured to deduct the seventh quantity of first-type resources from the first-type resource account by using the first server if a remaining quantity of first-type resources in a first-type resource account is not less than the seventh quantity.

In some embodiments, the resource acquiring module is further configured to: determine a difference quantity between the seventh quantity and a remaining quantity of first-type resources in a first-type resource account and an eighth quantity matching the difference quantity if the remaining quantity is less than the seventh quantity, the eighth quantity being a quantity of second-type resources equal in value to and the difference quantity of first-type resources, and the eighth quantity being determined according to the current conversion rate between the first-type resource and the second-type resource and the seventh quantity; and deduct the remaining first-type resources from the first-type resource account by using the first server, and deduct the eighth quantity of second-type resources from the second-type resource account.

All the foregoing optional technical solutions may be randomly combined to form optional embodiments of the present disclosure. Details are no longer described here one by one.

Figure 9:
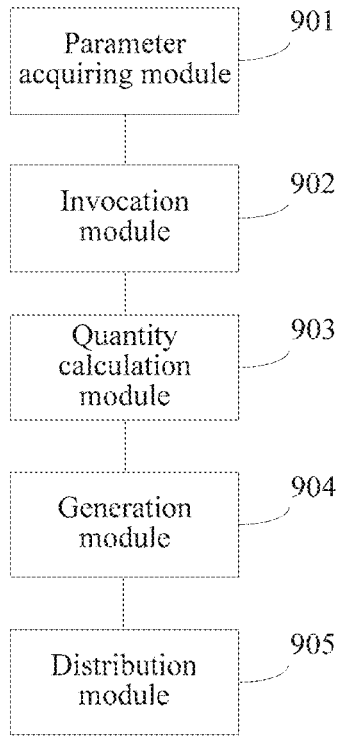
FIG. 9 is a schematic structural diagram of an information processing apparatus for distributing a resource package according to an embodiment of the present disclosure.

FIG. 9 is a schematic structural diagram of an apparatus for distributing a resource package according to an embodiment of the present disclosure. The apparatus for distributing a resource package may be implemented by software, hardware or a combination thereof as a part or all of a first server. Referring to FIG. 9, the apparatus including:

a parameter acquiring module 901, configured to acquire a resource package parameter determined by a sender client, the resource package parameter being used to determine a quantity of resource packages to be sent and a first quantity, and the first quantity being a quantity of first-type resources to be sent;

an invocation module 902, configured to: invoke an interface with a second server, and acquire a current conversion rate that is between the first-type resource and a second-type resource and is issued by the second server;

a quantity calculation module 903, configured to: calculate a quantity of second-type resources equal in value to the first quantity of first-type resources according to the conversion rate, and use the quantity as a second quantity;

a generation module 904, configured to: deduct the second quantity of second-type resources from a second-type resource account of the sender client, and generate at least one resource package, a sum of quantities corresponding to the at least one resource package being equal to the first quantity, so that the sender client sends link information to at least one receiving end having a friendship, the link information being used to receive the at least one resource package; and a distribution module 905, configured to distribute the at least one resource package to at least one receiver client by using the link information.

For the apparatus provided in this embodiment of the present disclosure, a solution of sending a resource package after a second-type resource is converted into a first-type resource is provided. A conversion rate issued by a second server is acquired, a second-type resource of a sender client is deducted according to the conversion rate, and at least one resource package including a first-type resource is generated, so that the second-type resource is converted into a first-type resource package equal in value for sending. A sender client can send a first-type resource package even if the sender client does not have a first-type resource, so that the flexibility is improved, and the solution can be used to perform conversion and then send a resource package for any two types of resources, so that requirements of sending different types of resource packages by users are satisfied.

In some embodiments, the generation module 9044 is further configured to: receive a resource-package sending request sent by the sender client, the resource-package sending request carrying a resource package parameter, and the resource package parameter being used to determine a quantity of resource packages to be sent and the first quantity; determine the quantity of resource packages and the first quantity according to the resource package parameter; determine the second quantity according to a current conversion rate between the first-type resource and the second-type resource and the first quantity; deduct the second quantity of second-type resources from the second-type resource account; and generate the at least one resource package according to the resource package parameter.

In some embodiments, the apparatus further includes:

the generation module 904, configured to: deduct the first quantity of first-type resources from a first-type resource account of the sender client by interacting with the sender client, and generate at least one resource package.

In some embodiments, the apparatus further includes:

an identifier generation module, configured to generate a resource package identifier for the at least one resource package; and a sending module, configured to send the resource package identifier to the sender client, so that the sender client generates the link information including the resource package identifier.

In some embodiments, the distribution module 905 is configured to: receive a resource-package receiving request sent by any receiver client, the resource-package receiving request carrying the resource package identifier; and choose one resource package from remaining resource packages corresponding to the resource package identifier and send the resource package to the receiver client, so that the receiver client adds the first-type resource included in the resource package to a first-type resource account.

In some embodiments, the distribution module 905 is further configured to: randomly determine a corresponding quantity of resource packages according to the quantity of resource packages and the first quantity if the resource package parameter includes a quantity of resource packages to be sent by the sender client and the first quantity; or, use the fixed quantity as a corresponding quantity of resource packages if the resource package parameter includes the quantity of resource packages and a fixed quantity of first-type resources in each resource package.

In some embodiments, the apparatus further includes:

a receiving module, configured to receive a resource exchange request sent by any social application client, the resource exchange request including a third quantity and a fourth quantity, the third quantity being a quantity of first-type resources to be exchanged, and the fourth quantity being a quantity of second-type resources equal in value to the third quantity of first-type resources; and a first exchange module, configured to: deduct the fourth quantity of second-type resources from the second-type resource account of the social application client, and add the third quantity of first-type resources to a first-type resource account of the social application client.

In some embodiments, the apparatus further includes:

a receiving module, configured to receive a resource exchange request sent by any social application client, the resource exchange request including a fifth quantity and a sixth quantity, the fifth quantity being a quantity of second-type resources to be exchanged, and the sixth quantity being a quantity of first-type resources equal in value to the fifth quantity of second-type resources; and a second exchange module, configured to: deduct the sixth quantity of first-type resources from a first-type resource account of the social application client, and add the fifth quantity of second-type resources to the second-type resource account of the social application client.

In some embodiments, the apparatus further includes:

a receiving module, configured to receive a resource acquiring request sent by any social application client, the resource acquiring request carrying a seventh quantity of first-type resources to be acquired; and a resource distribution module, configured to: deduct resources corresponding to the seventh quantity from a resource account of the social application client, and generate an order at least including the seventh quantity and address information, the order being used to distribute a physical resource represented by the seventh quantity of first-type resources to a user of the social application client according to the address information.

In some embodiments, the resource distribution module is further configured to deduct the seventh quantity of first-type resources from the first-type resource account if a remaining quantity of first-type resources in a first-type resource account is not less than the seventh quantity.

In some embodiments, the resource distribution module is further configured to: determine a difference quantity between the seventh quantity and a remaining quantity of first-type resources in a first-type resource account and an eighth quantity matching the difference quantity if the remaining quantity is less than the seventh quantity, the eighth quantity being a quantity of second-type resources equal in value to and the difference quantity of first-type resources, and the eighth quantity being determined according to the current conversion rate between the first-type resource and the second-type resource and the difference quantity; and deduct the remaining first-type resources from the first-type resource account, and deduct the eighth quantity of second-type resources from the second-type resource account.

All the foregoing optional technical solutions may be randomly combined to form optional embodiments of the present disclosure. Details are no longer described here one by one.

Figure 10:
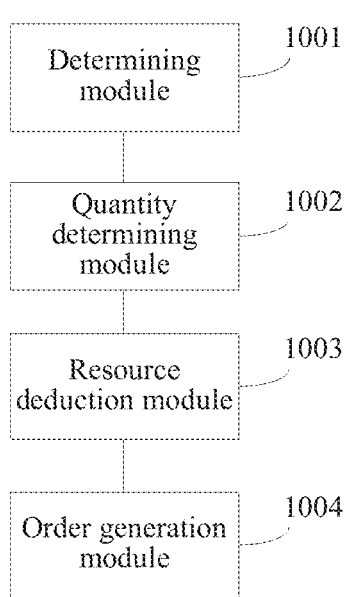
FIG. 10 is a schematic structural diagram of an information processing apparatus for distributing a resource package according to an embodiment of the present disclosure.

FIG. 10 is a schematic structural diagram of an apparatus for distributing a resource package according to an embodiment of the present disclosure. Referring to FIG. 10, the apparatus includes:

a determining module 1001, configured to determine a seventh quantity of first-type resources to be acquired when a first-type-resource acquiring request sent by a social application client is received;

a quantity determining module 1002, configured to determine a difference quantity between the seventh quantity and a remaining quantity of first-type resources in a first-type resource account of the social application client if the remaining quantity is less than the seventh quantity, the quantity determining module 1002 being further configured to: invoke an interface with a second server, acquire a current conversion rate that is between the first-type resource and a second-type resource and is issued by the second server, and calculate an eighth quantity matching the difference quantity according to the conversion rate, the eighth quantity being a quantity of second-type resources equal in value to and the difference quantity of first-type resources;

a resource deduction module 1003, configured to: deduct the remaining first-type resources from the first resource account, and deduct the eighth quantity of second-type resources from a second-type resource account of the social application client; and an order generation module 1004, configured to generate an order at least including the seventh quantity and address information, the order being used to distribute a physical resource represented by the seventh quantity of first-type resources to a user of the social application client according to the address information.

For the apparatus provided in this embodiment of the present disclosure, a resource can be deducted from a virtual resource account to generate an order used to acquire a physical resource, so that the physical resource can be distributed to a user according to the order, and the operations are very simple.

In some embodiments, the resource deduction module 1003 is further configured to deduct the seventh quantity of first-type resources from the first-type resource account if a remaining quantity of first-type resources in a first-type resource account is not less than the seventh quantity.

All the foregoing optional technical solutions may be randomly combined to form optional embodiments of the present disclosure. Details are no longer described here one by one.

Figure 11:
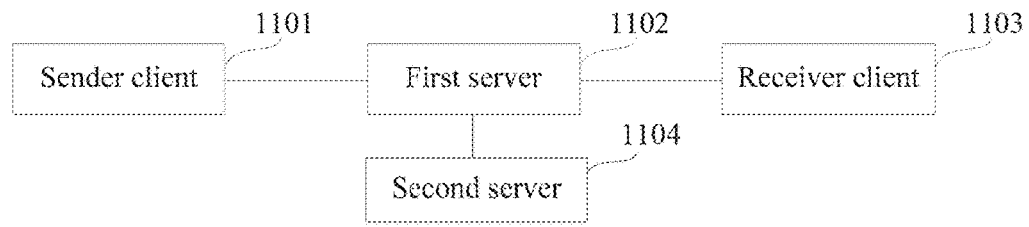
FIG. 11 is a schematic structural diagram of an information processing system for receiving and sending a resource package according to an embodiment of the present disclosure.

FIG. 11 is a schematic structural diagram of a system for receiving and sending a resource package according to an embodiment of the present disclosure. Referring to FIG. 11, the system includes: a sender client 1101, a first server 1102, at least one receiver client 1103, and a second server 1104.

The sender client 1101 is configured to: determine a resource package parameter when a first-type-resource-package sending instruction is received, acquire, by using the first server 1102, a current conversion rate that is between the first-type resource and a second-type resource and is issued by the second server 1104, calculate a quantity of second-type resources equal in value to a first quantity of first-type resources according to the conversion rate, use the quantity as a second quantity, deduct the second quantity of second-type resources from a second-type resource account of the sender client 1101, generate at least one resource package, and acquire link information used to receive the at least one resource package; and send the link information to the at least one receiver client 1103 having a friendship with the sender client 1101.

The first server 1102 is configured to: acquire the resource package parameter determined by the sender client, the resource package parameter being used to determine a quantity of resource packages to be sent and the first quantity, and the first quantity being a quantity of first-type resources to be sent, invoke an interface with the second server 1104, acquire the current conversion rate that is between the first-type resource and a second-type resource and is issued by the second server, calculate a quantity of second-type resources equal in value to the first quantity of first-type resources according to the conversion rate, use the quantity as a second quantity, perform interaction by using the sender client 1101, deduct the second quantity of second-type resources from the second-type resource account of the sender client 1101, generate at least one resource package, and distribute the at least one resource package to at least one receiver client by using the link information.

The receiver client 1103 is configured to: receive the link information sent by the sender client 1101 having a friendship with the receiver client 1103, interact with the first server 1102 according to the link information, acquire a resource package, and add the first-type resource included in the resource package to a first-type resource account of the receiver client 1103.

In an embodiment, any social application client or first server in the system for receiving and sending a resource package can be configured to: determine a seventh quantity of first-type resources to be acquired when a first-type-resource acquiring request is received; and deduct resources corresponding to the seventh quantity from a resource account of the social application client, and generate an order at least including the seventh quantity and address information, the order being used to distribute a physical resource represented by the seventh quantity of first-type resources to a user of the social application client according to the address information.

Figure 12:
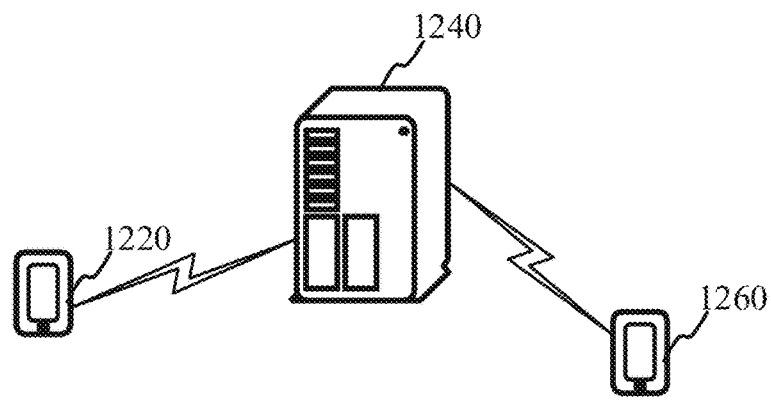
FIG. 12 is a schematic diagram of an implementation environment according to an embodiment of the present disclosure.

Referring to FIG. 12, FIG. 12 is a schematic diagram of an implementation environment according to an embodiment of the present disclosure. The implementation environment includes: a sending terminal 1220, a backend server 1240, and a receiving terminal 1260.

A sender client is run in the sending terminal 1220. The sending terminal 1220 may be a mobile phone, a tablet computer, an e-book reader, a Moving Picture Experts Group Audio Layer III (MP3) player, a Moving Picture Experts Group Audio Layer IV (MP4) player, a portable laptop computer, a desktop computer or the like.

The backend server 1240 may be a server, or a server cluster formed of several servers, or a cloud computing service center.

A receiver client is run in the receiving terminal 1260. The receiving terminal 1260 may be a mobile phone, a tablet computer, an e-book reader, an MP3 player, an MP4 player, a portable laptop computer, a desktop computer or the like.

The backend server 1240 may establish a communication connection with the sending terminal 1220 and the receiving terminal 1260 respectively through a network. The network may be a wireless network or a wired network.

In this embodiment of the present disclosure, the sender client and the receiver client may be any client having the function of receiving and sending a virtual item package. For example, the sender client may be a social application client, an instant messaging client, a payment application client, a game client, a reading client, a client dedicated to sending of a virtual item package, or the like.

During actual applications, the sender client and the receiver client may be two clients having different functions. The sender client has the function of sending a virtual item package. The receiver client has the function of receiving a virtual item package. Alternatively, the sender client and the receiver client may be two clients having the same function, and the clients have the functions of sending and receiving a virtual item package. When a client is configured to implement the function on a sender client side in the method example of the present disclosure, the client is used as a sender client. When a client is configured to implement the function on a receiver client side in a method example of the present disclosure, the client is used as a receiver client. Correspondingly, both a sending terminal and a receiving terminal are terminal devices. When a client running in the terminal device is configured to implement the function of a sender client side in a method example of the present disclosure, the terminal device is used as a sending terminal. When a client running in the terminal device is configured to implement the function of a receiver client side in a method example of the present disclosure, the terminal device is used as a receiving terminal. During actual applications, one same client may be used as either a sender client or a receiver client. One same terminal may be used as either a sending terminal or a receiving terminal.

In this embodiment of the present disclosure, a virtual item package may also be referred to as a virtual red packet or an electronic red packet. A virtual item package is a virtual medium for transferring a resource (or referred to as a virtual item) in the form of a gift between at least two users. The at least two users may have a friendship in a client and/or the real world, or may have no friendship. A resource (or referred to as a virtual item) involved in a virtual item package may be a currency, gaming equipment, a game material, a game pet, a game currency, an icon, membership, a title, a value-added service, a bonus point, a yuan bao (a virtual item issued by Tencent), a gold bean (another virtual item issued by Tencent), a gift money voucher, an exchange voucher, a coupon, a greeting card, or the like. The type of a resource is not limited in this embodiment of the present disclosure.

Figure 13:
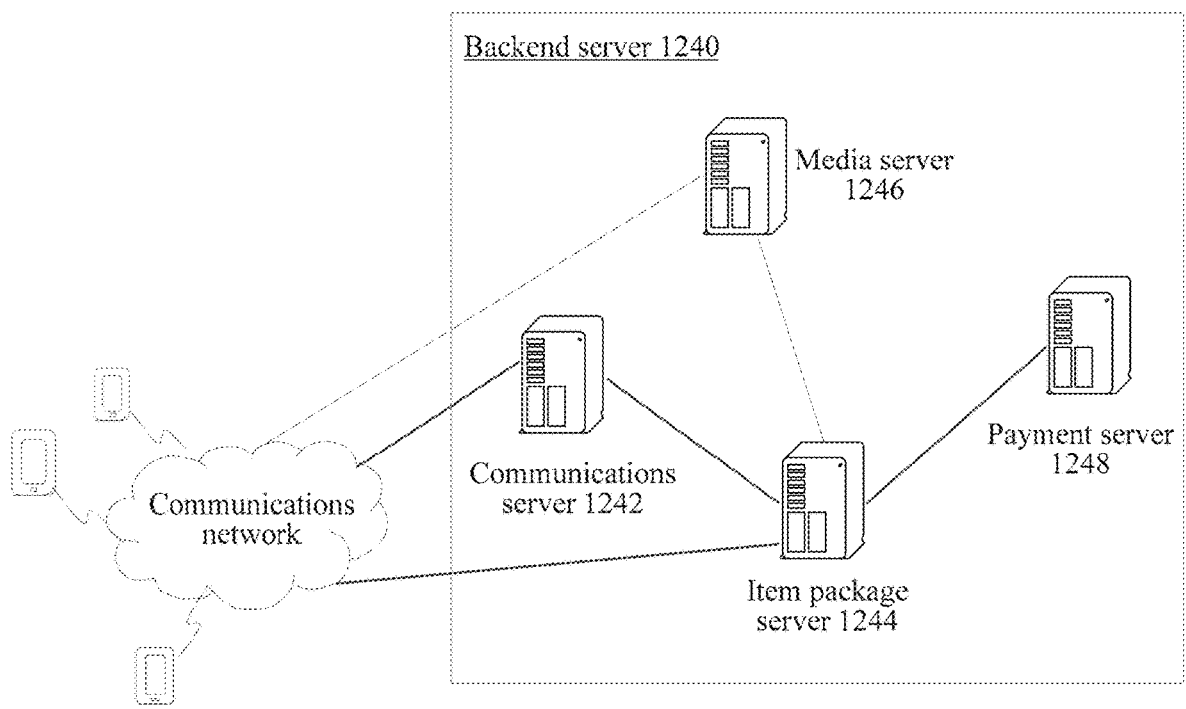
FIG. 13 is an architectural diagram of a backend server according to an embodiment of the present disclosure.

In an example, as shown in FIG. 13, when the backend server 1240 is a cluster architecture, the backend server 1240 may include: a communications server 1242, an item package server 1244, a media server 1246, and a payment server 1248.

The communications server 1242 is configured to provide a communication service between the sender client and the receiver client. For example, the communications server 1242 is configured to provide the functions of receiving and sending a message such as a text, an image, a voice, and a video between the sender client and the receiver client.

The item package server 1244 is configured to provide the functions of receiving and sending a virtual item package.

The media server 1246 is configured to provide the functions of storing and processing media information. The media information may be voice information or video information. Correspondingly, the media server 1246 may be a voice server or a video server.

The payment server 1248 is configured to provide a resource transfer function. For example, the payment server 1248 is configured to provide the functions of transferring a resource from an account corresponding to a sender client to an account corresponding to the backend server 1240 and transferring a resource from the account corresponding to the backend server 1240 to an account corresponding to a receiver client.

The foregoing servers may establish a communication connection through a network. The network may be a wireless network or a wired network.

Figure 14:
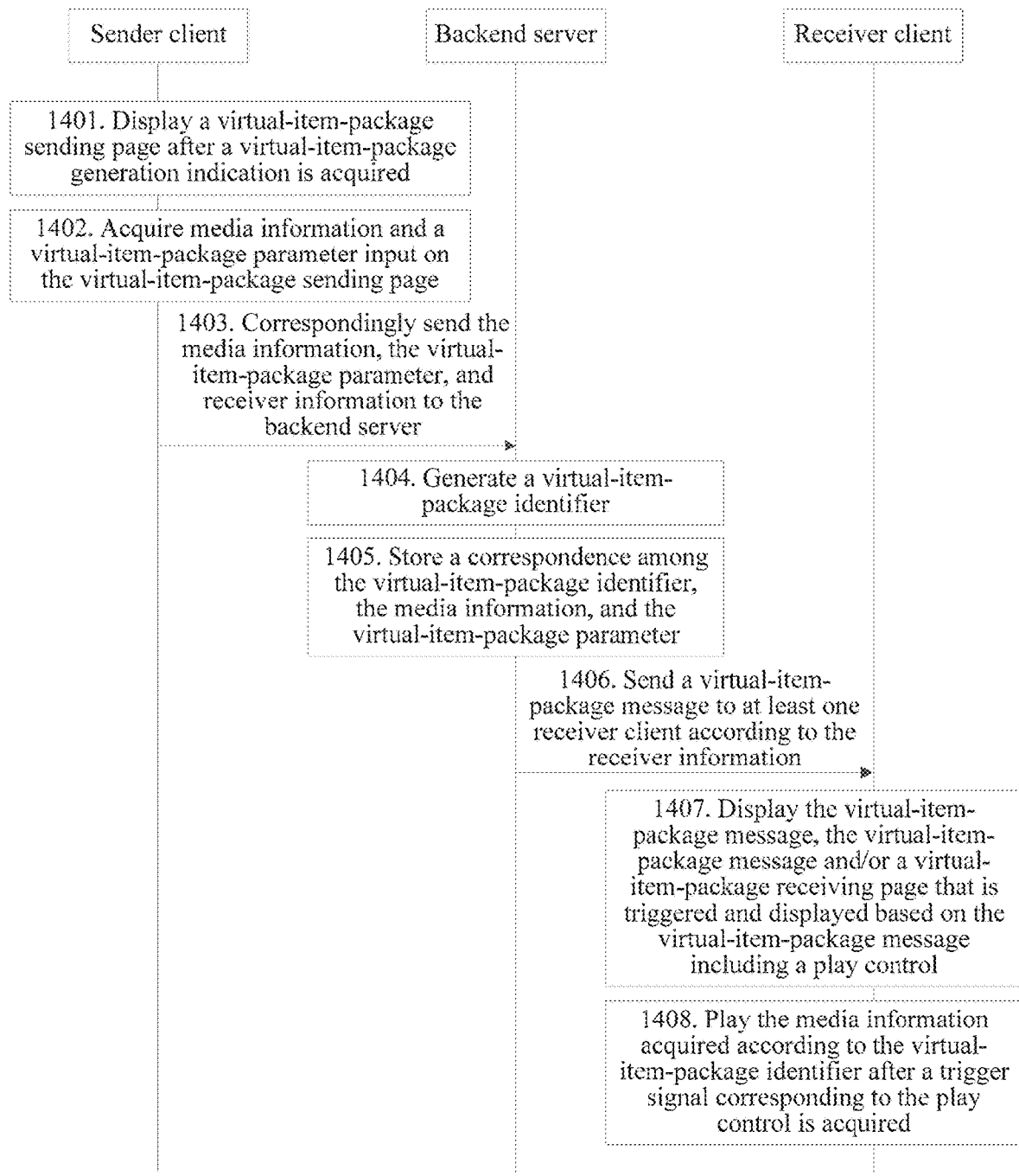
FIG. 14 is a flowchart of a method of information processing for sending a virtual item package according to an embodiment of the present disclosure.

Referring to FIG. 14, FIG. 14 is a flowchart of a method for sending a virtual item package according to an embodiment of the present disclosure. The method may be applied to the implementation environment shown in FIG. 12. The method may include the following steps:

Step 1401: A sender client displays a virtual-item-package sending page after a virtual-item-package generation indication is acquired.

Step 1402: The sender client acquires media information and a virtual-item-package parameter input on the virtual-item-package sending page, the media information being voice information or video information.

Step 1403: The sender client correspondingly sends the media information, the virtual-item-package parameter, and receiver information to a backend server.

Correspondingly, the backend server receives the media information, the virtual-item-package parameter, and the receiver information correspondingly sent by the sender client.

Step 1404: The backend server generates a virtual-item-package identifier.

Step 1405: The backend server stores a correspondence among the virtual-item-package identifier, the media information, and the virtual-item-package parameter.

Step 1406: The backend server sends a virtual-item-package message to at least one receiver client according to the receiver information.

The virtual-item-package message carries the virtual-item-package identifier.

Correspondingly, the receiver client receives the virtual-item-package message sent by the backend server.

Step 1407: The receiver client displays the virtual-item-package message, the virtual-item-package message and/or a virtual-item-package receiving page that is triggered and displayed based on the virtual-item-package message including a play control.

Step 1408: The receiver client plays the media information acquired according to the virtual-item-package identifier after a trigger signal corresponding to the play control is acquired.

In conclusion, in the method provided in this embodiment, when sending a virtual item package, a sender user may record media information as association information of the virtual item package and send the association information to a receiver. The receiver can play the media information after receiving the virtual item package. Therefore, compared with a greeting in a text form, the media information can transfer more information. For example, a receiver user can intuitively and explicitly know a mental state of the sender user according to features such as the voice, pitch, and tone of the sender user, thereby enriching the amount of information transferred in sending a virtual item package.

In addition, a sender user does not need to manually edit a greeting, and records media information to express a mood during sending of a virtual item package, for example, extend a greeting, offer comfort or give compliments, so that operations are fully simplified and the operation efficiency is improved.

In addition, if a receiver is a disabled person such as a deaf person, the recording of video information to extend a greeting, offer comfort or give compliments undoubtedly provides user experience completely different from a conventional red packet. The information transfer that cannot be implemented in a conventional information transfer manner can be implemented by using the information transfer manner. For other people such as seniors or children who cannot use or cannot normally use conventional information for expression, a video recording manner is essentially different from a conventional manner.

In addition, to resolve the problem that a user needs to manually edit a greeting resulting in relatively complex operations and low efficiency of inputting greetings, a conventional approach is to use a default greeting. If a user does not manually input a greeting when sending a virtual item package, the sender client adds the default greeting to a virtual item package and sends the virtual item package to a corresponding receiver client. However, sometimes the mood of a user cannot be accurately expressed by using the default greeting. For example, a default greeting is "I wish you good fortune and every success", and can only be used to express a greeting, but cannot be used to offer comfort or give compliments. By using the technical solutions provided in this embodiment of the present disclosure, not only operations can be simplified, but also a sender user can accurately express a mood in sending a virtual item package.

Two different types of media information, that is, voice information and video information, are respectively described below.

Figure 15A:
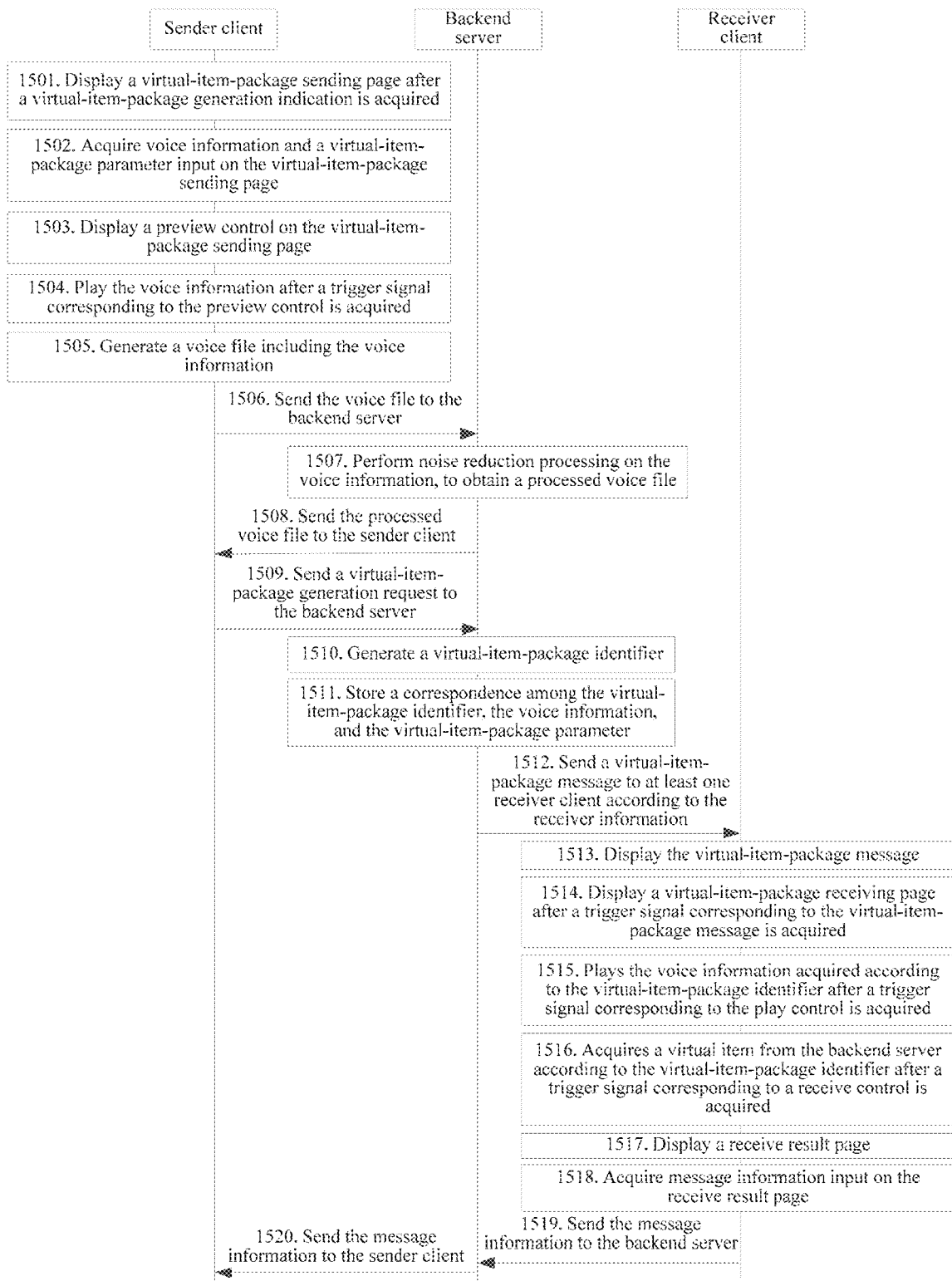
FIG. 15A is a flowchart of a method of information processing for sending a virtual item package according to another embodiment of the present disclosure.

Referring to FIG. 15A, FIG. 15A is a flowchart of a method for sending a virtual item package according to an embodiment of the present disclosure. The method may be applied to the implementation environment shown in FIG. 12. The method may include the following steps:

Step 1501: A sender client displays a virtual-item-package sending page after a virtual-item-package generation indication is acquired.

The virtual-item-package generation indication is an operation signal that is triggered by a sender user and is used to request the generation of a virtual item package. The sender client provides an operation control used to send a virtual item package. A user clicks the operation control to trigger the virtual-item-package generation indication. In an example, the sender client displays a conversation interface. The conversation interface may be a one-to-one conversation interface or a group chat conversation interface. A function menu is displayed after a trigger signal corresponding to a menu control in a conversation interface is acquired. The function menu includes an operation control used to send a virtual item package. A virtual-item-package sending page is displayed after a trigger signal corresponding to the operation control is acquired.

In some embodiments, if the sender client provides a user with both the function of sending a virtual item package carrying voice information and the function of sending a virtual item package carrying text information, the sender client displays selection items of virtual item package types after acquiring the trigger signal corresponding to the foregoing operation control used to send a virtual item package. After a trigger signal on a selection item corresponding to a virtual item package carrying voice information is acquired, a virtual-item-package sending page used to send a virtual item package carrying the voice information is displayed. In an example, a selection item of a virtual item package type includes a selection item corresponding to a virtual item package carrying text information and a selection item corresponding to a virtual item package carrying voice information.

Figures 1, 2, 15B:
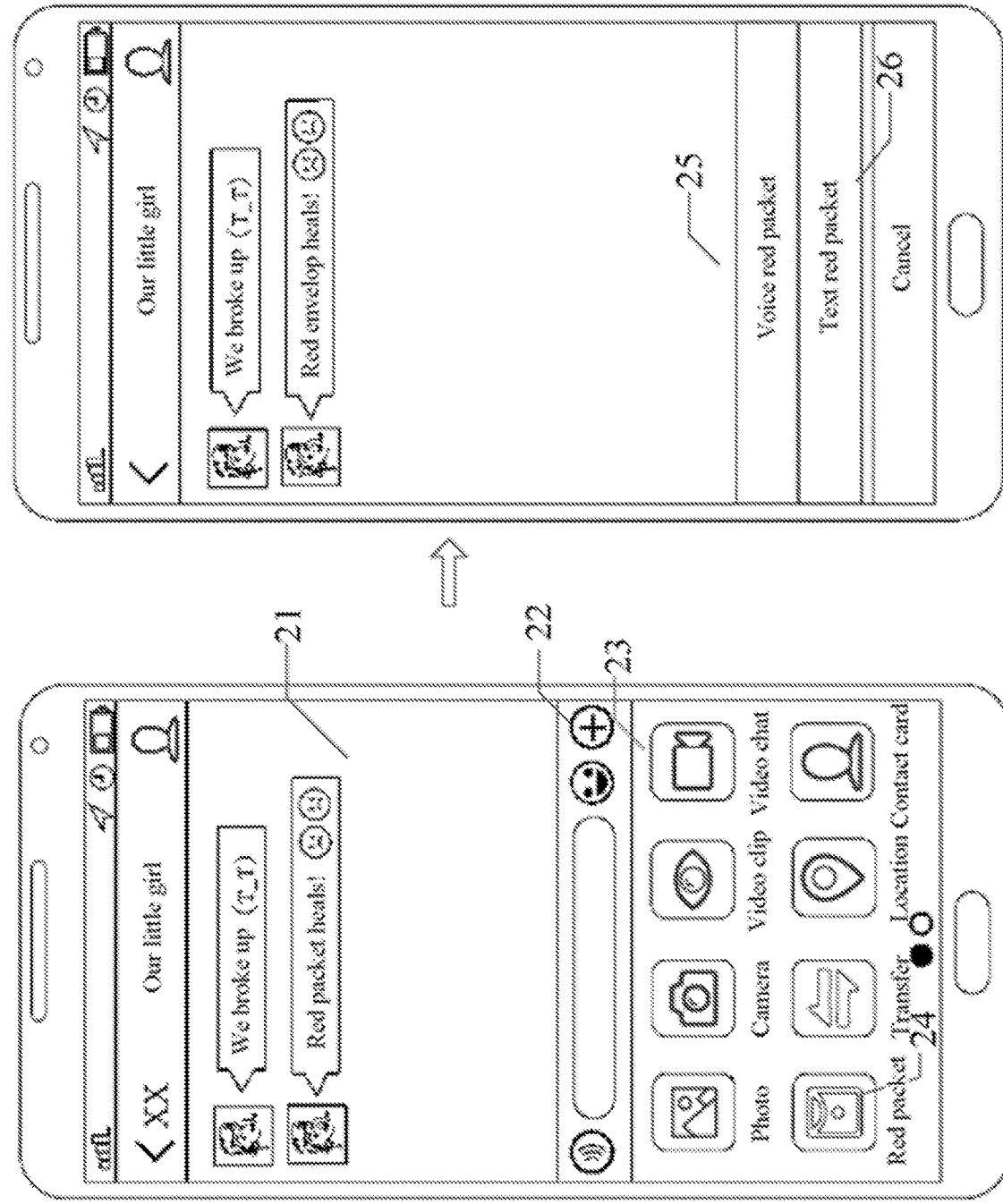

The virtual-item-package sending page includes: an operation control used by a sender user to input a virtual-item-package parameter, an operation control used by a sender user to record voice information, and an operation control used by a sender user to trigger sending of a virtual item package. With reference to FIG. 15B-1, FIG. 15B-1 is exemplarily a schematic interface diagram involved in the process of sending a virtual item package. It is assumed that a "red packet" is used as a medium to send a currency as a gift. The sender user clicks a menu control 22 in a one-to-one conversation interface 21 to trigger displaying of a function menu 23. The function menu 23 includes an operation control 24 used to send a virtual item package. The sender user clicks the operation control 24 to trigger displaying of selection items of virtual item package types. The selection items include a voice-red-packet selection item 25 and a text-red-packet selection item 26 as depicted in FIG. 15B-2. The sender user clicks the voice-red-packet selection item 25 to trigger displaying of a virtual-item-package sending interface 27 used to send a voice red packet as depicted in FIG. 15B-3. The virtual-item-package sending interface 27 includes an input box 28 used by a sender user to input a currency amount that needs to be sent as a gift, a recording control 29 used by a sender user to record the voice information, and an operation control 30 used by a sender user to trigger sending of a virtual item package.

Step 1502: The sender client acquires voice information and a virtual-item-package parameter input on the virtual-item-package sending page.

The sender client collects voice information by using a microphone after acquiring a trigger signal corresponding to a voice recording control in the virtual-item-package sending page. With reference to FIG. 15B-3, a user holds the recording control 29 to trigger recording of the voice information. The sender user starts to talk after viewing a displayed recording prompt box 31 as depicted in FIG. 15B-4, so as to record voice information that the sender user hopes to express. In some embodiments, during the recording of the voice information by the sender client, recording of voice information is canceled if a recording cancelation indication is acquired. For example, a user performs a swipe-up operation during recording of voice information to trigger the recording cancelation indication.

The virtual-item-package parameter includes several possible implementation forms as follows: When a virtual item package is sent to a single receiver client, the virtual-item-package parameter includes a quantity of virtual items in the virtual item package. When a virtual item package is sent to at least one receiver client that belongs to a same group, the virtual-item-package parameter includes a quantity of virtual item packages and a total quantity of virtual items. The total quantity of virtual items is used to randomly generate a quantity of virtual items in each virtual item package. Alternatively, the virtual-item-package parameter includes a quantity of virtual item packages and a fixed quantity of virtual items in each virtual item package.

Step 1503: The sender client displays a preview control on the virtual-item-package sending page.

The sender client displays a preview control on the virtual-item-package sending page after acquiring voice information. The preview control is used by a sender user to preview and play voice information recorded by the sender user. In some embodiments, the sender client switches the recording control in the virtual-item-package sending interface to the preview control after acquiring voice information.

Step 1504: The sender client plays the voice information after a trigger signal corresponding to the preview control is acquired.

The sender user may trigger the preview control to listen to voice information recorded by the sender user, so as to achieve the objective of examining the voice information. When deciding that voice information recorded by the sender user is unsatisfactory, the sender user may re-record the voice information. In some embodiments, the virtual-item-package sending interface further includes a re-recording control. The sender client re-acquires voice information after acquiring a trigger signal corresponding to the re-recording control.

With reference to FIG. 15B-1, FIG. 15B-2, FIG. 15B-3, FIG. 15B-4, FIGS. 15C-1, and 15C-2, the sender client switches the recording control 29 in virtual-item-package sending interface 27 to a preview control 32 after acquiring voice information. The sender user clicks the preview control 32 to trigger playing of the voice information. During playing of the voice information, the sender client may display a playing progress of the voice information. For example, as shown in FIG. 15C-1 and FIG. 15C-2, the sender client displays the playing progress of the voice information at an outer frame of the preview control 32. For example, a relatively thick line may be used at the outer frame to represent voice information that has already been played, and a relatively thin line is used to represent voice information that has not been played yet. The lengths of the two lines may represent the playing progress of the voice information. As voice information is played, a dynamic effect that the relatively thick line extends along the outer frame may be presented.

Step 1505: The sender client generates a voice file including the voice information.

The sender client generates a voice file including voice information after acquiring the voice information.

Step 1506: The sender client sends the voice file to the backend server.

Correspondingly, the backend server receives the voice file sent by the sender client.

Step 1507: The backend server performs noise reduction processing on the voice information, to obtain a processed voice file.

The backend server reads the voice information from the received voice file, and performs noise reduction processing on the voice information, to obtain a processed voice file. In this embodiment of the present disclosure, a noise reduction processing algorithm used by the backend server is not limited. In an example, the backend server performs analog/digital (A/D) conversion on voice information (that is, an audio signal), to acquire a power spectrum of the audio signal, calculates an a priori signal-to-noise ratio, a posterior signal-to-noise ratio, and each subband gain of the audio signal according to the power spectrum, performs suppression processing on a noise signal in the audio signal according to the calculated result, performs digital/analog (D/A) conversion on the audio signal obtained after suppression processing, and saves the converted audio signal.

In addition, the backend server saves the processed voice file. A file identifier of the processed voice file may be a file identifier of the voice file received by the backend server from the sender client, or may be a file identifier generated by the backend server for the processed voice file.

Step 1508: The backend server sends the processed voice file to the sender client.

Correspondingly, the sender client receives the processed voice file sent by the backend server.

In some embodiments, the sender client plays the voice information in the processed voice file after acquiring the trigger signal corresponding to the preview control.

In addition, in this embodiment, only an example in which the backend server performs noise reduction processing on the voice information is used. In an embodiment, alternatively, the sender client may perform noise reduction processing on the voice information.

Step 1509: The sender client sends a virtual-item-package generation request to the backend server.

The virtual-item-package generation request is used to instruct the backend server to generate a virtual item package. The virtual-item-package generation request includes a file identifier of the voice file, the virtual-item-package parameter, and receiver information. The file identifier is generated by the sender client or the backend server. The file identifier is used to uniquely identify the voice file. For example, the file identifier may be a filename of the voice file, or may be a unique sequence number distributed by the sender client or the backend server to the voice file. The receiver information is used to indicate a receiver user of the virtual item package. For example, the receiver information may be an identifier of a receiver client, or may be a group identifier of a group to which a receiver client belongs, or a condition set by a sender user for a receiver client. For example, the condition may be receiver clients corresponding to receiver users between 20 to 30 years old in Guangzhou City.

In an example, the virtual-item-package sending page includes a sending control. A sender user triggers the sending control to trigger a virtual-item-package sending indication. The sender client triggers execution of a sending procedure below after acquiring the virtual-item-package sending indication, to send a virtual-item-package message to at least one receiver client. The virtual-item-package message generated based on the virtual-item-package parameter carries the voice information.

In some embodiments, if the sender client receives the processed voice file from the backend server, the virtual-item-package generation request includes the file identifier of the processed voice file, the virtual-item-package parameter, and the receiver information. The file identifier of the processed voice file may be the same as the file identifier of the unprocessed voice file, or may be a file identifier newly generated by the backend server for the processed voice file. If the backend server newly generates a file identifier for the processed voice file, the backend server sends the processed voice file and the file identifier of the processed voice file together to the sender client.

With reference to FIG. 15B-1, FIG. 15B-2, FIG. 15B-3, FIG. 15B-4, FIG. 15C-1, FIG. 15C-2, FIG. 15D-1, and FIG. 15D-2, the sender user clicks an operation control 30 to trigger a payment procedure. The sender client and the backend server interact to complete a payment procedure. The sender client transfers a currency amount that needs to be sent as a gift from an account corresponding to the sender client to an account corresponding to the backend server. The virtual item package is successfully sent after transfer succeeds. One sent virtual-item-package message 33 is displayed in the one-to-one conversation interface 21 displayed by the sender client.

Step 1510: The backend server generates a virtual-item-package identifier.

The backend server generates the virtual-item-package identifier corresponding to the virtual-item-package parameter.

It should be noted that for one or more virtual item packages that need to be generated for a same virtual-item-package generation request, the backend server generates one virtual-item-package identifier. The virtual-item-package identifier and a virtual-item-package parameter included in the request are correspondingly stored.

Step 1511: The backend server stores a correspondence among the virtual-item-package identifier, the voice information, and the virtual-item-package parameter.

Step 1512: The backend server sends a virtual-item-package message to at least one receiver client according to the receiver information, the virtual-item-package message carrying the virtual-item-package identifier.

Correspondingly, the receiver client receives the virtual-item-package message sent by the backend server.

If sending of a virtual item package is triggered in a one-to-one conversation interface, a receiver user of the virtual item package is the contact in the one-to-one conversation interface. A virtual-item-package generation request sent by a sender client to a backend server may carry a user account of the contact in the one-to-one conversation interface. The backend server sends a virtual-item-package message to a receiver client corresponding to the user account of the contact.

If sending of a virtual item package is triggered in a group chat conversation interface, a receiver user of the virtual item package is a contact in a group corresponding to the group chat conversation interface. A virtual-item-package generation request sent by a sender client to a backend server may carry a group identifier of the group corresponding to the group chat conversation interface. The backend server acquires, according to the group identifier, a user account of each contact that belongs to the group, and then sends a virtual-item-package message a receiver client corresponding to the acquired user account of each contact.

In some embodiments, the virtual-item-package message further carries an identifier of the sender client, making it convenient for a receiver user to know the sender user of the virtual item package according to the identifier of the sender client.

Step 1513: The receiver client displays the virtual-item-package message.

The receiver client displays the virtual-item-package message in the conversation interface with the sender client. In an example, the virtual-item-package message displayed by the receiver client includes a play control. In another example, a virtual-item-package receiving page of which displaying is triggered based on the virtual-item-package message displayed by the receiver client includes the play control. In still another example, both the virtual-item-package message displayed by the receiver client and the virtual-item-package receiving page of which displaying is triggered based on the virtual-item-package message include the play control. The play control is used by a receiver user to trigger playing of the voice information.

The virtual-item-package message displayed by the receiver client is similar to the virtual-item-package message displayed by the sender client. Reference may be made to FIG. 15D-1 and FIG. 15D-2.

Step 1514: The receiver client displays a virtual-item-package receiving page after acquiring a trigger signal corresponding to the virtual-item-package message.

The virtual-item-package receiving page includes the play control and a receive control. The receive control is used by a receiver user to trigger receiving of a virtual item in a virtual item package.

As shown in FIG. 15E-1, FIG. 15E-1 is exemplarily a schematic interface diagram of a virtual-item-package receiving page 34. The virtual-item-package receiving page 34 includes the play control 35 and a receive control 36. A receiver user clicks the play control 35 to trigger the receiver client to play the voice information. A receiver user clicks the receive control 36 to trigger the receiver client to acquire a virtual item in a virtual item package.

Step 1515: The receiver client plays the voice information acquired according to the virtual-item-package identifier after acquiring a trigger signal corresponding to the play control.

A receiver user may click the play control included in the virtual-item-package message, or click the play control included in the virtual-item-package receiving page, to trigger the receiver client to play the voice information.

In addition, the receiver client may acquire voice information from the backend server in the following manners. In an example, the receiver client sends a voice acquiring request to the backend server. The voice acquiring request includes a virtual-item-package identifier. The backend server searches a prestored correspondence after receiving the voice acquiring request to acquire voice information corresponding to the virtual-item-package identifier, and sends a voice file including the found voice information to the receiver client. In an example, a virtual-item-package message sent by the backend server to the receiver client further includes a file identifier corresponding to voice information. The receiver client sends a voice acquiring request to the backend server. The voice acquiring request includes the file identifier. The backend server sends a voice file corresponding to the file identifier to the receiver client after receiving the voice acquiring request. In some embodiments, the voice file is a processed voice file obtained by performing noise reduction processing on the voice information.

In addition, the time that the receiver client acquires voice information from the backend server includes several possible implementations as follows:

In a first possible implementation, the receiver client acquires voice information from the backend server after acquiring a trigger signal corresponding to the play control.

That is, the receiver client requests to acquire voice information from the backend server after determining that a receiver user needs to play the voice information, so as to avoid a resource waste that occurs when the voice information is acquired in advance but the receiver user does not need to play the voice information.

In a second possible implementation, the receiver client acquires the voice information from the backend server after verifying that a user account that logs in to the receiver client meets a condition of receiving a virtual item in a virtual item package.

The condition of receiving a virtual item in a virtual item package includes, but is not limited to, at least one of the following: a user account that is used to log in to a receiver client is the contact in the one-to-one conversation interface, a user account that is used to log in to a receiver client is a contact that belongs to the group corresponding to the group chat conversation interface, an unreceived virtual item package still exists, and a virtual item package is not expired. Authority verification is performed on a receiver user by using the foregoing manner. Only a receiver user that has the right to receive a virtual item in a virtual item package is allowed to view the voice information recorded by the sender user, thereby improving the privacy of the voice information.

In a third possible implementation, a receiver client acquires voice information from the backend server after successfully acquiring a virtual item in a virtual item package.

In this implementation, a receiver user has the right to acquire and view corresponding voice information only after successfully receiving a virtual item in a virtual item package. In this case, the receiver client may perform the following step 1516 to receive a virtual item and then perform step 1515 to play the voice information or automatically play the voice information.

Step 1516: The receiver client acquires a virtual item from the backend server according to the virtual-item-package identifier after acquiring a trigger signal corresponding to a receive control.

The receiver client sends a virtual-item receiving request to the backend server after acquiring a trigger signal corresponding to a receive control. The virtual-item receiving request carries the virtual-item-package identifier. The backend server searches the prestored correspondence after receiving the virtual-item receiving request, to acquire a virtual-item-package parameter corresponding to the virtual-item-package identifier, and sends a virtual item to the receiver client according to the virtual-item-package parameter.

If the virtual-item-package parameter includes a quantity of virtual items in the virtual item package, the backend server transfers the quantity of virtual items from an account corresponding to the backend server to an account corresponding to the receiver client. If the virtual-item-package parameter includes a quantity of virtual item packages and a total quantity of virtual items, the backend server randomly generates, according to the quantity of virtual item packages and a total quantity of virtual items, a quantity of virtual items in a virtual item package acquired by a receiver client, and transfers the quantity of virtual items from an account corresponding to the backend server to an account corresponding to the receiver client. If the virtual-item-package parameter includes a quantity of virtual item packages and a fixed quantity of virtual items in each virtual item package, the backend server transfers the fixed quantity of virtual items from an account corresponding to the backend server to an account corresponding to the receiver client.

In this embodiment, only an example in which a user clicks a receive control to trigger receiving of a virtual item in a virtual item package is used. In another embodiment, a receiver client may automatically receive a virtual item in a virtual item package. In an example, a receiver client acquires a virtual item from the backend server according to a virtual-item-package identifier after playing of the voice information ends.

Step 1517: The receiver client displays a receive result page.

The receiver client displays a receive result page after acquiring a virtual item. The receive result page may include a quantity of received virtual items. In some embodiments, the receive result page further includes a message control. The message control is used by a receiver user to input message information.

As shown in FIG. 15E-2, after a receiver user successfully receives a virtual item, the receiver client displays a receive result page 37. The receive result page 37 includes a message control 38.

Step 1518: The receiver client acquires message information input on the receive result page.

A receiver user clicks a message control to trigger input of message information. The message information is any one of a text, a voice or a video. For example, a receiver user may record a voice or a video, to express the gratitude toward the sending user.

Step 1519: The receiver client sends the message information to the backend server.

Correspondingly, the backend server receives the message information sent by the receiver client.

Step 1520: The backend server sends the message information to the sender client.

Correspondingly, the sender client receives the message information sent by the backend server.

Step 1521: The sender client displays the message information.

In conclusion, in the method provided in this embodiment, when sending a virtual item package, a sender user may record the voice information as association information of the virtual item package and send the association information to a receiver. The receiver can play the voice information after receiving the virtual item package. Therefore, compared with a greeting in a text form, the voice information can transfer more information. For example, a receiver user can intuitively and explicitly know a mental state of the sender user according to features such as the voice, pitch, and tone of the sender user, thereby enriching the amount of information transferred in sending a virtual item package.

In addition, the sender client does not directly add the voice information to the virtual-item-package generation request and send the virtual-item-package generation request to the backend server, but instead, sends the voice information and the virtual-item-package generation request to the backend server respectively and separately, so that two different servers can be respectively configured to implement the function of storing voice information and implement the function of receiving and receiving a virtual item package, thereby reducing the processing and storage load of the server configured to implement the function of receiving and sending a virtual item package.

In addition, noise reduction processing is further performed on voice information to reduce the interference with listening by a user from a noise signal in the voice information. Even if the sender user Voice information having relatively desirable quality can be recorded even in a relatively noisy environment such as a road, a mall, and a restaurant.

In addition, a preview control is further displayed on the virtual-item-package sending page, so that the sender user can preview and play recorded voice information before sending a virtual item package, thereby ensuring that the subsequently sent voice information is satisfactory to the user.

In the foregoing method embodiments, steps about a side of a sender client may be separately implemented as a method for sending a virtual item package on the side of the sender client, steps about a side of a backend server may be separately implemented as a method for sending a virtual item package on the side of the backend server, and steps about a side of a receiver client may be separately implemented as a method for receiving a virtual item package on the side of the receiver client.

Figure 16:
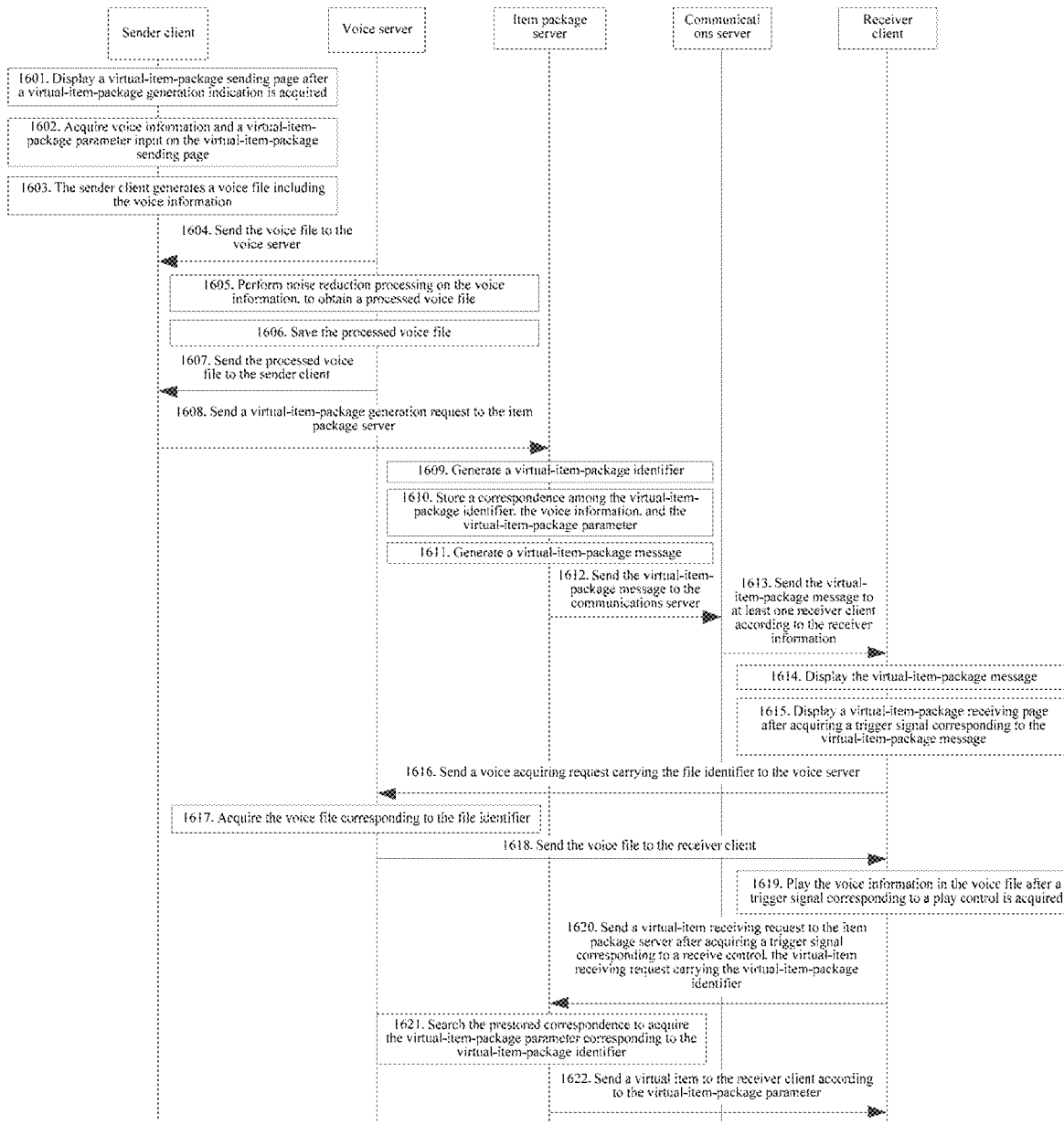
FIG. 16 is a flowchart of a method of information processing for sending a virtual item package according to another embodiment of the present disclosure.

In an example, when the backend server is the cluster architecture shown in FIG. 13. Referring to FIG. 16, the method for sending a virtual item package may include several steps as follows:

Step 1601: The sender client displays a virtual-item-package sending page after acquiring a virtual-item-package generation indication.

Step 1602: The sender client acquires voice information and a virtual-item-package parameter input on the virtual-item-package sending page.

Step 1603: The sender client generates a voice file including the voice information.

Step 1604: The sender client sends the voice file to a voice server.

Correspondingly, the voice server receives the voice file sent by the sender client.

Step 1605: The voice server performs noise reduction processing on the voice information, to obtain a processed voice file.

Step 1606: The voice server saves the processed voice file.

Step 1607: The voice server sends the processed voice file to the sender client.

Correspondingly, the sender client receives the processed voice file sent by the voice server.

Step 1608: The sender client sends a virtual-item-package generation request to an item package server.

The virtual-item-package generation request includes a file identifier of the processed voice file, the virtual-item-package parameter, and receiver information.

Correspondingly, the item package server receives the virtual-item-package generation request sent by the sender client.

Step 1609: The item package server generates a virtual-item-package identifier.

Step 1610: The item package server stores a correspondence among the virtual-item-package identifier, the voice information, and the virtual-item-package parameter.

Step 1611: The item package server generates a virtual-item-package message.

The virtual-item-package message carries the virtual-item-package identifier. In some embodiments, the virtual-item-package message further carries an identifier of the sender client and/or a file identifier of the voice file.

Step 1612: The item package server sends the virtual-item-package message to a communications server.

Correspondingly, the communications server receives the virtual-item-package message sent by the item package server.

Step 1613: The communications server sends the virtual-item-package message to at least one receiver client according to the receiver information.

Correspondingly, the receiver client receives the virtual-item-package message sent by the communications server.

Step 1614: The receiver client displays the virtual-item-package message.

Step 1615: The receiver client displays a virtual-item-package receiving page after acquiring a trigger signal corresponding to the virtual-item-package message.

Step 1616: The receiver client sends a voice acquiring request carrying the file identifier to the voice server.

Correspondingly, the voice server receives the voice acquiring request sent by the receiver client.

Step 1617: The voice server acquires the voice file corresponding to the file identifier.

Step 1618: The voice server sends the voice file to the receiver client.

Correspondingly, the receiver client receives the voice file sent by the voice server.

Step 1619: The receiver client plays the voice information in the voice file after acquiring a trigger signal corresponding to a play control.

Step 1620: The receiver client sends a virtual-item receiving request to the item package server after acquiring a trigger signal corresponding to a receive control, the virtual-item receiving request carrying the virtual-item-package identifier.

Correspondingly, the item package server receives the virtual item receiving request sent by the receiver client.

Step 1621: The item package server searches the pre-stored correspondence to acquire the virtual-item-package parameter corresponding to the virtual-item-package identifier.

Step 1622: The item package server sends a virtual item to the receiver client according to the virtual-item-package parameter.

Figure 17A:
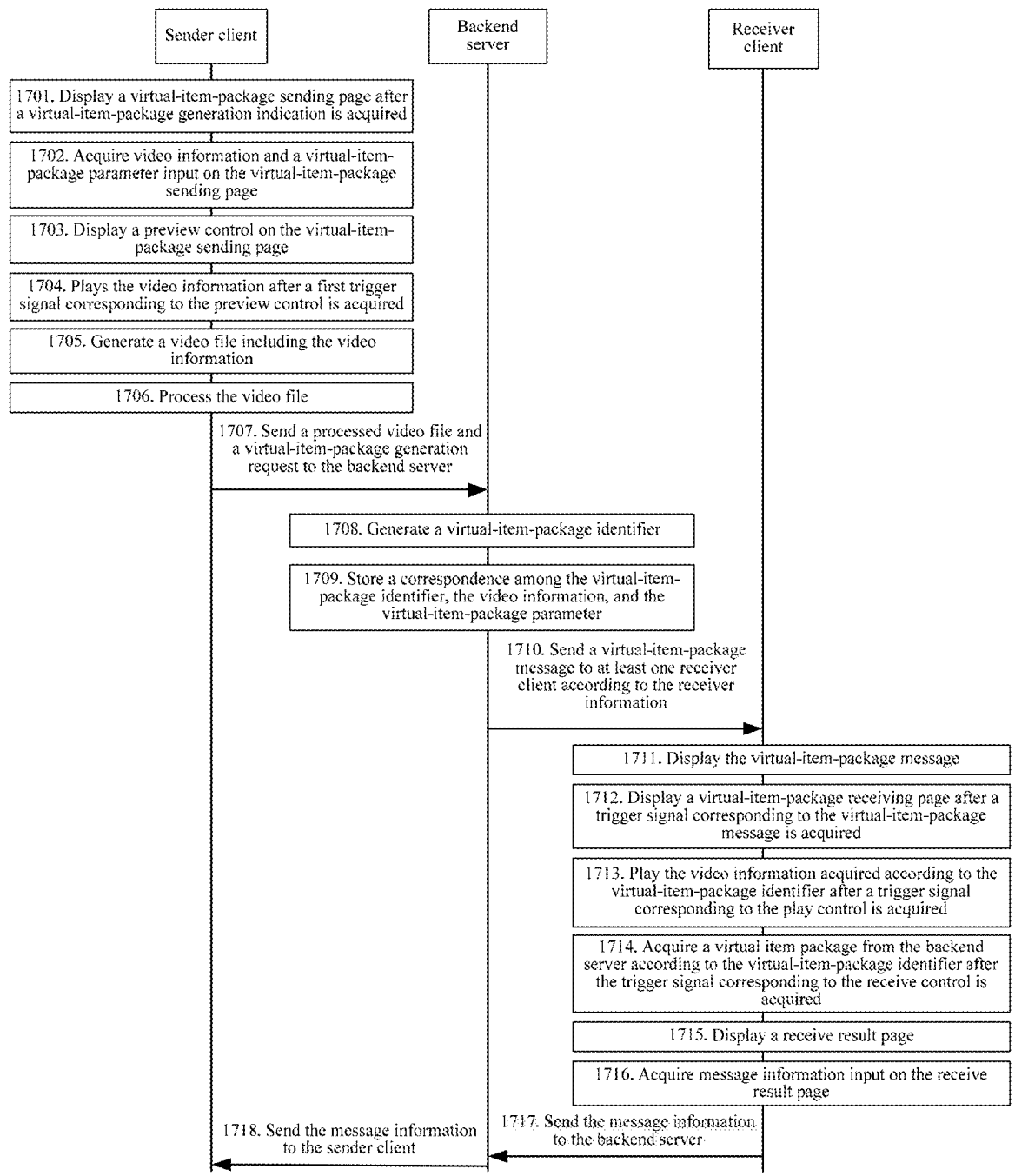
FIG. 17A is a flowchart of a method of information processing for sending a virtual item package according to an embodiment of the present disclosure.

Referring to FIG. 17A, FIG. 17A is a flowchart of a method for sending a virtual item package according to an embodiment of the present disclosure. The method may be applied to the implementation environment shown in FIG. 12. The method may include the following steps:

Step 1701: A sender client displays a virtual-item-package sending page after acquiring a virtual-item-package generation indication.

The virtual-item-package generation indication is an operation signal that is triggered by a sender user and is used to request the generation of a virtual item package. The sender client provides an operation control used to send a virtual item package. A user clicks the operation control to trigger the virtual-item-package generation indication. In an example, the sender client displays a conversation interface. The conversation interface may be a one-to-one conversation interface or a group chat conversation interface. A function menu is displayed after a trigger signal corresponding to a menu control in a conversation interface is acquired. The function menu includes an operation control used to send a virtual item package. A virtual-item-package sending page is displayed after a trigger signal corresponding to the operation control is acquired.

In some embodiments, if the sender client provides a user with both the function of sending a virtual item package carrying video information and the function of sending a virtual item package carrying text information, the sender client displays selection items of virtual item package types after acquiring the trigger signal corresponding to the foregoing operation control used to send a virtual item package. After a trigger signal on a selection item corresponding to a virtual item package carrying video information is acquired, a virtual-item-package sending page used to send a virtual item package carrying the video information is displayed. In an example, a selection item of a virtual item package type includes a selection item corresponding to a virtual item package carrying text information and a selection item corresponding to a virtual item package carrying video information.

Figures 1, 2, 17B:
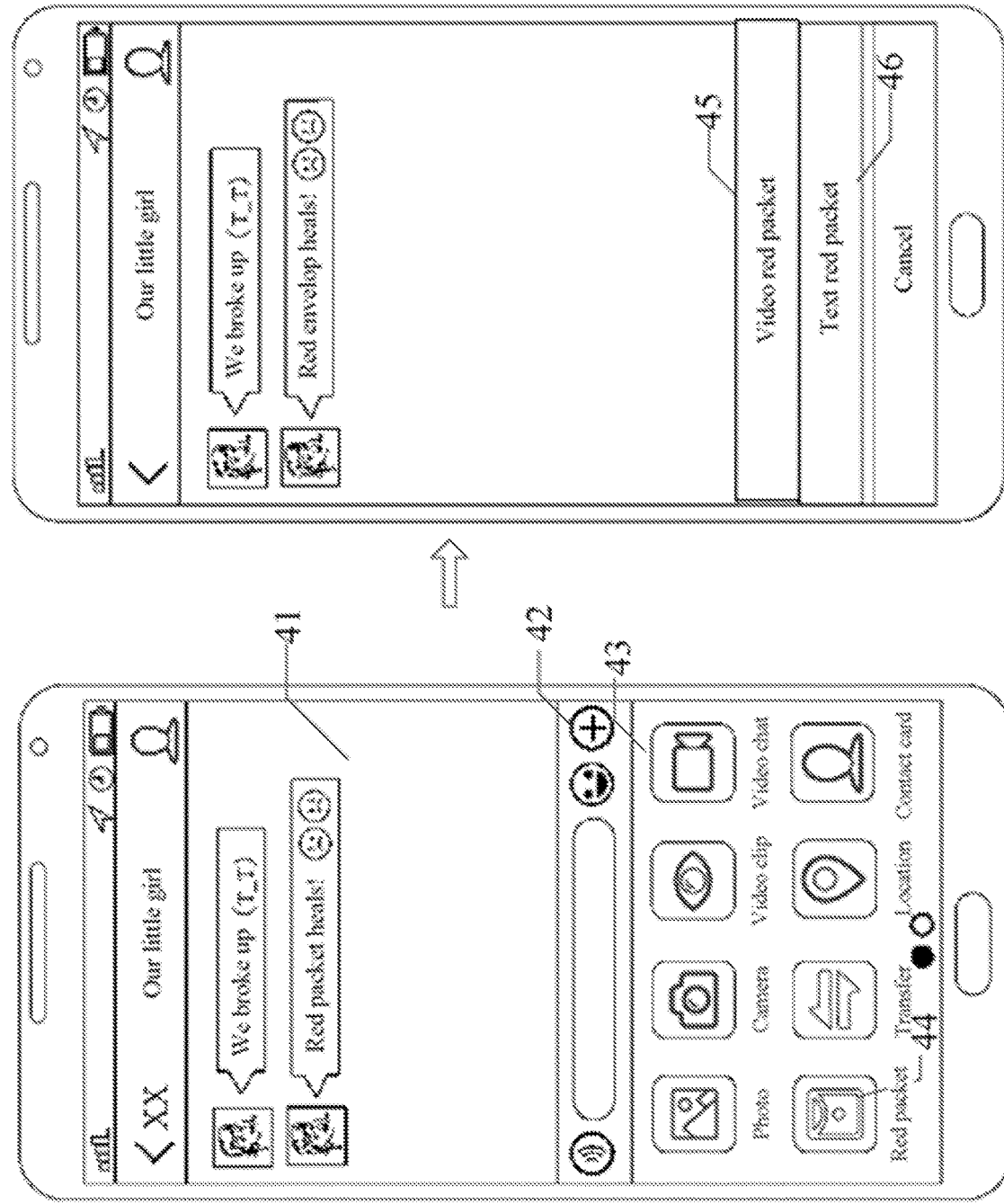
Figures 4, 17B:
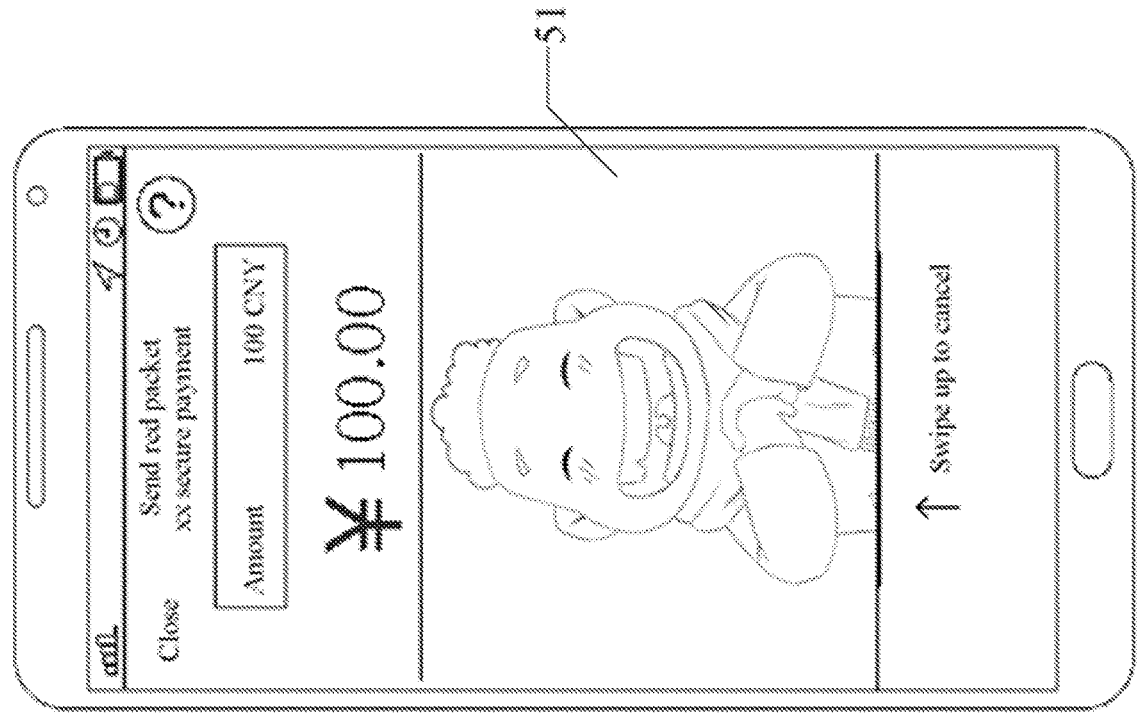
Figures 3, 17B:
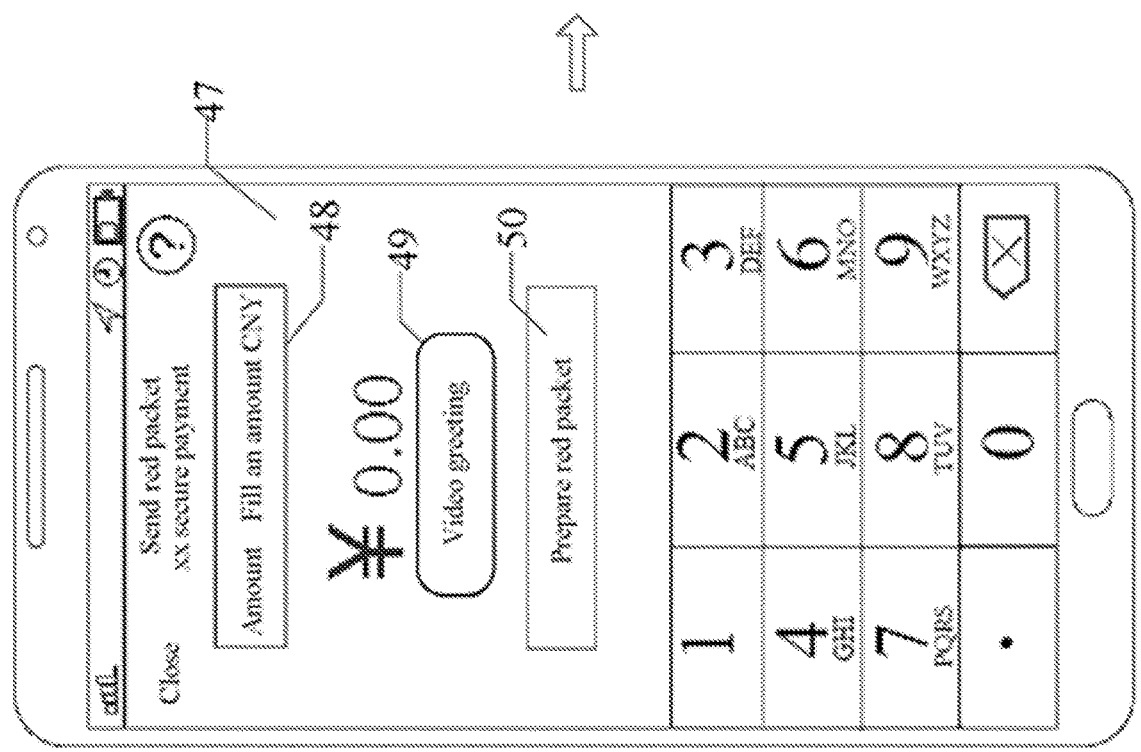

The virtual-item-package sending page includes: an operation control used by a sender user to input a virtual-item-package parameter, an operation control used by a sender user to record video information, and an operation control used by a sender user to trigger sending of a virtual item package. With reference to FIG. 17B-1, FIG. 17B-1 is exemplarily a schematic interface diagram involved in the process of sending a virtual item package. It is assumed that a "red packet" is used as a medium to send a currency as a gift. The sender user clicks a menu control 42 in a one-to-one conversation interface 41 to trigger displaying of a function menu 43. The function menu 43 includes an operation control 44 used to send a virtual item package. The sender user clicks the operation control 44 to trigger displaying of selection items of virtual item package types. The selection items include a video-red-packet selection item 45 and a text-red-packet selection item 46 as depicted in FIG. 17B-2. The sender user clicks the video-red-packet selection item 45 to trigger displaying of a virtual-item-package sending interface 47 used to send a video red packet. The virtual-item-package sending interface 47 includes an input box 48 used by a sender user to input a currency amount that needs to be sent as a gift, a recording control 49 used by a sender user to record video information, and an operation control 50 used by a sender user to trigger sending of a virtual item package as depicted in FIG. 17B-3.

Step 1702: The sender client acquires video information and a virtual-item-package parameter input on the virtual-item-package sending page.

The sender client collects video information by using a video camera after acquiring a trigger signal corresponding to a video recording control in the virtual-item-package sending page. With reference to FIG. 17B-3, a user holds the recording control 49 to trigger recording of the video information. The sender user starts to talk and act after viewing a displayed recording prompt box 51 as depicted in FIG. 17B-4, so as to record video information that the sender user hopes to express. In some embodiments, during the recording of the video information by the sender client, recording of video information is canceled if a recording cancelation indication is acquired. For example, a user performs a swipe-up operation during recording of video information to trigger the recording cancelation indication.

The virtual-item-package parameter includes several possible implementation forms as follows: When a virtual item package is sent to a single receiver client, the virtual-item-package parameter includes a quantity of virtual items in the virtual item package. When a virtual item package is sent to at least one receiver client that belongs to a same group, the virtual-item-package parameter includes a quantity of virtual item packages and a total quantity of virtual items. The total quantity of virtual items is used to randomly generate a quantity of virtual items in each virtual item package. Alternatively, the virtual-item-package parameter includes a quantity of virtual item packages and a fixed quantity of virtual items in each virtual item package.

Step 1703: The sender client displays a preview control on the virtual-item-package sending page.

The sender client displays a preview control on the virtual-item-package sending page after acquiring video information. The preview control is used by a sender user to preview and play video information recorded by the sender user. In some embodiments, the sender client switches the recording control in virtual-item-package sending interface to the preview control after acquiring video information.

Step 1704: The sender client plays the video information after acquiring a first trigger signal corresponding to the preview control.

The sender user may trigger the preview control to see video information recorded by the sender user, so as to achieve the objective of examining the video information. In addition, the sender client may pause the playing of the video information after acquiring a second trigger signal corresponding to the preview control. When deciding that video information recorded by the sender user is unsatisfactory, the sender user may re-record the video information. In some embodiments, the virtual-item-package sending interface further includes a re-recording control. The sender client re-acquires video information after acquiring a trigger signal corresponding to the re-recording control.

With reference to FIG. 17B-3 and FIG. 17C-1, the sender client switches the recording control 49 in virtual-item-package sending interface 47 to a preview control 52 after acquiring video information. The sender user clicks the preview control 52 to trigger playing of the video information. During playing of the video information, the sender client may display a playing progress of the video information. For example, as shown in FIG. 17C-2, the sender client displays the playing progress of the video information at an outer frame of the preview control 52. For example, a progress bar may be created at a lower frame of the preview control 52, and the progress bar is used to display the playing progress of the video information.

Step 1705: The sender client generates a video file including the video information.

The sender client generates the video file including the video information after acquiring video information.

Step 1706: The sender client processes the video file as further depicted in FIG. 17F. Referring to FIG. 17F, in step 1706, the processing the video file uses a compression algorithm to compress the video file, including the following substeps:

Step 17061: The sender client acquires at least one frame of video data and a video parameter of the video data.

The sender client may decode an existing video file to obtain at least one frame of video data and a video parameter of the video data. The sender client may alternatively acquire at least one frame of video data collected by a camera of a mobile terminal and a video parameter of the video data.

When at least one frame of video data is obtained by decoding an existing video file, the sender client may also a hardware acceleration function thereof to decode an existing video file to obtain the at least one frame of video data and a video parameter of the video data.

An example in which the mobile terminal provided with a sender client is an electronic device manufactured by Apple Inc. US and runs an iOS system is used. The mobile terminal uses a multimedia decoding component in the iOS system to decode an existing video file. The multimedia decoding component can enable a hardware acceleration function in the electronic device running the iOS system, thereby greatly improving the decoding efficiency.

The video parameter of the video data means resolution and a code rate. In an iOS system, the video parameter of the video data is carried in a SampleBuffer structure. A plurality of frames of video data share one SampleBuffer structure. For example, the $1^{st}$ to $100^{th}$ frames of video data share the first SampleBuffer structure. The first SampleBuffer structure records respective resolution and code rates (which are usually the same) of the $1^{st}$ to $100^{th}$ frames of video data. The $101^{st}$ to $200^{th}$ frames share the second SampleBuffer structure. The second SampleBuffer structure records respective resolution and code rates (which are usually the same) of the $101^{st}$ to $200^{th}$ frames of video data, and the like.

Step 17062: The sender client changes the video parameter of the video data to a post-compression video parameter.

The sender client changes the video parameter of the video data to a post-compression video parameter. The video parameter includes resolution and a code rate. Only one of the parameters needs to be changed to a post-compression video parameter to implement video compression. However, the parameters are usually both changed to post-compression video parameters. That is, the resolution of the video data is changed to post-compression resolution; and/or, the mobile terminal changes the code rate of the video data to a post-compression code rate. When an original code rate is changed to a post-compression code rate, the video data has a very obvious compression effect. The electronic device running an iOS system is used as an example. Original resolution in a SampleBuffer structure is changed to post-compression resolution 480*480, and an original code rate (usually 1500 kbps) in the SampleBuffer structure is changed to a post-compression code rate 500 kbps.

Step 17063: The sender client compresses the at least one frame of video data according to the post-compression video parameter by using a hardware acceleration function, to obtain a compressed video file.

In step 17063, the hardware acceleration function of the mobile terminal is used to decode an existing video file to obtain at least one frame of video data. During compression of video data, the hardware acceleration function is used to compress the at least one frame of video data according to the post-compression resolution and/or code rate. A mobile terminal running an iOS system is used as an example. The mobile terminal uses a multimedia encoding component AVAssetWriter in the iOS system to perform compression in an H.264 encoding format on the at least one frame of video data according to the post-compression resolution and/or code rate. The multimedia encoding component AVAssetWriter can enable a hardware acceleration function in the mobile terminal running the iOS system, thereby greatly improving the encoding efficiency.

It may be learned through the foregoing description that the process of video compression in step 17061 to step 17063 further includes:

Step 170611: Decode the existing video file to obtain the at least one frame of video data.

Step 170612: Acquire at least one frame of video data collected by a camera of the mobile terminal.

Step 17062 includes: changing the resolution of the video data to post-compression resolution; and/or, changing the code rate of the video data to a post-compression code rate.

Step 17063 includes the following substeps:

Step 170631: For each frame of video data, compress the video data according to the post-compression video parameter by using the hardware acceleration function of the mobile terminal.

Step 170632: Write each frame of the compressed video data in the video file by using a predetermined write frame rate, to obtain the compressed video file.

In step 170632, the mobile terminal writes a current frame of compressed video data to the video file, and then performs step 170631 on a next frame of video data, so as to implement sequential synchronous compression and write on all frames of video data. When one frame of compressed video data is written to the video file, the mobile terminal controls a write frame rate to be a post-compression predetermined write frame rate. For example, the mobile terminal controls the predetermined write frame rate to be 24 frames per second, that is, lowest frame rate that human eyes can accept, so as to implement a desirable compression effect. It is found through experiments that by using the foregoing compression processing, a short video having 8-second duration only has only 500 K of data after compression, and a very desirable compression effect is achieved.

The video compression technology described in step 170611 to step 170613 is used. At least one frame of video data and a video parameter of the video data are acquired, the video parameter of the video data is changed to a post-compression video parameter, and the hardware acceleration function of the mobile terminal is used to compress the at least one frame of video data according to the post-compression video parameter, to obtain a compressed video file. The problem of relatively slow processing speed of an existing video compression method is resolved. The hardware acceleration function of the mobile terminal is used to perform video compression, and the processing speed of the video compression method on the mobile terminal is increased. It is very beneficial to use this type of video compression processing technology in the process of sending a virtual item package in this embodiment. A compression operation is performed on a mobile terminal, so that the amount of data transmitted by a terminal to a video server and data transmitted by the video server to a receiving terminal can be greatly reduced. In one aspect, the communication traffic can be saved. In an aspect, the video compression technology of the mobile terminal can further lighten the load on communication bandwidths during peak hours of sending a large quantity of virtual item packages.

In the process of sending a virtual item package, an obtained video file is compressed on a sending side because the video file is in a large-size format. As a result, the process of sending a virtual item package is different from a manner of sending a virtual item package in a text form, an audio form, or another form.

Certainly, the compression technology in this embodiment is merely an exemplary description. Another video compression technology can further be used on a client to implement the sending of a video from a sending side to a backend server.

In some cases, for example, when a user is under a relatively favorable network condition, the user may select to directly upload an uncompressed lossless video to the backend server. The video is compressed on a server side, and the uncompressed lossless video and a compressed video file in a small-size format are stored on the server side. A receiver may choose to receive the lossless video or the compressed video file in a small-size format. In an example, a receiver first receives a compressed video in a small-size format. Subsequently, for example, when a network condition is favorable or a user needs a clearer video, a request of acquiring a lossless video is sent to the backend server. The server delivers a lossless video file according to the request. A backend server is used as a medium in the manner of sending a virtual item package, so that hardware resources of users can be saved, and various choices can be provided to users. In particular, it can be convenient for a user to acquire video files according to requirements in different network conditions.

Step 1707: The sender client sends a processed video file to a backend server, and sends a virtual-item-package generation request to the backend server, the virtual-item package generation request including a file identifier of the video file, the virtual-item-package parameter, and receiver information. Correspondingly, the backend server receives the video file and the virtual-item-package generation request sent by the sender client.

The virtual-item-package generation request is used to instruct the backend server to generate a virtual item package. The virtual-item-package generation request includes a file identifier of the video file, the virtual-item-package parameter, and the receiver information. The file identifier is generated by the sender client or the backend server. The file identifier is used to uniquely identify the video file. For example, the file identifier may be a filename of the video file, or may be a unique sequence number distributed by the sender client or the backend server to the video file. The receiver information is used to indicate a receiver user of the virtual item package.

For example, the receiver information may be an identifier of a receiver client, or a group identifier of a group to which a receiver client belongs, or a condition set by a sender user for a receiver client. For example, the condition may be receiver clients corresponding to receiver users between 20 to 30 years old in Guangzhou City.

In an example, the virtual-item-package sending page includes a sending control. The sender user triggers the sending control to trigger a virtual-item-package sending indication. The sender client triggers execution of a sending procedure below after acquiring the virtual-item-package sending indication, to send a virtual-item-package message to at least one receiver client. The virtual-item-package message generated based on the virtual-item-package parameter carries the video information.

In some embodiments, if the sender client receives the processed video file from the backend server, the virtual-item-package generation request includes the file identifier of the processed video file, the virtual-item-package parameter, and the receiver information. The file identifier of the processed video file may be the same as the file identifier of the unprocessed video file, or may be a file identifier newly generated by the backend server for the processed video file. If the backend server newly generates a file identifier for the processed video file, the backend server sends the processed video file and the file identifier of the processed video file together to the sender client.

With reference to FIG. 17B-3, FIG. 17C-1, and FIG. 17D-1, the sender user clicks an operation control 50 to trigger a payment procedure. The sender client and the backend server interact to complete a payment procedure. The sender client transfers a currency amount that needs to be sent as a gift from an account corresponding to the sender client to an account corresponding to the backend server. The virtual item package is successfully sent after transfer succeeds. One sent virtual-item-package message 53 is displayed in the one-to-one conversation interface 41 displayed by the sender client as depicted in FIG. 17D-2.

Step 1708: A server generates a virtual-item-package identifier.

The backend server generates the virtual-item-package identifier corresponding to the virtual-item-package parameter.

It should be noted that for one or more virtual item packages that need to be generated for a same virtual-item-package generation request, the backend server generates one virtual-item-package identifier. The virtual-item-package identifier and a virtual-item-package parameter included in the request are correspondingly stored.

Step 1709: The backend server stores a correspondence among the virtual-item-package identifier, the video information, and the virtual-item-package parameter.

The backend server stores the processed video file. The file identifier of the processed video file may be a file identifier of a video file received by the backend server from the sender client or may be a file identifier generated by the backend server for the processed video file.

Step 1710: The backend server sends a virtual-item-package message to at least one receiver client according to the receiver information, the virtual-item-package message carrying the virtual-item-package identifier.

Correspondingly, the receiver client receives the virtual-item-package message sent by the backend server.

If sending of a virtual item package is triggered in a one-to-one conversation interface, a receiver user of the virtual item package is the contact in the one-to-one conversation interface. A virtual-item-package generation request sent by a sender client to a backend server may carry a user account of the contact in the one-to-one conversation interface. The backend server sends a virtual-item-package message to a receiver client corresponding to the user account of the contact.

If sending of a virtual item package is triggered in a group chat conversation interface, a receiver user of the virtual item package is a contact in a group corresponding to the group chat conversation interface. A virtual-item-package generation request sent by a sender client to a backend server may carry a group identifier of the group corresponding to the group chat conversation interface.

The backend server acquires, according to the group identifier, a user account of each contact that belongs to the group, and then sends a virtual-item-package message a receiver client corresponding to the acquired user account of each contact.

In some embodiments, the virtual-item-package message further carries an identifier of the sender client, making it convenient for a receiver user to know the sender user of the virtual item package according to the identifier of the sender client.

Step 1711: The receiver client displays the virtual-item-package message.

The receiver client displays the virtual-item-package message in the conversation interface with the sender client. In an example, the virtual-item-package message displayed by the receiver client includes a play control. In another example, a virtual-item-package receiving page of which displaying is triggered based on the virtual-item-package message displayed by the receiver client includes the play control. In still another example, both the virtual-item-package message displayed by the receiver client and the virtual-item-package receiving page of which displaying is triggered based on the virtual-item-package message include the play control. The play control is used by a receiver user to trigger playing of the video information.

The virtual-item-package message displayed by the receiver client is similar to the virtual-item-package message displayed by the sender client. Reference may be made to FIG. 17D-2.

Step 1712: The receiver client displays a virtual-item-package receiving page after acquiring a trigger signal corresponding to the virtual-item-package message.

The virtual-item-package receiving page includes the play control and a receive control. The receive control is used by a receiver user to trigger receiving of a virtual item in a virtual item package.

Figure 17E:
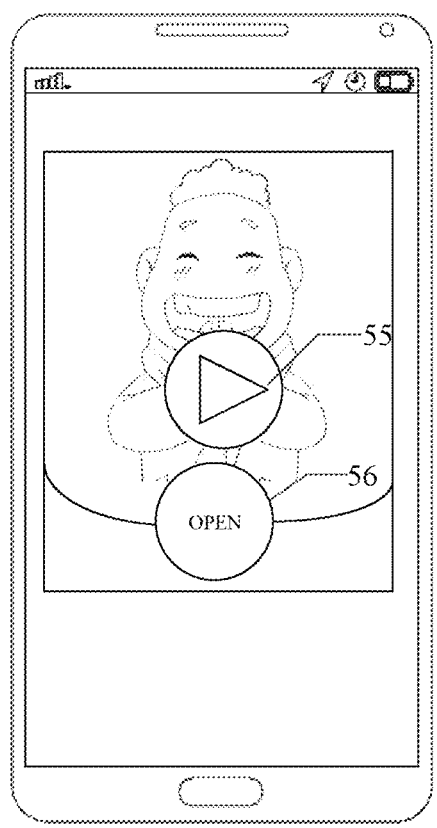
Figure 17F:
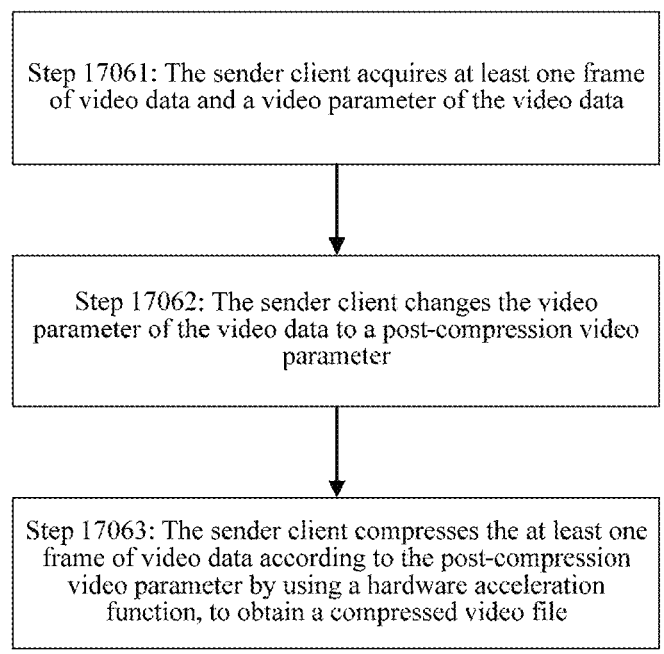
FIG. 17F is a flowchart of a method of information processing for the sender client processing a video file according to an embodiment of the present disclosure.

As shown in FIG. 17E, FIG. 17E is exemplarily a schematic interface diagram of a virtual-item-package receiving page 54.

The virtual-item-package receiving page 54 includes the play control 55 and a receive control 56. A receiver user clicks the play control 55 to trigger the receiver client to play the video information. A receiver user clicks the receive control 56 to trigger the receiver client to acquire a virtual item in a virtual item package.

Step 1713: The receiver client plays the video information acquired according to the virtual-item-package identifier after a trigger signal corresponding to the play control is acquired.

A receiver user may click the play control included in the virtual-item-package message, or click the play control included in the virtual-item-package receiving page, to trigger the receiver client to play the video information.

Figure 17G:
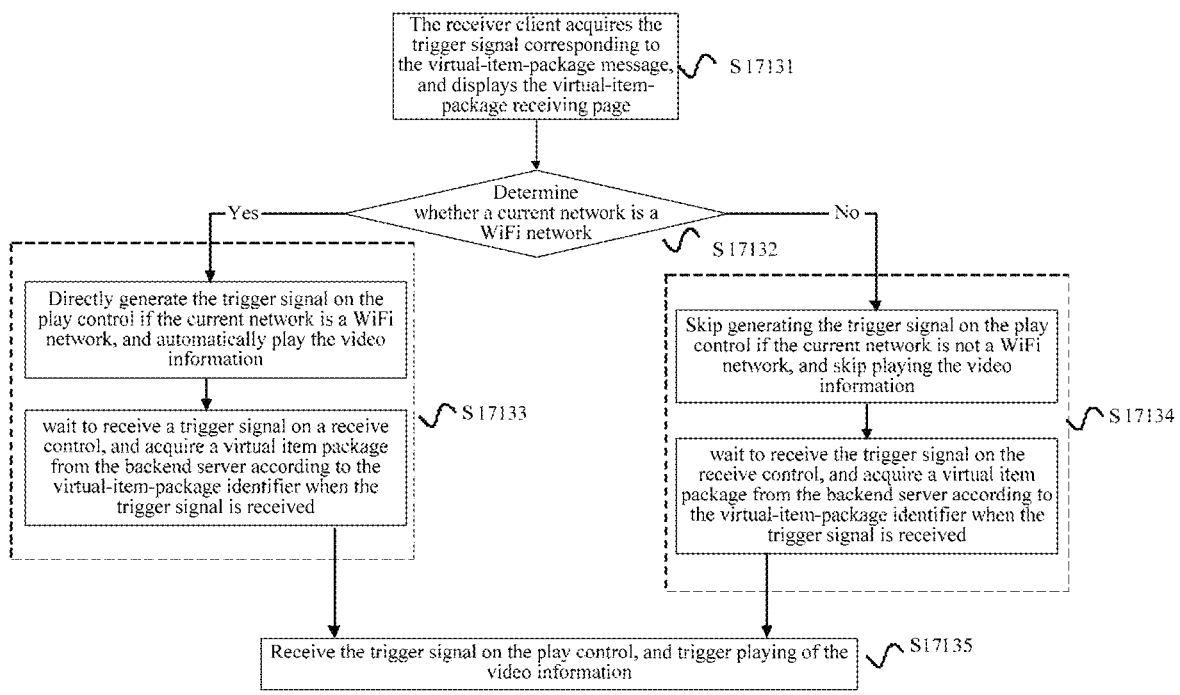
FIG. 17G is a flowchart of a method of information processing for the receiver client determining a network environment to determine a manner of triggering a video play control according to an embodiment of the present disclosure.

In a possible implementation, the receiver client determines a network environment to determine a manner of triggering a video play control as further depicted in FIG. 17G. Referring to FIG. 17G, the process may be described as the following steps:

Step 17131: The receiver client acquires the trigger signal corresponding to the virtual-item-package message, and displays the virtual-item-package receiving page.

Step 17132: Determine whether a current network is a Wireless Fidelity (WiFi) network.

Step 17133: Directly generate the trigger signal on the play control if the current network is a WiFi network, automatically play the video information, wait to receive a trigger signal on a receive control, and acquire a virtual item package from the backend server according to the virtual-item-package identifier when the trigger signal on the receive control is received.

Step 17134: Skip generating the trigger signal on the play control if the current network is not a WiFi network, and skip playing the video information; and wait to receive the trigger signal on the receive control, and acquire a virtual item package from the backend server according to the virtual-item-package identifier when the trigger signal is received.

Step 17135: Receive the trigger signal on the play control, and trigger playing of the video information.

In fact, the receiver client may determine a current network status, select, according to the current network status, to generate the trigger signal on the play control or wait to receive an input of the trigger signal on the play control, and play the video information when selecting to generate the trigger signal on the play control or wait for a user to input the trigger signal on the play control.

In addition, the receiver client may acquire video information from the backend server in the following manners. In an example, the receiver client sends a video acquiring request to the backend server. The video acquiring request includes a virtual-item-package identifier. The backend server searches a prestored correspondence after receiving the video acquiring request to acquire video information corresponding to the virtual-item-package identifier, and sends a video file including the found video information to the receiver client. In another example, a virtual-item-package message sent by the backend server to the receiver client further includes a file identifier corresponding to video information. The receiver client sends a video acquiring request to the backend server. The video acquiring request includes the file identifier. The backend server sends a video file corresponding to the file identifier to the receiver client after receiving the video acquiring request. In some embodiments, the video file is a processed video file obtained by performing compression processing on the video information.

In addition, the time at which the receiver client acquires video information from the backend server includes several possible implementations as follows:

In a first possible implementation, the receiver client acquires video information from the backend server after acquiring a trigger signal corresponding to the play control.

That is, the receiver client requests to acquire video information from the backend server after determining that a receiver user needs to play the video information, so as to avoid a resource waste that occurs when the video information is acquired in advance but the receiver user does not need to play the video information.

In a second possible implementation, the receiver client acquires the video information from the backend server after verifying that a user account that logs in to the receiver client meets a condition of receiving a virtual item in a virtual item package.

The condition of receiving a virtual item in a virtual item package includes, but is not limited to, at least one of the following:

A user account that is used to log in to a receiver client is the contact in the one-to-one conversation interface, a user account that is used to log in to a receiver client is a contact that belongs to the group corresponding to the group chat conversation interface, an unreceived virtual item package still exists, and a virtual item package is not expired. Authority verification is performed on a receiver user by using the foregoing manner. Only a receiver user that has the right to receive a virtual item in a virtual item package is allowed to view the video information recorded by the sender user, thereby improving the privacy of the video information.

In a third possible implementation, a receiver client acquires video information from the backend server after successfully acquiring a virtual item in a virtual item package.

In this implementation, a receiver user has the right to acquire and view corresponding video information only after successfully receiving a virtual item in a virtual item package.

Step 1714: The receiver client acquires a virtual item package from the backend server according to the virtual-item-package identifier after acquiring the trigger signal corresponding to the receive control.

The receiver client sends a virtual-item-package receiving request to the backend server after acquiring a trigger signal corresponding to a receive control. The virtual-item-package receiving request carries the virtual-item-package identifier. The backend server searches the prestored correspondence after receiving the virtual-item-package receiving request, to acquire the virtual-item-package parameter corresponding to the virtual-item-package identifier, and sends a virtual item to the receiver client according to the virtual-item-package parameter package.

If the virtual-item-package parameter includes a quantity of virtual items in the virtual item package, the backend server transfers the quantity of virtual items from an account corresponding to the backend server to an account corresponding to the receiver client. If the virtual-item-package parameter includes a quantity of virtual item packages and a total quantity of virtual items, the backend server randomly generates a quantity of virtual items in a virtual item package acquired by a receiver client according to a quantity of virtual item packages and a total quantity of virtual items, and transfers the quantity of virtual items from an account corresponding to the backend server to an account corresponding to the receiver client. If the virtual-item-package parameter includes a quantity of virtual item packages and a fixed quantity of virtual items in each virtual item package, the backend server transfers the fixed quantity of virtual items from an account corresponding to the backend server to an account corresponding to the receiver client.

In this embodiment, only an example in which a user clicks a receive control to trigger receiving of a virtual item in a virtual item package is used. In an embodiment, a receiver client may automatically receive a virtual item in a virtual item package.

In an example, the receiver client acquires a virtual item package from the backend server according to the virtual-item-package identifier after playing of video information ends.

Step 1715: The receiver client displays a receive result page.

The receiver client displaying a receive result page after acquiring a virtual item. The receive result page may include a quantity of received virtual items. In some embodiments, the receive result page further includes a message control. The message control is used by a receiver user to input message information.

As shown in FIG. 17E, the receiver client displays a receive result page 57 after a receiver user successfully receives a virtual item. The receive result page 57 includes a message control 58.

Step 1716: The receiver client acquires message information input on the receive result page.

A receiver user clicks a message control to trigger input of message information. The message information is any one of a text, a video or a video. For example, a receiver user may record an audio or a video, to express the gratitude toward the sending user.

Step 1717: The receiver client sends the message information to the backend server.

Correspondingly, the backend server receives the message information sent by the receiver client.

Step 1718: The backend server sends the message information to the sender client.

Correspondingly, the sender client receives the message information sent by the backend server.

The sender client displays the message information.

In conclusion, in the method provided in this embodiment, when sending a virtual item package, a sender user may record the video information as association information of the virtual item package and send the association information to a receiver. The receiver can play the video information after receiving the virtual item package. Therefore, compared with a greeting in a text form, the video information can transfer more information. For example, a receiver user can intuitively and explicitly know a mental state of the sender user according to features such as the video, pitch, and tone of the sender user, thereby enriching the amount of information transferred in sending a virtual item package.

In addition, the sender client does not directly add the video information to the virtual-item-package generation request and send the virtual-item-package generation request to the backend server, but instead, sends the video information and the virtual-item-package generation request to the backend server respectively and separately, so that two different servers can be respectively configured to implement the function of storing video information and implement the function of receiving and receiving a virtual item package, thereby reducing the processing and storage load of the server configured to implement the function of receiving and sending a virtual item package.

In addition, if a receiver is a disabled person such as a deaf person, the recording of video information to extend a greeting, offer comfort or give compliments undoubtedly provides user experience completely different from a conventional red packet. The information transfer that cannot be implemented in a conventional information transfer manner can be implemented by using the information transfer manner. For other people such as seniors or children who cannot use or cannot normally use conventional information for expression, a video recording manner is essentially different from a conventional manner.

In addition, a preview control is further displayed on the virtual-item-package sending page, so that the sender user can preview and play recorded video information before sending a virtual item package, thereby ensuring that the subsequently sent video information is satisfactory to the user.

In the foregoing method embodiment, steps about a side of a sender client may be separately implemented as a method for sending a virtual item package on the side of the sender client, steps about a side of a backend server may be separately implemented as a method for sending a virtual item package on the side of the backend server, and steps about a side of a receiver client may be separately implemented as a method for receiving a virtual item package on the side of the receiver client.

Figure 18:
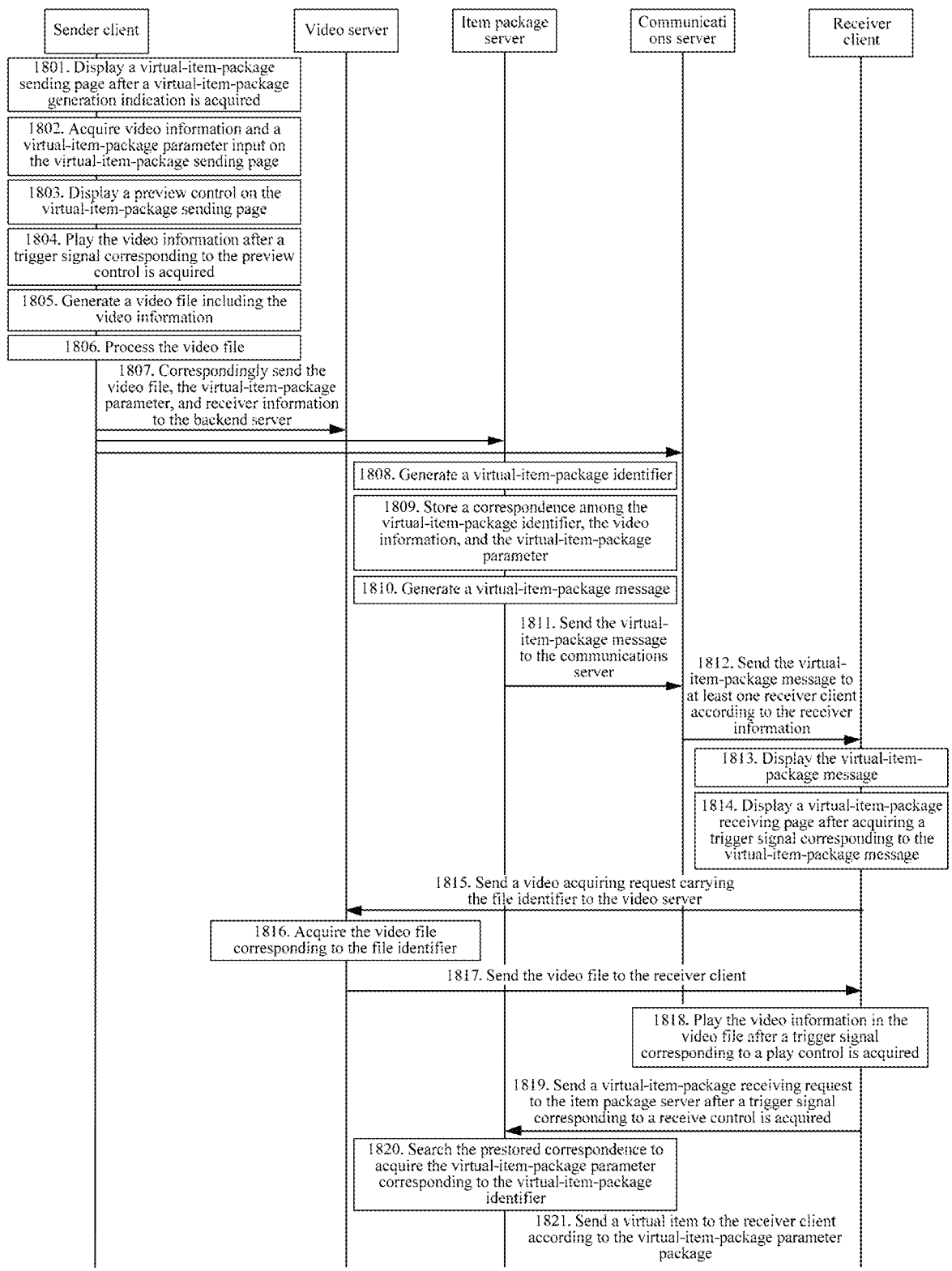
FIG. 18 is a flowchart of a method of information processing for sending a virtual item package according to an embodiment of the present disclosure.

In an example, when the backend server is the cluster architecture shown in FIG. 13. Referring to FIG. 18, the method for sending a virtual item package may include several steps as follows:

Step 1801: The sender client displays a virtual-item-package sending page after acquiring a virtual-item-package generation indication.

Step 1802: The sender client acquires video information and a virtual-item-package parameter input on the virtual-item-package sending page.

Step 1803: Display a preview control on the virtual-item-package sending page.

Step 1804: Play the video information after a trigger signal corresponding to the preview control is acquired.

Step 1805: Generate a video file including the video information.

Step 1806: Process the video file. The processing process includes, but is not limited to, the processing process defined in step 406.

Step 1807: Correspondingly send the video file, the virtual-item-package parameter, and receiver information to the backend server.

Step 1808: An item package server generates a virtual-item-package identifier.

Step 1809: The item package server stores a correspondence among the virtual-item-package identifier, the video information, and the virtual-item-package parameter.

Step 1810: The item package server generates a virtual-item-package message.

The virtual-item-package message carries the virtual-item-package identifier. In some embodiments, the virtual-item-package message further carries an identifier of the sender client and/or a file identifier of the video file.

Step 1811: The item package server sends the virtual-item-package message to a communications server.

Correspondingly, the communications server receives the virtual-item-package message sent by the item package server.

Step 1812: The communications server sends the virtual-item-package message to at least one receiver client according to the receiver information.

Correspondingly, the receiver client receives the virtual-item-package message sent by the communications server.

Step 1813: The receiver client displays the virtual-item-package message.

Step 1814: The receiver client displays a virtual-item-package receiving page after acquiring a trigger signal corresponding to the virtual-item-package message.

Step 1815: The receiver client sends a video acquiring request carrying the file identifier to a video server.

Correspondingly, the video server receives the video acquiring request sent by the receiver client.

Step 1816: The video server acquires the video file corresponding to the file identifier.

Step 1817: The video server sends the video file to the receiver client.

Correspondingly, the receiver client receives the video file sent by the video server.

Step 1818: The receiver client plays the video information in the video file after acquiring a trigger signal corresponding to a play control.

Step 1819: The receiver client sends a virtual-item-package receiving request to the item package server after acquiring a trigger signal corresponding to a receive control, the virtual-item-package receiving request carrying the virtual-item-package identifier.

Correspondingly, the item package server receives the item-package receiving request sent by the receiver client.

Step 1820: The item package server searches the pre-stored correspondence to acquire the virtual-item-package parameter corresponding to the virtual-item-package identifier.

Step 1821: The item package server sends a virtual item to the receiver client according to the virtual-item-package parameter package.

Figure 19:
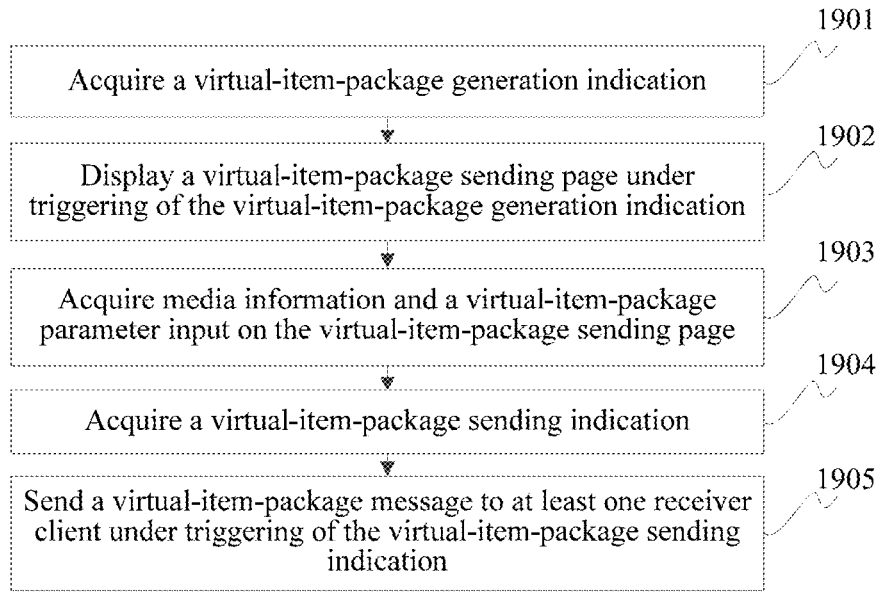
FIG. 19 is a flowchart of a method of information processing for sending a virtual item package according to an embodiment of the present disclosure.

Referring to FIG. 19, FIG. 19 is a flowchart of a method for sending a virtual item package according to an embodiment of the present disclosure. The method may be applied to a sender client. The method may include several steps as follows:

Step 1901: Acquire a virtual-item-package generation indication.

Step 1902: Display a virtual-item-package sending page under triggering of the virtual-item-package generation indication.

Step 1903: Acquire media information and a virtual-item-package parameter input on the virtual-item-package sending page, the media information being voice information or video information.

In some embodiments, the sender client generates a voice file including voice information after acquiring the voice information, and sends the voice file to the backend server. The backend server is configured to: perform noise reduction processing on the voice information, to obtain a processed voice file, and send the processed voice file to the sender client. Correspondingly, the sender client receives the processed voice file.

In some embodiments, the sender client displays a preview control on the virtual-item-package sending page after acquiring the voice information. The sender client plays the voice information after a trigger signal corresponding to the preview control is acquired.

In some embodiments, the sender client generates a video file including the video information after acquiring video information, sends a video file to the backend server. The backend server is configured to perform noise reduction processing on the video information to obtain the processed video file, and send the processed video file to the sender client. Correspondingly, the sender client receives the processed video file.

In some embodiments, the sender client displays the preview control in a virtual-item sending page after acquiring video information. The sender client plays the video information after acquiring the trigger signal corresponding to the preview control.

In some embodiments, the sender client generates a video file including the video information after acquiring video information, processes the video file, to generate a processed video file, and sends the processed video file to the backend server. Correspondingly, the backend server receives the processed video file.

In some embodiments, the sender client displays a video preview control on the virtual-item-package sending page after acquiring video information. The sender client plays the video information after acquiring a first trigger signal corresponding to the video preview control, and pauses the playing of the video information after acquiring a second trigger signal corresponding to the video preview control.

Step 1904: Acquire a virtual-item-package sending indication.

Step 1905: Send a virtual-item-package message to at least one receiver client under triggering of the virtual-item-package sending indication, the virtual-item-package message generated based on the virtual-item-package parameter carrying the media information.

Refer to the method embodiments shown in FIG. 15A and FIG. 17A for details.

Figure 20:
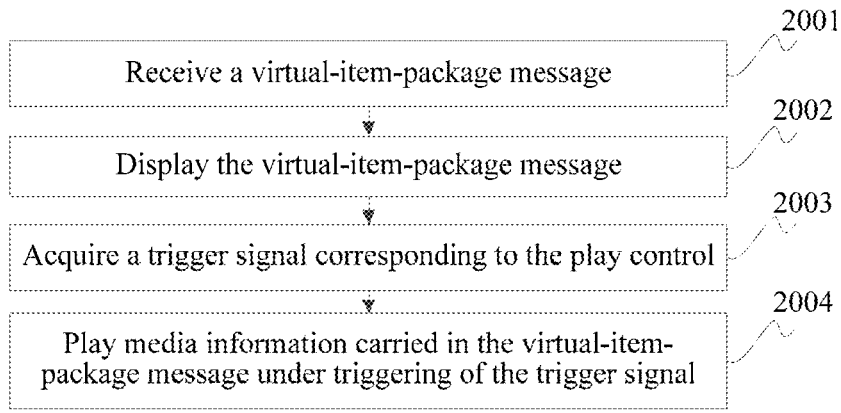
FIG. 20 is a flowchart of a method of information processing for receiving a virtual item package according to an embodiment of the present disclosure.

Referring to FIG. 20, FIG. 20 is a flowchart of a method for receiving a virtual item package according to an embodiment of the present disclosure. The method may be applied to a receiver client. The method may include several steps as follows:

Step 2001: Receive a virtual-item-package message.

Step 2002: Display the virtual-item-package message, the virtual-item-package message and/or a virtual-item-package receiving page that is triggered and displayed based on the virtual-item-package message including a play control.

In some embodiments, the receiver client displays the virtual-item-package receiving page after a trigger signal corresponding to the virtual-item-package message is acquired.

Step 2003: Acquire a trigger signal corresponding to the play control.

Step 2004: Play media information carried in the virtual-item-package message under triggering of the trigger signal.

In some embodiments, the virtual-item-package receiving page further includes a receive control, and the receiver client acquires a virtual item from a backend server according to a virtual-item-package identifier after acquiring a trigger signal corresponding to the receive control.

In some embodiments, the receiver client displays a receive result page, acquires message information input on the receive result page, and then sends the message information to a sender client. Correspondingly, the sender client displays the message information after receiving the message information sent by the receiver client.

Refer to the method embodiments shown in FIG. 15A and FIG. 17A for details.

Based on the above, in some embodiments, a method for facilitating exchange of virtual-item packages is performed at a first client device (e.g., sender client) having one or more processors, memory, and a display. The first client device displays a conversation interface of an instant messaging conversation between a first user corresponding to the first client device and a second user corresponding to a second client device that is distinct from the first client device, the conversation interface including one or more previously exchanged instant messages between the first user and the second user on a social network platform (e.g., upper left user interface of FIGS. 15B and 17B). While displaying the conversation interface of the instant messaging conversation between the first user and the second user, the first client device receives a user request for generating a virtual-item-package from the first user. In response to receiving the request for generating the virtual-item-package from the first client device, the first client device replaces display of the conversation interface with a virtual-item-package generation interface (e.g., lower left user interface shown in FIGS. 15B and 17B). In accordance with a determination that the request is for generating a media enhanced virtual-item-package (e.g., a red packet with an audio or video message and a virtual item in it), the first client device presents an affordance for recording an audio and/or video message concurrently with one or more input fields for entering one or more virtual-item-package parameters in the virtual-item-package generation interface, the one or more virtual-item-package parameters including at least a quantity and a type of virtual item to be withdrawn from a virtual item account of the first user and included in the virtual-item-package (e.g., lower left user interface shown in FIGS. 15B and 17B). In accordance with a determination that the request is for generating a textual virtual-item-package (e.g., a regular red packet with a plain text message and a virtual item in it), the first client device presents a text input field for entering a textual message concurrently with the one or more input fields for entering the one or more virtual-item-package parameters, without concurrently presenting the affordance for recording an audio and/or video message in the virtual-item-package generation interface. In some embodiments, the client device displays the input fields for other types of red packets, such as red packets with different types of virtual items that are converted from a virtual item in an associated item account, or a red packet that require the recipients to fulfil certain tasks (e.g., walk a preset number of steps, or meet a health requirement, etc.) according to automatic monitoring of the recipients' client devices that is initiated by the recipient opening the packets and accepting the challenge). The details of these other types of virtual-item package creation are provided with respect to various embodiments disclosed herein and may be combined with this embodiment without limitation.

In some embodiments, the first client device receives user input specifying the one or more virtual-item-package parameters and a user input activating the affordance for recording an audio and/or video message in the virtual-item-package generation interface. In response to the input activating the affordance for recording an audio and/or video message, the first client device displays a progress indicator of audio and/or video recording concurrently with the one or more virtual-item-package parameters that have been entered, and the first client device displays a prompt for canceling the recording with an upward swipe gesture (e.g., as shown in lower right of FIGS. 15B and 17B). This user interface functionality provides the technical advantage that the user can easily cancel and restart of recording during the recording process, without completing the recording.

In some embodiments, the first client device generates a first virtual-item-package in accordance with user inputs received in the virtual-item-package generation interface. In accordance with a user request to send the first virtual-item-package to the second user, the first client device sends the first virtual item-package to one or more servers of the social network platform. For example, in accordance with a determination that the first virtual-item-package is a media enhanced virtual-item-package, the first client device uploads the one or more virtual-item-package parameters of the first virtual item-package parameters and an identifier of an audio and/or video message of the first virtual-item-package to a first server (e.g., item package server) of the one or more servers. In accordance with a determination that the first virtual item-package is a textual virtual-item-package, the first client device uploads the one or more virtual-item-package parameters of the first virtual-item-package and the textual message of the first virtual-item-package to the first server (e.g., the item package server) of the one or more servers. In these embodiments, the first client device generates the identifier and the first server stores the correspondence between the identifier and the first virtual item-package message, such that when the first virtual item-package message is opened by the second user, the first server can identify the audio and/or video message and send (e.g., in response to the second user opening the package or in response to the second user invoking the playback button on the package) the request to a media server (e.g., a voice server or video server) for the media server to send the audio and/or video message to the second client device for playback. In some embodiments, the first client device uploads the audio and/or video file to the media server with the identifier, such that the media server stores the audio and/or video file in association with the identifier for later retrieval. In some embodiments, the first server generates the identifier and send it to the first client device and the first client device send the identifier back to the first server with the audio and/or video message once the recording is confirmed. In some embodiments, by separating the media uploading to a second server and only sending an identifier to the item package server, the load on the item package server can be reduced, and there can be separate network connections established for the item package server and for the media server based on bandwidth requirements of the two types of servers. For example, media uploading can be completed at a different time (e.g., later time, when bandwidth is available), without delaying the completion of the virtual-item-package generation, which improves user experience and server performance.

In some embodiments, sending the first virtual-item-package to one or more servers of the social network platform further includes: in accordance with a determination that the first virtual-item-package is a media enhanced virtual-item-package: in accordance with a determination that the first virtual-item-package is prepared with a first privacy preference (e.g., preference for uploading audio/video to server), uploading the audio and/or video message of the first virtual-item-package to a second server (e.g., media server such as voice or video server) of the one or more servers that is distinct from the first server (e.g., item package server); and in accordance with a determination that the first virtual-item-package is prepared with a second privacy preference (e.g., preference for direct transmission to recipients without uploading to the server) that is distinct from the first privacy preference (e.g., the second privacy preference has a higher privacy level that the first privacy preference): storing the audio and/or video message locally at the first client device without uploading the audio and/or video message of the first virtual-item-package to the one or more servers, wherein the first client device directly transmits the audio and/or video message to the second client device through a peer-to-peer connection (e.g., an HTTPS connection initiated by the first client device to the second client device directly or initiated by the second client device to the first client device directly) in accordance with receipt of a notification from the second server that the first virtual-item-package has been opened at the second client device (or that a user's playback request is received at the second client device). By allowing the first client device to retain the audio and/or video file and directly transmits to the second client device, without uploading the file to the server first, the server does not need to store the file, and the first user maintains control of the media file (e.g., can delete the file or control dissemination of the file after the red packet is sent out already). For example, if the user decides to delete the media file after the virtual-item-package is sent to the second client device but before the package is opened at the second client device, the first client device will not send any media file to the second client device, further improving the privacy of the first user. The same does not apply to text messages which is easily replicated and is less personal than video or audio recording of the first user.

In some embodiments, after sending the first virtual-item-package to one or more severs of the social network platform, the first client device displays a representation of the first virtual-item-package in the conversation interface of the instant messaging conversation between the first user and the second user on the social network platform (e.g., as shown in lower right user interface in FIGS. 15D and 17D). While displaying the representation of the first virtual-item-package in the conversation interface of the instant messaging conversation between the first user and the second user on the social network platform, the first client device receives a notification from the first server of the one or more servers that the first virtual-item-package is opened by the second user at the second client device (and/or that a user request for playing back the media file is detected at the second client device). In response to receiving the notification from the first server that the first virtual-item-package is opened by the second user at the second client device: in accordance with a determination that the first virtual-item-package is prepared with the second privacy preference that is distinct from the first privacy preference (e.g., the second privacy preference has a higher privacy level that the first privacy preference), the first client device initiates direct transmission of the audio and/or video message to the second client device through a peer-to-peer connection (e.g., established by the first client device and the second client device without the server of the social network platform intercepting any part of the transmission).

In some embodiments, in response to receiving the notification from the first server that the first virtual-item-package is opened by the second user at the second client device (e.g., or the playback of the media file is started at the second client device): in accordance with a determination that the first virtual-item-package is prepared with the first privacy preference, the first client device displays an indication of playback progress in the representation of the first virtual-item-package in the conversation interface of the instant messaging conversation. In some embodiments, the same media file is played back at the first client device in a miniature form in a synchronous manner with the playback of the media file at the second client device, such that the first user can be informed of where the second user has reached in his/her listening/viewing of the media file. This helps to facilitate the two user's exchange of words and emotions in real-time over instant message.

In some embodiments, in response to receiving the notification from the first server that the first virtual-item-package is opened by the second user at the second client device: in accordance with a determination that the first virtual-item-package is prepared with the second privacy preference that is distinct from the first privacy preference (e.g., the second privacy preference has a higher privacy level that the first privacy preference), the first client device sends a self-destruction instruction for the audio and/or video message with the audio and/or video message, wherein the self-destruction instruction causes the second client device to delete the audio and/or video message at the second client device after a preset amount of time unless an exemption code is received from the first client device within the preset amount of time. In some embodiments, the first client device displays an affordance in association with the representation of the first virtual-item-package in the conversation interface, which when activated by a user input at the first client device, causes the first client device to send the self-destruction instruction, or to send the exemption code if the self-destruction instruction has been sent for the audio and/video message already (e.g., in response to a previous activation of the affordance). This allows further control of the media file by the first user after the media enhanced virtual item package has been sent out to the receiving client devices, and enhancing the user's control over his/her privacy on the social network platform.

Other features of the above embodiments are provided with respect to various embodiments described herein, and can be combined with these above embodiments without limitation. Corresponding actions of the receiving client device, and the one or more servers of the social network are deducible from the description of the actions of the sending client device.

Apparatus embodiments of the present disclosure are provided below, and may be used to perform the method embodiments of the present disclosure. Refer to the method embodiments of the present disclosure for details that are not disclosed in the apparatus embodiments of the present disclosure.

Figure 21:
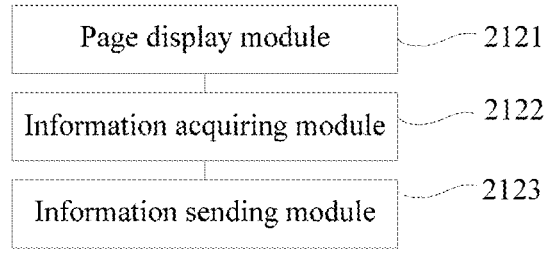
FIG. 21 is a block diagram of an information processing apparatus for sending a virtual item package according to an embodiment of the present disclosure.

Referring to FIG. 21, FIG. 21 is a block diagram of an apparatus for sending a virtual item package according to an embodiment of the present disclosure. The apparatus implements functions on a side of a sender client in the foregoing method example. The function may be implemented by hardware, or may be implemented by hardware executing corresponding software. The apparatus may include: a page display module 2121, an information acquiring module 2122, and an information sending module 2123.

The page display module 2121 is configured to perform step 1401, step 1501, and step 1701.

The information acquiring module 2122 is configured to perform step 1402, step 1502, and step 1702.

The information sending module 2123 is configured to perform step 1403.

In some embodiments, the information sending module 2123 includes: a file generation unit, a file sending unit, and a request sending unit.

The file generation unit is configured to perform step 1505 and step 1705.

The file sending unit is configured to perform step 1506 and step 1706.

The request sending unit is configured to perform step 1509 and step 1709.

In some embodiments, the information sending module 2123 further includes: a file receiving unit, configured to receive a processed voice file sent by a backend server.

In some embodiments, the apparatus further includes: a control display module and an information play module.

The control display module is configured to perform step 1503 and step 1703.

The information play module is configured to perform step 1504 and step 1704.

Refer to the method embodiment shown in FIG. 14, FIG. 15A or FIG. 17A for details.

Figure 22:
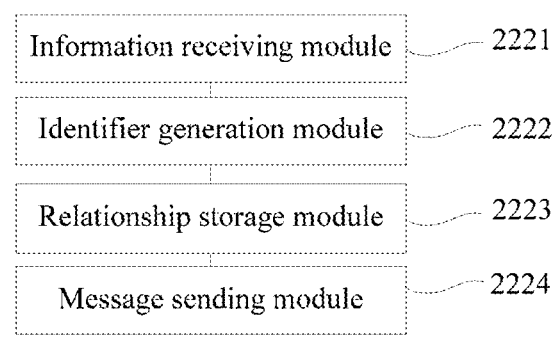
FIG. 22 is a block diagram of an information processing apparatus for sending a virtual item package according to an embodiment of the present disclosure.

Referring to FIG. 22, FIG. 22 is a block diagram of an apparatus for sending a virtual item package according to an embodiment of the present disclosure. The apparatus implements functions on a side of a backend server in the foregoing method example. The function may be implemented by hardware, or may be implemented by hardware executing corresponding software. The apparatus may include: an information receiving module 2221, an identifier generation module 2222, a relationship storage module 2223, and a message sending module 2224.

The information receiving module 2221 is configured to receive voice information and a virtual-item-package parameter correspondingly sent by a sender client.

The identifier generation module 2222 is configured to perform step 1404, step 1510, and step 1710.

The relationship storage module 2223 is configured to perform step 1405, step 1511, and step 1711.

The message sending module 2224 is configured to perform step 1406, step 1512, and step 1712.

In some embodiments, the information receiving module 2221 includes: a file receiving unit and a request receiving unit.

The file receiving unit configured to receive a voice file that is sent by the sender client and includes the voice information.

The request receiving unit is configured to receive a virtual-item-package generation request sent by the sender client.

In some embodiments, the information receiving module 2221 further includes: an information processing unit and a file sending unit.

The information processing unit being configured to perform step 1507 and step 1707.

The file sending unit is configured to perform step 1509 and step 1709.

Refer to the method embodiment shown in FIG. 14, FIG. 15A or FIG. 17A for details.

Figure 23:
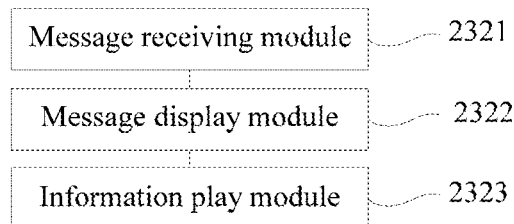
FIG. 23 is a block diagram of an information processing apparatus for sending a virtual item package according to an embodiment of the present disclosure.

Referring to FIG. 23, FIG. 23 is a block diagram of an apparatus for sending a virtual item package according to an embodiment of the present disclosure. The apparatus implements functions on a side of a receiver client in the foregoing method example. The function may be implemented by hardware, or may be implemented by hardware executing corresponding software. The apparatus may include: a message receiving module 2321, a message display module 2322, and an information play module 2323.

The message receiving module 2321 is configured to receive a virtual-item-package message sent by a backend server.

The message display module 2322 is configured to perform step 1407, step 1513, and step 1713.

The information play module 2323 is configured to perform step 1408, step 1516, and step 1716.

In some embodiments, the apparatus further includes: a first information acquiring module, a second information acquiring module, and a third information acquiring module.

The first information acquiring module is configured to acquire voice information from the backend server after acquiring a trigger signal corresponding to a play control.

The second information acquiring module is configured to acquire the voice information from the backend server after verifying that a user account that logs in to the receiver client meets a condition of receiving a virtual item in a virtual item package.

The third information acquiring module is configured to acquire the voice information from the backend server after successfully acquiring a virtual item in a virtual item package.

In some embodiments, the apparatus further includes: a first item acquiring module and a second item acquiring module.

The first item acquiring module is configured to: display a virtual-item-package receiving page after a trigger signal corresponding to the virtual-item-package message is acquired, the virtual-item-package receiving page including the play control and a receive control; and acquire a virtual item from the backend server according to a virtual-item-package identifier after acquiring a trigger signal corresponding to the receive control.

The second item acquiring module is configured to acquire a virtual item from the backend server according to the virtual-item-package identifier after the playing of the voice information ends.

In some embodiments, the apparatus further includes: a page display module, a message acquiring module, and a message sending module.

The page display module is configured to perform step 1517 and step 1717.

The message acquiring module is configured to perform step 1518 and step 1718.

The message sending module is configured to perform step 1519 and step 1719.

Refer to the method embodiment shown in FIG. 14, FIG. 15A or FIG. 17A for details.

An exemplary embodiment of the present disclosure further provides an apparatus for sending a virtual item package. The apparatus implements functions on a side of a sender client in the foregoing method example. The function may be implemented by hardware, or may be implemented by hardware executing corresponding software. The apparatus may include: a generation-indication acquiring module, a page display module, an information acquiring module, a sending-indication acquiring module, and a message sending module.

The generation-indication acquiring module is configured to perform step 1901.

The page display module is configured to perform step 1902.

The information acquiring module is configured to perform step 1903.

The sending-indication acquiring module is configured to perform step 1904.

The message sending module is configured to perform step 1905.

Refer to the method embodiment shown in FIG. 19 for details.

An exemplary embodiment of the present disclosure further provides an apparatus for sending a virtual item package. The apparatus implements functions on a side of a receiver client in the foregoing method example. The function may be implemented by hardware, or may be implemented by hardware executing corresponding software. The apparatus may include: a message receiving module, a message display module, a signal acquiring module, and a voice playing module.

The message receiving module is configured to perform step 2001.

The message display module is configured to perform step 2002.

The signal acquiring module is configured to perform step 2003.

The voice playing module is configured to perform step 2004.

Refer to the method embodiment shown in FIG. 20 for details.

An exemplary embodiment of the present disclosure further provides a system for sending a virtual item package. The system includes: a sender client, a backend server, and a receiver client.

The sender client is configured to: display a virtual-item-package sending page after a virtual-item-package generation indication is acquired; acquire voice information and a virtual-item-package parameter input on the virtual-item-package sending page; and correspondingly send the voice information, the virtual-item-package parameter, and receiver information to the backend server.

The backend server is configured to: generate a virtual-item-package identifier; store a correspondence among the virtual-item-package identifier, the voice information, and the virtual-item-package parameter; and send a virtual-itempackage message to at least one receiver client according to the receiver information, the virtual-item-package message carrying the virtual-item-package identifier.

The receiver client is configured to: display the virtual-item-package message, the virtual-item-package message and/or a virtual-item-package receiving page that is triggered and displayed based on the virtual-item-package message including a play control; and play the voice information acquired according to the virtual-item-package identifier after a trigger signal corresponding to the play control is acquired.

Figure 24A:
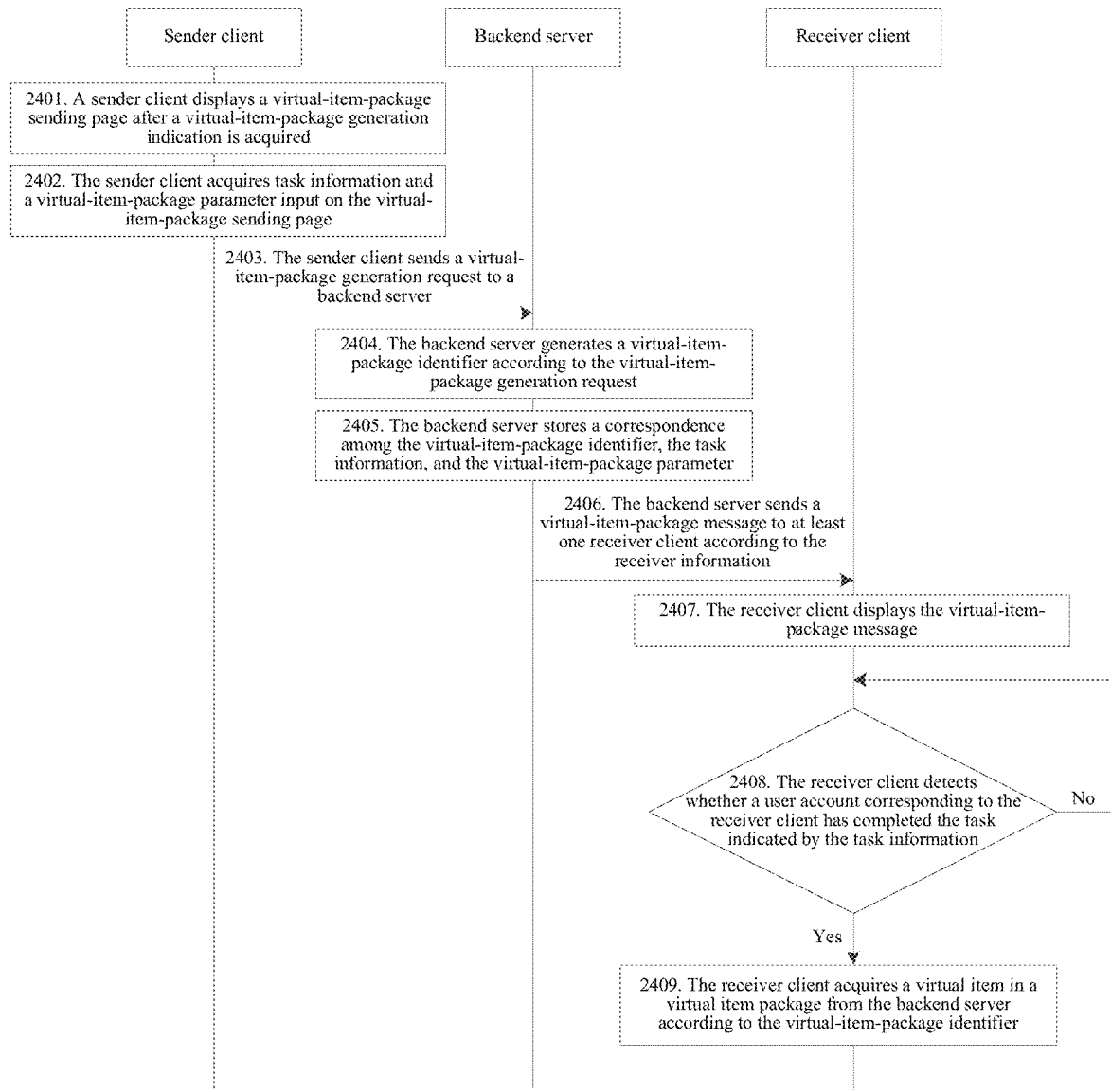
FIG. 24A is a flowchart of a method of information processing for sending a virtual item according to an embodiment of the present disclosure.

Referring to FIG. 24A, FIG. 24A is a flowchart of a method for sending a virtual item package according to an embodiment of the present disclosure. The method may be applied to the implementation environment shown in FIG. 12. The method may include the following steps:

Step 2401: A sender client displays a virtual-item-package sending page after a virtual-item-package generation indication is acquired.

The virtual-item-package generation indication is an operation signal that is triggered by a sender user and is used to request the generation of a virtual item package. The sender client provides an operation control used to send a virtual item package. A user clicks the operation control to trigger the virtual-item-package generation indication.

In an example, the sender client displays a conversation interface. The conversation interface may be a one-to-one conversation interface or a group chat conversation interface. A function menu is displayed after a trigger signal corresponding to a menu control in a conversation interface is acquired. The function menu includes an operation control used to send a virtual item package. A virtual-item-package sending page is displayed after a trigger signal corresponding to the operation control is acquired.

In an example, the sender client displays a function portal interface. The function portal interface includes operation portals corresponding to various functions provided by the sender client. A virtual-item-package sending page is displayed after a trigger signal corresponding to an operation portal corresponding to a virtual-item-package send function in the function portal interface is acquired.

In some embodiments, if the sender client provides a user with the function of sending at least two different types of virtual item packages, the sender client displays selection items corresponding to the at least two types of virtual item packages after acquiring a trigger signal corresponding to the foregoing operation control used to send a virtual item package in the function menu or after acquiring a trigger signal corresponding to an operation portal corresponding to a virtual-item-package send function in the function portal interface; and displays the virtual-item-package sending page used to send a target type of virtual item package after acquiring a trigger signal corresponding to a selection item of the target type of virtual item package.

In some embodiments, the foregoing at least two different types of virtual item packages include a task virtual item package and further include an ordinary virtual item package and/or a group virtual item package. The task virtual item package means a virtual item package carrying task information provided in this embodiment of the present disclosure. The introduction of task information is provided below. The ordinary virtual item package means a virtual item package that is sent to at least one receiver client and includes a fixed quantity of virtual items. The group virtual item package means a virtual item package that is sent to a plurality of receiver clients in a group and includes a random quantity of virtual items.

The virtual-item-package sending page used to send a task virtual item package includes: an operation control used by a sender user to input task information, an operation control used by a sender user to input a virtual-item-package parameter, and an operation control used by a sender user to trigger sending of a virtual item package. In some embodiments, the virtual-item-package sending page further includes: an operation control used by a sender user to input a greeting.

With reference to FIG. 24B-1, FIG. 24B-1 is exemplarily a schematic interface diagram involved in the process of sending a virtual item package. It is assumed that a "red packet" is used as a medium to send a currency as a gift. The sender user clicks an operation portal 61a in a function portal interface 61 to trigger displaying of a type selection interface 62. The type selection interface 62 provides selection items corresponding to three different types of virtual item packages, which are respectively a selection item 62a (shown as a "health task red packet" in FIG. 24B-2) corresponding to a task virtual item package, a selection item 62b (shown as an "ordinary red packet" in FIG. 24B-2) corresponding to an ordinary virtual item package, and a selection item 62c (shown as "luck red packet" in FIG. 24B-2) corresponding to the group virtual item package. The sender user clicks the selection item 62a corresponding to a task virtual item package, to trigger displaying of a virtual-item-package sending page 63 used to send a task virtual item package. The virtual-item-package sending page 63 includes a first input box 63a used by a sender user to input task information, a second input box 63b used by a sender user to input a virtual-item-package parameter, a third input box 63c used by a sender user to input a greeting, and an operation button 63d used by a sender user to trigger sending of a virtual item package as depicted in FIG. 24B-3.

Step 2402: The sender client acquires task information and a virtual-item-package parameter input on the virtual-item-package sending page.

The task information being used to indicate a task that needs to be completed to receive a virtual item package. In this embodiment of the present disclosure, the task indicated by the task information is not limited, and may be set by default in a system or defined by a user. In some embodiments, the task indicated by the task information is a health task. The health task is a task that has a positive effect on improving the physical health of a user. For example, the health task may be a step count task, a walking distance task, a stair-climbing task, and a minimal phone use task.

The task information at least includes a task parameter. The task parameter is used to indicate a task amount. The task parameter may have different content for different tasks. For example, when the task is a step count task, the task parameter may include a step count, for example, 8000 steps. For an example, when the task is a minimal phone use task, the task parameter may include an upper limit value of phone use duration, for example, 30 minutes.

In some embodiments, the task information further includes: a time constraint and/or a location constraint.

The time constraint is used to restrict the time for a receiver user to complete a task. For example, the time constraint is used to restrict an execution period, a deadline, a starting time, and the like for a receiver user to complete a task. For example, the time constraint is a deadline. The deadline is 24:00 on the day when a virtual item package is received. A step count task in the foregoing example is combined. In order to successfully receive a virtual item package, a receiver user needs to walk up to 8000 steps before 24:00 on the day when the virtual item package is received. For an example, the time constraint is an execution period. The execution period is 22:00 to 24:00. A minimal phone use task in the foregoing example is combined. In order to successfully receive a virtual item package, a receiver user needs to keep phone use duration shorter than 30 minutes between 22:00 and 24:00.

The location constraint is used to restrict a location for a receiver user to complete a task. For example, the location constraint is used to restrict an execution location, an execution region, or the like for a receiver user to complete a task. For example, the location constraint is an execution region. The execution region is a specified park. A step count task in the foregoing example is combined. In order to successfully receive a virtual item package, a receiver user needs to walk up to 8000 steps in the specified park.

In an example, the task information includes a task parameter, a time constraint, and a location constraint. The foregoing step count task is still used as an example. In order to successfully receive a virtual item package, a receiver user needs to walk up to 8000 steps in the foregoing specified park before 24:00 on the day when the virtual item package is received.

Certainly, the foregoing task is only exemplary and explanatory. In an possible implementation, the foregoing task may further be a task in which a receiver user is required to arrive at a specified location, a task in which a receiver user is required to complete a specified event, or the like.

In some embodiments, the sender client provides at least two selectable tasks to the sender user. The virtual-item-package sending page includes a task selection control. The task selection control is used to provide at least two tasks to the sender user. The sender client acquires a selection signal corresponding to a target task, and acquires task information corresponding to the target task. The task selection control may be implemented by using an operation control such as a drop-down list and a scrollable list, and may provide various selectable tasks such as a step count task, a walking distance task, a stair-climbing task to the sender user. By using the foregoing manner, a sender user can set a task more flexibly, so that use requirements of users are better satisfied.

With reference to FIG. 24B, a step count task is used as an example. The first input box 63a of the virtual-item-package sending page 63 is used by a sender user to input a step count that needs to be reached to receive a virtual item package. For example, the sender user inputs 8000 in the first input box 63a, representing that a receiver user needs to walk 8000 steps to successfully receive a virtual item package.

The virtual-item-package parameter includes several possible implementation forms as follows:

(1) When a virtual item package is sent to a single receiver client, the virtual-item-package parameter includes a fixed quantity of virtual items in the virtual item package.

(2) When a virtual item package is sent respectively to a plurality of receiver clients, the virtual-item-package parameter includes a total quantity of virtual items or a fixed quantity of virtual items in each virtual item package, and In some embodiments further include a quantity of virtual item packages.

(3) When a virtual item package is sent to at least one receiver client that belongs to a same group, the virtual-item-package parameter includes a total quantity of virtual items or a fixed quantity of virtual items in each virtual item package, and In some embodiments further includes a quantity of virtual item packages.

The total quantity of virtual items in (2) and (3) above is used to evenly or randomly generate a quantity of virtual items in each virtual item package.

With reference to FIG. 24B, an example in which a virtual item package is sent to a single receiver client is used. The second input box 63b of the virtual-item-package sending page 63 is used by a sender user to input an amount of a currency sent as a gift in a red packet. For example, the sender user inputs 80 in the second input box 63b, representing that an amount of a currency that is sent as a gift in a red packet is 80 CNY.

Step 2403: The sender client sends a virtual-item-package generation request to a backend server.

The virtual-item-package generation request is used to instruct the backend server to generate a virtual item package. The virtual-item-package generation request includes: the task information, the virtual-item-package parameter, and receiver information. The receiver information is used to indicate a receiver user of the virtual item package. For example, the receiver information may be an identifier (for example, a user account corresponding to the receiver client) of a receiver client, or may be a group identifier of a group to which a receiver client belongs, or a condition set by a sender user for a receiver client. For example, the condition may be receiver clients corresponding to receiver users between 20 to 30 years old in Guangzhou City. In some embodiments, the virtual-item-package generation request further includes sender information. The sender information may be an identifier (for example, a user account corresponding to the sender client) of the sender client.

In an example, the virtual-item-package sending page includes a sending control. The sender user triggers the sending control to trigger a virtual-item-package sending indication. The sender client sends a virtual-item-package generation request to the backend server after acquiring the virtual-item-package sending indication.

With reference to FIG. 24B-3 and FIG. 24C, the sender user clicks the operation button 63d in the virtual-item-package sending page 63 to trigger a payment procedure. The sender client and the backend server interact to complete a payment procedure. The sender client transfers a currency amount that needs to be sent as a gift from an account corresponding to the sender client to an account corresponding to the backend server. The virtual item package is successfully sent after transfer succeeds. In this embodiment, an example in which a virtual item package is sent to a single receiver client is used. One sent virtual-item-package message 64a is displayed in a one-to-one conversation interface 64 between a sender user and a receiver user, as shown in FIG. 24C.

Step 2404: The backend server generates a virtual-item-package identifier according to the virtual-item-package generation request.

The backend server generates the virtual-item-package identifier corresponding to the virtual-item-package parameter after receiving the virtual-item-package generation request.

It should be noted that for one or more virtual item packages that need to be generated for a same virtual-item-package generation request, the backend server generates one virtual-item-package identifier. The virtual-item-package identifier and a virtual-item-package parameter included in the request are correspondingly stored.

Step 2405: The backend server stores a correspondence among the virtual-item-package identifier, the task information, and the virtual-item-package parameter.

The backend server correspondingly stores the virtual-item-package identifier, the task information, and the virtual-item-package parameter. In some embodiments, the correspondence further includes sender information.

Step 2406: The backend server sends a virtual-item-package message to at least one receiver client according to the receiver information.

The virtual-item-package message carries the virtual-item-package identifier and the task information. In some embodiments, the virtual-item-package message further carries sender information, making it convenient for a receiver user to know the sender user of the virtual item package according to the sender information.

The backend server sends the virtual-item-package message to a receiver client corresponding to a user account when the receiver information is the user account. There may be one or more user accounts.

The backend server sends the virtual-item-package message to a receiver client in a group indicated by a group identifier when the receiver information is the group identifier.

When the receiver information is a condition set by the sender user for a receiver client, the backend server sends a virtual-item-package message to a receiver client that meets the condition.

Step 2407: The receiver client displays the virtual-item-package message.

The receiver client displays the virtual-item-package message in a conversation interface with the sender client. If the sender client sends a virtual item package to a single receiver client or respectively sends a virtual item package to a plurality of receiver clients, the receiver client displays a virtual-item-package message in a one-to-one conversation interface with the sender client. If the sender client sends a virtual item package to at least one receiver client that belongs to a same group, the receiver client displays a virtual-item-package message in a group chat conversation interface with the sender client.

The virtual-item-package message displayed by the receiver client is similar to the virtual-item-package message displayed by the sender client. Reference may be made to FIG. 24D-1. One received virtual-item-package message 65a is displayed in a one-to-one conversation interface 65 between a receiver user and a sender user.

Step 2408: The receiver client detects whether a user account corresponding to the receiver client has completed the task indicated by the task information. If yes, the following step 2409 is performed. If not, step 2408 starts to be performed again after a preset time interval.

The receiver client acquires recorded data related to the task indicated by the task information, and detects, according to the recorded data, whether a user account corresponding to the receiver client has completed the foregoing task.

The preset time interval is set in advance according to an actual requirement. Two adjacent preset time intervals may the same or may be different.

In a possible implementation, step 2408 includes several substeps as follows:

Step 2408a: The receiver client acquires recorded data related to the task indicated by the task information.

The task information indicates different tasks, and therefore the tasks are related to different recorded data. For example, when the task is a step count task, and recorded data related to the task is used to record data about a step count of a user. When the task is a walking distance task, and recorded data related to the task is used to record data about a walking distance of a user. When the task is a stair-climbing task, recorded data related to the task is used to record data about the number of stairs that a user climbs. When the task is a minimal phone use task, recorded data related to the task is used to record data about phone use duration. For example, the duration that a mobile phone is in a screen-on state is used as the phone use duration.

Step 2408b: The receiver client determines whether the recorded data meets a task completion condition.

The task completion condition is a condition for completing the task indicated by the task information. The task completion condition may be determined according to the task information. In some embodiments, the task completion condition includes several possible implementation cases as follows:

1. The task completion condition is that an indicator value indicated by the recorded data satisfies a preset value range.

A step count task is used as an example. The task completion condition may be that a step count is greater than or equal to 8000 steps, and the like. A minimal phone use task is used as an example. The task completion condition may be that phone use duration is shorter than one hour, and the like.

2. The task completion condition is that an indicator value indicated by the recorded data satisfies a preset value range within a preset time constraint.

A step count task is used as an example. The task completion condition may be that a walking step count reaches 8000 steps before 24:00 on a current day, or may be that a walking step count between 17:00 and 20:00 on a current day reaches 5000 steps, and the like. A minimal phone use task is used as an example. The task completion condition may be that phone use duration between 22:00 and 24:00 on a current day is shorter than 30 minutes, and the like.

3. The task completion condition is that an indicator value indicated by the recorded data satisfies a preset value range within a preset location constraint.

A step count task is used as an example. The task completion condition may be that a walking step count reaches 3000 steps at a specified location or in a specified region, and the like.

4. The task completion condition is that an indicator value indicated by the recorded data satisfies a preset value range within a preset time constraint and location constraint.

A step count task is used as an example. The task completion condition may be that a walking step count reaches 3000 steps on a specified location or in a specified region between 17:00 to 20:00 on a current day, and the like.

In addition, the time constraint and/or the location constraint may be set by default in a system or defined by a sender user. When the time constraint and/or the location constraint is defined by a sender user, the virtual-item-package sending page further includes operation controls used by a sender user to set the time constraint and/or the location constraint. The task information further includes a time constraint and/or a location constraint.

When the task completion condition includes a location constraint, the receiver client may use a related positioning technology to acquire a geographical location corresponding to a receiver user. The foregoing related positioning technology includes, but is not limited to, the Global Positioning System (GPS) technology, a base station positioning technology, a WiFi positioning technology, and an indoor positioning technology.

In an example, a step count task is used as an example. It is assumed that the task completion condition is a walking step count reaches 8000 steps before 24:00 on a current day when a virtual item package is received, the receiver client acquires data used to record a step count of a user, and determines a walking step count of a receiver user on a current day according to the data.

In another example, a minimal phone use task is used as an example. It is assumed that the task completion condition is that phone use duration is shorten than 30 minutes between 22:00 and 24:00 on a current day when a virtual item package is received, the receiver client acquires, between 22:00 and 24:00, data used to record phone use duration, and determines phone use duration of a receiver user between 22:00 and 24:00 according to the data.

Step 2408c: The receiver client determines that the user account corresponding to the receiver client has completed the task indicated by the task information if the recorded data meets the task completion condition.

A step count task provided in the foregoing example is used as an example. It is assumed that a walking step count of a receiver user on a current day is 8100 steps, and the receiver client determines that the receiver user has completed the step count task.

A minimal phone use task provided in the foregoing second example is used as an example. It is assumed that phone use duration of a receiver user between 22:00 and 24:00 is 20 minutes, and the receiver client determines that the receiver user has completed the minimal phone use task.

Step 2408d: The receiver client determines that the user account corresponding to the receiver client has not completed the task indicated by the task information if the recorded data does not meet the task completion condition.

A step count task provided in the foregoing first example is used as an example. It is assumed that a walking step count of a receiver user on a current day is 2430 steps, and the receiver client determines that the receiver user has not completed the step count task.

A minimal phone use task provided in the foregoing second example is used as an example. It is assumed that phone use duration of a receiver user between 22:00 and 24:00 is 40 minutes, the receiver client determines that the receiver user has not completed the minimal phone use task.

In addition, in this embodiment of the present disclosure, the time at which the receiver client detects for the first time whether a user account corresponding to the receiver client has completed the task indicated by the task information (that is, the time that the receiver client performs step 2408 for the first time) is not limited. For example, the receiver client may perform step 2408 for the first time when receiving the virtual-item-package message. The receiver client may alternatively perform step 2408 for the first time when displaying the virtual-item-package message. The receiver client may alternatively perform step 2408 for the first time when detecting that a receiver user receives the task indicated by the task information, and the like.

Step 2409: The receiver client acquires a virtual item in a virtual item package from the backend server according to the virtual-item-package identifier.

The receiver client sends a virtual-item receiving request to the backend server after detecting that the user account corresponding to the receiver client has completed the task indicated by the task information. The virtual-item receiving request carries the virtual-item-package identifier. The backend server searches the prestored correspondence to acquire the virtual-item-package parameter corresponding to the virtual-item-package identifier after receiving the virtual-item receiving request, and sends a virtual item to the receiver client according to the virtual-item-package parameter.

If the sender client sends a virtual item package to a single receiver client, and the virtual-item-package parameter includes a fixed quantity of virtual items in the virtual item package, the backend server transfers the fixed quantity of virtual items from an account corresponding to the backend server to an account corresponding to the receiver client.

If the sender client sends a virtual item package to a plurality of receiver clients respectively or sends a virtual item package to at least one receiver client that belongs to a same group, and the virtual-item-package parameter includes a total quantity of virtual items and a quantity of virtual item packages, the backend server evenly or randomly generates, according to a quantity of virtual item packages and a total quantity of virtual items, a quantity of virtual items in a virtual item package acquired by a receiver client, and transfers the quantity of virtual items from an account corresponding to the backend server to an account corresponding to the receiver client.

In an example, the backend server determines, according to a rank at which each receiver client completes a task, a receiver client that has the right to receive a virtual item. For any receiver client, if a value corresponding to a rank at which the receiver client completes the task is less than or equal to a value corresponding to a quantity of virtual item packages, the backend server determines that the receiver client has the right to receive a virtual item. If a value corresponding to a rank at which the receiver client completes the task is greater than a value corresponding to a quantity of virtual item packages, the backend server determines that the receiver client does not have the right to receive a virtual item.

In another example, the backend server determines, according to a rank at which each receiver client sends a virtual-item receiving request, a receiver client that has the right to receive a virtual item. For any receiver client, if a value corresponding to a rank at which the receiver client sends a virtual-item receiving request is less than or equal to a value corresponding to a quantity of virtual item packages, the backend server determines that the receiver client has the right to receive a virtual item. If a value corresponding to a rank at which the receiver client sends a virtual-item receiving request is greater than a value corresponding to a quantity of virtual item packages, the backend server determines that the receiver client does not have the right to receive a virtual item.

If the sender client sends a virtual item package to a plurality of receiver clients respectively or sends a virtual item package to at least one receiver client that belongs to a same group, and the virtual-item-package parameter includes a total quantity of virtual items, the backend server determines a quantity of receiver clients that complete the task after a completion time limit of the task is reached, and evenly or randomly generates, according to the quantity of receiver clients that complete the task and the total quantity of virtual items, a quantity of virtual items in a virtual item package acquired by a receiver client, and transfers the quantity of virtual items from an account corresponding to the backend server to an account corresponding to the receiver client.

If the sender client sends a virtual item package to a plurality of receiver clients respectively or sends a virtual item package to at least one receiver client that belongs to a same group, and the virtual-item-package parameter includes a fixed quantity of virtual items in each virtual item package, the backend server transfers the fixed quantity of virtual items from an account corresponding to the backend server to an account corresponding to the receiver client. In some embodiments, if the virtual-item-package parameter further includes a quantity of virtual item packages, the backend server determines, according to a rank at which each receiver client completes a task or a rank at which each receiver client sends a virtual-item receiving request, a receiver client that has the right to receive a virtual item. Related content is already introduced above. Details are no longer described here.

In the implementation described above, only an example in which the receiver client automatically performs the step of acquiring a virtual item from the backend server according to the virtual-item-package identifier (that is, automatically receives a virtual item) after detecting that the user account corresponding to the receiver client has completed the task indicated by the task information is used. In another possible implementation, a receiver client may perform the step of acquiring a virtual item from the backend server according to the virtual-item-package identifier under triggering by a receiver user. For example, reference may be made to the following introduction, in which the receiver client performs the step of acquiring a virtual item in a virtual item package from the backend server according to the virtual-item-package identifier after acquiring a trigger signal corresponding to a receive control.

In some embodiments, the receiver client further performs the following step after displaying the virtual-item-package message: displaying, by the receiver client, a task detail page after acquiring a trigger signal corresponding to the virtual-item-package message, the task detail page at least including the task information.

In some embodiments, the receiver client determines, according to a task acceptance status (whether a task is accepted) and a task completion status (whether a task is completed) of a user account corresponding to a receiver client, an interface element displayed in the task detail page. A possible implementation includes the following cases.

1. The task detail page includes the task information and a receive control when the user account corresponding to the receiver client has not received the task indicated by the task information. The receive control is used by a receiver user to trigger receiving of the task indicated by the task information. In some embodiments, the task detail page further includes a task completion status.

The task completion status is a completion status of the user account corresponding to the receiver client for the task indicated by the task information. For example, the task completion status includes a completed amount and/or a remaining amount.

As shown by the picture in the middle in FIG. 24D-2, when a receiver user has not received a step count task, a task detail page 66 includes a receive control 66a, task information 66b, and a task completion status 66c. A receiver user clicks the receive control 66a to trigger receiving of a step count task.

In some embodiments, the receiver client sends a task acceptance response to the backend server after acquiring a trigger signal corresponding to the receive control. The backend server forwards the task acceptance response to the sender client. The sender client displays task acceptance prompt information after receiving the task acceptance response. In some embodiments, the task acceptance response carries the virtual-item-package identifier and the user account corresponding to the receiver client. The backend server searches for a corresponding sender client according to the virtual-item-package identifier, and forwards the task acceptance response to the sender client.

The task acceptance prompt information is used to indicate that a user account corresponding to a receiver client has already accepted the task indicated by the task information. The sender client displays the task acceptance prompt information, making it convenient for the sender user to know whether a receiver user has already accepted a task or know one or more receiver users that have already accepted the task.

If the sender client sends a virtual item package to a single receiver client, or sends a virtual item package to a plurality of receiver clients respectively, the sender client displays the task acceptance prompt information in a one-to-one conversation interface with the receiver client. If the sender client sends a virtual item package to at least one receiver client that belongs to a same group, the sender client displays the task acceptance prompt information in a group chat conversation interface with the receiver client.

2. When a user account corresponding to a receiver client has already accepted the task indicated by the task information and has not completed the task indicated by the task information, the task detail page includes the task information. In some embodiments, the task detail page further includes a task completion status.

In this case, reference may be made to the picture on the right side in FIG. 24D-3 for the task detail page.

3. The task detail page includes the task information and a receive control when the user account corresponding to the receiver client has completed the task indicated by the task information. The receive control is used by a receiver user to trigger receiving of a virtual item in a virtual item package. In some embodiments, the task detail page further includes a task completion status.

In some embodiments, the receiver client does not automatically receive a virtual item, and the receiver client performs the step of acquiring a virtual item in a virtual item package from the backend server according to the virtual-item-package identifier after acquiring a trigger signal corresponding to the receive control.

As shown by the picture in the middle in FIG. 24E-2, when a receiver user has completed a step count task, a task detail page 66 includes a receive control 66d, task information 66b, and a task completion status 66c. A receiver user clicks the receive control 66d to trigger the receiver client to acquire a virtual item in a virtual item package. Reference may be made to the picture on the right side in FIG. 24E-3 for a receive success page 67.

In some embodiments, the receiver client sends an item receive response to the backend server after acquiring a virtual item in a virtual item package from the backend server according to the virtual-item-package identifier. The backend server forwards the item receive response to the sender client. The sender client displays item receive prompt information after receiving the item receive response. In some embodiments, the item receive response carries the virtual-item-package identifier and the user account corresponding to the receiver client. The backend server searches for a corresponding sender client according to the virtual-item-package identifier, and forwards the item receive response to the sender client.

The item receive prompt information is used to indicate that a user account corresponding to a receiver client has already received a virtual item in a virtual item package. The sender client displays the item receive prompt information, making it convenient for the sender user to know whether a receiver user has already received a virtual item or know one or more receiver users that have already received a virtual item.

If the sender client sends a virtual item package to a single receiver client, or sends a virtual item package to a plurality of receiver clients respectively, the sender client displays the item receive prompt information in a one-to-one conversation interface with the receiver client. If the sender client sends a virtual item package to at least one receiver client that belongs to a same group, the sender client displays the item receive prompt information in a group chat conversation interface with the receiver client.

In addition, during actual applications, under the premise of determining that a receiver user has already accepted a task, the receiver client may then determine, according to a task completion status, whether the receiver user has the right to receive a virtual item in a virtual item package. Alternatively, regardless of whether a receiver user has already received a task or not, the receiver client may directly determine, according to a task completion status, whether the receiver user has the right to receive a virtual item in a virtual item package.

In some embodiments, after a user account corresponding to a receiver client already receives a virtual item in a virtual item package, if the receiver client acquires a trigger signal corresponding to a virtual-item-package message, the receiver client displays a receive success page.

Figure 24F:
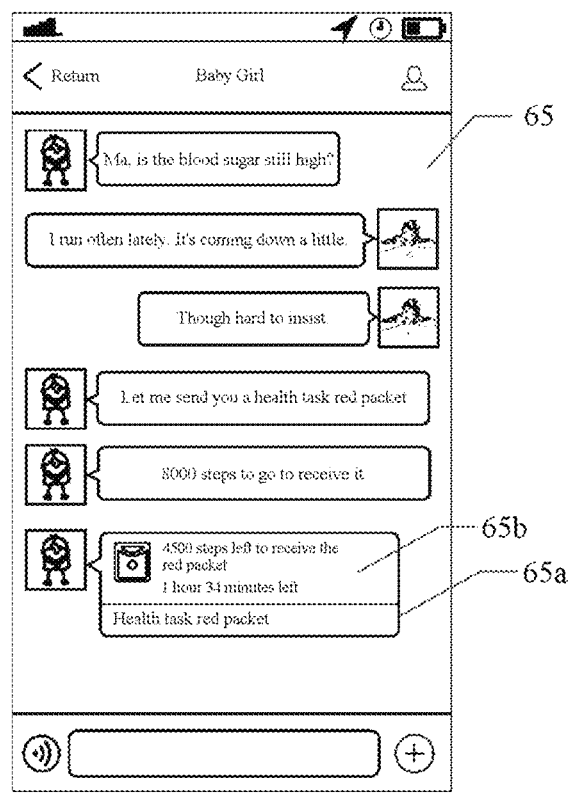

It should be noted that the receiver client further performs the following step after displaying the virtual-item-package message: displaying, by the receiver client, a task completion status in the virtual-item-package message. In some embodiments, the receiver client displays the task completion status in the virtual-item-package message when subsequently displaying the virtual-item-package message after acquiring a trigger signal corresponding to a receive control. With reference to FIG. 24F, after a receiver user accepts a task, the virtual-item-package message 65a displayed in the one-to-one conversation interface 65 between the receiver user and the sender user displays a task completion status 65b, including remaining walking steps and a remaining time of the task.

In some embodiments, the receiver client sends the task completion status to the sender client by using the backend server, and the sender client displays the task completion status in the virtual-item-package message.

It should be additionally noted that before the acquiring, by the receiver client, recorded data related to the task indicated by the task information, the method further includes: detecting, by the receiver client, whether the receiver client has the right of acquiring recorded data; displaying, by the receiver client, right enable prompt information if the receiver client does not have the right of acquiring recorded data, the right enable prompt information being used to prompt enabling of the right of acquiring recorded data for the receiver client; and if the receiver client has the right of acquiring recorded data, performing, by the receiver client, the step of acquiring recorded data related to the task indicated by the task information.

With reference to FIG. 24G-1 and FIG. 24G-2, the receiver client detects whether the receiver client has the right of acquiring recorded data after receiving the virtual-item-package message. If a detection result is that the receiver client does not have the right of acquiring recorded data, a prompt control 65c is displayed in the virtual-item-package message 65a. A receiver user clicks the prompt control 65c to trigger displaying of right enable prompt information 65d. The receiver user may enable, according to the right enable prompt information 65d, the right of acquiring recorded data for the receiver client.

In conclusion, in the related technology, upon receiving a virtual item package, a receiver client may send a virtual-item receiving request to a backend server to request to acquire a virtual item in the virtual item package. When a large number of users are exchanging virtual item packages, a large quantity of virtual-item receiving requests are generated, causing heavy processing load to the backend server. However, in the embodiments of the present disclosure, task information is additionally set during the sending of a virtual item package, a receiver user needs to complete a task indicated by the task information before the receiver user can request to receive a virtual item in the virtual item package. Because the time of performing tasks is indefinite, even if a relatively large number of users are exchanging virtual item packages, requests are staggered. In this case, the processing load on the backend server at a same time is reduced. In addition, tasks are added during the receiving and sending of virtual item packages, so that the forms of receiving and sending the forms of receiving and sending virtual item packages can be enriched.

In addition, in the method provided in this embodiment of the present disclosure, a receiver client further displays a task completion status in a virtual-item-package message after a receiver user accepts a task, so that the receiver user may view the task completion status when reviewing the virtual-item-package message, but does not need to open the virtual-item-package message, so that user operations are simplified.

In addition, in the method provided in this embodiment of the present disclosure, a virtual item package can be sent to a single receiver user, a plurality of receiver users or a group, so that the forms of sending a virtual item package become more diverse, thereby better satisfying use requirements of users.

In addition, a terminal device usually has a gravity sensor. Therefore, when a sender user sets a health task such as a step count task, a walking distance task, and a stair-climbing task, related recorded data can be collected very conveniently without needing to increase hardware costs of terminal devices.

In addition, a sender user may set a health task such as a step count task, a walking distance task, and a stair-climbing task. Therefore, this embodiment of the present disclosure provides a more interesting, positive, and healthy manner of receiving and sending a virtual item package. This manner is more suitable for receiving and sending of virtual item packages between users having a close relationship (for example, relatives, and friends), so as to express concerns and wishes of a sender user for the health status of a receiver user, so that receiver users complete tasks with increased enthusiasm.

In the foregoing method embodiment, steps about a side of a sender client may be separately implemented as a method for sending a virtual item package on the side of the sender client, steps about a side of a backend server may be separately implemented as a method for sending a virtual item package on the side of the backend server, and steps about a side of a receiver client may be separately implemented as a method for receiving a virtual item package on the side of the receiver client.

It should be further noted that, in the foregoing embodiment, only an example in which a sender client and a receiver client perform an interaction procedure of receiving and sending virtual item packages by using a backend server for relaying is used. In another possible implementation, a sender client and a receiver client may directly interact to receive and send virtual item packages and does not need the relaying of a backend server. In this case, the receiver client may receive a virtual-item-package message sent by the sender client. The virtual-item-package message carries task information and a virtual-item-package parameter. The receiver client acquires a virtual item in a virtual item package according to the virtual-item-package parameter if determining that a user account corresponding to the receiver client has completed a task indicated by the task information.

Apparatus embodiments of the present disclosure are provided below, and may be used to perform the method embodiments of the present disclosure. Refer to the method embodiments of the present disclosure for details that are not disclosed in the apparatus embodiments of the present disclosure.

Referring to FIG. 25, FIG. 25 is a block diagram of an apparatus for sending a virtual item package according to an embodiment of the present disclosure. The apparatus implements functions on a side of a sender client in the foregoing method example. The function may be implemented by hardware, or may be implemented by hardware executing corresponding software. The apparatus may include: a page display module 2510, an information acquiring module 2520, and a request sending module 2530.

The page display module 2510 is configured to perform step 2401.

The information acquiring module 2520 is configured to perform step 2402.

The request sending module 2530 is configured to perform step 2403.

Refer to the method embodiment shown in FIG. 24A for details.

Figure 26:
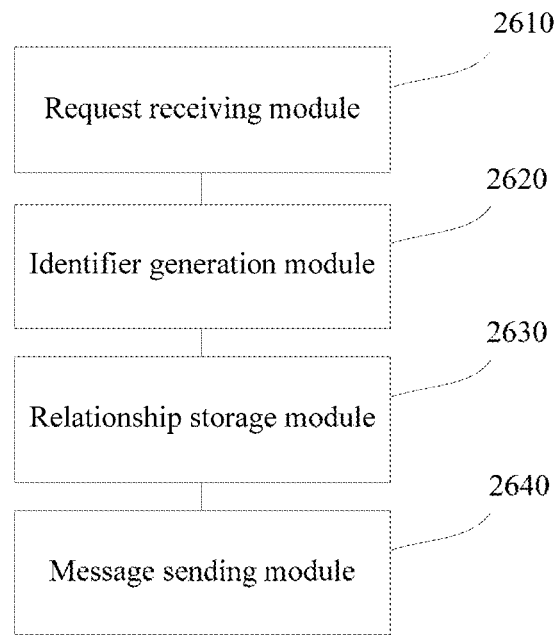
FIG. 26 is a block diagram of an information processing apparatus for sending a virtual item package according to an embodiment of the present disclosure.

Referring to FIG. 26, FIG. 26 is a block diagram of an apparatus for sending a virtual item package according to an embodiment of the present disclosure. The apparatus implements functions on a side of a backend server in the foregoing method example. The function may be implemented by hardware, or may be implemented by hardware executing corresponding software. The apparatus may include: a request receiving module 2610, an identifier generation module 2620, a relationship storage module 2630, and a message sending module 2640.

The request receiving module 2610 is configured to receive a virtual-item-package generation request sent by a sender client.

The identifier generation module 2620 is configured to perform step 2404.

The relationship storage module 2630 is configured to perform step 2405.

The message sending module 2640 is configured to perform step 2406.

Refer to the method embodiment shown in FIG. 24A for details.

Figure 27:
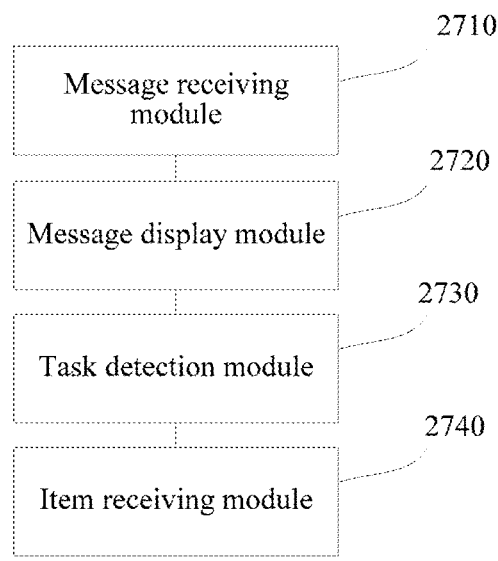
FIG. 27 is a block diagram of an information processing apparatus for receiving a virtual item package according to an embodiment of the present disclosure.

Referring to FIG. 27, FIG. 27 is a block diagram of an apparatus for receiving a virtual item package according to an embodiment of the present disclosure. The apparatus implements functions on a side of a receiver client in the foregoing method example. The function may be implemented by hardware, or may be implemented by hardware executing corresponding software. The apparatus may include: a message receiving module 2710, a message display module 2720, a task detection module 2730, and an item receiving module 2740.

The message receiving module 2710 is configured to receive a virtual-item-package message sent by a backend server.

The message display module 2720 is configured to perform step 2407.

The task detection module 2730 is configured to perform step 2408.

The item receiving module 2740 is configured to acquire a virtual item in a virtual item package from the backend server according to a virtual-item-package identifier if a task indicated by task information has been completed.

In some embodiments, the apparatus further includes: a page display module.

The page display module is configured to display a task detail page after a trigger signal corresponding to the virtual-item-package message is acquired.

In some embodiments, the apparatus further includes: a status display module. The status display module is configured to display a task completion status in the virtual-item-package message.

In some embodiments, the apparatus further includes: a right detection module and an information prompt module.

The right detection module is configured to detect whether the receiver client has the right of acquiring recorded data.

The information prompt module is configured to display right enable prompt information if the receiver client does not have the right of acquiring recorded data.

Refer to the method embodiment shown in FIG. 24A for details.

An exemplary embodiment of the present disclosure further provides a system for sending a virtual item package. The system includes: a sender client, a backend server, and a receiver client.

The sender client is configured to: display a virtual-item-package sending page after a virtual-item-package generation indication is acquired; acquire task information and a virtual-item-package parameter input on the virtual-item-package sending page, the task information being used to indicate a task that needs to be completed to receive a virtual item package; and send a virtual-item-package generation request to the backend server, the virtual-item-package generation request carrying the task information, the virtual-item-package parameter, and receiver information.

The backend server is configured to: generate a virtual-item-package identifier according to the virtual-item-package generation request; store a correspondence among the virtual-item-package identifier, the task information, and the virtual-item-package parameter; and send a virtual-item-package message to at least one receiver client according to the receiver information, the virtual-item-package message carrying the virtual-item-package identifier and the task information.

The receiver client is configured to: display the virtual-item-package message; detect whether a user account corresponding to the receiver client has completed the task indicated by the task information; and acquire a virtual item in the virtual item package from the backend server according to the virtual-item-package identifier if the task indicated by the task information is already completed.

Figure 28:
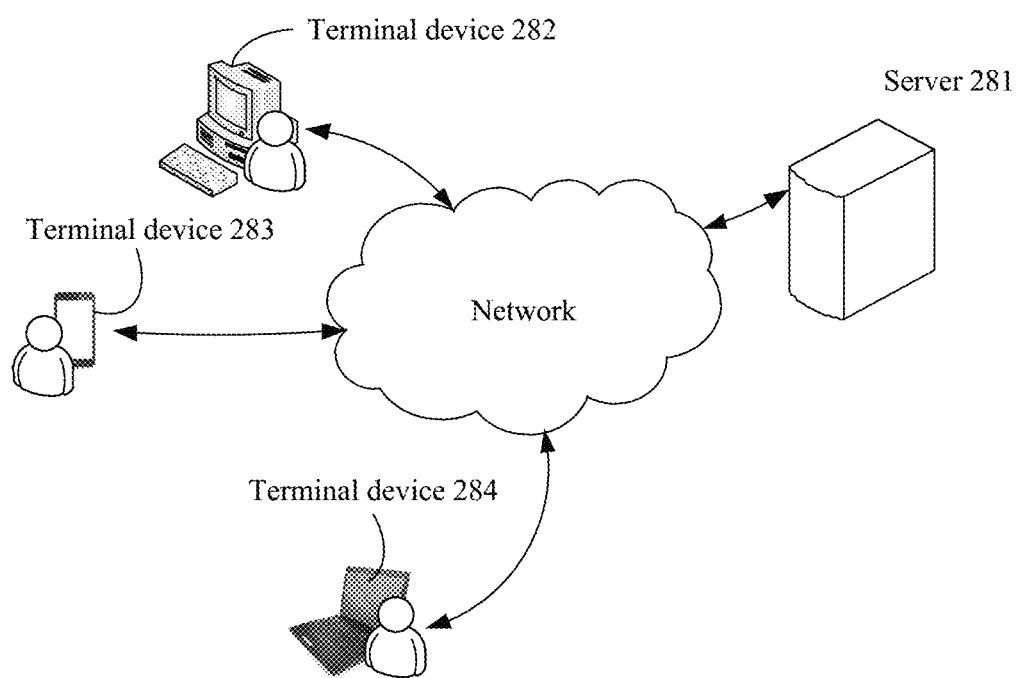
FIG. 28 is a schematic diagram of all hardware entities that perform information interaction according to an embodiment of the present disclosure.

FIG. 28 is a schematic diagram of all hardware entities that perform information interaction according to an embodiment of the present disclosure. As shown in FIG. 28, FIG. 28 includes: a server 281 and terminal devices 282 to 284. The terminal devices 282 to 284 perform information interaction with the server 281 by using a wired network or a wireless network. The terminal devices 282 to 284 include types such as a mobile phone, a desktop computer, a PC, and an all-in-one PC.

The terminal devices 282 to 284 may be in a same group. Each of the terminal devices 282 to 284 may output a conversation window. The conversation windows include users corresponding to the terminal devices 282 to 284. The conversation window may be specifically a conversation window of an instant messaging application, or may be a conversation window presented by using a web page. In an example, the server 281 may interact with a first-type terminal device (for example, a terminal of a user that distributes a red packet) through a network, to obtain red packet request information sent by a first type user corresponding to the first-type terminal device. The red packet request information may specifically include: a red packet quantity, a red packet amount, and an attribute parameter. The attribute parameter may specifically denote whether a red packet event represented by the red packet request information is an ordinary red packet event or a red packet event having a specific display effect in this embodiment of the present disclosure. In addition to a first-type terminal device, the terminal devices 282 to 284 may further include a second-type terminal device. The second-type terminal device may interact with the server 281 through a network. The server 281 generates red packet information having a specific display effect based on the red packet request information sent by the first-type terminal device, and outputs the red packet information to a conversation window including the first type user and a second type user. When the second-type terminal device detects an input operation of the second type user on the red packet information displayed in the conversation window, for example, a trigger operation such as an operation of clicking the red packet information or an operation of long-pressing the red packet information, it denotes a request for obtaining a red packet, and a message is correspondingly sent to the server 281. In this embodiment, when the attribute parameter denotes a red packet event having have a specific display effect, red packet information displayed in a conversation window of the second-type terminal device is different from red packet information corresponding to an ordinary red packet event. As an example, the red packet information displayed in the conversation window has a specific displaying appearance. When any second-type terminal device detects an input operation of the second type user on the red packet information, the second-type terminal device and the server 281 perform information interaction. The server 281 starts a timer, and sets a timing time. At this time, the countdown starts. Within the timing time of the timer, the server may continue to receive a notification message representing a second-type terminal device that triggers the red packet information. Till the timing time of the timer is up, the server 281 counts a quantity of second type users that triggers the red packet information, and distributes, according to a preconfigured distribution rule the red packet amount distributed by the first type user, to the second type users that trigger the red packet information.

Certainly, the second-type terminal device may include a first-type terminal device. That is, a terminal device that distributes a red packet may also be used as a terminal device that obtains a red packet.

The foregoing example in the FIG. 28 is merely an example of a system architecture that implements the embodiments of the present disclosure. The embodiments of the present disclosure are not limited to the foregoing system structure in FIG. 28. Various embodiments of the present disclosure are provided based on the system architecture.

Figure 29:
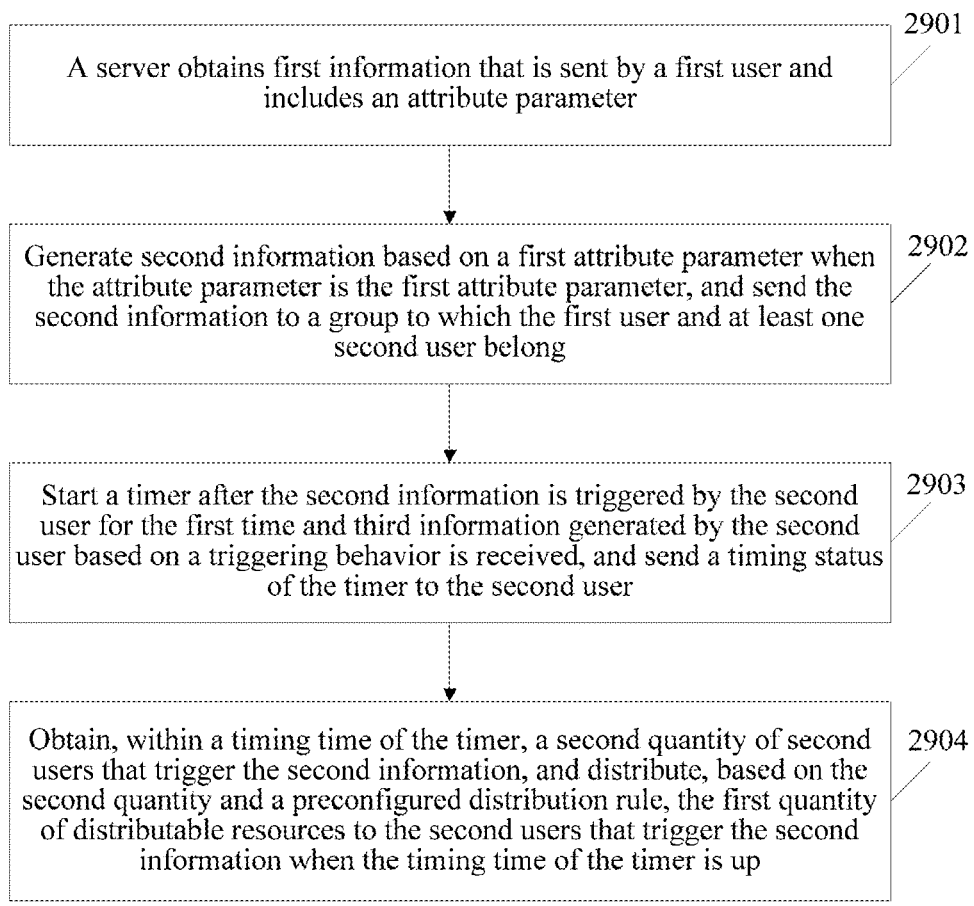
FIG. 29 is a schematic flowchart 1 of an information processing method according to an embodiment of the present disclosure.

An embodiment of the present disclosure provides an information processing method applied to a server. FIG. 29 is a schematic flowchart of an information processing method according to an embodiment of the present disclosure. As shown in FIG. 29, the information processing method includes:

Step 2901: The server obtains first information that is sent by a first user and includes an attribute parameter, the first information being information about a first quantity of distributable resources distributed by the first user to at least one second user. The first user and the at least one second user are in a same group. The first quantity is a total quantity of distributable resources distributed to the at least one second user.

Step 2902: Generate second information based on a first attribute parameter when the attribute parameter is the first attribute parameter, and send the second information to a group to which the first user and the at least one second user belong, the first attribute parameter representing that information having a specific display effect needs to be sent, and the second information displayed in a conversation window corresponding to the group having the specific display effect.

Step 2903: Start a timer after the second information is triggered by the second user for the first time and third information generated by the second user based on a triggering behavior is received, and send a timing status of the timer to the second user, the third information representing that the second information is triggered for the first time.

Step 2904: Obtain, within a timing time of the timer, a second quantity of second users that trigger the second information, and distribute, based on the second quantity and a preconfigured distribution rule, the first quantity of distributable resources to the second users that trigger the second information when the timing time of the timer is up.

In this embodiment, the first user corresponds to a first terminal, and the second user corresponds to a second terminal. That is, a user may perform an operation on a corresponding terminal. The first terminal and the at least one second terminal are in a same group. The first terminal is a terminal sending information, and the second terminal is a terminal receiving information. Any terminal can be used as a first terminal to send information and can be used as a second terminal to receive information. The conversation window corresponding to the group may be specifically a conversation window based on a social application (for example, an instant messaging application). Based on the group, users in the group may communicate with each other and may also participate in a social activity, for example, share information. In the embodiments of the present disclosure, users may also use a conversation window to participate in a payment activity, for example, a payment behavior of "Send red packet" and money transfer. The behavior "Send red packet" may be understood as that the first user uses a conversation window to send a distributable resource to at least one second user. The distributable resource may be an electronic red packet having a particular amount.

Based on the foregoing description, the first user sets an attribute parameter of a distributable resource and a first quantity (the first quantity may be specifically a specific amount) of distributable resources in a conversation window by using an input operation. The first terminal generates the first information based on the set attribute parameter and first quantity and sends the first information to the server. During actual applications, a payment tool (for example, the social application is the application "WeChat", and the payment tool "WeChat Wallet" is built in the "WeChat" application; for another example, the social application is the application "QQ", and the payment tool "QQ" Wallet is built in the application "QQ") is built in a social application to which a conversation window belongs. Generally, in this embodiment of the present disclosure, the distributable resource is an electronic currency in a payment tool built in a social application to which a conversation window belongs. It may be understood that when a first user pays a first quantity of distributable resources to at least one second user, the first user sends at least a part of an electronic currency existing in a payment tool built in a social tool to the at least one second user through the association of the group.

The server receives the first information sent by the first user. The first information includes the first quantity and an attribute parameter. The attribute parameter is used to denote whether a distributable resource represented by the first information is an ordinary distributable resource or a specific distributable resource. The ordinary distributable resource corresponds to an ordinary information processing rule. For example, the first user sends an ordinary distributable resource by using a conversation window. The distributable resource can be distributed to n (n is a positive integer) second users. A second user clicks the distributable resource. If a second user that clicks the distributable resource belongs to the first n users that click the distributable resource, the second user can obtain a part of the distributable resource. During actual applications, for an ordinary distributable resource, reference may be made to an existing information interaction procedure of "Send red packet". The specific distributable resource corresponds to a specific information processing rule. The specific information processing rule is an information interaction procedure in this embodiment of the present disclosure.

In this embodiment, the server obtains an attribute parameter included in first information after receiving the first information, and determines whether the attribute parameter is a first attribute parameter, the first attribute parameter being an attribute parameter corresponding to a specific distributable resource. When the attribute parameter is a first attribute parameter, the server may determine that the first user sends a specific distributable resource. The server invokes corresponding display effect data based on the first attribute parameter, generates second information based on the display effect data, and sends the second information to a group to which the first user and the at least one second user belong. The first user corresponds to the first terminal, and the second user corresponds to the second terminal. That is, the server sends the second information to a conversation window corresponding to the group. In this case, the conversation window displayed by the at least one second user displays the second information. The second information has a specific display effect based on the included display effect data. The specific display effect is, for example, a specific skin (the skin may be a static image, a dynamic image, or the like).

In this embodiment, when the second information is output by using a conversation window and displayed on the at least one second terminal, the second user may perform an input operation on the second information. The second terminal may send third information to the server when detecting the input operation on the second information. The input operation may be a click operation, a long-press operation, or the like, representing that the second user has triggered the second information. The server may determine that the second user has triggered the second information when receiving the third information. Correspondingly, the server may determine that the second information in the conversation window is triggered by the second user for the first time when receiving the third information for the first time. In this embodiment, when the second information is triggered for the first time, the server starts a timer, and the timer starts timing according to the timing time. The timing time of the timer may be set by the server in advance. In another implementation, the timing time of the timer may be configured in the first information input by the first user.

In this embodiment, within the timing time of the timer, the server receives the third information sent by the second terminal to obtain a quantity of second users that trigger the second information. Specifically, in the conversation window, a second terminal corresponding to each second user that triggers the second information in the conversation window for the first time sends the third information to the server. The third information is used to denote that a corresponding second user expects the distribution of the distributable resource. The server may determine, based on the quantity of the received third information, the quantity of the second users that trigger the second information. The third information may include an identifier corresponding to the second user (or the second terminal).

As an example, when the second user performs an input operation on the second information, the server receives the third information, and sends the timing status of the timer to the second user. The second terminal of the second user outputs and displays a first interface based on the received timing status of the timer. The first interface includes the timing status of the timer. In an implementation, the second user may keep the first interface until the timing status of the timer terminates.

In an implementation, the second user may close the first interface by using an input operation and return to the conversation window again. In this application scenario, within the timing time of the timer, the method further includes: obtaining, by the server, the timing status of the timer after receiving fourth information sent by the second user, and sending the timing status of the timer to the second user, the fourth information representing that the second information is not triggered by the second user for the first time. The second user can detect again, within the timing time of the timer, an input operation performed on the second information in the conversation window, and generate the fourth information based on the detected input operation. The server obtains the timing status of the timer after receiving the fourth information, and sends the timing status to the second user, so that the second user outputs and displays the first interface again, and displays the timing status of the timer by using the first interface.

It should be noted that as soon as the timing time is set, the timer may start to perform countdown as time passes. The timing status may be represented by using a current remaining time. The second user can view the current remaining time displayed in the first interface regardless of whether the second user triggers the second information for the first time or not. Correspondingly, when the timing time is up, it means that the current remaining time is 0, and the countdown may terminate. Alternatively, as soon as the timing time is set, the timer may start timing from 0 as time passes. In this case, the timing status may be represented by using a current counted time. The second user can view the current counted time displayed in the first interface regardless of whether the second user triggers the second information for the first time or not, and calculates a remaining time according to the timing time and the current counted time. Correspondingly, when the timing time is up, the current counted time is equal to the timing time, and the timing may terminate.

In this embodiment, the server distributes, based on the second quantity and a preconfigured distribution rule, the first quantity of distributable resources to the second users that trigger the second information when determining that the timing time of the timer is up.

In this embodiment, the first information sent by the first user further includes a third quantity. The third quantity represents a quantity of second users to which the first quantity of distributable resources can be distributed. It may be understood that 10 CNY (the first quantity) of an electronic currency (a distributable resource) is to be distributed to 10 (the third quantity) users. The second quantity represents a quantity of second users that actually request distribution of a distributable resource within the timing time. In this case, during actual applications, several cases as follows may occur: The first case is that the second quantity is greater than the third quantity. That is, the quantity of second users that click the second information is greater than the preconfigured quantity of second users to which distribution is to be performed. Based on this, in this embodiment, the method further includes: randomly selecting second users satisfying the third quantity from the second users that trigger the second information, and distributing the first quantity of distributable resources to the second users that trigger the second information based on the third quantity and a preconfigured distribution rule.

Specifically, in this case, the server may configure a random picking algorithm in advance, and randomly pick second users satisfying the third quantity from the second users that trigger the second information. It may be understood that a second user that does not obtain a distributed distributable resource exists among the second users that trigger the second information.

The second case is that the second quantity is not greater than the third quantity. That is, a quantity of second users that click the second information is not greater than a preconfigured quantity of second users to which distribution is to be performed. Based on this, in this case, the preconfigured distribution rule may be used to distribute the first quantity of distributable resources.

In this embodiment, the preconfigured distribution rule may be specifically not limited to the following two manners: random distribution and proportional random distribution.

In an implementation, when the second quantity is not greater than the third quantity, the distributing, based on the second quantity and a preconfigured distribution rule, the first quantity of distributable resources to the second users that trigger the second information includes: randomly distributing the first quantity of distributable resources according to the second quantity, obtaining a first subquantity of distributable resources satisfying the second quantity, and respectively sending the first subquantity of distributable resources to the corresponding second users that trigger the second information, the first subquantity being a quantity of distributable resources to be distributed to the second user, and the first subquantity being less than the first quantity. The second users may correspond to the same first subquantity or different first subquantities.

Specifically, in this implementation, when the timing time of the timer is up, the server randomly distributes the first quantity of distributable resources based on the second quantity of second users that trigger the second information, determines a sub-quantity of distributable resources obtained by each second user, and distributes distributable resources satisfying the sub-quantity to a corresponding second user. For example, the first information includes 10 CNY of an electronic currency that can be distributed to 10 second users. In fact, the actual quantity of second users that have performed a click is 8. In this case, the server randomly distributes 10 CNY to the 8 second users. The second users may obtain different amounts of the electronic currency.

In an implementation, when the second quantity is not greater than the third quantity, the distributing, based on the second quantity and a preconfigured distribution rule, the first quantity of distributable resources to the second users that trigger the second information includes: evenly distributing the first quantity of distributable resources based on the quantity of second users to which the first quantity of distributable resources can be distributed, to obtain a second subquantity of distributable resources; and respectively sending the second subquantity of distributable resources to the second users that trigger the second information, the second subquantity being a quantity of distributable resources distributed to each second user.

Specifically, in this implementation, when the timing time of the timer is up, the server performs proportional random distribution on the first quantity of distributable resources based on the second quantity of second users that trigger the second information. That is, each second user obtains the same distributable resource. A sub-quantity of distributable resources obtained by each second user is determined, and distributable resources satisfying the sub-quantity are distributed to a corresponding second user. For example, the first information includes: 10 CNY of an electronic currency that can be distributed to 10 second users. The actual quantity of second users that have performed a click is 8. In this case, the server evenly divides 10 CNY into 10 shares. Each share is 1 CNY. The same amount 1 CNY of the electronic currency is distributed to each of the 8 second users, and the remaining 2 CNY is returned to the first user again.

In the technical solution in this embodiment of the present disclosure, a new information interaction solution about "Grab Red packet" is provided. When a second user triggers second information for the first time, a server starts a timer to start timing. That is, a user that triggers red packet information within a countdown timing time is marked as valid. A user that triggers red packet information before a timing time of the timer is up may obtain a red packet, thereby greatly shortening a time period of acquiring a distributable resource and improving the efficiency of information interaction. In another aspect, a specific display effect (for example, an explosion display effect, or a firework display effect) is displayed when the timing time of the timer is up, and the lively atmosphere of information interaction is improved.

Figure 30:
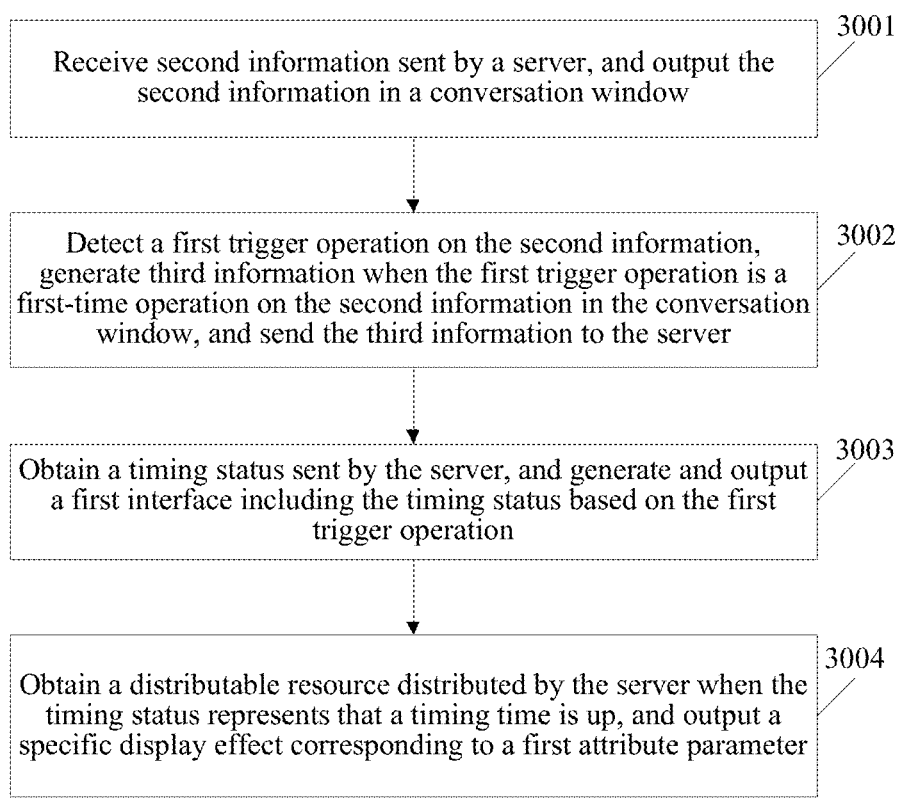
FIG. 30 is a schematic flowchart 2 of an information processing method according to an embodiment of the present disclosure.

An embodiment of the present disclosure further provides an information processing method, applied to a terminal corresponding to a second user. FIG. 30 is a schematic flowchart 2 of an information processing method according to an embodiment of the present disclosure. As shown in FIG. 30, the information processing method includes:

Step 3001: Receive second information sent by a server, and output the second information in a conversation window, the second information being used to distribute a first quantity of distributable resources to a user in the conversation window.

Step 3002: Detect a first trigger operation on the second information, generate third information when the first trigger operation is a first-time operation on the second information in the conversation window, and send the third information to the server.

Step 3003: Obtain a timing status sent by the server, and generate and output a first interface including the timing status based on the first trigger operation.

Step 3004: Obtain a distributable resource distributed by the server when the timing status represents that a timing time is up, and output a specific display effect corresponding to a first attribute parameter.

In this embodiment, for a first user, a second user is a user that obtains a distributable resource distributed by the first user. In an implementation, a first user that distributes a first quantity of distributable resources may also be a second user. That is, a user that distributes an electronic red packet may also be one of the users that obtain an electronic red packet.

In this embodiment, when the second information sent by the server is received, the second information is output and displayed in the conversation window. The conversation window includes at least two users. The second information carries specific display effect data. The second information has a specific display effect based on the included display effect data. The specific display effect is, for example, a specific skin (the skin may be a static image, a dynamic image, or the like).

In this embodiment, when the second information is output and displayed by using the conversation window, the second user may perform a first trigger operation on the second information. A second terminal corresponding to the second user may generate third information based on the detected first trigger operation, and send the third information to the server. The third information represents that the second user triggers the second information for the first time. To distinguish a first-time operation from a non-first-time operation on the second information, information corresponding to an operation performed on the second information for the first time is marked as the third information, and information corresponding to an operation that is not performed on the second information for the first time is marked as the fourth information.

In this embodiment, when receiving at least one piece of third information, the server may determine, based on an order of receiving the third information, third information that is received for the first time. Further, the server starts a timer, and the timer starts countdown. Correspondingly, the second user obtains the timing status sent by the server, and displays the timing status by using the first interface output by the second terminal corresponding to the second user. When the first interface displays the timing status, the second terminal may trigger a timer of the second terminal based on the obtained timing status of the timer to start countdown. For example, the obtained timing status of the timer is that there are still 10 seconds. The second terminal triggers the timer of the second terminal to start countdown by 10 seconds. The counting of the timer of the second user is controlled to display the timing status in the first interface.

In an implementation, the second user may close the first interface by using an input operation, and return to the conversation window again; or may continue to stay in the first interface. After closing the first interface, the second user may still perform an input operation on the second information in the conversation window, so that the second terminal corresponding to the second user outputs and displays the first interface again. In this case, when the first trigger operation is a non-first-time operation on the second information in the conversation window, the method further includes: generating fourth information, and sending the fourth information to the server, the fourth information being used to request the timing status; and obtaining the timing status sent by the server, and generating and displaying the first interface including the timing status based on the first trigger operation.

In this embodiment, when determining that the timing time of the timer is up, that is, the countdown of the timer terminates, the server obtains the quantity of the second users that trigger the second information, determines sub-quantities of distributable resources obtained by the second users according to a preconfigured distribution rule, and sends a sub-quantity of distributable resources corresponding to each second user to the second user. Correspondingly, the second user obtains distributable resources that are distributed by the server and satisfy the sub-quantities when the timing time is up.

In an implementation, the obtaining a distributable resource distributed by the server when the timing time is up includes: obtaining a notification message sent by the server when the timing time is up, and outputting the notification message in the conversation window; and obtaining a distributable resource distributed by the server when a second trigger operation on the notification message is detected, and outputting an image that matches the first attribute parameter and includes a specific display effect. The specific display effect may be specifically at least one of the following effects: an explosion effect, a firework effect, a red packet effect, a preset expression effect, and the like.

In the technical solution in this embodiment of the present disclosure, a new information interaction solution about "Grab Red packet" is provided. When a second user triggers second information for the first time, a server starts a timer to start timing. That is, a user that triggers red packet information within a countdown timing time is marked as valid. A user that triggers red packet information before a timing time of the timer is up may obtain a red packet, thereby greatly shortening a time period of acquiring a distributable resource and improving the efficiency of information interaction. In another aspect, a specific display effect (for example, an explosion display effect, or a firework display effect) is displayed when the timing time of the timer is up, the lively atmosphere of information interaction is improved.

Figure 31:
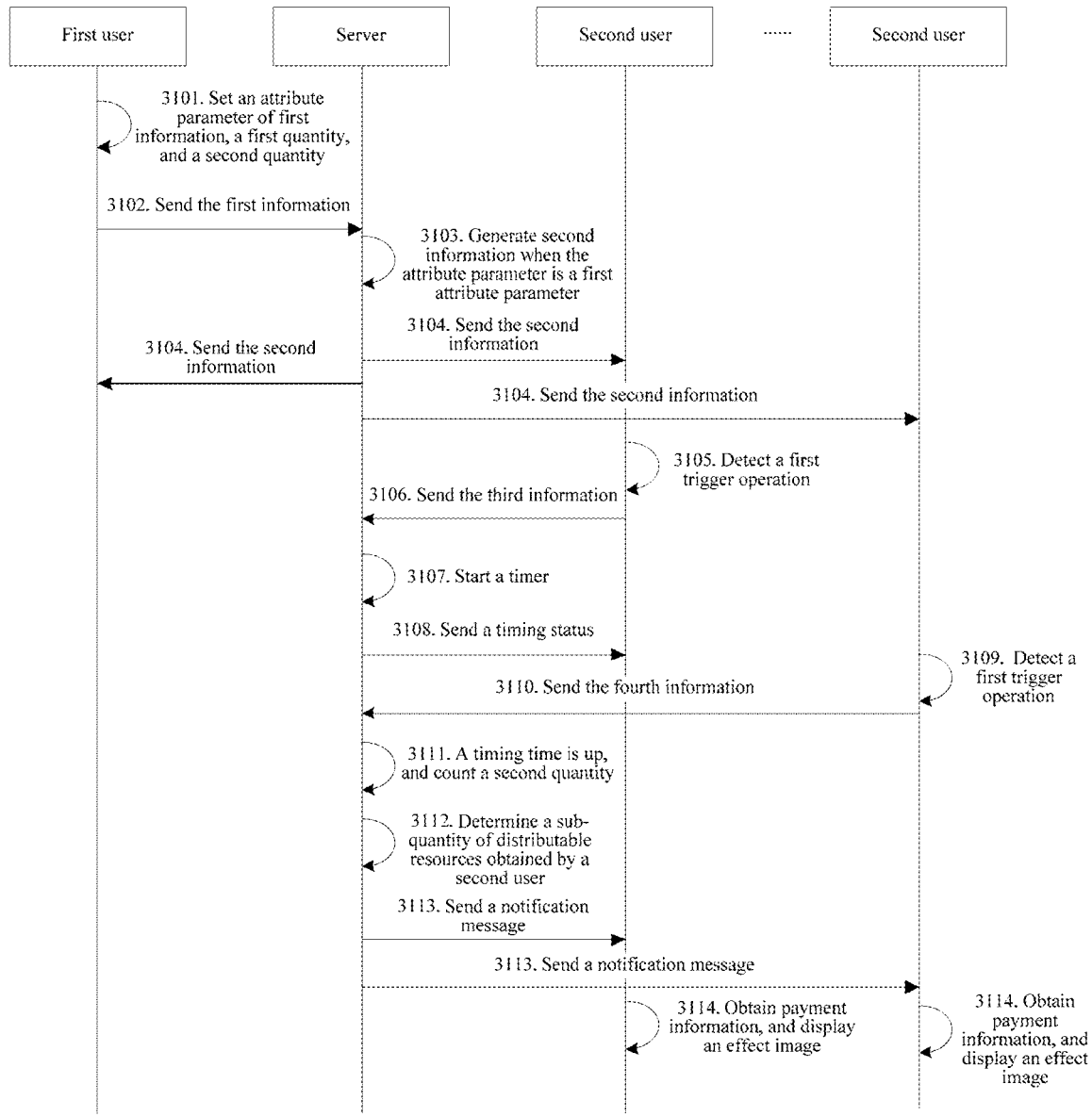
FIG. 31 is a schematic interaction diagram of an information processing method according to an embodiment of the present disclosure.

An embodiment of the present disclosure further provides an information processing method. FIG. 31 is a schematic interaction diagram of an information processing method according to an embodiment of the present disclosure. As shown in FIG. 31, the information processing method includes:

Step 3101: A first user sets an attribute parameter of first information, a first quantity representing a payment amount, and a second quantity representing second users to which a distributable resource can be distributed.

Here, the first user may set the attribute parameter as a first attribute parameter representing an explosion effect.

Step 3102: The first user sends the first information to a server, the first information including the attribute parameter, the first quantity, and the second quantity.

Step 3103: The server generates second information based on the first attribute parameter when determining that the attribute parameter is a first attribute parameter.

Here, the server invokes corresponding display effect data based on the first attribute parameter, and generates the second information based on the display effect data.

Step 3104: Send the second information to a conversation window that includes the first user and at least one second user. The first user corresponds to a first terminal, and the second user corresponds to a second terminal. That is, the server sends the second information to at least one second terminal corresponding to a group. The second information displayed in the conversation window has a specific display effect. The specific display effect is, for example, a specific skin (the skin may be a static image, a dynamic image, or the like).

Step 3105: The second user detects a first trigger operation, the first trigger operation being a trigger operation on the second information.

Step 3106: The second user generates third information and sends the third information to the server when the first trigger operation represents that the second information is triggered for the first time.

Step 3107: The server starts a timer based on the received third information.

Step 3108: The server sends a timing status of the timer to the second user.

Step 3109: After the timer is started till the timing time of the timer is up, another second user in the conversation window may also perform the first trigger operation on the second information, and a terminal corresponding to the another second user generates the fourth information based on that the first trigger operation is a non-first time trigger operation on the second information.

Step 3110: The another second user sends the fourth information to the server.

Step 3111: The server detects that a timing time is up, and counts a second quantity of second users that trigger the second information.

Step 3112: Determine, based on the second quantity and a preconfigured distribution rule, a sub-quantity of distributable resources obtained by each second user that triggers the second information.

Step 3113: The server sends a notification message to each second user that triggers the second information, the notification message including a sub-quantity of distributable resources obtained by a corresponding second user.

Step 3114: The second user obtains a corresponding sub-quantity of distributable resources by using the detected second trigger operation on the notification message after the notification message is obtained, and outputs an image that matches the first attribute parameter and includes the specific display effect.

In the technical solution in this embodiment of the present disclosure, a new information interaction solution about "Grab Red packet" is provided. When a second user triggers second information for the first time, a server starts a timer to start timing. That is, a user that triggers red packet information within a countdown timing time is marked as valid. A user that triggers red packet information before a timing time of the timer is up may obtain a red packet, thereby greatly shortening a time period of acquiring a distributable resource and improving the efficiency of information interaction. In another aspect, a specific display effect (for example, an explosion display effect, or a firework display effect) is displayed when the timing time of the timer is up, the lively atmosphere of information interaction is improved.

Figure 32:
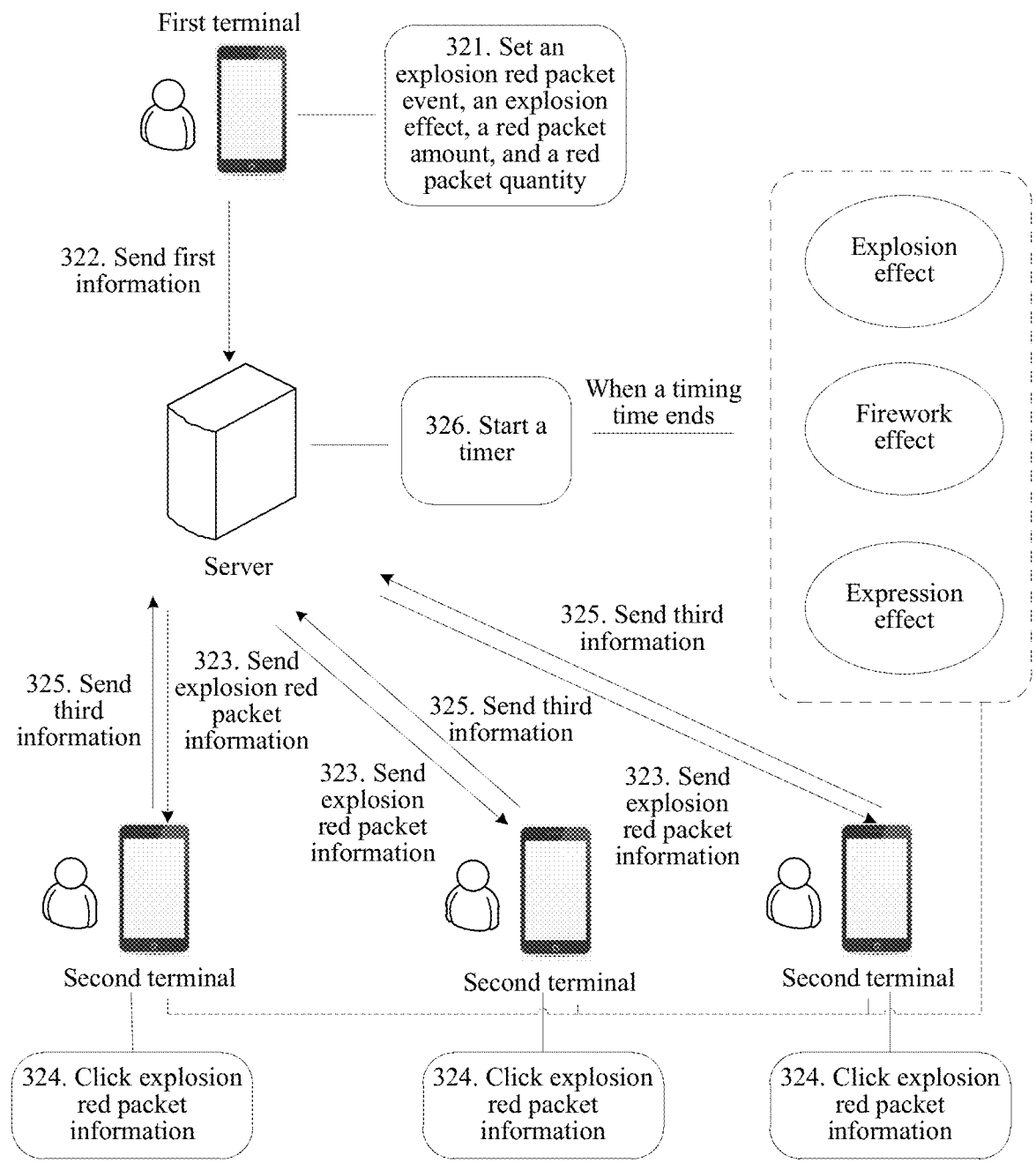
FIG. 32 is a schematic diagram of an interaction scenario of an information processing method according to an embodiment of the present disclosure.
Figures 33A, 33B, 33C:
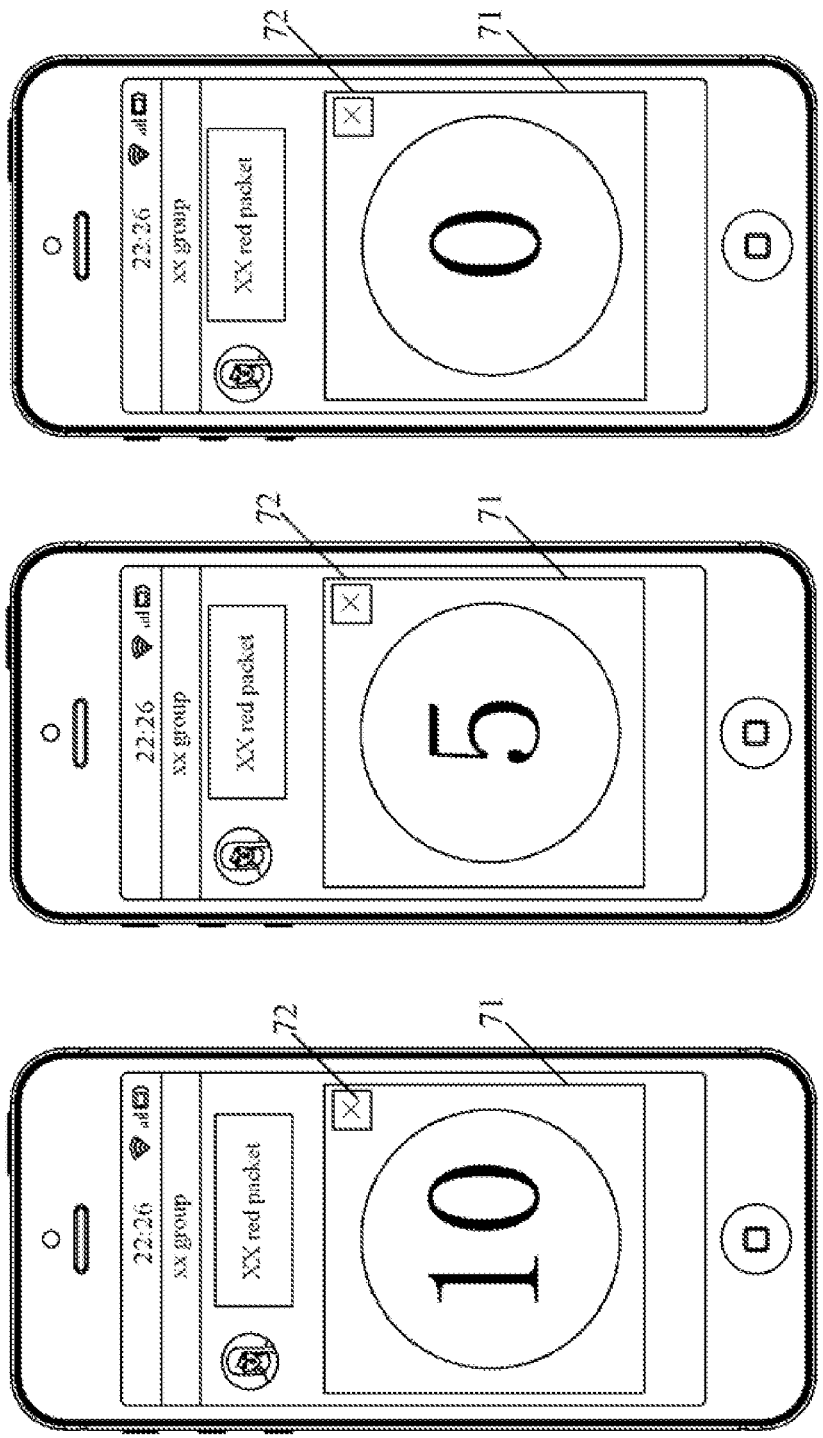
FIG. 33A, FIG. 33B and FIG. 33C are respectively schematic diagrams of application scenarios of a terminal according to an embodiment of the present disclosure.
Figure 34:
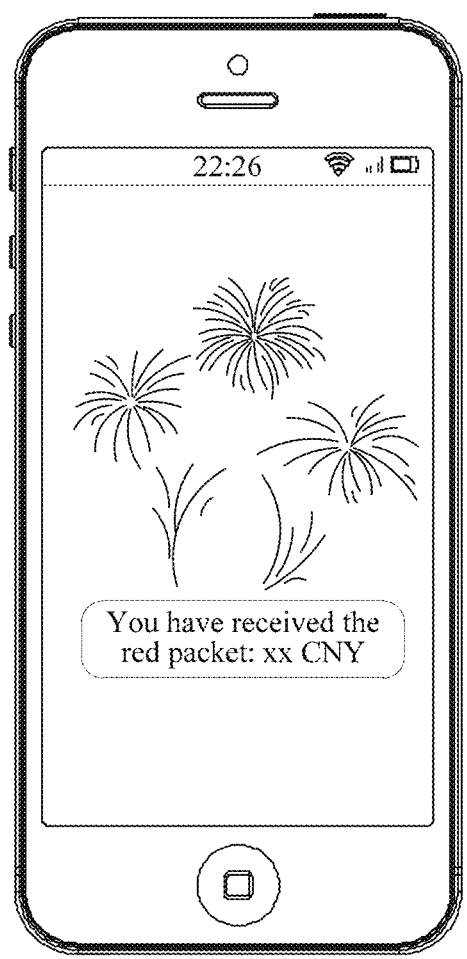
FIG. 34 is a schematic diagram of an application scenario of a terminal according to an embodiment of the present disclosure.

The information processing method in this embodiment of the present disclosure is specifically described below with reference to a specific application scenario of "Send red packet". FIG. 32 is a schematic diagram of an interaction scenario of an information processing method according to an embodiment of the present disclosure. FIG. 33A, FIG. 33B and FIG. 33C are respectively schematic diagrams of an application scenario of a terminal according to an embodiment of the present disclosure. FIG. 34 is a schematic diagram of another application scenario of a terminal according to an embodiment of the present disclosure. With reference to FIG. 32, FIG. 33A, FIG. 33B and FIG. 33C, and FIG. 34, the method includes:

Step 321: A red-packet sending user sets, by using a conversation window of a first terminal, an explosion red packet event, an explosion effect of an explosion red packet, a red packet amount, and a red packet quantity (the red packet quantity denotes a quantity of terminals to which red packets of the red packet amount can be distributed).

Step 322: Send first information to a server after the setting is completed.

Step 323: The red-packet sending user performs a payment operation on the explosion red packet event by using the first terminal. The payment operation may be payment performed based on a payment tool built in an application to which the conversation window belongs. After the payment is completed, the server records the explosion red packet event and an explosion effect, generates explosion red packet information based on the explosion red packet event, and sends the explosion red packet information to a second terminal corresponding to a red-packet receiving user in the conversation window.

Step 324: The conversation window displayed by the second terminal outputs the explosion red packet information. The explosion red packet information has a special display effect. The special display effect is, for example, a special skin effect that the explosion red packet information has. A user of the second terminal may click the explosion red packet information in the conversation window. This is equivalent to viewing the explosion red packet information. As shown in FIG. 33A to FIG. 33C, the terminal in FIG. 33A to FIG. 33C is used as the second terminal, and displays an "XX red packet" sent by a user of the first terminal. The user of the second terminal may click the "XX red packet" to view a red packet message. In this embodiment, the displayed "XX red packet" has a special display effect different from that of an ordinary red packet.

Step 325: The second terminal generates third information based on a click operation, and sends the third information to the server.

Step 326: The server receives the third information, and starts a timer to perform countdown when determining that the third information represents that the explosion red packet information is operated for the first time. A timing status of the timer is simultaneously sent to a second terminal that clicks the explosion red packet information.

The second terminal displays the timing status of the timer by using a first interface after receiving the timing status of the timer. As an example, the first interface displays counting of the countdown. As shown in FIG. 33A to FIG. 33C, a generated first interface 71 displays that the countdown is from 10 to 0. When the countdown reaches 0, it denotes that the countdown ends, that is, a timing time of the timer is up. In an implementation, the timing status of the timer may be represented by using another display manner, for example, a progress bar having a decreasing length. When the progress bar disappears, it may denote that the timing time of the timer is up. During actual applications, the second terminal may close the first interface by using an input operation and return to the conversation window. For example, as shown in FIG. 33A to FIG. 33C, a function button 72 used to close the first interface 71 may be set at the upper right corner of the first interface 71. The second terminal may close the first interface 71 when detecting an input operation on the function button 72, and return to the conversation window again. The first interface may also be maintained to wait till the countdown ends.

The server sends a notification message to the second terminal when determining that the timing of the timer terminates.

After the second terminal receives the notification message, the user of the second terminal clicks the notification message. The second terminal detects an input operation on the notification message, and obtains a result (which may include a result of "grabbed" and a result of "none grabbed") of grabbing a red packet.

When determining that the timing of the timer terminates, the server obtains a quantity of terminals that have viewed and triggered the explosion red packet information during the timing of the timer. When the quantity is greater than the red packet quantity set by the first terminal, extra terminals are randomly selected to be terminals that have grabbed no red packet. For users of second terminals that can obtain a red packet, a sub-electronic red packet amount obtained by a user of each second terminal may be determined according to a preconfigured random distribution manner or according to a proportional random distribution manner. The electronic currency satisfying the sub-electronic red packet amount is distributed to a user of a corresponding second terminal.

In this embodiment, regardless of whether a result of grabbing a red packet of a user of a second terminal is "grabbed" or "none grabbed", when detecting an input operation on the notification message, that is, opening a "red packet", the second terminal displays an image including a specific display effect. The specific display effect may specifically include at least one of the following effects: an explosion effect, a firework effect, an expression effect, and the like. As an example, as shown in FIG. 34, an explosion or firework display effect is displayed. Correspondingly, for a second terminal that obtains a corresponding sub-red packet, an amount of the obtained sub-red packet is further displayed. For example, prompt information displaying that "You have received a red packet of XX CNY" in FIG. 34 is displayed.

In an implementation, when explosion red packet information in the conversation window has not been operated by a user of any second terminal within a preset time (for example, 24 hours), the server refunds the amount of the electronic currency to a user of the first terminal.

Figure 35:
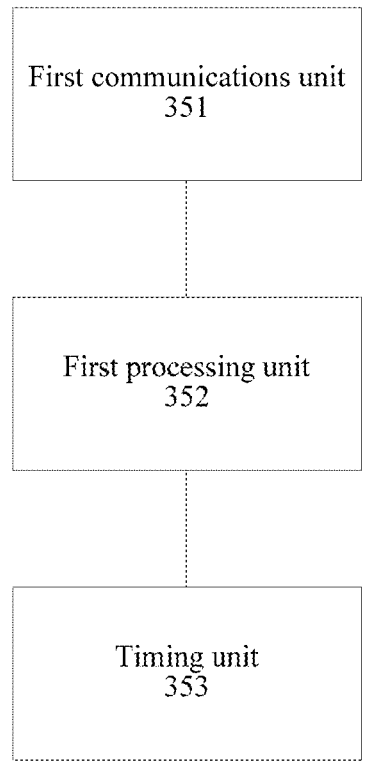
FIG. 35 is a schematic structural composition diagram of a server of according to an embodiment of the present disclosure.

An embodiment of the present disclosure further provides a server. FIG. 35 is a schematic structural composition diagram of a server of according to an embodiment of the present disclosure. As shown in FIG. 35, the server includes: a first communications unit 351, a first processing unit 352, and a timing unit 353.

The first communications unit 351 is configured to: obtain first information that is sent by a first user and includes an attribute parameter, the first information being information about a first quantity of distributable resources distributed by the first user to at least one second user, and send the first information to the first processing unit 352.

The first processing unit 352 is configured to generate second information based on a first attribute parameter when the attribute parameter is the first attribute parameter.

The first communications unit 351 is further configured to send the second information to a group to which the first user and the at least one second user belong, the second information displayed in a conversation window corresponding to the group having a specific display effect; and is further configured to: trigger the second information by using the second user for the first time and receive third information generated by the second user based on a triggering behavior, the third information representing that the second information is triggered for the first time.

The first processing unit 352 is further configured to enable the timing unit 353 to start after the first communications unit 351 receives the third information, to obtain a timing status of the timing unit 353.

The first communications unit 351 is further configured to send the timing status of the timing unit 353 to the second user; and is further configured to obtain, within a timing time of the timing unit 353, a second quantity of second users that trigger the second information.

The first processing unit 352 is further configured to distribute, based on the second quantity and a preconfigured distribution rule, the first quantity of distributable resources to the second users that trigger the second information within the timing time of the timing unit 353.

In an implementation, the first communications unit 351 is further configured to receive fourth information sent by the second user within the timing time of the timing unit 353, the fourth information representing that the second information is not triggered by the second user for the first time.

The first processing unit 352 is further configured to obtain the timing status of the timing unit 353 after the first communications unit 351 receives the fourth information.

The first communications unit 351 is further configured to send the timing status of the timing unit 353 to the second user.

In an implementation, the first information further includes a third quantity, the third quantity representing a quantity of second users to which the first quantity of distributable resources can be distributed.

The first processing unit 352 is further configured to: randomly select second users satisfying the third quantity from the second users that trigger the second information when the second quantity is greater than the third quantity, and distribute the first quantity of distributable resources to the second users that trigger the second information based on the third quantity and a preconfigured distribution rule.

In an implementation, the first processing unit 352 is further configured to randomly distribute the first quantity of distributable resources according to the second quantity when the second quantity is not greater than the third quantity, and obtain a first subquantity of distributable resources satisfying the second quantity;

the first communications unit 351 is further configured to respectively send the first subquantity of distributable resources to the corresponding second users that trigger the second information; or the first processing unit 352 is further configured to: evenly distribute the first quantity of distributable resources based on the quantity of second users to which the first quantity of distributable resources can be distributed when the second quantity is not greater than the third quantity, to obtain a second subquantity of distributable resources; and the first communications unit 351 is further configured to respectively send the second subquantity of distributable resources to the second users that trigger the second information.

A person skilled in the art should understand that the functions of the processing units in the server in this embodiment of the present disclosure may be understood by referring to the related description of the foregoing information processing method. The processing units in the server in this embodiment of the present disclosure may be implemented by using a simulated circuit for implementing the functions in this embodiment of the present disclosure, and may alternatively be implemented through the running of software for executing the functions in this embodiment of the present disclosure on a smart terminal.

In this embodiment, the first processing unit 352 and the timing unit 353 in the server may both be implemented by a central processing unit (CPU), a digital signal processor (DSP) or a field-programmable gate array (FPGA) in the server during actual applications. The first communications unit 351 in the server, may be implemented by using a communications component in the server during actual applications.

Figure 36:
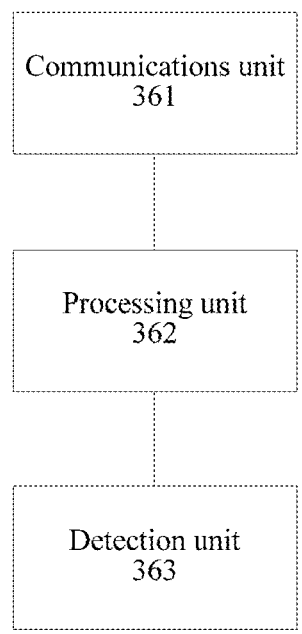
FIG. 36 is a schematic structural composition diagram of a terminal according to an embodiment of the present disclosure.

An embodiment of the present disclosure further provides a terminal. The terminal is a second terminal. FIG. 36 is a schematic structural composition diagram of a terminal according to an embodiment of the present disclosure. As shown in FIG. 36, the terminal includes: a communications unit 361, a processing unit 362, and a detection unit 363.

The communications unit 361 is configured to receive second information sent by a server.

The processing unit 362 is configured to output the second information, the second information being used to distribute a first quantity of distributable resources to a user in a conversation window.

The detection unit 363 is configured to detect a first trigger operation on the second information.

The processing unit 362 is further configured to generate third information when determining that the first trigger operation is a first-time operation on the second information in the conversation window.

The communications unit 361 is further configured to send the third information to the server; is further configured to: obtain a timing status sent by the server, and send the timing status to the second processing unit 362; and is further configured to obtain a distributable resource distributed by the server when the timing status represents that a timing time is up.

The processing unit 362 is further configured to generate and output a first interface including the timing status based on the first trigger operation; and is further configured to: obtain a distributable resource distributed by the server when the timing status represents that the timing time is up, and output a specific display effect corresponding to a first attribute parameter.

In an implementation, the processing unit 362 is further configured to generate the fourth information when the first trigger operation is a non-first-time operation on the second information in the conversation window, the fourth information being used to request the timing status;

the communications unit 361 is further configured to send the fourth information to the server; and is further configured to obtain a timing status sent by the server; and the processing unit 362 is further configured to generate and display the first interface including the timing status based on the first trigger operation.

In an implementation, the communications unit 361 is configured to obtain a notification message sent by the server when the timing time is up, and send the notification message to the processing unit 362;

the processing unit 362 is further configured to output the notification message in the conversation window;

the detection unit 363 is further configured to detect a second trigger operation on the notification message; and the processing unit 362 is further configured to: obtain a distributable resource distributed by the server when the detection unit 363 detects the second trigger operation, and output an image that matches the first attribute parameter and includes the specific display effect.

A person skilled in the art should understand that the functions of the processing units in the terminal in this embodiment of the present disclosure may be understood by referring to the related description of the foregoing information processing method. The processing units in the terminal in this embodiment of the present disclosure may be implemented by using a simulated circuit for implementing the functions in this embodiment of the present disclosure, and may alternatively be implemented through the running of software for executing the functions in this embodiment of the present disclosure on a smart terminal.

In this embodiment, a terminal (including a first terminal and a second terminal) may be implemented by using a terminal such as a mobile phone, a desktop computer, a PC, an all-in-one PC during actual applications. The processing unit 362 and the detection unit 363 in the terminal may both be implemented by using a CPU, a DSP or an FPGA in the terminal during actual applications. The communications unit 361 in the terminal may be implemented by using a communications component in the terminal during actual applications.

Figure 37:
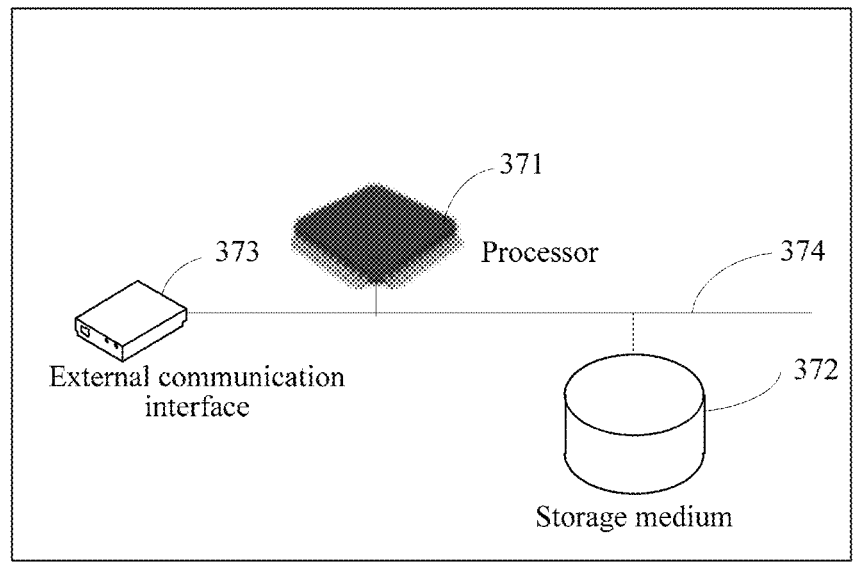
FIG. 37 is a schematic composition diagram of using a server/terminal as a hardware entity according to an embodiment of the present disclosure.

In this embodiment, the terminal and the server are shown in FIG. 37 as one example of hardware entities. The terminal/server includes a processor 371, a storage medium 372, and at least one external communication interface 373. The processor 371, the storage medium 372, and the external communication interface 373 are all connected through a bus 374.

It should be noted here that the foregoing descriptions related to a server are similar to the foregoing method descriptions. The descriptions of beneficial effects same as those of methods are omitted here. Refer to the description of the method embodiments of the present disclosure for technical details that are not disclosed in server embodiments of the present disclosure.

An embodiment of the present disclosure further provides an information recommendation method. Related terms in this embodiment of the present disclosure are explained and described as follows:

Big data analysis: In big data analysis, a large amount of collected data is analyzed by using specific statistical and analytical methods, so as to extract useful information and form conclusions to perform detailed research and summarization on data.

Voucher: A voucher is a discount activity launched by a merchant. A voucher can be used as cash equal in value at physical or online stores.

Coupon: A coupon is a ticket that can be redeemed by a holder for a special right when purchasing a commodity or taking part in other business activities, and may be a physical ticket or a mark for a special agreement (for example, code used on the Internet).

Buy at a discount: "Buy at a discount" means an actual paid amount is less than an actual denomination of a commodity or a virtual item.

The implementations of the technical solutions are further described below in detail with reference to the accompanying drawings.

Figure 38:
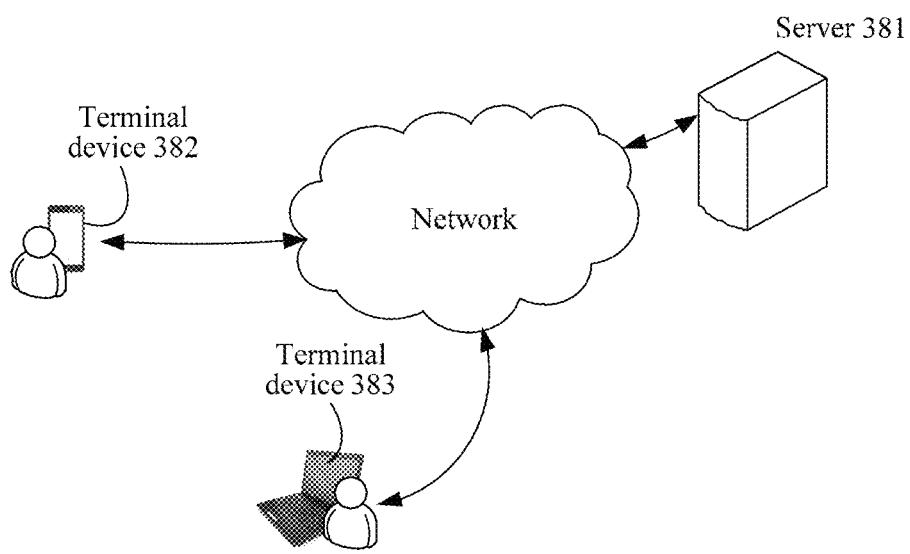
FIG. 38 is a schematic diagram of all hardware entities that perform information interaction according to an embodiment of the present disclosure.

FIG. 38 is a schematic diagram of all hardware entities that perform information interaction according to an embodiment of the present disclosure. As shown in FIG. 38, FIG. 38 includes: a server 381 and terminal devices 382 and 383. The terminal devices 382 and 383 perform information interaction with the server 381 through a wired network or wireless network. The terminal devices 382 and 383 include a type such as a mobile phone, a desktop computer, a PC, and an all-in-one PC. Instant messaging clients are installed on the terminal devices 382 and 383. The terminal device 382 and the terminal device 383 may perform instant messaging by using the server 381. When the terminal device 382 and the terminal device 383 perform instant messaging, a first user corresponding to the terminal device 382 may send a red packet to a second user corresponding to the terminal device 383. In an example, the server 381 interacts with the terminal device 382 (for example, a terminal of a user that distributes a red packet) through a network, to obtain first information sent by the first user corresponding to the terminal device 382. The first information may specifically include: a red packet amount. The server 381 may further interact with the terminal device 383 (for example, a terminal of a user that receives a red packet) through a network, to obtain a red-packet opening request sent by the second user corresponding to the terminal device 383, acquire, according to a red packet amount and user data of the second user, second information recommended to the second user. The second information may specifically include: a voucher, a coupon, or the like. The server 381 sends the first information and the second information to the second user corresponding to the terminal device 383. In this embodiment of the present disclosure, when the second user opens a red packet, not only information about the amount in the red packet can be obtained, but also information about a personalized voucher, coupon, or the like recommended by the server to the second user based on the user data of the second user can be obtained, so that a precise voucher or coupon is recommended to a user based on a red packet. The second user may choose to accept a red packet or accept a voucher or coupon.

The foregoing example in FIG. 38 is merely an example of a system architecture for implementing the embodiments of the present disclosure. The embodiments of the present disclosure are not limited to the foregoing system structure in FIG. 38. Various embodiments of the present disclosure are provided based on the system architecture.

Figure 39:
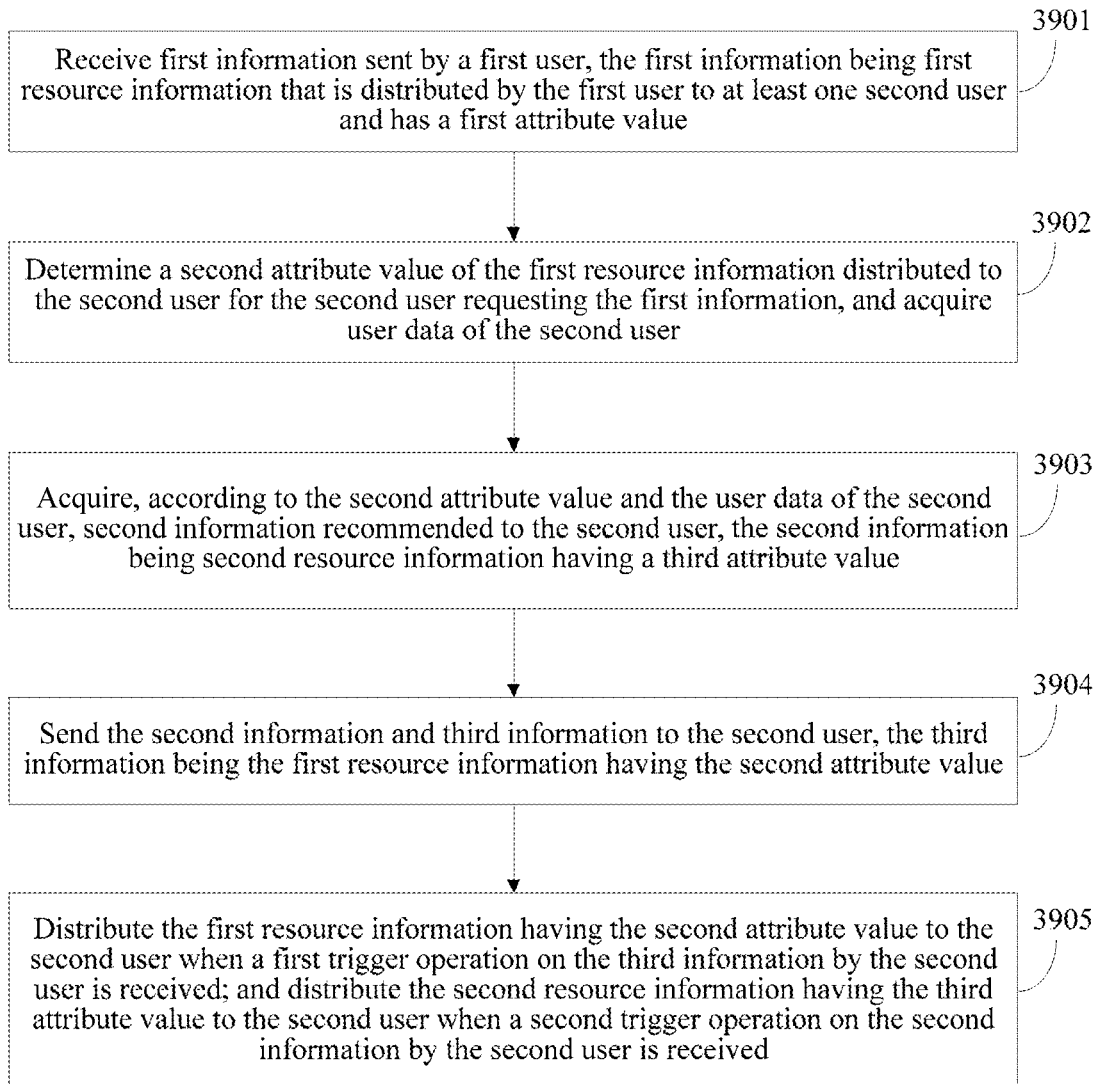
FIG. 39 is a schematic flowchart 1 of an information recommendation method according to an embodiment of the present disclosure.

FIG. 39 is a schematic flowchart 1 of an information recommendation method according to an embodiment of the present disclosure. The information recommendation method in this example is applied to a server side. As shown in FIG. 39, the information recommendation method includes the following steps:

Step 3901: Receive first information sent by a first user, the first information being first resource information that is distributed by the first user to at least one second user and has a first attribute value.

In this embodiment of the present disclosure, the first user performs information interaction with another device (for example, a second client, and a server) by using a first client. The second user performs information interaction with another device (for example, the first client, and the server) by using the second client. Here, a client is installed on a terminal device. The client is an instant messaging (IM) client. A user may apply for an account by using an IM client, then log in to the IM client by using the account, and acquire an IM function provided by the IM client to the user. Here, the IM function includes: a chat function, a video function, a file transfer function, a red-packet distribution function, and the like. Different users correspond to different accounts, and an account may be used to distinguish and uniquely represent a user. For example, a user A may log in to the IM client by using an account a. A user B may log in to the IM client by using an account b. The user A may add a contact B in the IM client (which is specifically implemented by adding the account b of the contact B). One user may add a plurality of contacts to a contact list of the user. Certainly, the user A may further set groups in the IM client to which the user A logs in. Contacts having a same characteristic may be added to each group, for example, a family group, a work group, or an entertainment group. When wanting to chat with the contact B, the user A may choose the contact B from the contact list. A chat window between the user A and the contact B then pops up from the IM client. Subsequently, the user A may chat with the contact B in the chat window.

In this embodiment of the present disclosure, the first information is first resource information that is distributed by the first user to at least one second user and has a first attribute value. Here, the first resource information may be a red packet. Correspondingly, the first attribute value may be an amount of a red packet. When the first user sends a red packet to one second user, the first user and a first client corresponding to the first user need to perform the following operations: The first user chooses the second user in the first client and opens a chat window with the second user. The first user chooses a red packet function in the chat window, inputs an amount that needs to be sent, and sends a red packet having information about the amount to the server. When the first user sends a red packet to a plurality of second users, the first user and the first client corresponding to the first user need to perform the following operations: The first user chooses one group in the first client. Users other than the first user in the group are all referred to as second users. A chat window of the group is then opened. The first user chooses a red packet function in the chat window, inputs a total amount (that is, a first attribute value) that needs to be sent and a red packet quantity (that is, a quantity of the second users), and sends information about the total amount and the red packet quantity to the server.

Step 3902: Determine a second attribute value of the first resource information distributed to the second user for the second user requesting the first information, and acquire user data of the second user.

In this embodiment of the present disclosure, when the first resource information having the first attribute value is distributed to one second user, the second attribute value distributed to the one second user is the same as the first attribute value.

When the first resource information having the first attribute value is distributed to a plurality of the second users, a sum of second attribute values distributed to the plurality of the second users is the same as the first attribute value or is less than the first attribute value.

In this embodiment of the present disclosure, the user data at least includes: user basic information and/or user behavior information and/or user relationship chain information. In addition, the user data may further include: user credibility information.

The user basic information is, for example, the age, gender, and region of a user. The user behavior information is, for example, whether a user likes shopping or likes playing games, and whether a user is interested in information content of an advertisement. The user relationship chain information is, for example, a QQ friend chain, a WeChat friend circle, QQ zone friends, high school classmates, university classmates, and the network of connections. The user credibility information is, for example, bank transaction records, and student information.

It may be seen that the user basic information represents the natural attributes of a user. The user behavior information represents the long-term interests of a user. The user relationship chain information represents social friends of a user and the interests of the social friends. The user credibility information represents the monetary transaction records of users.

Step 3903: Acquire, according to the second attribute value and the user data of the second user, second information recommended to the second user, the second information being second resource information having a third attribute value.

In this embodiment of the present disclosure, the server analyzes big data of user data of each user. Specifically, models are established according to data such as user profiles, spending habits, and friendships. The models are analyzed and mined. Big data analysis methods are used to draw a self-portrait (the self-portrait includes all personalized tags of the user) for each user, and keyword tags such as "education", "exercise", "reading", "dating", and "shopping" are attached. In this case, each user has a self-portrait representing personalized traits.

Based on this, the server recommends personalized information, that is, second information, to a second user according to an amount of a red packet obtained by the second user and a self-portrait of the second user. Here, the second information is second resource information having a third attribute value. The second resource information may be a voucher, a coupon, or the like. The third attribute value is the actual value of a voucher or coupon. The second resource information and the first resource information are different resources. Generally, the actual value of second information recommended to a user may be equal to a second attribute value, or the actual value of second information recommended to a user is higher than a second attribute value. In this case, second users can be encouraged to consume the second information. It should be noted that, an object recommended at a premium is not necessarily a voucher or coupon, and may alternatively be a virtual currency, a membership bonus point, a value-added service, gaming equipment, or the like. As compared with the first information, the second information may be regarded as a commodity.

In this embodiment of the present disclosure, both user data of the second user and the second attribute value are combined in the second information recommended to the second user. In this case, it can be ensured that the second information recommended to the second user and the second attribute value are essentially in the same value range, and personalized requirements of second users are satisfied, so that precise information recommendation is implemented.

Step 3904: Send the second information and third information to the second user, the third information being the first resource information having the second attribute value.

In this embodiment of the present disclosure, the server sends the second information and the third information to the second user, so that the second user freely chooses to accept the second information or accept the third information. Here, the second information is a commodity that is recommended by the server to a user and matches the value of the third information, for example, a commodity whose value is equal to the value of the third information or a commodity whose value is higher than the value of the third information. The commodity also meets personalized requirements of the second user.

A red packet and a voucher are used as an example. The third information is a red packet valued 80 CNY. This red packet valued 80 CNY is sent by a user A to a user B. The server first determines that an amount of the red packet obtained by the user B is 80 CNY after receiving the first information, acquires user data of the user B, and finds through big data analysis that the user B likes hot pots of a merchant C. The server recommends a hot pot voucher valued 100 CNY of the merchant C to the user B. The server then sends the red packet valued 80 CNY and the hot pot voucher valued 100 CNY of the merchant C together to the user B. The user B may choose to accept the red packet valued 80 CNY or accept the hot pot voucher valued 100 CNY of the merchant C.

In this embodiment of the present disclosure, a server may recommend one or more pieces of second information to a second user. When a server recommends a plurality of pieces of second information to a second user, the plurality of pieces of second information may be arranged in a descending order of priority and displayed on a second client corresponding to the second user. The order of priority is obtained by the server by performing big data analysis according to user data. For example, a user likes products having a same function to different degrees. A product that the user likes better has a priority higher than that of a product that the user likes less.

Step 3905: Distribute the first resource information having the second attribute value to the second user when a first trigger operation on the third information by the second user is received; and distribute the second resource information having the third attribute value to the second user when a second trigger operation on the second information by the second user is received.

Here, when a plurality of pieces of second information are recommended to the second user, the server receives a selection operation of the second user on the plurality of pieces of second information, where the second information that the second user intends to exchange can be determined by using the selection operation.

In this embodiment of the present disclosure, a second user may choose to accept the second information or accept the third information after receiving, on the second client, the second information and the third information sent by the server. If the second user wants to accept the third information sent by the first user, the second user implements the first trigger operation on the third information. The server distributes the first resource information having the second attribute value to the second user when receiving the first trigger operation of the second user on the third information. If the second user wants to accept the second information the server recommended by the server, the second user implements the second trigger operation on the second information. The server distributes the second resource information having the third attribute value to the second user when receiving the second trigger operation of the second user on the second information.

It should be noted that the server distributes the second resource information having the third attribute value to the second user, and at the same time distributes the first resource information having the second attribute value to an issuer of the second resource information.

A red packet and a voucher are used as an example. The third information is a red packet valued 80 CNY. The red packet valued 80 CNY is sent by a user A to a user B. The second information is a hot pot voucher valued 100 CNY of a merchant C. If the user B chooses to accept the red packet valued 80 CNY, the server stores an amount of the red packet valued 80 CNY in a wallet account of the user B. If the user B chooses to accept the hot pot voucher valued 100 CNY of the merchant C, the server stores the hot pot voucher valued 100 CNY of the merchant C in a card account of the user B, and at the same time transfers the red packet valued 80 CNY to an account of the merchant C.

In the technical solution in this embodiment of the present disclosure, receiving and sending of red packets are combined with recommendation of other virtual commodities. A virtual commodity to be recommended is obtained by a server by performing big data analysis on user data. Therefore, the objective of precise recommendation is achieved. For an application scenario in which a virtual commodity is a coupon or voucher, a solution that achieves precise and direct targeting and personalized issuing of merchant coupons or vouchers is provided, thereby effectively resolving the problems that merchant coupons or vouchers are fuzzily issued and have low use rates. By using this embodiment of the present disclosure, benefits are offered to users, and users can buy commodity coupons or vouchers at a discount; the conversion efficiency of merchant coupons or vouchers is enhanced, and the exposure of merchant brands is improved; and advertising revenues of Internet platforms are increased.

Figure 40:
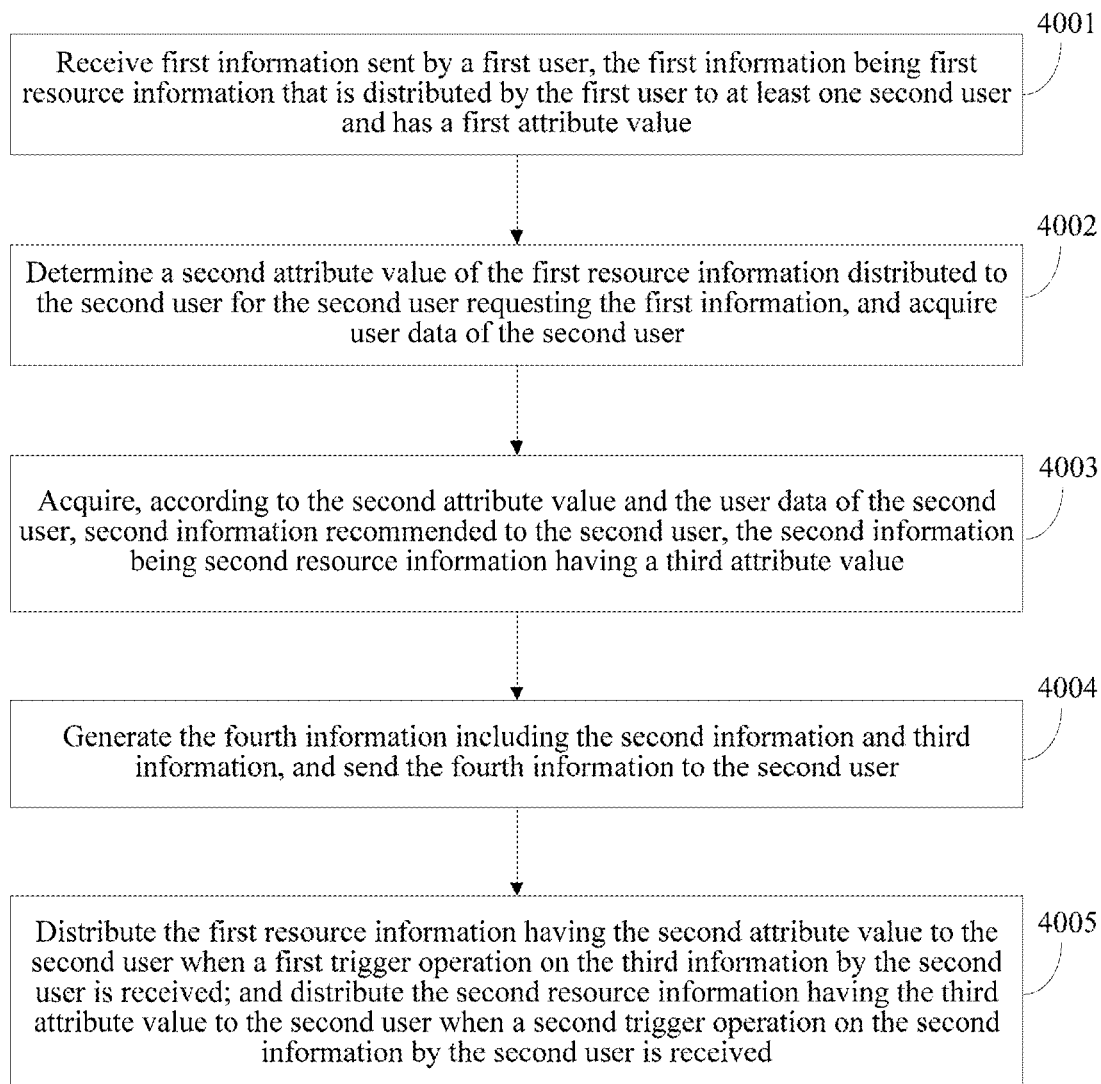
FIG. 40 is a schematic flowchart 2 of an information recommendation method according to an embodiment of the present disclosure.

FIG. 40 is a schematic flowchart 2 of an information recommendation method according to an embodiment of the present disclosure. In this example, the information recommendation method applied to a server side, as shown in FIG. 40, the information recommendation method include the following steps:

Step 4001: Receive first information sent by a first user, the first information being first resource information that is distributed by the first user to at least one second user and has a first attribute value.

In this embodiment of the present disclosure, the first information is first resource information that is distributed by the first user to at least one second user and has a first attribute value. Here, the first resource information may be a red packet. Correspondingly, the first attribute value may be an amount of a red packet. When the first user sends a red packet to one second user, the first user and a first client corresponding to the first user need to perform the following operations: The first user chooses the second user in the first client and opens a chat window with the second user. The first user chooses a red packet function in the chat window, inputs an amount that needs to be sent, and sends a red packet having information about the amount to the server. When the first user sends a red packet to a plurality of second users, the first user and the first client corresponding to the first user need to perform the following operations: The first user chooses one group in the first client. Users other than the first user in the group are all referred to as second users. A chat window of the group is then opened. The first user chooses a red packet function in the chat window, inputs a total amount (that is, a first attribute value) that needs to be sent and a red packet quantity (that is, a quantity of the second users), and sends information about the total amount and the red packet quantity to the server.

Step 4002: Determine a second attribute value of the first resource information distributed to the second user for the second user requesting the first information, and acquire user data of the second user.

In this embodiment of the present disclosure, when the first resource information having the first attribute value is distributed to one second user, the second attribute value distributed to the one second user is the same as the first attribute value.

When the first resource information having the first attribute value is distributed to a plurality of the second users, a sum of second attribute values distributed to the plurality of the second users is the same as the first attribute value or is less than the first attribute value.

In this embodiment of the present disclosure, the user data at least includes: user basic information and/or user behavior information and/or user relationship chain information. In addition, the user data may further include: user credibility information.

The user basic information is, for example, the age, gender, and region of a user. The user behavior information is, for example, whether a user likes shopping or likes playing games, and whether a user is interested in information content of an advertisement. The user relationship chain information is, for example, a QQ friend chain, a WeChat friend circle, QQ zone friends, high school classmates, university classmates, and the network of connections. The user credibility information is, for example, bank transaction records, and student information.

Step 4003: Acquire, according to the second attribute value and the user data of the second user, second information recommended to the second user, the second information being second resource information having a third attribute value.

In this embodiment of the present disclosure, the server analyzes big data of user data of each user. Specifically, models are established according to data such as user profiles, spending habits, and friendships. The models are analyzed and mined. Big data analysis methods are used to draw a self-portrait (the self-portrait includes all personalized tags of the user) for each user, and keyword tags such as "education", "exercise", "reading", "dating", and "shopping" are attached. In this case, each user has a self-portrait representing personalized traits.

Based on this, the server recommends personalized information, that is, second information, to a second user according to an amount of a red packet obtained by the second user and a self-portrait of the second user. Here, the second information is second resource information having a third attribute value. The second resource information may be a voucher, a coupon, or the like. The third attribute value is the actual value of a voucher or coupon. The second resource information and the first resource information are different resources. Generally, the actual value of second information recommended to a user may be equal to a second attribute value, or the actual value of second information recommended to a user is higher than a second attribute value. In this case, second users can be encouraged to consume the second information. It should be noted that, an object recommended at a premium is not necessarily a voucher or coupon, and may alternatively be a virtual currency, a membership bonus point, a value-added service, gaming equipment, or the like. As compared with the first information, the second information may be regarded as a commodity.

In this embodiment of the present disclosure, both user data of the second user and the second attribute value are combined in the second information recommended to the second user. In this case, it can be ensured that the second information recommended to the second user and the second attribute value are essentially in the same value range, and personalized requirements of second users are satisfied, so that precise information recommendation is implemented.

Step 4004: Generate the fourth information including the second information and third information, and send the fourth information to the second user.

In this embodiment of the present disclosure, the server sends the fourth information to the second user. The fourth information includes the second information and the third information, so that the second user can freely choose to accept the second information or accept the third information. Here, the second information is a commodity that is recommended by the server to a user and matches the value of the first information, for example, a commodity whose value is equal to the value of the third information or commodity whose value is higher than the value of the third information, and the commodity meets personalized requirements of the second user.

A red packet and a voucher are used as an example. The third information is a red packet valued 80 CNY. This red packet valued 80 CNY is sent by a user A to a user B. The server first determines that an amount of the red packet obtained by the user B is 80 CNY after receiving the first information, acquires user data of the user B, and finds through big data analysis that the user B likes hot pots of a merchant C. The server recommends a hot pot voucher valued 100 CNY of the merchant C to the user B. The server then sends the red packet valued 80 CNY and the hot pot voucher valued 100 CNY of the merchant C together to the user B. The user B may choose to accept the red packet valued 80 CNY or accept the hot pot voucher valued 100 CNY of the merchant C.

In this embodiment of the present disclosure, a server may recommend one or more pieces of second information to a second user. When a server recommends a plurality of pieces of second information to a second user, the plurality of pieces of second information may be arranged in a descending order of priority and displayed on a second client corresponding to the second user. The order of priority is obtained by the server by performing big data analysis according to user data. For example, a user likes products having a same function to different degrees. A product that the user likes better has a priority higher than that of a product that the user likes less.

A red packet is used as an example. The fourth information may be understood as an envelope of a red packet. The third information may be understood as cash in a red packet. The second information may be understood as a voucher in a red packet. Here, the fourth information has a specific presentation effect. Specifically, the fourth information has a first presentation effect (corresponding to an unopened state of a red packet) and a second presentation effect (corresponding to an opened state of a red packet).

When a third trigger operation of the second user on the fourth information has not been received, the fourth information corresponding to the first presentation effect, and the first presentation effect is to hide the second information and the third information included in the fourth information.

When a third trigger operation of the second user on the fourth information is received, the fourth information corresponds to the second presentation effect, and the second presentation effect is to expose the second information and the third information included in the fourth information.

A red packet is used as an example. When the fourth information is sent to the second user, a graphical interface of a red packet is presented according to a display state (corresponding to the first presentation effect) that the red packet is not opened. Next, when an open operation of the second user on the red packet has not been received, the graphical interface of the red packet is still presented according to the display state (corresponding to the first presentation effect) that the red packet is not opened. The graphical interface of the red packet is presented according to a display state (corresponding to the second presentation effect) that the red packet is opened only when an open operation of the second user on the red packet is received.

Here, when a red packet is not opened, an amount (corresponding to the third information) of the red packet and a recommended cash voucher or coupon (corresponding to the second information) are hidden. After the red packet is opened, the amount (corresponding to the third information) of the red packet and the recommended cash voucher or coupon (corresponding to the second information) are exposed, so that the second user can view the amount of the red packet and the recommended cash voucher or coupon. A user may choose to accept one of the two pieces of content, as in step 4005 below.

Step 4005: Distribute the first resource information having the second attribute value to the second user when a first trigger operation on the third information by the second user is received; and distribute the second resource information having the third attribute value to the second user when a second trigger operation on the second information by the second user is received.

Here, when a plurality of pieces of second information are recommended to the second user, the server receives a selection operation of the second user on the plurality of pieces of second information, where the second information that the second user intends to exchange can be determined by using the selection operation.

In this embodiment of the present disclosure, the second user may choose to accept the second information or accept the third information after receiving, on the second client, the fourth information sent by the server. If the second user wants to accept the third information, the second user implements the first trigger operation on the third information, and the server distributes the first resource information having the second attribute value to the second user when receiving the first trigger operation of the second user on the third information. If the second user wants to accept the second information recommended by the server, the second user implements the second trigger operation on the second information, and the server distributes the second resource information having the third attribute value to the second user when receiving the second trigger operation of the second user on the second information.

It should be noted that the server distributes the second resource information having the third attribute value to the second user, and at the same time distributes the first resource information having the second attribute value to an issuer of the second resource information.

A red packet and a voucher are used as an example. The third information is a red packet valued 80 CNY. The red packet valued 80 CNY is sent by a user A to a user B. The second information is a hot pot voucher valued 100 CNY of a merchant C. If the user B chooses to accept the red packet valued 80 CNY, the server stores an amount of the red packet valued 80 CNY in a wallet account of the user B. If the user B chooses to accept the hot pot voucher valued 100 CNY of the merchant C, the server stores the hot pot voucher valued 100 CNY of the merchant C in a card account of the user B, and at the same time transfers the red packet valued 80 CNY to an account of the merchant C.

In the technical solution in this embodiment of the present disclosure, receiving and sending of red packets are combined with recommendation of other virtual commodities. A virtual commodity to be recommended is obtained by a server by performing big data analysis on user data. Therefore, the objective of precise recommendation is achieved. For an application scenario in which a virtual commodity is a coupon or voucher, a solution that achieves precise and direct targeting and personalized issuing of merchant coupons or vouchers is provided, thereby effectively resolving the problems that merchant coupons or vouchers are fuzzily issued and have low use rates. By using this embodiment of the present disclosure, benefits are offered to users, and users can buy commodity coupons or vouchers at a discount; the conversion efficiency of merchant coupons or vouchers is enhanced, and the exposure of merchant brands is improved; and advertising revenues of Internet platforms are increased.

Figure 41:
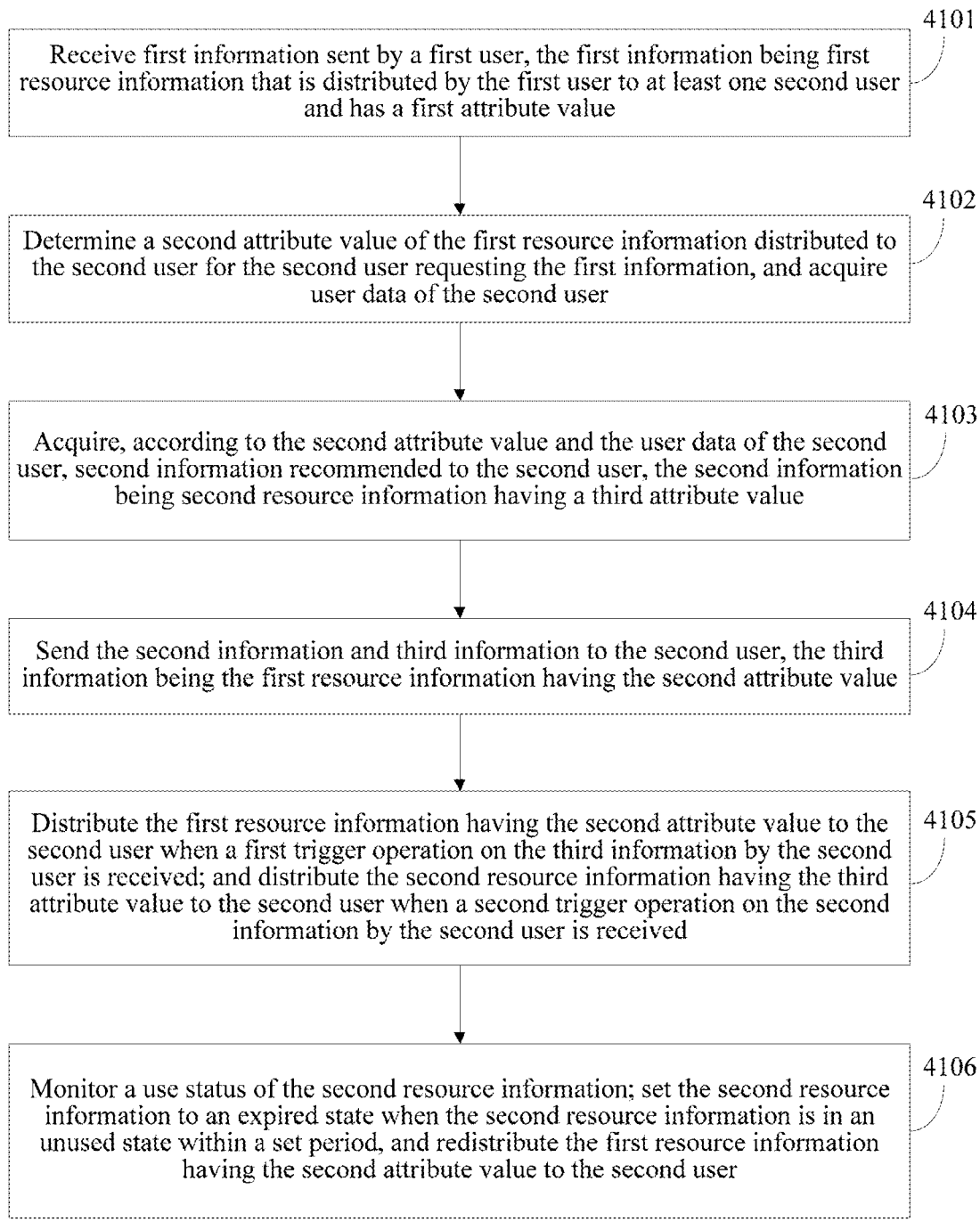
FIG. 41 is a schematic flowchart 3 of an information recommendation method according to an embodiment of the present disclosure.

FIG. 41 is a schematic flowchart 3 of an information recommendation method according to an embodiment of the present disclosure. The information recommendation method in this example is applied to a server side. As shown in FIG. 41, the information recommendation method includes the following steps:

Step 4101: Receive first information sent by a first user, the first information being first resource information that is distributed by the first user to at least one second user and has a first attribute value.

In this embodiment of the present disclosure, the first user performs information interaction with another device (for example, a second client, and a server) by using a first client. The second user performs information interaction with another device (for example, the first client, and the server) by using the second client. Here, a client is installed on a terminal device. The client is an instant messaging (IM) client. A user may apply for an account by using an IM client, then log in to the IM client by using the account, and acquire an IM function provided by the IM client to the user. Here, the IM function includes: a chat function, a video function, a file transfer function, a red-packet distribution function, and the like. Different users correspond to different accounts, and an account may be used to distinguish and uniquely represent a user. For example, a user A may log in to the IM client by using an account a. A user B may log in to the IM client by using an account b. The user A may add a contact B in the IM client (which is specifically implemented by adding the account b of the contact B). One user may add a plurality of contacts to a contact list of the user. Certainly, the user A may further set groups in the IM client to which the user A logs in. Contacts having a same characteristic may be added to each group, for example, a family group, a work group, or an entertainment group. When wanting to chat with the contact B, the user A may choose the contact B from the contact list. A chat window between the user A and the contact B then pops up from the IM client. Subsequently, the user A may chat with the contact B in the chat window.

In this embodiment of the present disclosure, the first information is first resource information that is distributed by the first user to at least one second user and has a first attribute value. Here, the first resource information may be a red packet. Correspondingly, the first attribute value may be an amount of a red packet. When the first user sends a red packet to one second user, the first user and a first client corresponding to the first user need to perform the following operations: The first user chooses the second user in the first client and opens a chat window with the second user. The first user chooses a red packet function in the chat window, inputs an amount that needs to be sent, and sends a red packet having information about the amount to the server. When the first user sends a red packet to a plurality of second users, the first user and the first client corresponding to the first user need to perform the following operations: The first user chooses one group in the first client. Users other than the first user in the group are all referred to as second users. A chat window of the group is then opened. The first user chooses a red packet function in the chat window, inputs a total amount (that is, a first attribute value) that needs to be sent and a red packet quantity (that is, a quantity of the second users), and sends information about the total amount and the red packet quantity to the server.

Step 4102: Determine a second attribute value of the first resource information distributed to the second user for the second user requesting the first information, and acquire user data of the second user.

In this embodiment of the present disclosure, when the first resource information having the first attribute value is distributed to one second user, the second attribute value distributed to the one second user is the same as the first attribute value.

When the first resource information having the first attribute value is distributed to a plurality of the second users, a sum of second attribute values distributed to the plurality of the second users is the same as the first attribute value or is less than the first attribute value.

In this embodiment of the present disclosure, the user data at least includes: user basic information and/or user behavior information and/or user relationship chain information. In addition, the user data may further include: user credibility information.

The user basic information is, for example, the age, gender, and region of a user. The user behavior information is, for example, whether a user likes shopping or likes playing games, and whether a user is interested in information content of an advertisement. The user relationship chain information is, for example, a QQ friend chain, a WeChat friend circle, QQ zone friends, high school classmates, university classmates, and the network of connections. The user credibility information is, for example, bank transaction records, and student information.

It may be seen that the user basic information represents the natural attributes of a user. The user behavior information represents the long-term interests of a user. The user relationship chain information represents social friends of a user and the interests of the social friends. The user credibility information represents the monetary transaction records of users.

Step 4103: Acquire, according to the second attribute value and the user data of the second user, second information recommended to the second user, the second information being second resource information having a third attribute value.

In this embodiment of the present disclosure, the server analyzes big data of user data of each user. Specifically, models are established according to data such as user profiles, spending habits, and friendships. The models are analyzed and mined. Big data analysis methods are used to draw a self-portrait (the self-portrait includes all personalized tags of the user) for each user, and keyword tags such as "education", "exercise", "reading", "dating", and "shopping" are attached. In this case, each user has a self-portrait representing personalized traits.

Based on this, the server recommends personalized information, that is, second information, to a second user according to an amount of a red packet obtained by the second user and a self-portrait of the second user. Here, the second information is second resource information having a third attribute value. The second resource information may be a voucher, a coupon, or the like. The third attribute value is the actual value of a voucher or coupon. The second resource information and the first resource information are different resources. Generally, the actual value of second information recommended to a user may be equal to a second attribute value, or the actual value of second information recommended to a user is higher than a second attribute value. In this case, second users can be encouraged to consume the second information. It should be noted that, an object recommended at a premium is not necessarily a voucher or coupon, and may alternatively be a virtual currency, a membership bonus point, a value-added service, gaming equipment, or the like. As compared with the first information, the second information may be regarded as a commodity.

In this embodiment of the present disclosure, both user data of the second user and the second attribute value are combined in the second information recommended to the second user. In this case, it can be ensured that the second information recommended to the second user and the second attribute value are essentially in the same value range, and personalized requirements of second users are satisfied, so that precise information recommendation is implemented.

Step 4104: Send the second information and third information to the second user, the third information being the first resource information having the second attribute value.

In this embodiment of the present disclosure, the server sends the second information and the third information to the second user, so that the second user freely chooses to accept the second information or accept the third information. Here, the second information is a commodity that is recommended by the server to a user and matches the value of the third information, for example, a commodity whose value is equal to the value of the third information or a commodity whose value is higher than the value of the third information. The commodity also meets personalized requirements of the second user.

A red packet and a voucher are used as an example. The third information is a red packet valued 80 CNY. This red packet valued 80 CNY is sent by a user A to a user B. The server first determines that an amount of the red packet obtained by the user B is 80 CNY after receiving the first information, acquires user data of the user B, and finds through big data analysis that the user B likes hot pots of a merchant C. The server recommends a hot pot voucher valued 100 CNY of the merchant C to the user B. The server then sends the red packet valued 80 CNY and the hot pot voucher valued 100 CNY of the merchant C together to the user B. The user B may choose to accept the red packet valued 80 CNY or accept the hot pot voucher valued 100 CNY of the merchant C.

In this embodiment of the present disclosure, a server may recommend one or more pieces of second information to a second user. When a server recommends a plurality of pieces of second information to a second user, the plurality of pieces of second information may be arranged in a descending order of priority and displayed on a second client corresponding to the second user. The order of priority is obtained by the server by performing big data analysis according to user data. For example, a user likes products having a same function to different degrees. A product that the user likes better has a priority higher than that of a product that the user likes less.

Step 4105: Distribute the first resource information having the second attribute value to the second user when a first trigger operation on the third information by the second user is received; and distribute the second resource information having the third attribute value to the second user when a second trigger operation on the second information by the second user is received.

Here, when a plurality of pieces of second information are recommended to the second user, the server receives a selection operation of the second user on the plurality of pieces of second information, where the second information that the second user intends to exchange can be determined by using the selection operation.

In this embodiment of the present disclosure, a second user may choose to accept the second information or accept the third information after receiving, on the second client, the second information and the third information sent by the server. If the second user wants to accept the third information sent by the first user, the second user implements the first trigger operation on the third information. The server distributes the first resource information having the second attribute value to the second user when receiving the first trigger operation of the second user on the third information. If the second user wants to accept the second information the server recommended by the server, the second user implements the second trigger operation on the second information. The server distributes the second resource information having the third attribute value to the second user when receiving the second trigger operation of the second user on the second information.

It should be noted that the server distributes the second resource information having the third attribute value to the second user, and at the same time distributes the first resource information having the second attribute value to an issuer of the second resource information.

A red packet and a voucher are used as an example. The third information is a red packet valued 80 CNY. The red packet valued 80 CNY is sent by a user A to a user B. The second information is a hot pot voucher valued 100 CNY of a merchant C. If the user B chooses to accept the red packet valued 80 CNY, the server stores an amount of the red packet valued 80 CNY in a wallet account of the user B. If the user B chooses to accept the hot pot voucher valued 100 CNY of the merchant C, the server stores the hot pot voucher valued 100 CNY of the merchant C in a card account of the user B, and at the same time transfers the red packet valued 80 CNY to an account of the merchant C.

Step 4106: Monitor a use status of the second resource information; and set the second resource information to an expired state when the second resource information is in an unused state within a set period, and redistribute the first resource information having the second attribute value to the second user.

In this embodiment of the present disclosure, the second resource information has a particular lifespan. A user can use the second resource information only within the lifespan. After the lifespan has expired, the second resource information is invalid and can no longer be used. An example in which the second resource information is a voucher or coupon is used. If the voucher or coupon is expired, an amount of the red packet is transferred from a store account to an account of a user (corresponding to the second user) that receives the red packet, and a message notification is sent to the corresponding user (corresponding to the second user) and store. In this case, a user suffers no loss even if the user does not use the second resource information, and can re-acquire an original corresponding red packet.

In the technical solution in this embodiment of the present disclosure, receiving and sending of red packets are combined with recommendation of other virtual commodities. A virtual commodity to be recommended is obtained by a server by performing big data analysis on user data. Therefore, the objective of precise recommendation is achieved. For an application scenario in which a virtual commodity is a coupon or voucher, a solution that achieves precise and direct targeting and personalized issuing of merchant coupons or vouchers is provided, thereby effectively resolving the problems that merchant coupons or vouchers are fuzzily issued and have low use rates. By using this embodiment of the present disclosure, benefits are offered to users, and users can buy commodity coupons or vouchers at a discount; the conversion efficiency of merchant coupons or vouchers is enhanced, and the exposure of merchant brands is improved; and advertising revenues of Internet platforms are increased.

Figure 42:
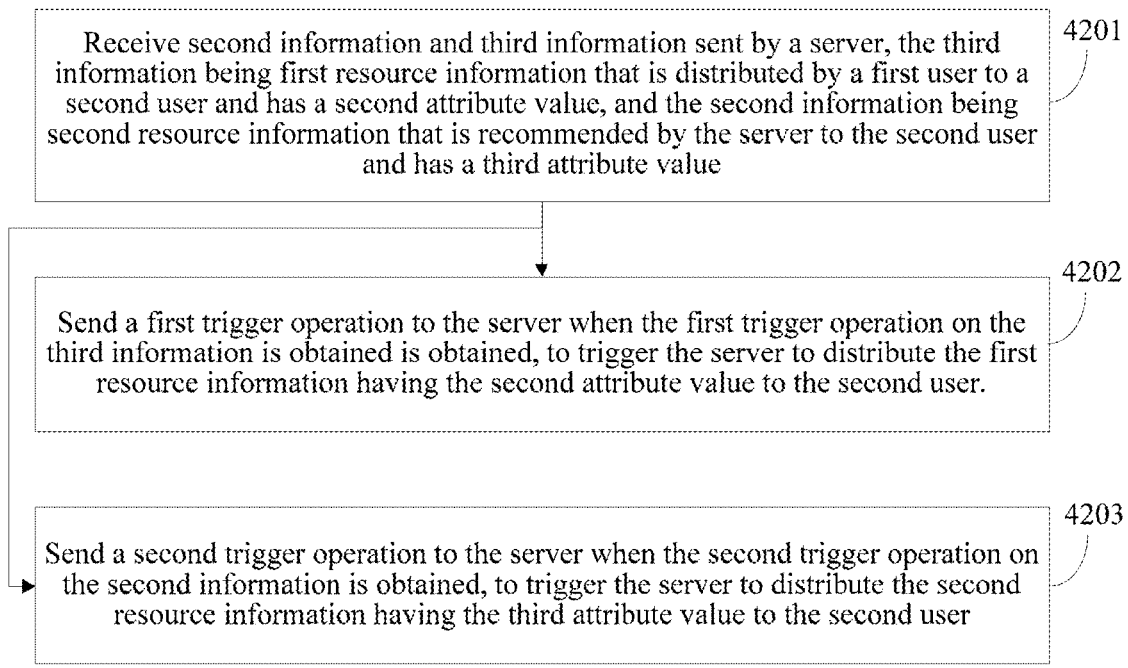
FIG. 42 is a schematic flowchart 4 of an information recommendation method according to an embodiment of the present disclosure.

FIG. 42 is a schematic flowchart 4 of an information recommendation method according to an embodiment of the present disclosure. The information recommendation method in this example is applied to a client side. As shown in FIG. 42, the information recommendation method includes the following steps:

Step 4201: Receive second information and third information sent by a server, the third information being first resource information that is distributed by a first user to a second user and has a second attribute value, and the second information being second resource information that is recommended by the server to the second user and has a third attribute value.

Figure 43:
FIG. 43 is a schematic diagram of a first presentation interface according to an embodiment of the present disclosure.

Referring to FIG. 43, a user A sends a cash red packet having an amount (for example, 20 CNY) to a user B. A client corresponding to the user A is a first client, and a client corresponding to the user B is a second client. In a chat window of the user A and the user B, both the user A and the user B can send information in this chat window, and both the user A and the user B can see the sent information. FIG. 43 is an interface displayed by the second client corresponding to the user B. In this interface, information such as a cash red packet sent by the user A to the user B by using the server can be seen.

Specifically, first, the user A sends first information (for example, a cash red packet of 20 CNY) to the server by using the first client. The server then recommends, to the user B according to user data of the user B and the third information (for example, the cash red packet of 20 CNY) obtained by the user B, second information (for example, a voucher of 25 CNY) meeting the personalization of the user B. The server sends the second information and the third information together to the user B. Here, the user B receives, by using the second client corresponding to the user B, the second information and the third information sent by the server.

In this embodiment of the present disclosure, the receiving the second information sent by the server and the third information includes:

receiving fourth information that is sent by the server and includes the second information and the third information; and presenting the fourth information.

The fourth information has a first presentation effect and a second presentation effect.

When a third trigger operation of the second user on the fourth information has not been obtained, the fourth information is presented according to the first presentation effect, the first presentation effect being to hide the second information and the third information included in the fourth information.

When a third trigger operation of the second user on the fourth information is obtained, the fourth information is presented according to the second presentation effect, the second presentation effect being to expose the second information and the third information included in the fourth information.

Figure 44:
FIG. 44 is a schematic diagram of a second presentation interface according to an embodiment of the present disclosure.

A red packet is used as an example. When a user B receives the fourth information sent by the server, the graphical interface (as shown in FIG. 43) of the red packet is presented according to a display state (corresponding to the first presentation effect) that the red packet is not opened. Next, when an open operation of the user B on the red packet has not been received, the graphical interface of the red packet is still presented according to the display state (corresponding to the first presentation effect) that the red packet is not opened. The graphical interface (as shown in FIG. 44) of the red packet is presented according to a display state (corresponding to the second presentation effect) that the red packet is opened only when the open operation of the user B on the red packet is received.

Here, when a red packet is not opened, an amount (corresponding to the third information) of the red packet and a recommended cash voucher or coupon (corresponding to the second information) are hidden. After the red packet is opened, the amount (corresponding to the third information) of the red packet and the recommended cash voucher or coupon (corresponding to the second information) are exposed, so that the second user can view the amount of the red packet and the recommended cash voucher or coupon. A user may choose to accept one of the two pieces of content.

Step 4202: Send a first trigger operation to the server when the first trigger operation on the third information is obtained is obtained, to trigger the server to distribute the first resource information having the second attribute value to the second user.

Step 4203: Send a second trigger operation to the server when the second trigger operation on the second information is obtained, to trigger the server to distribute the second resource information having the third attribute value to the second user.

In this embodiment of the present disclosure, a user B may choose to accept the second information or accept the third information after receiving, on the second client, the second information and the third information sent by the server. If the user B wants to accept the third information, the user B implements the first trigger operation on the third information, and the server distributes the first resource information having the second attribute value to the user B when receiving the first trigger operation of the user B on the third information. If the user B wants to accept the second information recommended by the server, the user B implements the second trigger operation on the second information, and the server distributes the second resource information having the third attribute value to the user B when receiving the second trigger operation of the user B on the second information.

It should be noted that the server distributes the second resource information having the third attribute value to the second user, and at the same time distributes the first resource information having the second attribute value to an issuer of the second resource information.

Figure 45:
FIG. 45 is a schematic diagram of an exchange interface according to an embodiment of the present disclosure.

A red packet and a voucher are used as an example. The third information is a red packet valued 80 CNY. The red packet valued 80 CNY is sent by a user A to a user B. The second information is a hot pot voucher valued 100 CNY of a merchant C. If the user B chooses to accept the red packet valued 80 CNY, the server stores an amount of the red packet valued 80 CNY in a wallet account of the user B. If the user B chooses to accept the hot pot voucher valued 100 CNY of the merchant C, the server stores the hot pot voucher valued 100 CNY of the merchant C in a card account (as shown in FIG. 45) of the user B, and at the same time transfers the red packet valued 80 CNY to an account of the merchant C. In addition, if a voucher is expired, a merchant refunds an amount of a cash red packet to the user B.

Figure 46:
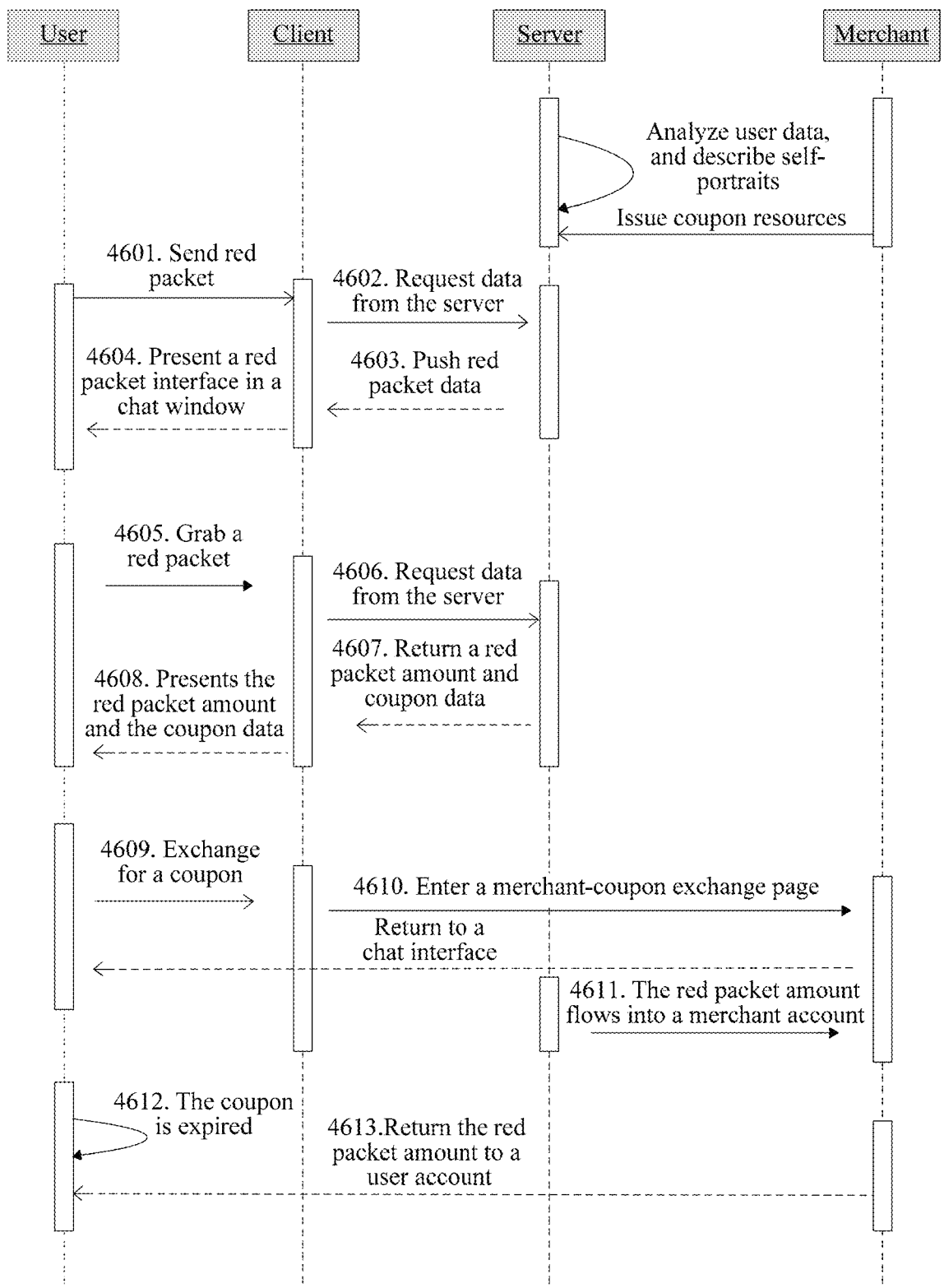
FIG. 46 is a schematic flowchart 5 of an information processing method for information recommendation according to an embodiment of the present disclosure.

FIG. 46 is a schematic flowchart 5 of an information recommendation method according to an embodiment of the present disclosure. As shown in FIG. 46, the information recommendation method includes the following steps:

Step 4601: A user enables a red-packet sending function on a client.

Step 4602: The client requests red packet data of the user from a server.

Step 4603: The server pushes the red packet data of the user to the user.

Step 4604: The client presents a red packet interface by using a chat window.

The foregoing steps are operations performed on a red-packet sending side, and the following steps are operations performed on a red-packet receiving side.

Step 4605: A user performs a red-packet grabbing operation on a client.

Step 4606: The client requests red-packet grabbing data from the server.

Step 4607: The server returns a red packet amount and recommended coupon data to the client.

Here, the server analyzes user data in advance, describes self-portraits of users, and then acquire, according to the user data, coupon resources issued by merchants.

Step 4608: The client presents the red packet amount and the recommended coupon data.

Step 4609: The user performs a coupon exchange operation on the client.

Step 4610: The client enters a merchant-coupon exchange interface.

Here, after the exchange succeeds, the client returns to a chat interface.

Step 4611: The server enables the red packet amount to flow into a merchant account.

Step 4612: The client monitors that a coupon is expired.

Step 4613: The merchant refunds the red packet amount to a user account.

Figure 47:
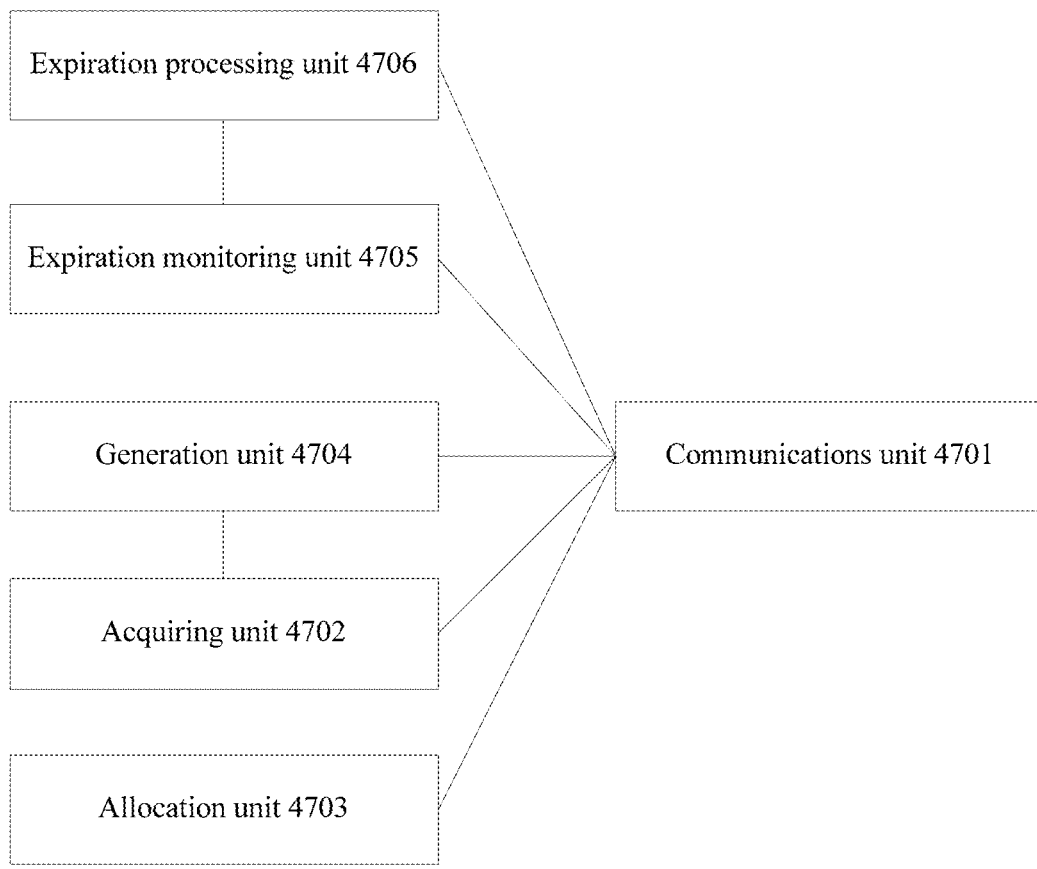
FIG. 47 is a schematic structural composition diagram of a server according to an embodiment of the present disclosure.

FIG. 47 is a schematic structural composition diagram of a server according to an embodiment of the present disclosure. As shown in FIG. 47, the server includes:

a communications unit 4701, configured to receive first information sent by a first user, the first information being first resource information that is distributed by the first user to at least one second user and has a first attribute value;

an acquiring unit 4702, configured to: determine a second attribute value of the first resource information distributed to the second user for the second user requesting the first information, and acquire user data of the second user; and acquire, according to the second attribute value and the user data of the second user, second information recommended to the second user, the second information being second resource information having a third attribute value, the communications unit 4701 being further configured to send the second information and third information to the second user, the third information being the first resource information having the second attribute value; and an allocation unit 4703, configured to: distribute the first resource information having the second attribute value to the second user when the communications unit 4701 receives a first trigger operation on the third information by the second user; and distribute the second resource information having the third attribute value to the second user when the communications unit 4701 receives a second trigger operation on the second information by the second user.

In this embodiment of the present disclosure, when the first resource information having the first attribute value is distributed to one second user, the second attribute value distributed to the one second user is the same as the first attribute value.

When the first resource information having the first attribute value is distributed to a plurality of the second users, a sum of second attribute values distributed to the plurality of the second users is the same as the first attribute value or is less than the first attribute value.

In this embodiment of the present disclosure, the server further includes:

a generation unit 4704, configured to generate fourth information including the first information and the second information, the fourth information having a first presentation effect and a second presentation effect, where when the communications unit 4701 has not received a third trigger operation of the second user on the fourth information, the fourth information corresponds to the first presentation effect, and the first presentation effect is to hide the second information and the third information included in the fourth information; and when the communications unit 4701 has received a third trigger operation of the second user on the fourth information, the fourth information corresponds to the second presentation effect, and the second presentation effect is to expose the second information and the third information included in the fourth information.

In this embodiment of the present disclosure, the server further includes:

an expiration monitoring unit 4705, configured to monitor a use status of the second resource information when the allocation unit 4703 distributes the second resource information having the third attribute value to the second user; and an expiration processing unit 4706, configured to: set the second resource information to an expired state when the second resource information is in an unused state within a set period, and trigger the allocation unit 4703 to redistribute the first resource information having the second attribute value to the second user.

In this embodiment of the present disclosure, one or more pieces of second information are recommended to the second user, when a plurality of pieces of second information are recommended to the second user, the allocation unit 4703 is further configured to receive a selection operation of the second user on the plurality of pieces of second information.

A person skilled in the art should understand that, the functions implemented by the units in the server shown in FIG. 47 may be understood by referring to the related descriptions in the foregoing information recommendation method. The functions of the units in the server shown in FIG. 47 may be implemented by using a program running on a processor, or may be implemented by using a specific logic circuit.

Figure 48:
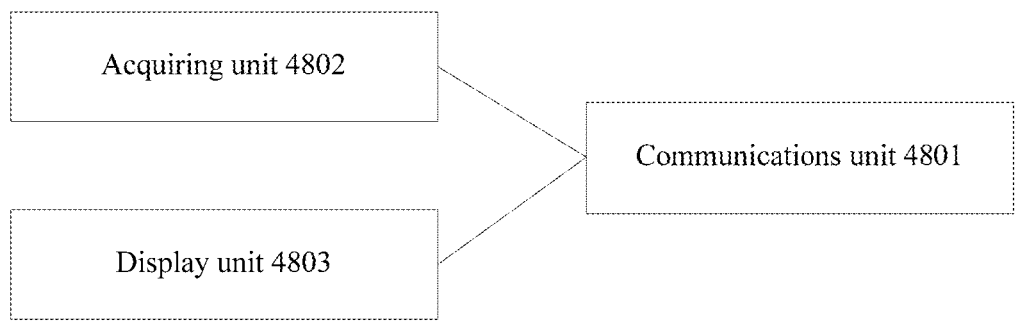
FIG. 48 is a schematic structural composition diagram of a client according to an embodiment of the present disclosure.

FIG. 48 is a schematic structural composition diagram of a client according to an embodiment of the present disclosure. As shown in FIG. 48, the client includes:

a communications unit 4801, configured to receive second information and third information sent by a server, the third information being first resource information that is distributed by a first user to a second user and has a second attribute value, and the second information being second resource information that is recommended by the server to the second user and has a third attribute value; and an acquiring unit 4802, configured to obtain a trigger operation of a user, the communications unit 4801 being further configured to: send a first trigger operation to the server when the acquiring unit 4802 obtains the first trigger operation on the third information, to trigger the server to distribute the first resource information having the second attribute value to the second user; and send a second trigger operation to the server when the acquiring unit 4802 obtains the second trigger operation on the second information, to trigger the server to distribute the second resource information having the third attribute value to the second user.

In this embodiment of the present disclosure, the communications unit 4801 is further configured to receive fourth information that is sent by the server and includes the second information and the third information; and the client further includes: a display unit 4803, configured to present the fourth information.

In this embodiment of the present disclosure, the fourth information has a first presentation effect and a second presentation effect, where when the acquiring unit 4802 has not obtained a third trigger operation of the second user on the fourth information, the display unit 4803 presents the fourth information according to the first presentation effect, the first presentation effect being to hide the second information and the third information included in the fourth information.

When the acquiring unit 4802 has obtained a third trigger operation of the second user on the fourth information, the display unit 4803 presents the fourth information according to the second presentation effect, the second presentation effect being to expose the second information and the third information included in the fourth information.

A person skilled in the art should understand that the functions implemented by the units in the client shown in FIG. 48 may be understood by referring to the related descriptions in the foregoing information recommendation method. The functions of the units in the client shown in FIG. 48 may be implemented by using a program running on a processor, or may be implemented by using a specific logic circuit.

The technical solution recorded in the embodiments of the present disclosure can be arbitrarily combined without causing any conflict.

Figure 49:
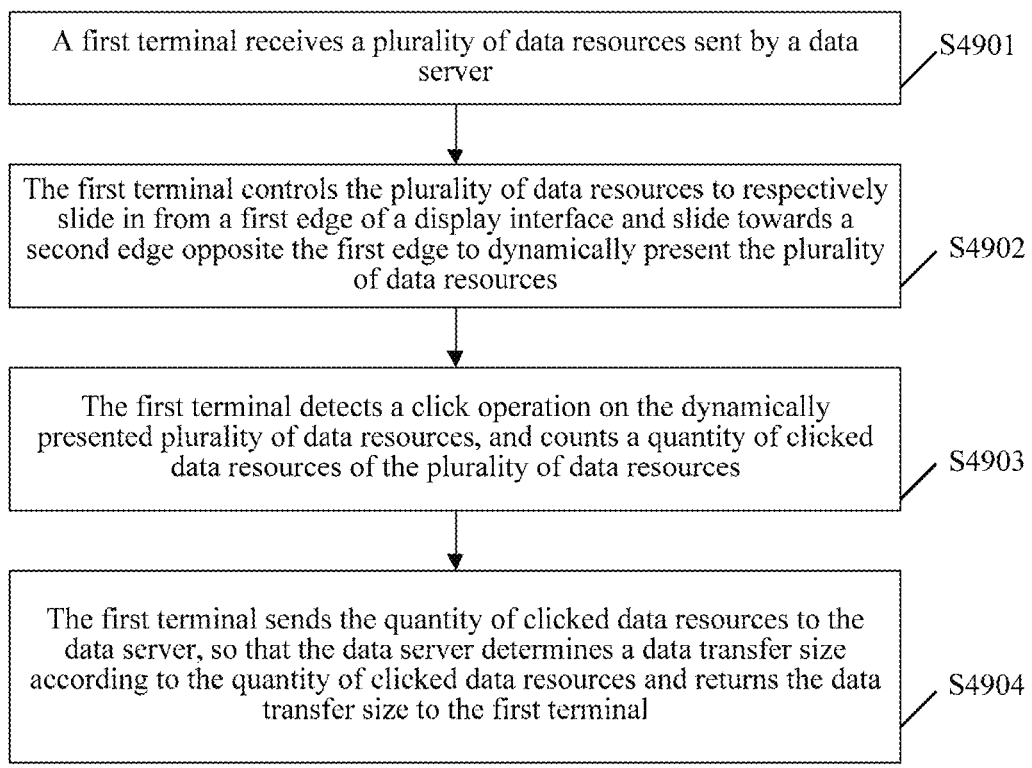
FIG. 49 is a flowchart of a method of information processing for receiving a data resource according to an embodiment of the present disclosure.

Referring to FIG. 49, FIG. 49 is a flowchart of a first embodiment of a method for receiving a data resource according to the present disclosure. As shown in FIG. 49, the method in this embodiment of the present disclosure includes:

S4901: A first terminal receives a plurality of data resources sent by a data server, the plurality of data resources being randomly generated by the data server according to a received resource amount sent by a second terminal, and the plurality of data resources including a valid data resource and an invalid data resource, or the plurality of data resources being generated by the data server according to a received resource amount and resource quantity sent by a second terminal, and the resource quantity including an invalid-resource quantity and a valid-resource quantity.

In a specific implementation, the second terminal may open an instant messaging client, select a "Send data resource" function option in the instant messaging client, acquire a resource amount and a resource quantity input by a user, and send the resource amount and the resource quantity to the data server. The data server may divide the resource amount by the resource quantity after receiving the resource amount and the resource quantity to calculate an average value as a resource size of each data resource, or randomly distribute a resource size of each data resource according to the resource amount and the resource quantity, and send the plurality of data resources to the first terminal after the resource sizes of the data resources have been distributed.

Alternatively, the second terminal acquires a resource amount input by a user, and sends the resource amount to the data server. The data server randomly generates a plurality of data resources after receiving the resource amount. The generated plurality of data resources include a valid data resource and an invalid data resource. A sum of resource sizes of valid data resources is equal to a size of the resource amount input by the user.

Alternatively, the second terminal acquires a resource amount and a resource quantity input by a user, the resource quantity including an invalid-resource quantity and a valid-resource quantity, and sends the resource amount and the resource quantity to the data server. The data server generates a plurality of data resources having the same resource size or different resource sizes according to a quantity of valid resources and the resource amount, and generates data resources corresponding to a quantity of invalid resources.

S4902: The first terminal controls the plurality of data resources to respectively slide in from a first edge of a display interface and slide towards a second edge opposite the first edge to dynamically present the plurality of data resources.

In a specific implementation, the plurality of data resources may be controlled to slide in respectively from the first edge of the display interface and slide at an increased speed towards the second edge opposite the first edge within a preset time range. The preset time range may be 2 seconds or 3 seconds, but is not limited thereto. The first edge may be an upper edge of the display interface or a left edge of the display interface. Correspondingly, the second edge may be a lower edge of the display interface or a right edge of the display interface.

Alternatively, a coordinate position of each data resource is randomly distributed when it is detected that the plurality of data resources slide in respectively from the first edge of the display interface. The coordinate position includes a first coordinate and a second coordinate. The first coordinate is kept unchanged and each data resource slide in a coordinate direction of the second coordinate. The first coordinate may be a horizontal coordinate, and the second coordinate may be a vertical coordinate. Alternatively, the first coordinate may be a vertical coordinate, and the first coordinate may be a horizontal coordinate. A specific manner to use may be determined according to a current attitude of the first terminal. For example, the first terminal is in a portrait mode, the first coordinate is a horizontal coordinate, and the second coordinate is a vertical coordinate.

In some embodiments, the first terminal may start timing after receiving a plurality of data resources sent by the data server. When a waiting time exceeds a preset interval, the first terminal starts to control the plurality of data resources to slide in from the first edge of the display interface. Further In some embodiments, a remaining waiting time may be presented in the display interface to remind a user to prepare to click a data resource. The preset interval may include 5 seconds or 10 seconds, but is not limited to the foregoing value.

Figure 50:
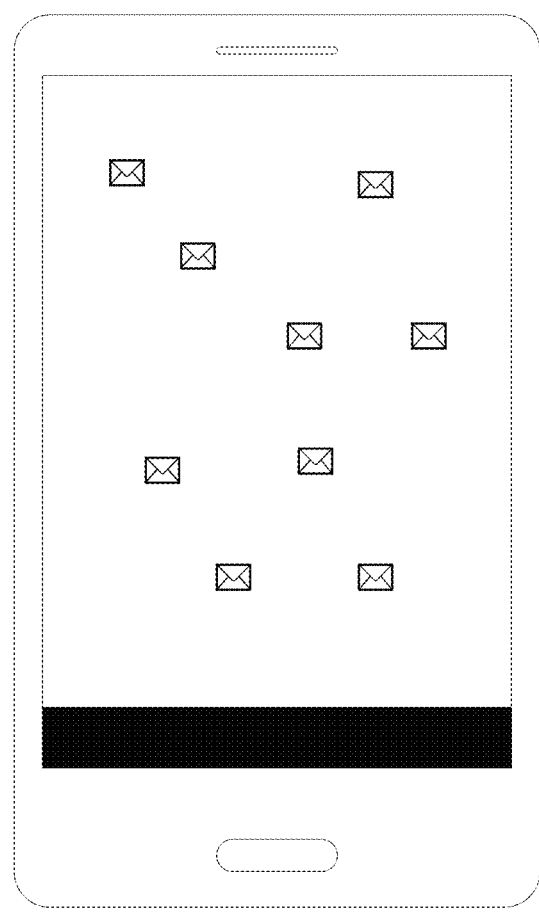
FIG. 50 is a schematic diagram of displaying a data resource according to an embodiment of the present disclosure.

For example, as shown in FIG. 50, a plurality of data resources respectively start to slide down from the upper edge of the display interface at different moments, and all slide into the display interface from the upper edge of the display interface within the preset time range. Moreover, the data resource may slide in a straight line with a constant velocity towards the lower edge, or slide in a straight line with an increasing velocity towards the lower edge, or slide in a curve towards the lower edge. However, a sliding manner of a data resource is not limited to this only. The speed or acceleration of a downward slide can be set in advance.

S4903: The first terminal detects a click operation on the dynamically presented plurality of data resources, and counts a quantity of clicked data resources of the plurality of data resources.

Figure 51:
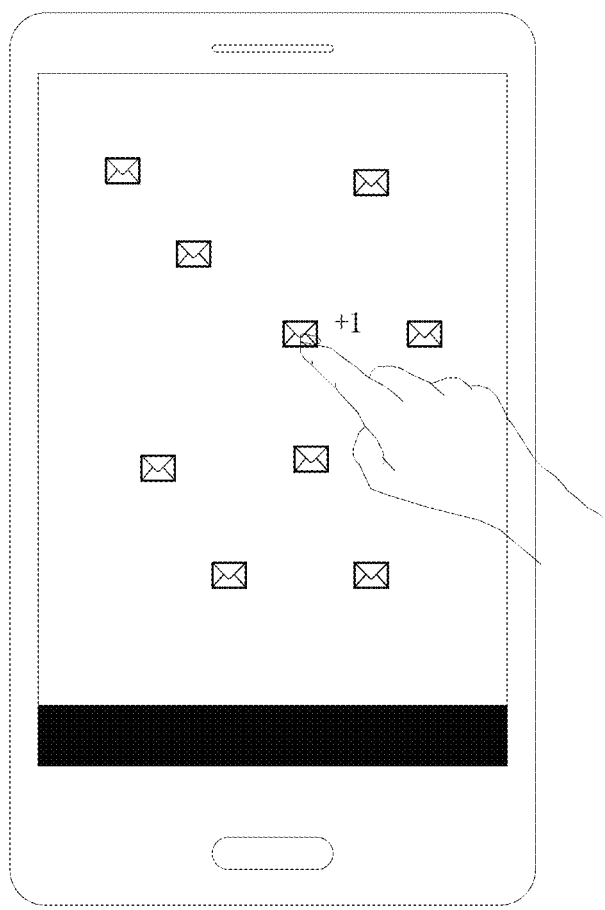
FIG. 51 is a schematic diagram of displaying a data resource according to an embodiment of the present disclosure.

For example, as shown in FIG. 51, as the plurality of data resources slide from the first edge to the second edge, counting starts from 0. A count value is added by 1 if a user clicks a data resource. Counting is not performed if a user fails to click a data resource. A quantity of all clicked data resources is counted eventually when all the data resources have been displayed in the display interface.

In some embodiments, a target data resource of the plurality of data resources may be controlled to slide out from the second edge when it is detected that the target data resource has not been clicked.

In some embodiments, a target data resource of the plurality of data resources may be controlled to be presented by using a preset dynamic presentation effect when it is detected that the target data resource has been clicked. For example, an effect that the target data resource explodes, an effect that the target data resource slides rapidly towards the second edge or an effect that the target data resource slides towards an edge other than the first edge and the second edge may be presented.

In some embodiments, the plurality of data resources include a valid data resource and an invalid data resource. A quantity of valid data resources that have been clicked and a quantity of invalid data resources that have been clicked may be respectively counted. The valid data resource is a data resource that needs to be added, the invalid data resource is a data resource that needs to be deducted. Alternatively, the invalid data resource is not a data resource that needs to be added or deducted, and is only used for presentation and clicking.

S4904: The first terminal sends the quantity of clicked data resources to the data server, so that the data server determines a data transfer size according to the quantity of clicked data resources and returns the data transfer size to the first terminal.

In a specific implementation, if data resources distributed by the data server have the same resource size, the data server may obtain a product by multiplying the quantity of clicked data resources by the resource size of each data resource and use the product as a data transfer size. If the data server randomly distributes resource sizes of data resources, the data server may first determine a resource size of each data resource that has been clicked, then calculate a sum of resource sizes of all data resources that have been clicked, and use the sum as a data transfer size. The data server performs data transfer to the first terminal according to the data transfer size.

In some embodiments, when the invalid data resource is a data resource that needs to be deducted, the quantity of valid data resources that have been clicked and the quantity of invalid data resources that have been clicked to the data server may be sent. After receiving the quantity of valid data resources that have been clicked and the quantity of invalid data resources that have been clicked, the data server calculates a difference value obtained by subtracting the quantity of invalid data resources that have been clicked from the quantity of valid data resources that have been clicked, and then uses a product of the difference value and a resource size of each data resource as the data transfer size.

For example, the second terminal first opens the "red packet" function of WeChat. After a user selects "Red packet rain", the second terminal prompts the user to input "Red packet amount" and "Red packet quantity", and sends "Red packet amount" and "Red packet quantity" to the data server. The data server calculates the size of each red packet after receiving "Red packet amount" and "Red packet quantity", and sends a plurality of red packets to the first terminal. After receiving the plurality of "red packets", the first terminal controls the "red packets" to be randomly displayed at the X coordinates, and for the Y coordinates, a particular acceleration is used to simulate free fall. Meanwhile, it is controlled to randomly generate several red packets within 200 seconds. If a user clicks a red packet, a count value is added by 1. If an icon having another color is clicked by mistake, the count value is subtracted by 1. If no red packet is clicked, the count value stays unchanged. Eventually, a corresponding amount is transferred to the first terminal according to the count value obtained through counting.

In this embodiment of the present disclosure, a first terminal receives a plurality of data resources sent by a data server; controls the plurality of data resources to respectively slide in from a first edge of a display interface and slide towards a second edge opposite the first edge to dynamically present the plurality of data resources; detects a click operation on the dynamically presented plurality of data resources, and counts a quantity of clicked data resources of the plurality of data resources; and sends the quantity of clicked data resources to the data server, so that the data server determines a data transfer size according to the quantity of clicked data resources and returns the data transfer size to the first terminal, thereby promoting communication between users by dynamically presenting data resources and improving the frequency of data transfer.

Figure 52:
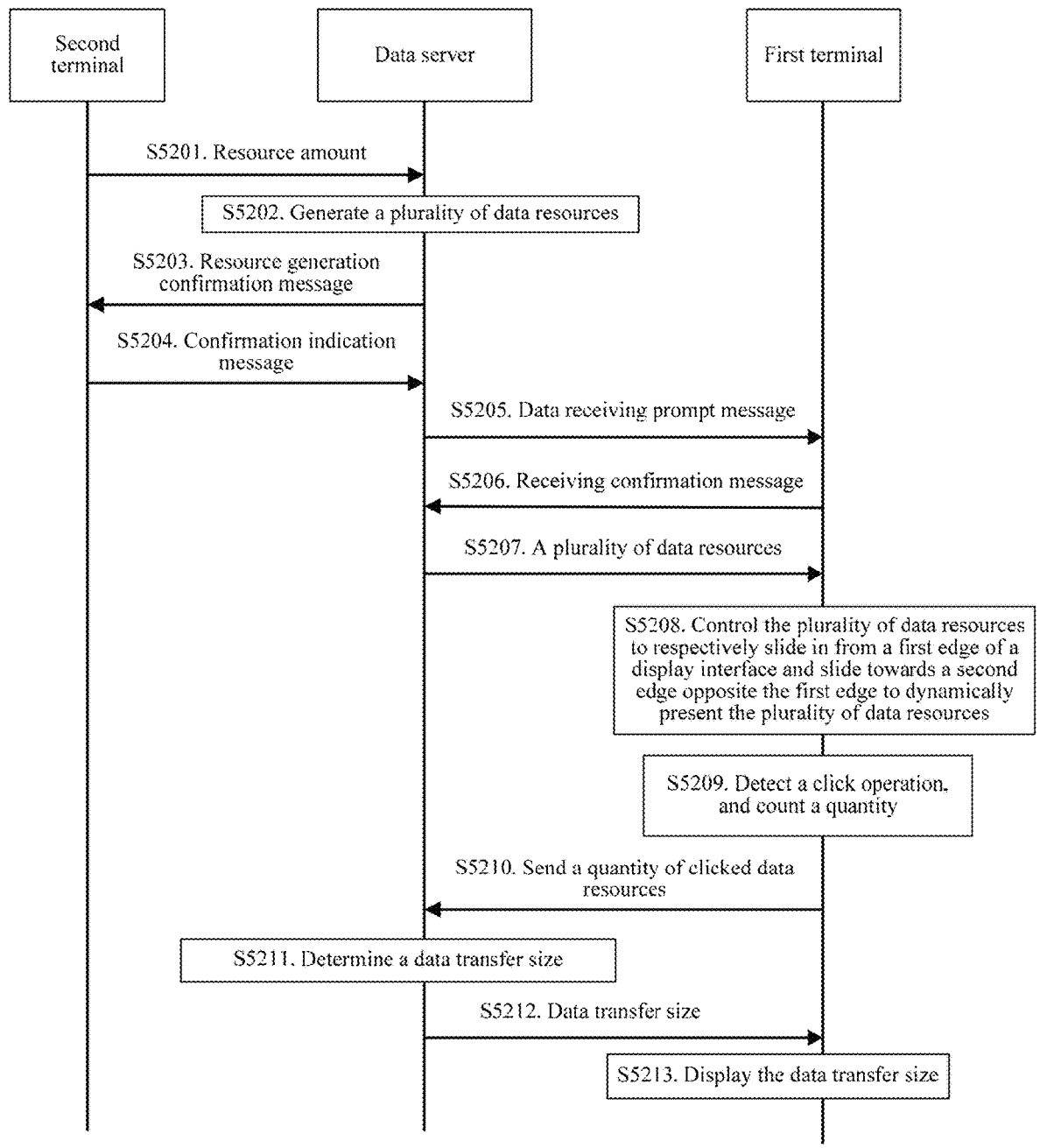
FIG. 52 is a flowchart of a method of information processing for receiving a data resource according to an embodiment of the present disclosure.

Referring to FIG. 52, FIG. 52 is a flowchart of a second embodiment of a method for receiving a data resource according to the present disclosure. As shown in FIG. 52, the method in this embodiment of the present disclosure includes:

S5201: A second terminal sends a resource amount or a resource amount and a resource quantity to the data server.

S5202: The data server randomly generates a plurality of data resources according to the resource amount, the plurality of data resources including a valid data resource and an invalid data resource; or generates a plurality of data resources according to the resource amount and the resource quantity, the resource quantity including an invalid-resource quantity and a valid-resource quantity.

S5203: The data server sends a resource generation confirmation message to the second terminal, the resource generation confirmation message carrying a resource identifier of the plurality of data resources.

S5204: The second terminal sends a confirmation indication message to the data server, the confirmation indication message carrying a terminal identifier of a first terminal, a terminal identifier of the second terminal, and a resource identifier of a data resource, and saves the plurality of data resources, the terminal identifier of the first terminal, the terminal identifier of the second terminal, and the resource identifier of the data resource.

S5205: The data server sends a data receiving prompt message to the first terminal.

S5206: The first terminal sends a receiving confirmation message the data server, the receiving confirmation message carrying the terminal identifier of the first terminal.

In a specific implementation, the first terminal may send the receiving confirmation message to the data server when opening a conversation window with the second terminal. The conversation window may be a one-to-one conversation window between the first terminal and the second terminal, or may be a group chat conversation window of a group including the first terminal and the second terminal.

S5207: The data server sends the plurality of data resources to the first terminal.

In a specific implementation, before sending the plurality of data resources to the first terminal, the data server may examine whether a saving time of a data resource on the data server exceeds preset duration, and determine whether a user of the first terminal has already received a data resource, or examine, according to the terminal identifier of the first terminal, whether a user of the first terminal has a receiving qualification. If a saving time of a data resource on a data server does not exceed the preset duration and it is determined that the user of the first terminal has not received the data resource and the user of the first terminal has a receiving qualification, the data server sends the plurality of data resources to the first terminal.

S5208: The first terminal controls the plurality of data resources to respectively slide in from a first edge of a display interface and slide towards a second edge opposite the first edge to dynamically present the plurality of data resources.

In a specific implementation, the plurality of data resources may be controlled to slide in respectively from the first edge of the display interface and slide at an increased speed towards the second edge opposite the first edge within a preset time range. The preset time range may be 2 seconds or 3 seconds, but is not limited thereto. The first edge may be an upper edge of the display interface or a left edge of the display interface. Correspondingly, the second edge may be a lower edge of the display interface or a right edge of the display interface.

Alternatively, a coordinate position of each data resource is randomly distributed when it is detected that the plurality of data resources slide in respectively from the first edge of the display interface. The coordinate position includes a first coordinate and a second coordinate. The first coordinate is kept unchanged and each data resource is slid in a coordinate direction of the second coordinate. The first coordinate may be a horizontal coordinate, and the second coordinate may be a vertical coordinate.

In some embodiments, the first terminal may start timing after receiving a plurality of data resources sent by the data server. When a waiting time exceeds a preset interval, the plurality of data resources start to slide in from the first edge of the display interface. Further In some embodiments, a remaining waiting time may be presented in the display interface to remind a user to prepare to click a data resource. The preset interval may include 5 seconds or 10 seconds, but is not limited to the foregoing value.

For example, as shown in FIG. 50, a plurality of data resources respectively start to slide down from the upper edge of the display interface at different moments, and all slide into the display interface from the upper edge of the display interface within the preset time range. Moreover, the data resource may slide in a straight line with a constant velocity towards the lower edge, or slide in a straight line with an increasing velocity towards the lower edge, or slide in a curve towards the lower edge. A sliding manner of a data resource is not limited to this only. The speed or acceleration of a downward slide can be set in advance.

S5209: The first terminal detects a click operation on the dynamically presented plurality of data resources, and counts a quantity of clicked data resources of the plurality of data resources.

For example, as shown in FIG. 51, as the plurality of data resources slide from the first edge to the second edge, counting starts from 0. A count value is added by 1 if a user clicks a data resource. Counting is not performed if a user fails to click a data resource. A quantity of all clicked data resources is counted eventually when all the data resources have been displayed in the display interface.

In some embodiments, a target data resource of the plurality of data resources may be controlled to be presented by using a preset dynamic presentation effect when it is detected that the target data resource has been clicked. For example, an effect that the target data resource explodes, an effect that the target data resource slides rapidly towards the second edge or an effect that the target data resource slides towards an edge other than the first edge and the second edge may be presented.

In some embodiments, a target data resource of the plurality of data resources may be controlled to slide out from the second edge when it is detected that the target data resource has not been clicked.

In some embodiments, the plurality of data resources include a valid data resource and an invalid data resource. A quantity of valid data resources that have been clicked and a quantity of invalid data resources that have been clicked may be respectively counted. The valid data resource is a data resource that needs to be added, and the invalid data resource is a data resource that needs to be deducted. Alternatively, the invalid data resource is not a data resource that needs to be added or deducted, and is only used for presentation and clicking.

S5210: The first terminal sends the quantity of clicked data resources to the data server.

In a specific implementation, the quantity of valid data resources that have been clicked and the quantity of invalid data resources that have been clicked to the data server may be sent.

S5211: The data server determines a data transfer size according to the quantity of clicked data resources.

In a specific implementation, if data resources distributed by the data server have the same resource size, the data server may obtain a product by multiplying the quantity of clicked data resources by the resource size of each data resource and use the product as a data transfer size. If the data server randomly distributes resource sizes of data resources, the data server may first determine a resource size of each data resource that has been clicked, then calculate a sum of resource sizes of all data resources that have been clicked, and use the sum as a data transfer size. The data server performs data transfer to the first terminal according to the data transfer size.

In some embodiments, when the invalid data resource is a data resource that needs to be deducted, the quantity of valid data resources that have been clicked and the quantity of invalid data resources that have been clicked to the data server may be sent. After receiving the quantity of valid data resources that have been clicked and the quantity of invalid data resources that have been clicked, the data server calculates a difference value obtained by subtracting the quantity of invalid data resources that have been clicked from the quantity of valid data resources that have been clicked, and then uses a product of the difference value and a resource size of each data resource as the data transfer size.

S5212: The data server returns the data transfer size to the first terminal.

S5213: The first terminal displays the data transfer size.

For example, the second terminal first opens the "red packet" function of WeChat. After a user selects "Red packet rain", the second terminal prompts the user to input "Red packet amount" and "Red packet quantity", and sends "Red packet amount" and "Red packet quantity" to the data server. The data server calculates the size of each red packet after receiving "Red packet amount" and "Red packet quantity", and sends a plurality of red packets to the first terminal. After receiving the plurality of "red packets", the first terminal controls the "red packets" to be randomly displayed at the X coordinates, and for the Y coordinates, a particular acceleration is used to simulate free fall. Meanwhile, it is controlled to randomly generate several red packets within 200 seconds. If a user clicks a red packet, a count value is added by 1. If an icon having another color is clicked by mistake, the count value is subtracted by 1. If no red packet is clicked, the count value stays unchanged. Eventually, a corresponding amount is transferred to the first terminal according to the count value obtained through counting.

Figure 53:
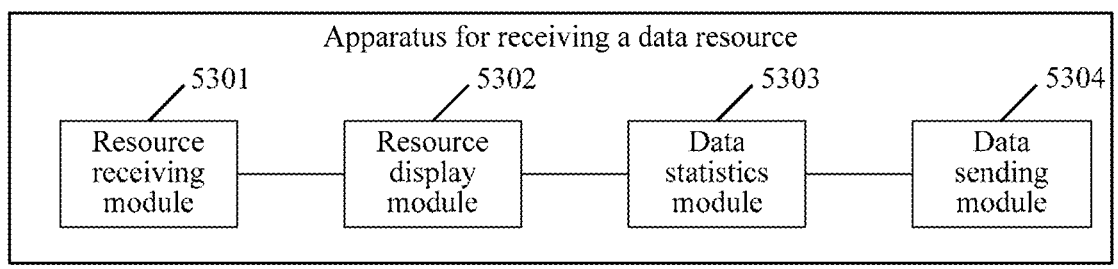
FIG. 53 is a schematic structural diagram of an information processing apparatus for receiving a data resource according to an embodiment of the present disclosure.

Referring to FIG. 53, FIG. 53 is a schematic structural diagram of an apparatus for receiving a data resource according to an embodiment of the present disclosure. As shown in FIG. FIG. 53, the apparatus in this embodiment of the present disclosure includes a resource receiving module 5301, a resource display module 5302, a data statistics module 5303, and a data sending module 5304.

The resource receiving module 5301 is configured to receive a plurality of data resources sent by a data server, the plurality of data resources being randomly generated by the data server according to a received resource amount sent by a second terminal, and the plurality of data resources including a valid data resource and an invalid data resource, or the plurality of data resources being generated by the data server according to a received resource amount and resource quantity sent by a second terminal, and the resource quantity including an invalid-resource quantity and a valid-resource quantity.

In a specific implementation, the second terminal may open an instant messaging client, select a "Send data resource" function option in the instant messaging client, acquire a resource amount and a resource quantity input by a user, and send the resource amount and the resource quantity to the data server. The data server may divide the resource amount by the resource quantity after receiving the resource amount and the resource quantity to calculate an average value as a resource size of each data resource, or randomly distribute a resource size of each data resource according to the resource amount and the resource quantity, and send the plurality of data resources to the first terminal after the resource sizes of the data resources have been distributed.

Alternatively, the second terminal acquires a resource amount input by a user, and then sends the resource amount to the data server. The data server randomly generates a plurality of data resources after receiving the resource amount. The generated plurality of data resources include a valid data resource and an invalid data resource. A sum of resource sizes of valid data resources is equal to a size of the resource amount input by the user.

Alternatively, the second terminal acquires a resource amount and a resource quantity input by a user, the resource quantity including an invalid-resource quantity and a valid-resource quantity, and sends the resource amount and the resource quantity to the data server. The data server generates a plurality of data resources having the same resource size or different resource sizes according to a quantity of valid resources and the resource amount, and generates data resources corresponding to a quantity of invalid resources.

The resource display module 5302 is configured to control the plurality of data resources to respectively slide in from a first edge of a display interface and slide towards a second edge opposite the first edge to dynamically present the plurality of data resources.

In a specific implementation, the plurality of data resources may be controlled to slide in respectively from the first edge of the display interface and slide at an increased speed towards the second edge opposite the first edge within a preset time range. The preset time range may be 2 seconds or 3 seconds, but is not limited thereto. The first edge may be an upper edge of the display interface or a left edge of the display interface. Correspondingly, the second edge may be a lower edge of the display interface or a right edge of the display interface.

Alternatively, a coordinate position of each data resource is randomly distributed when it is detected that the plurality of data resources slide in respectively from the first edge of the display interface. The coordinate position includes a first coordinate and a second coordinate. The first coordinate is kept unchanged and each data resource is slid in a coordinate direction of the second coordinate. The first coordinate may be a horizontal coordinate, and the second coordinate may be a vertical coordinate.

In some embodiments, the first terminal may start timing after receiving a plurality of data resources sent by the data server. When a waiting time exceeds a preset interval, the plurality of data resources start to slide in from the first edge of the display interface. Further In some embodiments, a remaining waiting time may be presented in the display interface to remind a user to prepare to click a data resource. The preset interval may include 5 seconds or 10 seconds, but is not limited to the foregoing value.

For example, as shown in FIG. 50, a plurality of data resources respectively start to slide down from the upper edge of the display interface at different moments, and all slide into the display interface from the upper edge of the display interface within the preset time range. Moreover, the data resource may slide in a straight line with a constant velocity towards the lower edge, or slide in a straight line with an increasing velocity towards the lower edge, or slide in a curve towards the lower edge. A sliding manner of a data resource is not limited to this only. The speed or acceleration of a downward slide can be set in advance.

The data statistics module 5303 is configured to: detect a click operation on the dynamically presented plurality of data resources, and count a quantity of clicked data resources of the plurality of data resources.

For example, as shown in FIG. 51, as the plurality of data resources slide from the first edge to the second edge, counting starts from 0. A count value is added by 1 if a user clicks a data resource. Counting is not performed if a user fails to click a data resource. A quantity of all clicked data resources is counted eventually when all the data resources have been displayed in the display interface.

In some embodiments, a target data resource of the plurality of data resources may be controlled to be presented by using a preset dynamic presentation effect when it is detected that the target data resource has been clicked. For example, an effect that the target data resource explodes, an effect that the target data resource slides rapidly towards the second edge or an effect that the target data resource slides towards an edge other than the first edge and the second edge may be presented.

In some embodiments, a target data resource of the plurality of data resources may be controlled to slide out from the second edge when it is detected that the target data resource has not been clicked.

In some embodiments, the plurality of data resources include a valid data resource and an invalid data resource. A quantity of valid data resources that have been clicked and a quantity of invalid data resources that have been clicked may be respectively counted. The valid data resource is a data resource that needs to be added, and the invalid data resource is a data resource that needs to be deducted. Alternatively, the invalid data resource is not a data resource that needs to be added or deducted, and is only used for presentation and clicking.

The data sending module 5304 is configured to send the quantity of clicked data resources to the data server, so that the data server determines a data transfer size according to the quantity of clicked data resources and returns the data transfer size to the first terminal.

In a specific implementation, if data resources distributed by the data server have the same resource size, the data server may obtain a product by multiplying the quantity of clicked data resources by the resource size of each data resource and use the product as a data transfer size. If the data server randomly distributes resource sizes of data resources, the data server may first determine a resource size of each data resource that has been clicked, then calculate a sum of resource sizes of all data resources that have been clicked, and use the sum as a data transfer size. The data server performs data transfer to the first terminal according to the data transfer size.

In some embodiments, when the invalid data resource is a data resource that needs to be deducted, the quantity of valid data resources that have been clicked and the quantity of invalid data resources that have been clicked to the data server may be sent. After receiving the quantity of valid data resources that have been clicked and the quantity of invalid data resources that have been clicked, the data server calculates a difference value obtained by subtracting the quantity of invalid data resources that have been clicked from the quantity of valid data resources that have been clicked, and then uses a product of the difference value and a resource size of each data resource as the data transfer size.

For example, the second terminal first opens the "red packet" function of WeChat. After a user selects "Red packet rain", the second terminal prompts the user to input "Red packet amount" and "Red packet quantity", and sends "Red packet amount" and "Red packet quantity" to the data server. The data server calculates the size of each red packet after receiving "Red packet amount" and "Red packet quantity", and sends a plurality of red packets to the first terminal. After receiving the plurality of "red packets", the first terminal controls the "red packets" to be randomly displayed at the X coordinates, and for the Y coordinates, a particular acceleration is used to simulate free fall. Meanwhile, it is controlled to randomly generate several red packets within 200 seconds. If a user clicks a red packet, a count value is added by 1. If an icon having another color is clicked by mistake, the count value is subtracted by 1. If no red packet is clicked, the count value stays unchanged. Eventually, a corresponding amount is transferred to the first terminal according to the count value obtained through counting.

In this embodiment of the present disclosure, a first terminal receives a plurality of data resources sent by a data server; controls the plurality of data resources to respectively slide in from a first edge of a display interface and slide towards a second edge opposite the first edge to dynamically present the plurality of data resources; detects a click operation on the dynamically presented plurality of data resources, and counts a quantity of clicked data resources of the plurality of data resources; and sends the quantity of clicked data resources to the data server, so that the data server determines a data transfer size according to the quantity of clicked data resources and returns the data transfer size to the first terminal, thereby promoting communication between users by dynamically presenting data resources and improving the frequency of data transfer.

Figure 54:
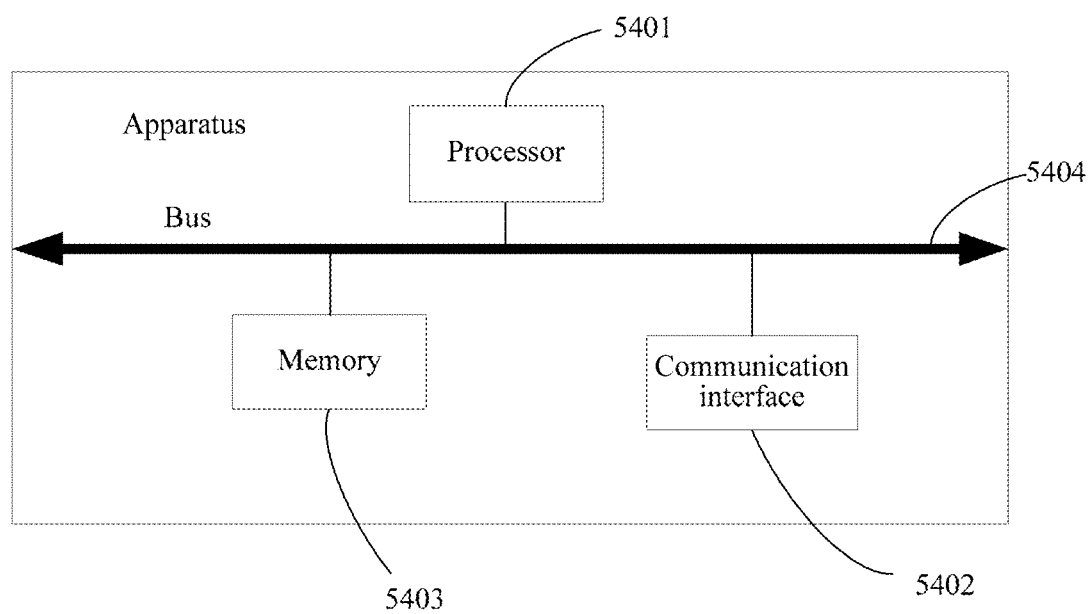
FIG. 54 is a schematic structural diagram of an information processing apparatus for receiving a data resource according to an embodiment of the present disclosure.

Referring to FIG. 54, FIG. 54 is a schematic structural diagram of according to an embodiment of the present disclosure according to another apparatus for receiving a data resource. As shown in FIG. 54, the apparatus may include: at least one processor 5401, for example, a CPU, at least one communication interface 5402, at least one memory 5403, and at least one bus 5406. The bus 5406 is configured to implement connection and communication between these components. The communication interface 5402 in the apparatus in this embodiment of the present disclosure is a wired sending port, or may be a wireless device, for example, an antenna apparatus, and is configured to perform signaling or data communication with another node device. The memory 5403 may be a high-speed random-access memory (RAM), or may be a non-volatile memory, for example, at least one magnetic disk memory. The memory 5403 optionally may further be at least one storage apparatus located far away from the processor 5401. The memory 5403 stores a group of program code. The processor 5401 is configured to invoke the program code stored in the memory, to perform the following operations:

receiving a plurality of data resources sent by a data server, the plurality of data resources being generated by the data server according to a received resource amount and resource quantity sent by a second terminal;

controlling the plurality of data resources to respectively slide in from a first edge of a display interface and slide towards a second edge opposite the first edge to dynamically present the plurality of data resources;

detecting a click operation on the dynamically presented plurality of data resources, and counting a quantity of clicked data resources of the plurality of data resources; and sending the quantity of clicked data resources to the data server, so that the data server determines a data transfer size according to the quantity of clicked data resources and returns the data transfer size to a first terminal.

The processor 5401 is further configured to perform the following operation steps:

controlling the plurality of data resources to slide in respectively from the first edge of the display interface and slide at an increased speed towards the second edge opposite the first edge within a preset time range.

The processor 5401 is further configured to perform the following operation steps:

randomly distributing a coordinate position of each data resource when it is detected that the plurality of data resources slide in respectively from the first edge of the display interface, the coordinate position includes a first coordinate and a second coordinate; and keeping the first coordinate unchanged and sliding each data resource in a coordinate direction of the second coordinate.

The processor 5401 is further configured to perform the following operation steps:

controlling a target data resource of the plurality of data resources to slide out from the second edge when it is detected that the target data resource has not been clicked.

The processor 5401 is further configured to perform the following operation steps:

respectively counting a quantity of valid data resources that have been clicked and a quantity of invalid data resources that have been clicked; and sending the quantity of valid data resources that have been clicked and the quantity of invalid data resources that have been clicked to the data server, so that the data server determines the data transfer size according to the quantity of valid data resources that have been clicked and the quantity of invalid data resources that have been clicked.

Figure 55:
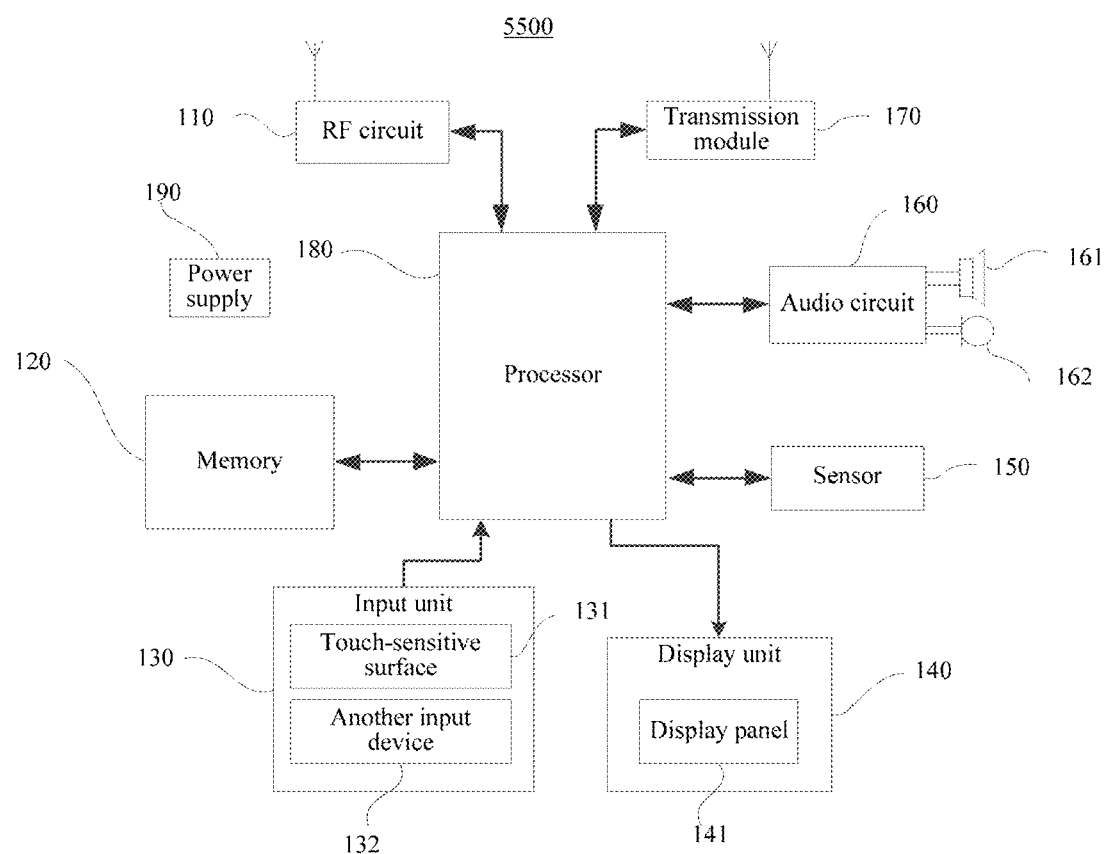
FIG. 55 is a schematic structural diagram of a terminal according to an embodiment of the present disclosure.

FIG. 55 is a schematic structural diagram of a terminal according to an embodiment of the present disclosure. The terminal may be a sending terminal running a sender client in a social application client, or may be a receiving terminal running a receiver client in a social application client. Specifically:

The terminal 5500 may include components such as a radio frequency (RF) circuit 110, a memory 120 including one or more computer readable storage media, an input unit 130, a display unit 140, a sensor 150, an audio circuit 160, a transmission module 170, a processor 180 including one or more processing cores, and a power supply 190. A person skilled in the prior art may understand that, the structure of the terminal shown in FIG. 55 does not constitute any limitation on the terminal, and may include components more or fewer than those shown in the figure, or a combination of some components, or different component layouts.

The RF circuit 110 may be used to receive and send information or receive and send a signal during a call, and in particular, after receiving downlink information of a base station, hand over the downlink information to one or more processors 180 for processing; and in addition, send related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LAN), and a duplexer. In addition, the RF circuit 110 may further communicate with a network and another device by using wireless communication. The wireless communication may use any communications standard or protocol, which includes, but is not limited to, a Global System for Mobile Communications (GSM), a General Packet Radio Service (GPRS), Code Division Multiple Access (CDMA), Wideband Code Division Multiple Access (WCDMA), Long Term Evolution (LTE), e-mail, a short messaging service (SMS), and the like.

The memory 120 may be configured to store a software program and a module, for example, a software program and a module corresponding to the terminal shown in the foregoing exemplary embodiments, and the processor 180 runs the software program and the module stored in the memory 120 to implement various functional applications and data processing, for example, implement video-based interaction. The memory 120 may mainly include a program storage area and a data storage area. The program storage area can store an operating system, an application program required by at least one function (such as a voice playback function and an image playback function), and the like. The data storage area may store data (such as audio data and an address book) created according to use of the terminal 5500. In addition, the memory 120 may include a high speed RAM, and may also include a non-volatile memory, such as at least one magnetic disk storage device, a flash memory, or another volatile solid-state storage device. Accordingly, the memory 120 may further include a memory controller, so that the processor 180 and the input unit 130 access the memory 120.

The input unit 130 may be configured to receive input number or character information, and generate a keyboard, mouse, joystick, optical, or trackball signal input related to the user setting and function control. Specifically, the input unit 130 may include a touch sensitive surface 131 and another input terminal 132. The touch sensitive surface 131 may also be referred to as a touch display screen or a touch panel, and may collect a touch operation of a user on or near the touch sensitive surface (such as an operation on the touch sensitive surface 131 or an operation near the touch sensitive surface 131 that are performed by a user by using any suitable object or accessory, such as a finger or a stylus), and drive a corresponding connection apparatus by using a preset program. In some embodiments, the touch sensitive surface 131 may include two parts: a touch detection apparatus and a touch controller. The touch detection apparatus detects a touch position input by a user, detects a signal generated by a touch operation, and sends the signal to the touch controller. The touch controller receives touch information from the touch detection apparatus, converts the touch information into contact coordinates, sends the contact coordinates to the processor 180, receives a command sent by the processor 180, and executes the command. In addition, the touch sensitive surface 131 may be implemented by using various types, such as a resistive type, a capacitive type, an infrared type, and a surface acoustic wave type. Besides the touch sensitive surface 131, the input unit 130 may further include the another input terminal 132. Specifically, the another input terminal 132 may include, but is not limited to, one or more of a physical keyboard, a functional key (such as a volume control key and a switch key), a trackball, a mouse, and a joystick.

The display unit 140 may be configured to display information input by a user or information provided to a user, and various graphical user interfaces of the terminal 5500, where these graphical user interfaces may be formed by a graph, a text, an icon, a video, and any combination thereof. The display unit 140 may include a display panel 141. In some embodiments, the display panel 141 may be configured in the form of a liquid crystal display (LCD), an organic light-emitting diode (OLED), or the like. Further, the touch sensitive surface 131 may cover the display panel 141. After detecting a touch operation on or near the touch sensitive surface 131, the touch sensitive surface 131 transfers the touch operation to the processor 180, so as to determine a type of a touch event. Subsequently, the processor 180 provides corresponding visual output on the display panel 141 according to the type of the touch event. In FIG. 55, the touch sensitive surface 131 and the display panel 141 are used as two separate parts to implement input and output functions; however, in some embodiments, the touch sensitive surface 131 and the display panel 141 may be integrated to implement the input and output functions.

The terminal 5500 may further include at least one sensor 150, for example, an optical sensor, a motion sensor, and other sensors. Specifically, the optical sensor may include an ambient light sensor and a proximity sensor, where the ambient light sensor may adjust the brightness of the display panel 141 according to brightness of the ambient light, and the proximity sensor may switch off the display panel 141 and/or backlight when the terminal 5500 is moved near an ear. As one type of the motion sensor, a gravity acceleration sensor may detect the magnitude of accelerations in various directions (which generally are triaxial), may detect the magnitude and direction of the gravity when the sensor is still, may be configured to identify an application of a mobile phone gesture (for example, switching between landscape and portrait modes, related games, and gesture calibration of a magnetometer), and a function related to vibration identification (such as a pedometer and a tap). Other sensors, for example, a gyroscope, a barometer, a hygrometer, a thermometer, and an infrared sensor, which may be configured in the terminal 5500 are not further described herein.

The audio circuit 160, a loudspeaker 161, and a microphone 162 may provide audio interfaces between the user and the terminal 5500. The audio circuit 160 may transmit, to the loudspeaker 161, an electric signal converted from received audio data. The loudspeaker 161 converts the electrical signal into a sound signal for output. On the other hand, the microphone 162 converts a collected sound signal into an electrical signal. The audio circuit 160 receives the electrical signal and converts the electrical signal into audio data, and outputs the audio data to the processor 180 for processing. Next, the processor 180 sends the audio data to another terminal by using the RF circuit 110, or outputs the audio data to the memory 120 for further processing. The audio circuit 160 may further include an earplug jack, so as to provide communication between a peripheral earphone and the terminal 5500.

The terminal 5500 may help, by using the transmission module 170, the user receive and send an e-mail, browse a webpage, access a streaming medium, and the like, and the transmission module 170 provides the user with wireless or wired broadband Internet access. Although FIG. 55 shows the transmission module 170, it may be understood that, the transmission module 170 is not an essential part of the terminal 5500, and can be completely omitted as required without changing the nature of the present disclosure.

The processor 180 is a control center of the terminal 5500, and connects various parts of a whole mobile phone by using various interfaces and circuits. By running or executing the software program and/or the module stored in the memory 120 and invoking data stored in the memory 120, the processor 180 performs various functions and data processing of the terminal 5500, thereby performing overall monitoring on the mobile phone. In some embodiments, the processor 180 may include one or more processing cores. Preferably, the processor 180 may integrate an application processor and a modem. The application processor mainly processes an operating system, a user interface, an application program, and the like, and the modem mainly processes wireless communication. It may be understood that, the foregoing modem may also be not integrated into the processor 180.

The terminal 5500 further includes the power supply 190 (such as a battery) for supplying power to the components. Preferably, the power supply may be logically connected to the processor 180 by using a power supply management system, thereby implementing functions such as charging, discharging, and power consumption management by using the power supply management system. The power supply 190 may further include any component, such as one or more direct current or alternate current power supplies, recharging systems, power supply fault detection circuits, power supply converters or inverters, and power supply state indicators.

Although not shown in the figure, the terminal 5500 may further include a camera, a Bluetooth module, and the like, which are not further described herein. Specifically, in this embodiment, the display unit of the terminal is a touch screen display, and the terminal further includes a memory and one or more programs. The one or more programs are stored in the memory, and configured to be executed by one or more processors. The one or more programs contain instructions which can be used to perform operations executed by the sender client, the receiver client, and the terminal in the foregoing embodiments.

Figure 56:
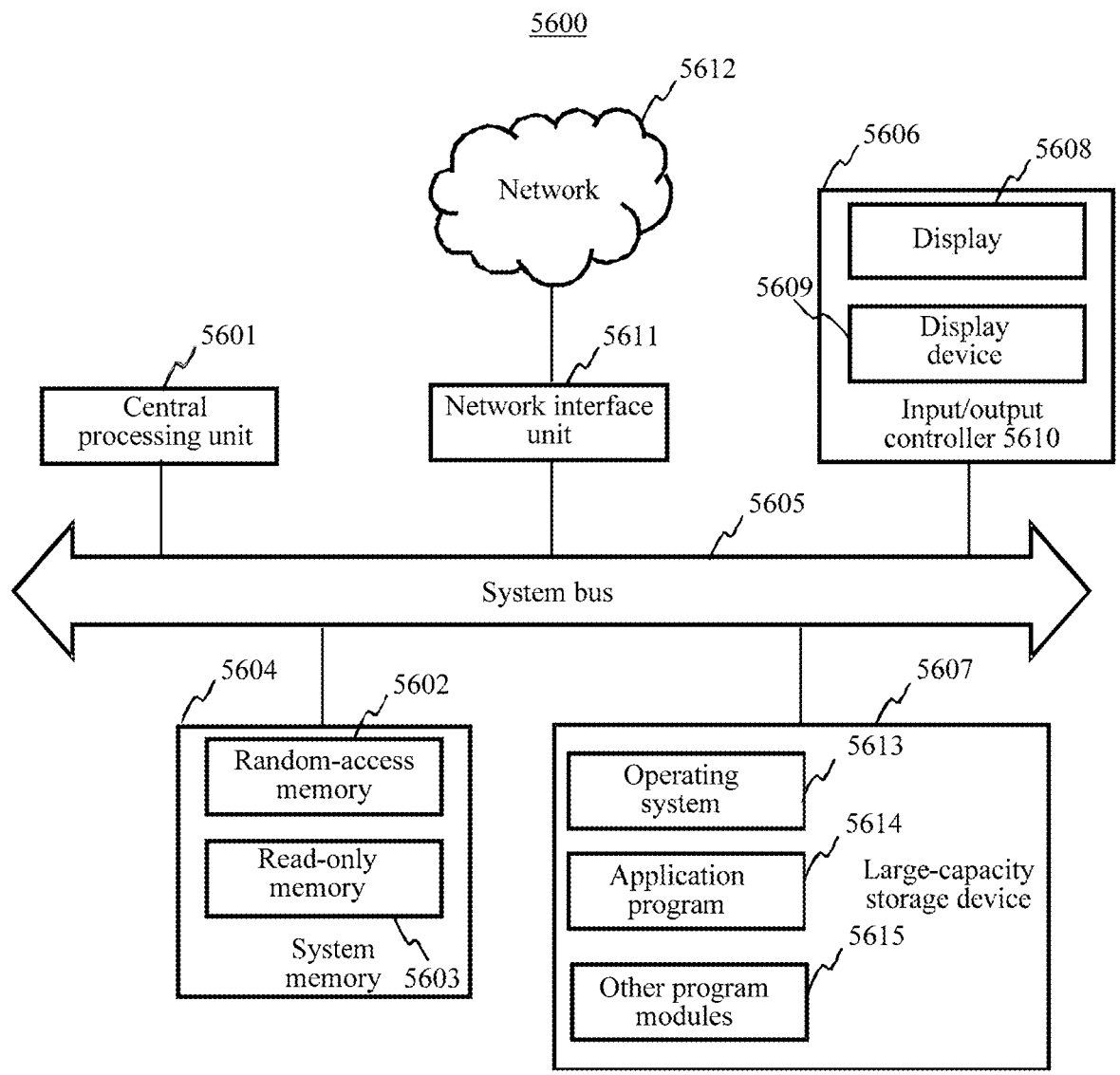
FIG. 56 is a schematic structural diagram of a server according to an embodiment of the present disclosure.

FIG. 56 is a schematic structural diagram of a server according to an embodiment of the present disclosure. The server 5600 may vary greatly due to different configurations or performance, and may include one or more CPUs 5622 (for example, one or more processors) and a memory 5632, and one or more storage media 5630 (for example, one or more mass storage devices) that store applications 5642 or data 5644. The memory 5632 and the storage medium 5630 may be transient or persistent storages. The program stored in the storage medium 5630 may include one or more modules (not shown in the figure), and each module may include a series of instructions and operations for the server. Still furthermore, the CPU 5622 may be configured to communicate with the storage medium 5630, and perform, on the server 5600, a series of instructions and operations in the storage medium 5630.

The server 5600 may further include one or more power supplies 5626, one or more wired or wireless network interfaces 5650, one or more input/output interfaces 5658, one or more keyboards 5656, and/or, one or more operating systems 5641, for example, Windows Server™, Mac OS X™, Unix™, Linux™, FreeBSD™, and the like.

The server 5600 may be configured to perform the steps performed by the servers in the methods provided in the foregoing embodiments.

Figure 57:
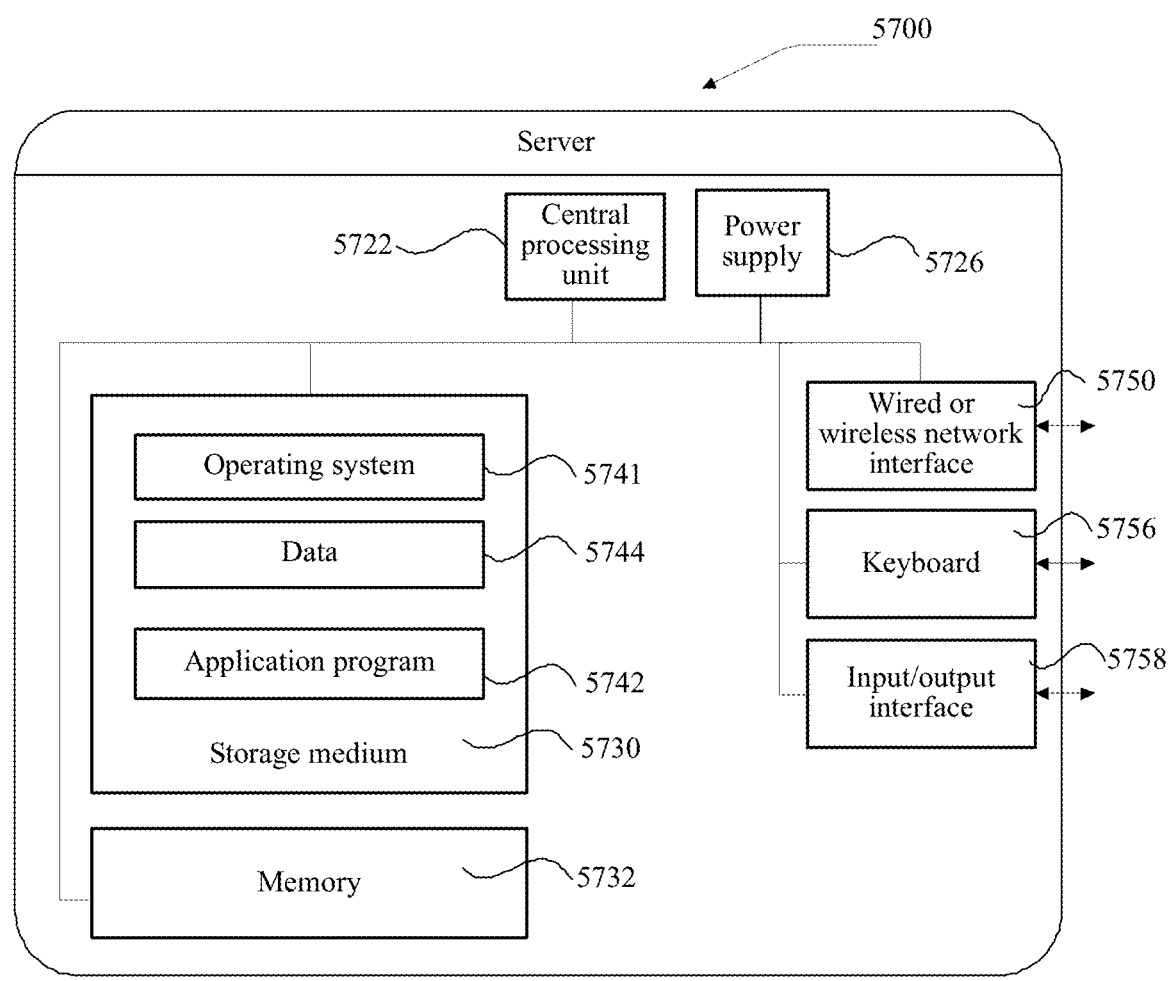
FIG. 57 is a schematic structural diagram of a server according to an embodiment of the present disclosure.

Referring to FIG. 57, FIG. 57 is a schematic structural diagram of a server according to an embodiment of the present disclosure. The server is configured to implement the operations performed by the servers in the methods provided in the foregoing embodiments. Specifically:

A server 5700 includes a CPU 5701, a system memory 5704 including a RAM 5702 and a read-only memory (ROM) 5703, and a system bus 5705 connecting the system memory 5704 and the CPU 5701. The server 5700 further includes a basic input/output system (I/O system) 5706 assisting in transmitting information between devices in a computer, and a large-capacity storage device 5707 configured to store an operating system 5713, an application program 5714 and another program module 5715.

The basic I/O system 5706 includes a display 5708 configured to display information and an input device 5709, such as a mouse or a keyboard, configured to input information for a user. The display 5708 and the input device 5709 are both connected to the CPU 5701 by using an input/output controller 5710 connected to the system bus 5705. The basic I/O system 5706 may further include the input/output controller 5710 to be configured to receive and process inputs from multiple other devices such as a keyboard, a mouse, and an electronic stylus. Similarly, the input/output controller 5710 further provides an output to a display screen, a printer or another type of output device.

The large-capacity storage device 5707 is connected to the CPU 5701 by using a large-capacity storage controller (not shown) connected to the system bus 5705. The large-capacity storage device 5707 and its associated computer readable medium provide non-volatile storage for the server 5700. That is, the large-capacity storage device 5707 may include the computer readable medium (not shown) such as a hard disk or a CD-ROM driver.

Without loss of generality, the computer readable medium may include a computer storage medium and a communications medium. The computer storage medium includes volatile and non-volatile media, and removable and non-removable media implemented by using any method or technology used for storing information such as a computer readable instruction, a data structure, a program module or other data. The computer storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices. Certainly, persons skilled in art can know that the computer storage medium is not limited to the foregoing several types. The system memory 5704 and the large-capacity storage device 5707 may be collectively referred to as a memory.

According to various embodiments of the present disclosure, the server 5700 may further be connected, by using a network such as the Internet to a remote computer on the network and run. That is, the server 5700 may be connected to a network 5712 by using a network interface unit 5711 connected to the system bus 5705, or may also be connected to another type of network or remote computer system (not shown) by using the network interface unit 5711.

The memory further includes one or more programs. The one or more programs are stored in the memory and configured to be executed by one or more processors. The foregoing one or more programs include instructions used to perform the methods on a server side of the foregoing embodiments.

In an exemplary embodiment, a non-transitory computer readable storage medium including instructions, for example, a memory including instructions, is further provided. The instructions may be executed by a processor of a terminal to implement steps on a sender client or a receiver client side or a terminal side in the foregoing method embodiments, or the instructions are executed by a processor of a server to implement steps on a server side in the foregoing method embodiments. For example, the non-transitory computer readable storage medium may be a read-only memory (ROM), a random access memory (RAM), a compact disc read-only memory (CD-ROM), a magnetic tape, a floppy disk, an optical data storage device, and the like.

It should be understood that the "plurality" in this specification means two or more. "and/or" in this specification merely describes an association between associated objects, indicating that three relationships may exist, for example, A and/or B may indicate three situations: only A exists, A and B exist at the same time, and only B exists. In addition, the character "/" in this specification usually represents that the former and latter associated objects are in an "or" relationship.

A person of ordinary skill in the art may understand that that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for distributing a resource package, performed at a first server, the method comprising:
   acquiring a resource package parameter determined by a sender client associated with a first user of a social networking application, the resource package parameter being used to determine a quantity of resource packages to be sent and a first quantity, and the first quantity being a quantity of first-type resources to be sent;
   invoking an interface with a second server, and acquiring a current conversion rate that is between the first-type resource and a second-type resource, the conversion rate being issued by the second server;
   calculating a quantity of second-type resources equal in value to the first quantity of first-type resources according to the conversion rate, and using the quantity as a second quantity;
   deducting the second quantity of second-type resources from a second-type resource account of the sender client, and generating at least one resource package, a sum of quantities corresponding to the at least one resource package being equal to the first quantity, so that the sender client sends link information to a plurality of receiving ends corresponding to a plurality of receiving clients associated with a plurality of receiving users of the social networking application, wherein the first user and each of the plurality of receiving users have a friendship relationship in the social networking application, the link information being used to receive the at least one resource package;
   distributing the at least one resource package to the plurality of receiving clients by using the link information, including causing the link to be displayed in a group chat window of the social networking application;
   triggering a timer having a countdown timing time when the link is caused to be displayed in the group chat window;
   receiving, from a first receiving client of the plurality of receiving clients within the countdown timing time, a resource-package receiving request; and
   in response to receiving the request:
      identifying the request as a valid request; and
      sending a first resource package of the at least one resource package to the first client, the first resource package being a fixed quantity of the first type resources, and the fixed quantity is less than the first quantity.

2. The method according to claim 1, further comprising:
   after generating at least one resource package:
   generating a resource package identifier for the at least one resource package; and
   sending the resource package identifier to the sender client, so that the sender client generates the link information comprising the resource package identifier.

3. The method according to claim 1, further comprising:
   receiving a resource exchange request sent by any social application client, the resource exchange request comprising a third quantity and a fourth quantity, the third quantity being a quantity of first-type resources to be exchanged, and the fourth quantity being a quantity of second-type resources equal in value to the third quantity of first-type resources; and
   deducting the fourth quantity of second-type resources from the second-type resource account of the social application client, and adding the third quantity of first-type resources to a first-type resource account of the social application client.

4. The method according to claim 1, further comprising:
receiving a resource exchange request sent by any social application client, the resource exchange request comprising a fifth quantity and a sixth quantity, the fifth quantity being a quantity of second-type resources to be exchanged, and the sixth quantity being a quantity of first-type resources equal in value to the fifth quantity of second-type resources; and
deducting the sixth quantity of first-type resources from a first-type resource account of the social application client, and adding the fifth quantity of second-type resources to the second-type resource account of the social application client.

5. The method according to claim 1, further comprising:
receiving a resource acquiring request sent by any social application client, the resource acquiring request carrying a seventh quantity of first-type resources to be acquired; and
deducting resources corresponding to the seventh quantity from a resource account of the social application client, and generating an order at least comprising the seventh quantity and address information, the order being used to distribute a physical resource represented by the seventh quantity of first-type resources to a user of the social application client according to the address information.

6. The method according to claim 5, wherein the deducting resources corresponding to the seventh quantity from a resource account of the social application client comprises:
deducting the seventh quantity of first-type resources from the first-type resource account in accordance with a determination that a remaining quantity of first-type resources in a first-type resource account is not less than the seventh quantity.

7. The method according to claim 5, wherein the deducting resources corresponding to the seventh quantity from a resource account of the social application client by interacting with the first server comprises:
determining a difference quantity between the seventh quantity and a remaining quantity of first-type resources in a first-type resource account and an eighth quantity matching the difference quantity in accordance with a determination that the remaining quantity is less than the seventh quantity, the eighth quantity being a quantity of second-type resources equal in value to and the difference quantity of first-type resources, and the eighth quantity being determined according to the current conversion rate between the first-type resource and the second-type resource and the difference quantity; and
deducting the remaining first-type resources from the first-type resource account, and deducting the eighth quantity of second-type resources from the second-type resource account.

8. A computer serving as a first server, comprising:
one or more processors;
memory; and
a plurality of instructions stored in the memory, wherein the instructions, when executed by the one or more processors, cause the first server to perform the following operations:
acquiring a resource package parameter determined by a sender client associated with a first user of a social networking application, the resource package parameter being used to determine a quantity of resource packages to be sent and a first quantity, and the first quantity being a quantity of first-type resources to be sent;
invoking an interface with a second server, and acquiring a current conversion rate that is between the first-type resource and a second-type resource, the conversion rate being issued by the second server;
calculating a quantity of second-type resources equal in value to the first quantity of first-type resources according to the conversion rate, and using the quantity as a second quantity;
deducting the second quantity of second-type resources from a second-type resource account of the sender client, and generating at least one resource package, a sum of quantities corresponding to the at least one resource package being equal to the first quantity, so that the sender client sends link information to a plurality of receiving ends corresponding to a plurality of receiving clients associated with a plurality of receiving users of the social networking application, wherein the first user and each of the plurality of receiving users have a friendship relationship in the social networking application, the link information being used to receive the at least one resource package;
distributing the at least one resource package to the plurality of receiving clients by using the link information, including causing the link to be displayed in a group chat window of the social networking application;
triggering a timer having a countdown timing time when the link is caused to be displayed in the group chat window;
receiving, from a first receiving client of the plurality of receiving clients within the countdown timing time, a resource-package receiving request; and
in response to receiving the request:
identifying the request as a valid request; and
sending a first resource package of the at least one resource package to the first client, the first resource package being a fixed quantity of the first type resources, and the fixed quantity is less than the first quantity.

9. The computer according to claim 8, wherein the plurality of operations further comprise:
after generating at least one resource package:
generating a resource package identifier for the at least one resource package; and
sending the resource package identifier to the sender client, so that the sender client generates the link information comprising the resource package identifier.

10. The computer according to claim 8, wherein the plurality of operations further comprise:
receiving a resource exchange request sent by any social application client, the resource exchange request comprising a third quantity and a fourth quantity, the third quantity being a quantity of first-type resources to be exchanged, and the fourth quantity being a quantity of second-type resources equal in value to the third quantity of first-type resources; and
deducting the fourth quantity of second-type resources from the second-type resource account of the social application client, and adding the third quantity of first-type resources to a first-type resource account of the social application client.

11. The computer according to claim 8, wherein the plurality of operations further comprise:
  receiving a resource exchange request sent by any social application client, the resource exchange request comprising a fifth quantity and a sixth quantity, the fifth quantity being a quantity of second-type resources to be exchanged, and the sixth quantity being a quantity of first-type resources equal in value to the fifth quantity of second-type resources; and
  deducting the sixth quantity of first-type resources from a first-type resource account of the social application client, and adding the fifth quantity of second-type resources to the second-type resource account of the social application client.

12. The computer according to claim 8, wherein the plurality of operations further comprise:
  receiving a resource acquiring request sent by any social application client, the resource acquiring request carrying a seventh quantity of first-type resources to be acquired; and
  deducting resources corresponding to the seventh quantity from a resource account of the social application client, and generating an order at least comprising the seventh quantity and address information, the order being used to distribute a physical resource represented by the seventh quantity of first-type resources to a user of the social application client according to the address information.

13. The computer according to claim 12, wherein the deducting resources corresponding to the seventh quantity from a resource account of the social application client comprises:
  deducting the seventh quantity of first-type resources from the first-type resource account in accordance with a determination that a remaining quantity of first-type resources in a first-type resource account is not less than the seventh quantity.

14. The computer according to claim 12, wherein the deducting resources corresponding to the seventh quantity from a resource account of the social application client by interacting with the first server comprises:
  determining a difference quantity between the seventh quantity and a remaining quantity of first-type resources in a first-type resource account and an eighth quantity matching the difference quantity in accordance with a determination that the remaining quantity is less than the seventh quantity, the eighth quantity being a quantity of second-type resources equal in value to and the difference quantity of first-type resources, and the eighth quantity being determined according to the current conversion rate between the first-type resource and the second-type resource and the difference quantity; and
  deducting the remaining first-type resources from the first-type resource account, and deducting the eighth quantity of second-type resources from the second-type resource account.

15. A non-transitory computer-readable storage medium storing a plurality of instructions configured for execution by a computer having one or more processors and serving as a first server, wherein the plurality of instructions cause the first server to perform operations comprising:
  acquiring a resource package parameter determined by a sender client associated with a first user of a social networking application, the resource package parameter being used to determine a quantity of resource packages to be sent and a first quantity, and the first quantity being a quantity of first-type resources to be sent;
  invoking an interface with a second server, and acquiring a current conversion rate that is between the first-type resource and a second-type resource, the conversion rate being issued by the second server;
  calculating a quantity of second-type resources equal in value to the first quantity of first-type resources according to the conversion rate, and using the quantity as a second quantity;
  deducting the second quantity of second-type resources from a second-type resource account of the sender client, and generating at least one resource package, a sum of quantities corresponding to the at least one resource package being equal to the first quantity, so that the sender client sends link information to a plurality of receiving ends corresponding to a plurality of receiving clients associated with a plurality of receiving users of the social networking application, wherein the first user and each of the plurality of receiving users have a friendship relationship in the social networking application, the link information being used to receive the at least one resource package;
  distributing the at least one resource package to the plurality of receiving clients by using the link information, including causing the link to be displayed in a group chat window of the social networking application;
  triggering a timer having a countdown timing time when the link is caused to be displayed in the group chat window;
  receiving, from a first receiving client of the plurality of receiving clients within the countdown timing time, a resource-package receiving request; and
  in response to receiving the request:
    identifying the request as a valid request; and
    sending a first resource package of the at least one resource package to the first client, the first resource package being a fixed quantity of the first type resources, and the fixed quantity is less than the first quantity.

16. The non-transitory computer-readable storage medium according to claim 15, wherein the plurality of operations further comprise:
  after generating at least one resource package:
  generating a resource package identifier for the at least one resource package; and
  sending the resource package identifier to the sender client, so that the sender client generates the link information comprising the resource package identifier.

17. The non-transitory computer-readable storage medium according to claim 15, wherein the plurality of operations further comprise:
  receiving a resource exchange request sent by any social application client, the resource exchange request comprising a third quantity and a fourth quantity, the third quantity being a quantity of first-type resources to be exchanged, and the fourth quantity being a quantity of second-type resources equal in value to the third quantity of first-type resources; and
  deducting the fourth quantity of second-type resources from the second-type resource account of the social application client, and adding the third quantity of first-type resources to a first-type resource account of the social application client.

18. The non-transitory computer-readable storage medium according to claim 15, wherein the plurality of operations further comprise:
- receiving a resource exchange request sent by any social application client, the resource exchange request comprising a fifth quantity and a sixth quantity, the fifth quantity being a quantity of second-type resources to be exchanged, and the sixth quantity being a quantity of first-type resources equal in value to the fifth quantity of second-type resources; and
- deducting the sixth quantity of first-type resources from a first-type resource account of the social application client, and adding the fifth quantity of second-type resources to the second-type resource account of the social application client.

* * * * *